US010868645B2

(12) United States Patent
Wang et al.

(10) Patent No.: US 10,868,645 B2
(45) Date of Patent: Dec. 15, 2020

(54) METHOD AND BASE STATION FOR TRANSMITTING DOWNLINK DATA

(71) Applicant: Huawei Technologies Co., Ltd., Shenzhen (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/771,018

(22) PCT Filed: Mar. 8, 2016

(86) PCT No.: PCT/CN2016/075882

§ 371 (c)(1),
(2) Date: Apr. 25, 2018

(87) PCT Pub. No.: WO2017/075928

PCT Pub. Date: May 11, 2017

(65) Prior Publication Data

US 2018/0359061 A1 Dec. 13, 2018

(30) Foreign Application Priority Data

Nov. 6, 2015 (WO) ................ PCT/CN2015/094045

(51) Int. Cl.
*H04L 5/00* (2006.01)
*H04L 1/00* (2006.01)
(Continued)

(52) U.S. Cl.
CPC ................ *H04L 5/001* (2013.01); *H04L 1/00* (2013.01); *H04L 5/0007* (2013.01); (Continued)

(58) Field of Classification Search
CPC ......... H04L 1/00; H04L 5/0007; H04L 5/001; H04L 5/0048; H04L 5/0053; H04W 88/02; H04W 88/08
(Continued)

(56) References Cited

U.S. PATENT DOCUMENTS 9,980,257 B2 * 5/2018 Chen ..................... H04L 5/0048
2013/0077582 A1 * 3/2013 Kim .................... H04W 74/006
370/329

(Continued)

FOREIGN PATENT DOCUMENTS

CN 101568180 A 10/2009
CN 104104467 A 10/2014

(Continued)

OTHER PUBLICATIONS

Machine Translation and Abstract of Chinese Publication No. CN101568180, Oct. 28, 2009, 16 pages.

(Continued)

*Primary Examiner* — Robert J Lopata
(74) *Attorney, Agent, or Firm* — Conley Rose, P.C.

(57) ABSTRACT

A method for transmitting downlink data is provided. The method includes sending, by a base station, Q orthogonal frequency division multiplexing (OFDM) symbols to user equipment (UE) according to a predetermined pattern; and receiving, by the base station, a response message sent by the UE, where the response message is a message sent by the terminal device to the base station after the terminal device receives the Q OFDM symbols, the predetermined pattern is a pattern including the Q OFDM symbols in a physical resource block (PRB), Q is a positive integer that is greater than or equal to 1 and less than 12 or 14, and at least one of the Q OFDM symbols in the PRB includes a downlink control signal and downlink data.

20 Claims, 134 Drawing Sheets

(51) Int. Cl.
*H04W 88/02* (2009.01)
*H04W 88/08* (2009.01)

(52) U.S. Cl.
CPC .......... *H04L 5/0048* (2013.01); *H04L 5/0053* (2013.01); *H04W 88/02* (2013.01); *H04W 88/08* (2013.01)

(58) Field of Classification Search
USPC .......................................................... 370/329
See application file for complete search history.

(56) References Cited

U.S. PATENT DOCUMENTS

2013/0201926 A1 8/2013 Nam et al.
2013/0223402 A1* 8/2013 Feng ..................... H04L 5/0007 370/330
2015/0036556 A1* 2/2015 Imamura ............... H04W 28/06 370/277
2015/0146558 A1 5/2015 Yi et al.
2015/0257132 A1* 9/2015 Park ....................... H04B 7/068 370/329
2016/0088594 A1* 3/2016 Xiong ..................... H04W 4/70 370/329
2016/0088652 A1* 3/2016 Patel ..................... H04L 5/0044 370/329
2016/0205540 A1* 7/2016 Wu ....................... H04L 1/1854 370/329
2016/0330003 A1* 11/2016 Chung ................ H04L 27/2613
2017/0012746 A1 1/2017 Xia et al.
2017/0041103 A1* 2/2017 Maattanen ........... H04B 7/0626
2017/0041829 A1 2/2017 Dai et al.
2017/0105206 A1* 4/2017 Maattanen ............ H04L 5/0048
2018/0035430 A1* 2/2018 Futaki ................... H04L 5/0044
2018/0206230 A1* 7/2018 Cheng ................. H04J 13/0059
2018/0212732 A1* 7/2018 You ....................... H04L 5/0053
2018/0213379 A1* 7/2018 Xiong ..................... H04W 4/70
2018/0234998 A1* 8/2018 You ................... H04W 72/1273
2018/0241458 A1* 8/2018 Jung ...................... H04B 7/024
2018/0262288 A1* 9/2018 Gao .......................... H04J 7/00
2018/0324604 A1* 11/2018 Yang ..................... H04W 16/14
2018/0324834 A1* 11/2018 Sebire ....................... H04L 1/00
2018/0367279 A1* 12/2018 Hellge .................... H04L 5/001
2019/0068352 A1* 2/2019 Xiong ................... H04L 5/0051

FOREIGN PATENT DOCUMENTS

CN 104782067 A 7/2015
CN 104883237 A 9/2015
CN 105025574 A 11/2015
WO 2014119919 A1 8/2014
WO 2015148076 A1 10/2015

OTHER PUBLICATIONS

Foreign Communication From a Counterpart Application, PCT Application No. PCT/CN2015/094045, International Search Report dated Jul. 28, 2016, 7 pages.
Foreign Communication From a Counterpart Application, PCT Application No. PCT/CN2015/094045, Written Opinion dated Jul. 28, 2016, 6 pages.
Foreign Communication From a Counterpart Application, PCT Application No. PCT/CN2016/075882, English Translation of International Search Report dated Jul. 28, 2016, 2 pages.
Foreign Communication From a Counterpart Application, PCT Application No. PCT/CN2016/075882, English Translation of Written Opinion dated Jul. 28, 2016, 6 pages.
Foreign Communication From a Counterpart Application, European Application No. 16861201.8, Extended European Search Report dated Sep. 18, 2018, 8 pages.
Machine Translation and Abstract of Chinese Publication No. CN104104467, Oct. 15, 2014, 34 pages.
Foreign Communication From a Counterpart Application, Chinese Application No. 201680064710.8, Chinese Office Action dated Nov. 13, 2019, 7 pages.

* cited by examiner

CONT. FROM FIG. 5A

TO FIG. 5C

CONT. FROM FIG. 5B

CONT. FROM FIG. 6A

CONT. FROM FIG. 10A

One antenna port

One antenna port

TO FIG. 27B

Two antenna ports

Two antenna ports

One antenna port

CONT. FROM FIG. 45A

CONT. FROM FIG. 50A

CONT. FROM FIG. 51A

CONT. FROM FIG. 58A

CONT. FROM FIG. 72A

TO FIG. 74B

One antenna port

One antenna port

One antenna port

One antenna port

One antenna port

METHOD AND BASE STATION FOR TRANSMITTING DOWNLINK DATA

CROSS-REFERENCE TO RELATED APPLICATIONS

This application is a national stage of International Application No. PCT/CN2016/075882, filed on Mar. 8, 2016, which claims priority to International Application No. PCT/CN2015/094045, filed on Nov. 6, 2015, both of which are hereby incorporated by reference in their entireties.

TECHNICAL FIELD

The present disclosure relates to the communications field, and in particular, to a method and base station for transmitting downlink data.

BACKGROUND

In a future 5th Generation (5G) system, latency reduction is an important requirement. A lower latency is required in many application scenarios of future 5G, for example, telemedicine, Internet of Vehicles, and an industrial precision control system. These scenarios are referred to as ultra low latency (ULL). Currently, in a 5G case and scenario definition in a 3rd Generation Partnership Project (3GPP) standard conference, a standard of a low latency system is defined as follows. An end-to-end (that is, from a transmit end to a receive end and then from the receive end to the transmit end) latency is less than an end-to-end latency in an existing Long Term Evolution (LTE) technology. The existing LTE technology cannot meet this requirement.

In the existing LTE technology, each subframe is a time transmission unit, and duration of a subframe is 1 milliseconds (ms). As shown in FIG. 1, for a downlink (from a base station to a terminal), an evolved NodeB (eNB) sends an initially-transmitted data packet in an $n^{th}$ subframe, user equipment (UE) feeds back negative acknowledgement (NACK) or acknowledgement (ACK) information in an $(n+4)^{th}$ subframe (4 ms later), and the eNB needs to transmit a retransmitted data packet after n+8 subframes (8 ms later) (retransmission is performed only when the NACK information is fed back, and the retransmission is not required when the ACK information is fed back). Therefore, the existing LTE technology cannot meet a requirement for a lower latency.

SUMMARY

Embodiments of the present disclosure provide a method and base station for transmitting a downlink control signal. In comparison with an existing LTE technology, the embodiments of the present disclosure can help reduce end-to-end transmission time.

According to a first aspect, an embodiment of the present disclosure provides a method for transmitting downlink data, and the method includes sending, by a base station, Q orthogonal frequency division multiplexing (OFDM) symbols to UE according to a predetermined pattern; and receiving, by the base station, a response message sent by the UE, where the response message is a message sent by the terminal device to the base station after the terminal device receives the Q OFDM symbols, where the predetermined pattern is a pattern including the Q OFDM symbols in a physical resource block (PRB); Q is a positive integer that is greater than or equal to 1 and less than 12 or 14; and at least one of the Q OFDM symbols in the PRB includes a downlink control signal and downlink data.

In a first possible implementation of the first aspect, the Q OFDM symbols further include a cell-specific reference signal (CRS); and a subcarrier carrying the downlink control signal and at least one subcarrier carrying the CRS are the same or are adjacent in a frequency domain.

With reference to the first aspect or the first possible implementation of the first aspect, in a second possible implementation, in each OFDM symbol, the downlink control signal occupies two resource elements REs in every M PRBs, and M is an integer greater than or equal to 1.

With reference to the second possible implementation of the first aspect, in a third possible implementation, in each PRB, there are at least two OFDM symbols in N OFDM symbols including the downlink control signal in a downlink subframe, where a subcarrier carrying the downlink control signal in an OFDM symbol in the at least two OFDM symbols is different from at least one subcarrier carrying the downlink control signal in another OFDM symbol in the at least two OFDM symbols; and N is a positive integer greater than or equal to 2.

With reference to any one of the first aspect, or the first to the third possible implementations of the first aspect, in a fourth possible implementation, the OFDM symbols including the downlink control signal include a CRS.

With reference to any one of the first aspect, or the first to the third possible implementations of the first aspect, in a fifth possible implementation, the OFDM symbols including the downlink control signal do not include a CRS.

With reference to any one of the first aspect, or the first to the third possible implementations of the first aspect, in a sixth possible implementation, in the OFDM symbols including the downlink control signal, a CRS is included in every other OFDM symbol.

With reference to the fifth possible implementation of the first aspect, in a seventh possible implementation, in the predetermined pattern, in an OFDM symbol that does not include the CRS, a subcarrier carrying the downlink control signal and at least one subcarrier carrying the CRS are the same or are adjacent in a frequency domain.

With reference to either of the fourth possible implementation and the sixth possible implementation of the first aspect, in an eighth possible implementation, in the predetermined pattern, in an OFDM symbol that includes the CRS, a subcarrier carrying the downlink control signal and at least one subcarrier carrying the CRS are adjacent in a frequency domain; and in an OFDM symbol that does not include the CRS, a subcarrier carrying the downlink control signal and at least one subcarrier carrying the CRS in an OFDM symbol that includes the CRS are the same or are adjacent in a frequency domain.

According to a second aspect, an embodiment of the present disclosure provides a base station for transmitting a downlink control signal, and the base station includes a transmitter configured to send Q OFDM symbols to UE according to a predetermined pattern; and a receiver configured to receive a response message sent by the UE, where the response message is a message sent by the terminal device to the base station after the terminal device receives the Q OFDM symbols, where the predetermined pattern is a pattern including the Q OFDM symbols in a PRB; Q is a positive integer that is greater than or equal to 1 and less than 12 or 14; and at least one of the Q OFDM symbols in the PRB includes a downlink control signal and downlink data.

In a first possible implementation of the second aspect, the Q OFDM symbols further include a CRS; and a subcarrier carrying the downlink control signal and at least one subcarrier carrying the CRS are the same or are adjacent in a frequency domain.

With reference to the second aspect or the first possible implementation of the second aspect, in a second possible implementation, in each OFDM symbol, the downlink control signal occupies two resource elements (REs) in every M PRBs, and M is an integer greater than or equal to 1.

With reference to the second possible implementation of the second aspect, in a third possible implementation, in each PRB, there are at least two OFDM symbols in N OFDM symbols including the downlink control signal in a downlink subframe, where a subcarrier carrying the downlink control signal in an OFDM symbol in the at least two OFDM symbols is different from a subcarrier carrying at least one downlink control signal in another OFDM symbol in the at least two OFDM symbols; and N is a positive integer greater than or equal to 2.

With reference to any one of the second aspect, or the first to the third possible implementations of the first aspect, in a fourth possible implementation, the OFDM symbols including the downlink control signal include a CRS.

With reference to any one of the second aspect, or the first to the third possible implementations of the first aspect, the OFDM symbols including the downlink control signal do not include a CRS.

With reference to any one of the second aspect, or the first to the third possible implementations of the first aspect, in a sixth possible implementation, in the OFDM symbols including the downlink control signal, a CRS is included in every other OFDM symbol.

With reference to the fifth possible implementation of the second aspect, in a seventh possible implementation, in the predetermined pattern, in an OFDM symbol that does not include the CRS, a subcarrier carrying the downlink control signal and at least one subcarrier carrying the CRS are the same or are adjacent in a frequency domain.

With reference to either of the fourth possible implementation and the sixth possible implementation of the second aspect, in an eighth possible implementation, in the predetermined pattern, in an OFDM symbol that includes the CRS, a subcarrier carrying the downlink control signal and a subcarrier carrying the CRS are adjacent in a frequency domain; and in an OFDM symbol that does not include the CRS, a subcarrier carrying the downlink control signal and a subcarrier carrying the CRS in an OFDM symbol that includes the CRS are the same or are adjacent in a frequency domain.

It may be learned from the foregoing solutions that, according to the method and the base station for transmitting a downlink control signal that are provided in the embodiments of the present disclosure, the base station sends the Q OFDM symbols to the UE according to the predetermined pattern, and receives the response message sent by the UE after the UE receives the Q OFDM symbols. Because Q is a positive integer that is greater than or equal to 1 and less than 12 or 14, an end-to-end transmission latency is reduced by transmitting Q symbols that are less than symbols included in a subframe, so that a ULL requirement can be met. Therefore, in comparison with an existing manner of mapping the downlink control signal to a downlink subframe for transmission and the existing LTE technology, the method and the base station for transmitting a downlink control signal that are provided in the embodiments of the present disclosure helps reduce the end-to-end latency.

BRIEF DESCRIPTION OF DRAWINGS

To describe the technical solutions in the embodiments of the present disclosure or in the prior art more clearly, the following briefly describes the accompanying drawings required for describing the embodiments or the prior art.

DESCRIPTION OF EMBODIMENTS

Figure 1:
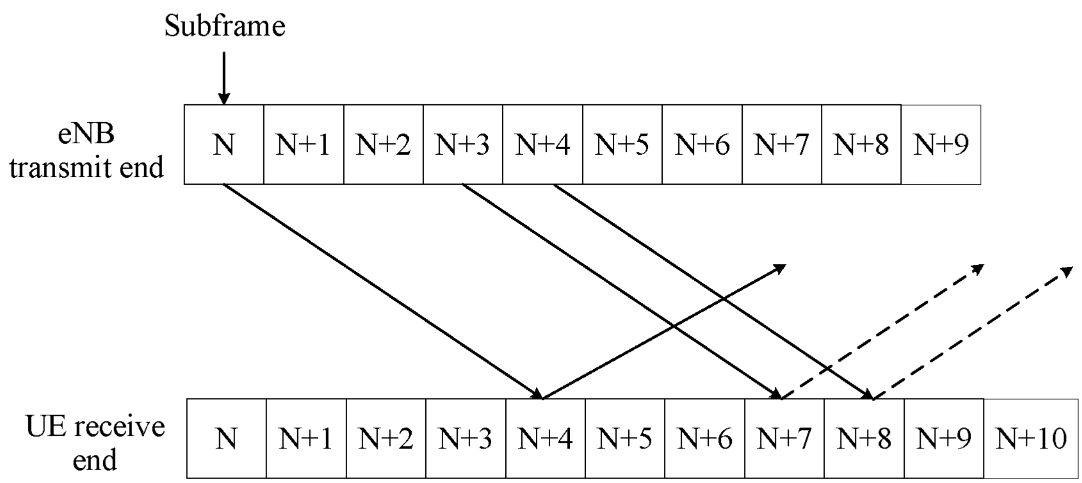
FIG. 1 is a schematic diagram of data transmission in an existing LTE technology.

To make the objectives, technical solutions, and advantages of the present disclosure clearer, the following further describes the embodiments of the present disclosure in detail with reference to the accompanying drawings.

A constituent component and a feature of the present disclosure are combined according to a predetermined format, to provide the following embodiments. When there is no additional mark, each constituent component or feature should be considered as an optional factor. Each constituent component or feature may not be combined with another component or feature if necessary. In addition, some constituent components and/or features may be combined, to implement the embodiments of the present disclosure. An operation order to be disclosed in the embodiments of the present disclosure may be changed. Alternatively, some components or features in any embodiment may be included in another embodiment, or may be replaced with components or features in another embodiment according to a requirement.

The embodiments of the present disclosure are disclosed according to a data communication relationship between a base station and a terminal. In this case, the base station is used as a terminal node that is of a network and that can directly communicate with the terminal using the base station. In the present disclosure, a specific operation to be performed by the base station may be performed by an upper node of the base station according to a requirement.

In other words, it is apparent for persons skilled in the art that, various operations are implemented using the base station or another network node other than the base station, and the operations enable the base station to communicate with the terminal in a network including several network nodes that include the base station. The term "base station (BS)" may be replaced with "fixed station", "NodeB", "eNB", or "access point" according to a requirement. The term "relay" may be replaced with "relay node (RN)" or "relay station (RS)". The term "terminal" may be replaced with "user equipment (UE)", "mobile station (MS)", "mobile subscriber station (MSS)", or "subscriber station (SS)" according to a requirement.

It should be noted that specific terms disclosed in the present disclosure are proposed to make descriptions of the present disclosure brief and easy to understand. Further, use of these specific terms may be changed to another format within the technical scope or the spirit of the present disclosure.

In some embodiments, a well-known structure or device is omitted, to avoid obscuring a concept of the present disclosure, and important functions of these structures and devices are shown in a block diagram. A same reference numeral used in all the accompanying drawings represents same or similar parts.

An example embodiment of the present disclosure is supported by standard documents disclosed for at least one of wireless access systems including an Institute of Electrical and Electronics Engineers (IEEE) 802 system, a 3GPP system, a 3GPP LTE system, an LTE-Advanced (LTE-A) system, and a 3GPP2 system. In other embodiments, a step and a component that are not described in the embodiments of the present disclosure for clear description of a technical conception of the present disclosure may be supported by the foregoing documents. All terms used herein may be supported by at least one of the foregoing documents.

The following embodiments of the present disclosure can be applied to various wireless access technologies such as Code Division Multiple Access (CDMA), Frequency Division Multiple Access (FDMA), Time Division Multiple Access (TDMA), orthogonal frequency division multiple access (OFDMA), and single carrier frequency division multiple access (SC-FDMA). The CDMA may be implemented using a wireless (or radio) technology such as Universal Terrestrial Radio Access (UTRA) or CDMA2000. The TDMA may be implemented using a wireless (or radio) technology such as a Global System for Mobile Communications (GSM)/general packet radio service (GPRS)/Enhanced Data Rates for GSM Evolution (EDGE). OFDM may be implemented using a wireless (or radio) technology such as IEEE 802.11 (Wi-Fi), IEEE 802.16 (WiMAX), IEEE 802-20, or Evolved UTRA (E-UTRA). The UTRA is a part of a Universal Mobile Telecommunications System (UMTS). 3GPP LTE is a part of an E-UMTS using the E-UTRA. The 3GPP LTE uses the OFDMA in a downlink, and uses the SC-FDMA in an uplink. LTE-A is an evolved version of the 3GPP LTE. The WiMAX can be explained using IEEE 802.16e (Wireless MAN-OFDMA Reference System) and advanced IEEE 802.16m (Wireless MAN-OFDMA Advanced System). For clarity, the following description focuses on a 3GPP LTE system and an LTE-A system. However, the technical spirit of the present disclosure is not limited thereto.

In the following description, the term “rank” indicates a quantity of paths used for independently transmitting a signal, and the term “number of layers” indicates a quantity of signal streams transmitted through each path. Generally, because a transmitter transmits layers whose quantity is corresponding to a quantity of ranks used for signal transmission, unless otherwise stated, the rank has a same meaning as the quantity of layers.

Figure 2:
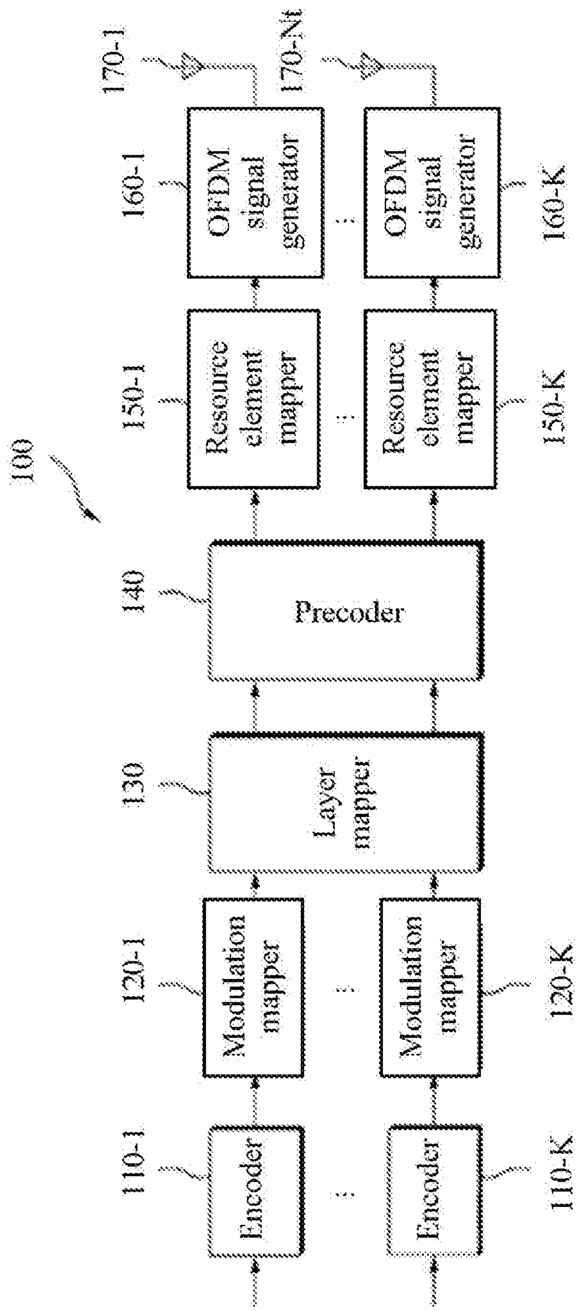
FIG. 2 shows a structural block diagram of a transmitter including a plurality of antennas.

FIG. 2 shows a structural block diagram of a transmitter including a plurality of antennas in the prior art.

Referring to FIG. 2, the transmitter 100 includes decoders 110-1, . . . , and 110-K, modulation mappers 120-1, . . . , and 120-K, a layer mapper 130, a precoder 140, resource element mappers 150-1, . . . , and 150-K, and OFDM signal generators 160-1, . . . , and 160-K. The transmitter 100 includes Nt transmission antennas 170-1, . . . , and 170-Nt.

The decoders 110-1, . . . , and 110-K decode input data and generate decoded data according to a predetermined decoding method. The modulation mappers 120-1, . . . , and 120-K map, on a signal constellation, the decoded data to a modulation symbol indicating a location. A modulation scheme is not limited, and may be M-phase shift keying (PSK) or M-quadrature amplitude modulation (QAM). For example, the m-PSK may be BPSK, QPSK, or 8-PSK, and the m-QAM may be 16-QAM, 64-QAM, or 256-QAM.

The layer mapper 130 defines a layer of a modulation symbol, so that the precoder 140 distributes a specific antenna symbol into an antenna path. The layer is defined as an information path input to the precoder 140. A previous information path of the precoder 140 may be referred to as a virtual antenna or layer.

The precoder 140 processes the modulation symbol and outputs the specific antenna symbol according to the plurality of transmission antennas 170-1, . . . , and 170-Nt using a multiple-input multiple-output (MIMO) scheme. The precoder 140 allocates the specific antenna symbol to the resource element mappers 150-1, . . . , and 150-K of the antenna path. Each information path transmitted by the precoder 140 to an antenna is referred to as a stream, or may be referred to as a physical antenna.

The resource element mappers 150-1, . . . , and 150-K may allocate the specific antenna symbol to an appropriate resource element, and multiplex the specific antenna symbol based on a fine reader. The OFDM signal generators 160-1, . . . , and 160-K modulate the specific antenna symbol and output an OFDM symbol using an OFDM scheme. The OFDM signal generators 160-1, . . . , and 160-K may perform inverse fast Fourier transform (IFFT) with respect to the specific antenna symbol, and insert a CP into a time domain symbol on which IFFT is performed. The CP is an inserted guard interval, to eliminate inter-symbol interference caused by a plurality of paths in an OFDM transmission scheme. The OFDM symbol is transmitted using the transmission antennas 170-1, . . . , and 170-Nt.

Figure 3:
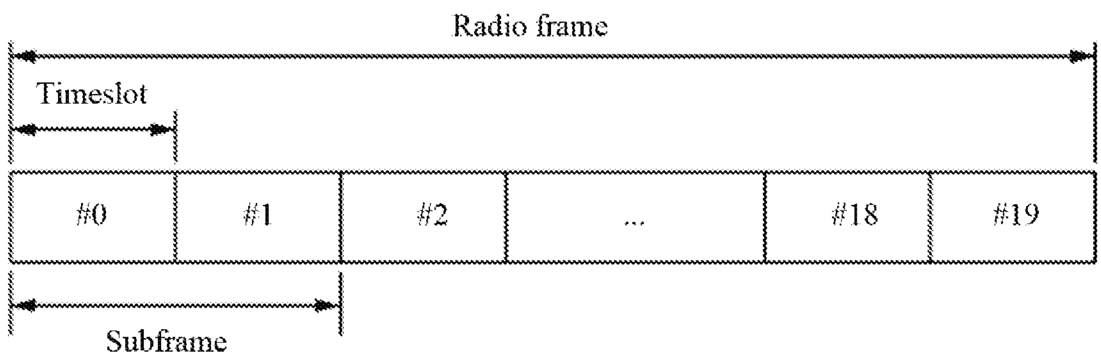
FIG. 3 shows a structural diagram of a downlink radio frame.

FIG. 3 shows a structural diagram of a downlink radio frame in the prior art. Referring to FIG. 3, the downlink radio frame includes 10 subframes, and one subframe includes two timeslots. Duration of the downlink radio frame that may be configured using frequency division duplex (FDD) or time division duplex (TDD) is referred to as a transmission time interval (TTI). For example, a subframe may have a length of 1 ms, and a timeslot may have a length of 0.5 ms. One timeslot may include a plurality of OFDM symbols in a time domain, and include a plurality of PRBs in a frequency domain.

A quantity of OFDM symbols included in one timeslot can be changed according to configuration of a CP. The CP includes an extended CP and a normal CP. For example, if the CP of the OFDM symbols is configured as the normal CP, there may be seven OFDM symbols included in one timeslot. If the CP of the OFDM symbols is configured as the extended CP, a quantity of OFDM symbols in one timeslot is less than that in a case of the normal CP. For example, in a case of the extended CP, there may be six OFDM symbols included in one timeslot. If a channel status is not stable, for example, if UE moves at a high speed, the extended CP is used to further reduce inter-symbol interference.

In a case in which the normal CP is used, because one timeslot includes seven OFDM symbols, one subframe includes 14 OFDM symbols. In this case, first two or three OFDM symbols of each subframe may be allocated to a physical downlink control channel (PDCCH), and remaining OFDM symbols may be allocated to a physical downlink shared channel (PDSCH).

The structure of the radio frame is only an example. Therefore, a quantity of frames included in the radio frame, a quantity of timeslots included in a subframe, or a quantity of symbols included in a timeslot can be changed in various manners.

Figure 4:
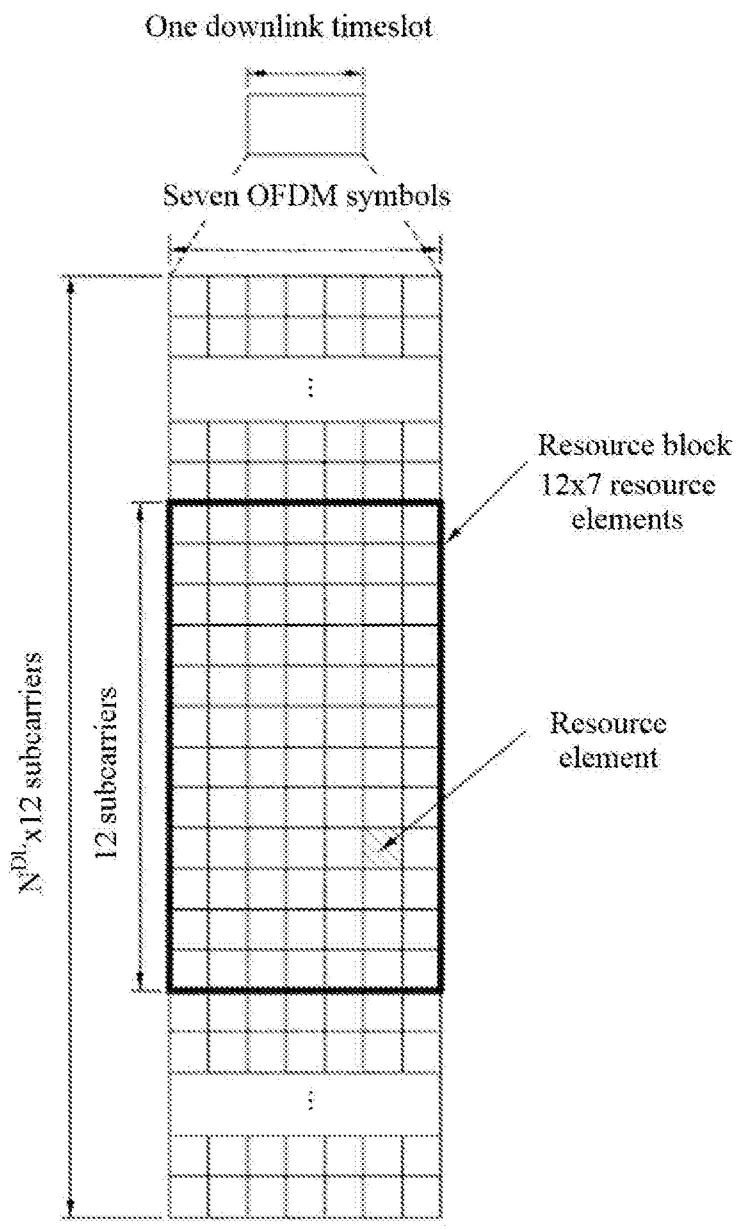
FIG. 4 shows an example diagram of a resource grid in a downlink timeslot in the prior art.

FIG. 4 shows an example diagram of a resource grid in a downlink timeslot (a normal CP is configured). Referring to FIG. 4, the downlink timeslot includes a plurality of OFDM symbols in a time domain, and includes a plurality of PRBs in a frequency domain. One downlink timeslot includes seven OFDM symbols, and one PRB includes 12 subcarriers. However, the present disclosure is not limited thereto. Each element in the resource grid is referred to as a RE. For example, an RE a(k, l) is located in a $k^{th}$ subcarrier and an $1^{th}$ OFDM symbol. In a case of a normal CP, one PRB includes 12×7 REs (in a case of an extended CP, one PRB includes 12×6 REs). Because an interval between subcarriers is 15 kHz, one PRB includes approximately 180 kHz in a frequency domain. $N^{DL}$ indicates a quantity of PRBs included in the downlink timeslot. A value of $N^{DL}$ is determined based on downlink transmission bandwidth that is set by a scheduling base station.

Cell-specific reference signal.

A pattern in which a reference signal of a specific cell, that is, a CRS is arranged on a PRB in the prior art is described with reference to FIG. 5A, FIG. 5B, FIG. 5C, FIG. 6A, FIG. 6B, and FIG. 6C.

The CRS is used to estimate a channel of a physical antenna port, may be jointly used by all terminals (UE) located in the cell, and is distributed on an entire frequency band. The CRS may be used to obtain channel state information (CSI) and demodulate data.

Various CRS s may be defined according to antenna configuration on a transmission side (base station). A 3GPP LTE (Release 8) system supports various types of antenna configuration, and a downlink signal transmission side (base station) has three types of antenna configuration such as a single antenna, two transmission antennas, and four transmission antennas. If a base station performs transmission using a single antenna, an RS (reference signal, reference signal) used for a single antenna port is arranged. If a base station performs transmission using two antennas, RS s used for two antenna ports are arranged using a time division multiplexing (TDM) scheme and/or a frequency division multiplexing (FDM) scheme. That is, for differentiation, the RSs used for the two antenna ports are arranged on different time resources and/or different frequency resources. If a base station performs transmission using four antennas, RSs used for four antenna ports are arranged using a TDM scheme and/or an FDM scheme. Channel information estimated by a downlink signal receiving side (UE) may be used to demodulate, using a CRS, data that is transmitted using transmission methods such as single antenna transmission, transmission diversity, closed-loop spatial multiplexing, open-loop spatial multiplexing, and multi-user MIMO (MU-MIMO).

In a case in which a plurality of antennas are supported, if an RS is transmitted using a specific antenna port, the RS is transmitted at a location of a RE designated according to an RS pattern, and no signal is transmitted at a location of an RE designated for another antenna port.

To improve channel estimation performance using a CRS, a location of the CRS in a frequency domain may be shifted based on a cell for differentiation. For example, when an RS is located on each third subcarrier, the CRS may be located on a $3k^{th}$ subcarrier in a specific cell, and the CRS may be located on a $(3k+1)^{th}$ subcarrier in another cell. For one antenna port, RSs are arranged at intervals of six REs (that is, at intervals of six subcarriers) in a frequency domain, and an interval between an RE in which an RS for an antenna port is arranged and an RE in which an RS for another antenna port is arranged is three REs.

In a time domain, starting from a first OFDM symbol (symbol index 0) used as a start point in each timeslot, an RS is set at a predetermined time interval. The time interval is defined according to different CP lengths. In a case of a normal CP, RSs are located in first and fifth OFDM symbols (symbol indexes 0 and 4) in a first timeslot. In a case of an extended CP, RSs are located in first and fourth OFDM symbols (symbol indexes 0 and 3) in the timeslot. In one OFDM symbol, only RSs used for at most two antenna ports are defined. Therefore, for four antenna port transmission, RSs used for antenna ports 0 and 1 are located in first and fifth OFDM symbols (in first and fourth OFDM symbols in a case of an extended CP) in a timeslot, and RSs used for antenna ports 2 and 3 are located in a second OFDM symbol in the timeslot. Frequency locations of the RSs used for the antenna ports 2 and 3 are switched in a second timeslot.

Figure 5A:
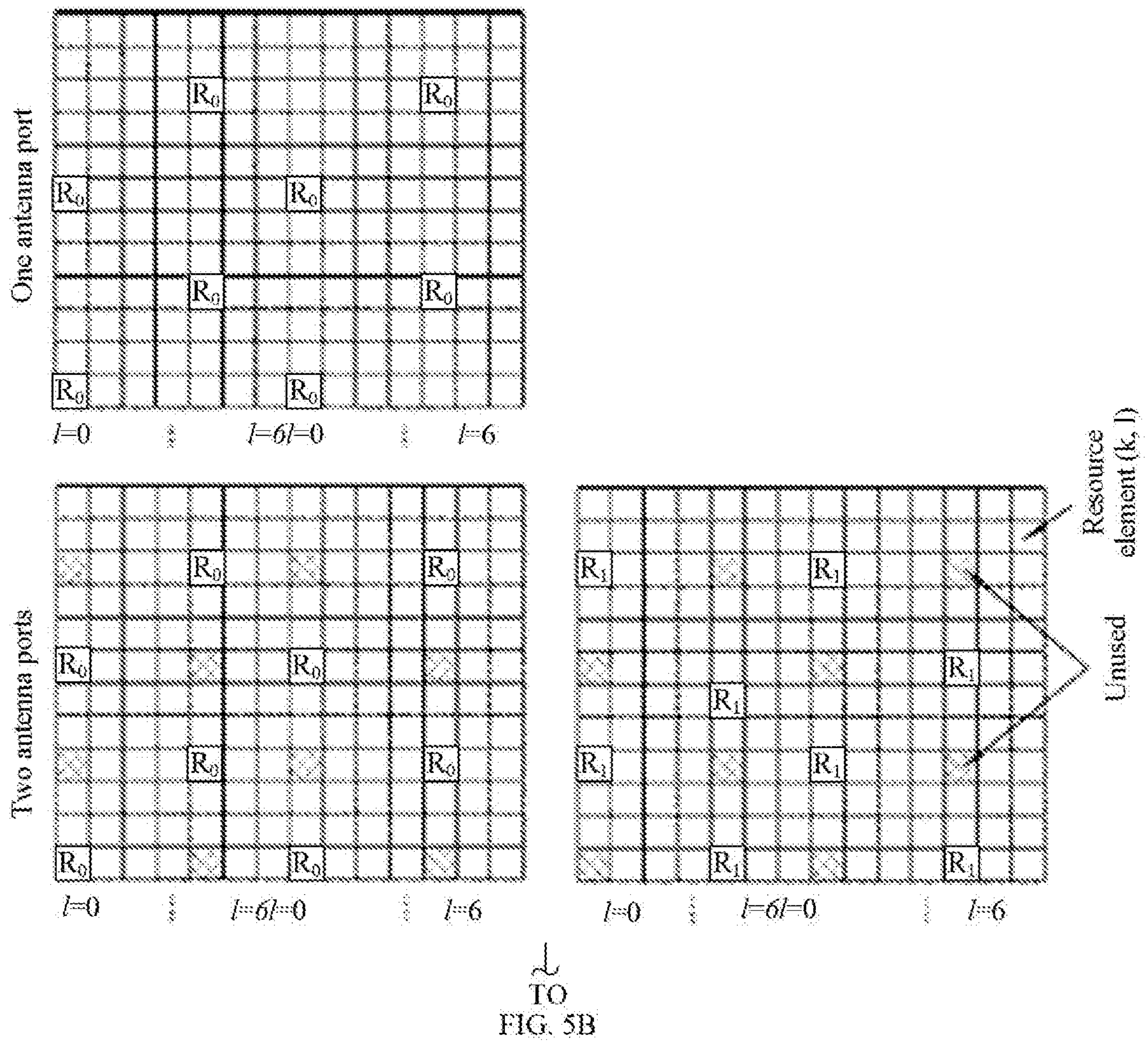
FIG. 5A, FIG. 5B, and FIG. 5C show a diagram of mapping a downlink CRS to a RE in a case of a normal cyclic prefix (NCP)
Figure 5B:
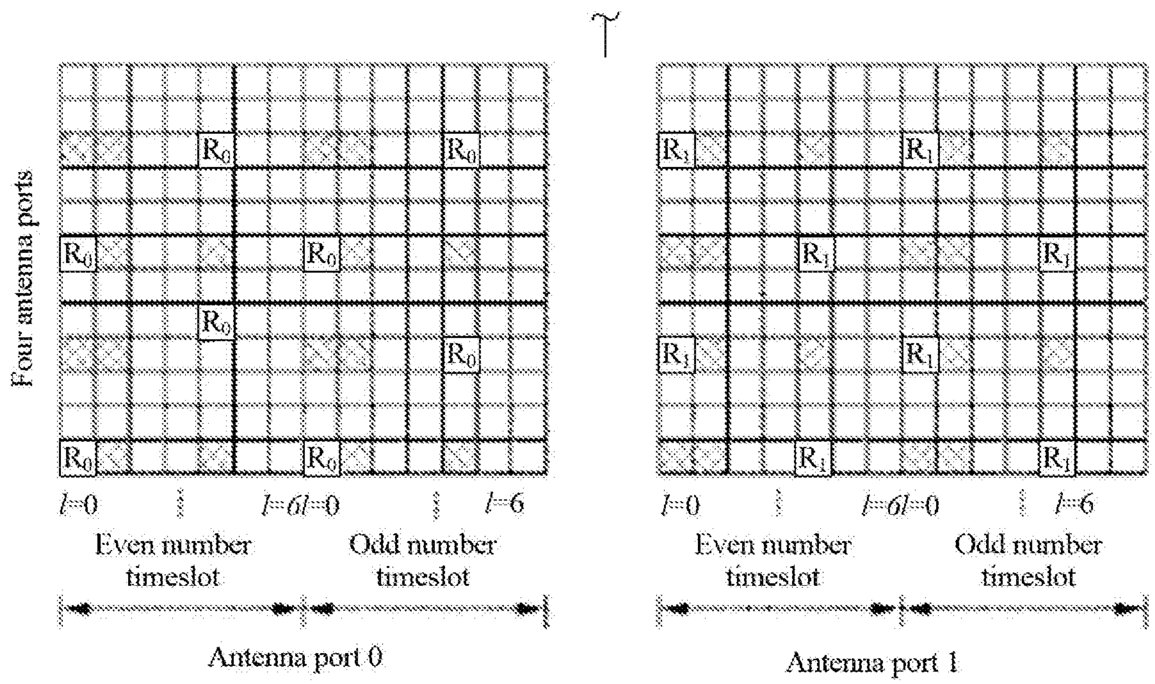
Figure 5C:
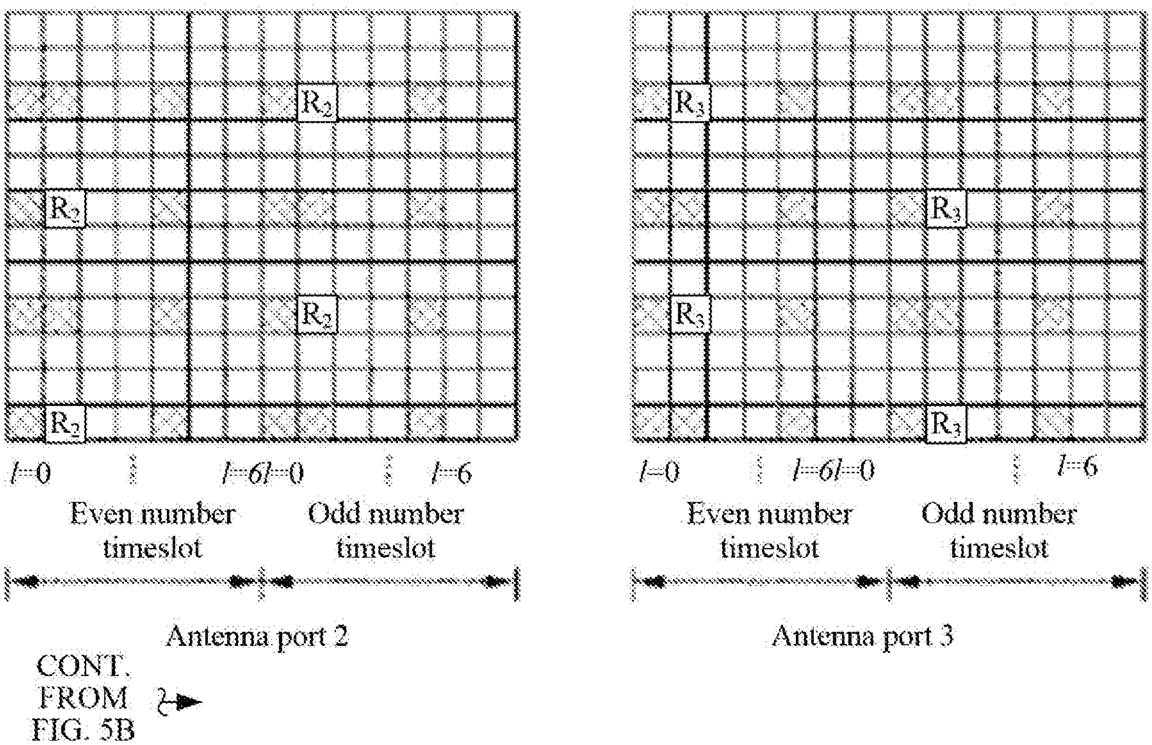

For the foregoing locations of a CRS, refer to FIG. 5A, FIG. 5B, FIG. 5C, FIG. 6A, FIG. 6B, and FIG. 6C. More precisely, FIG. 5A, FIG. 5B, and FIG. 5C show a diagram of mapping a CRS to an RE in a case of a normal CP. In FIG. 5A, FIG. 5B, and FIG. 5C, a horizontal axis indicates a time domain, and a vertical axis indicates a frequency domain. In FIG. 5A, FIG. 5B, and FIG. 5C, a mapping unit of an RE is corresponding to an OFDM symbol configuring a subframe (that is, two timeslots) in the time domain, and is corresponding to a subcarrier configuring a PRB in the frequency domain. A minimum rectangle in the time-frequency domain shown in FIG. 5A, FIG. 5B, and FIG. 5C is corresponding to an OFDM symbol in the time domain and a subcarrier in the frequency domain, that is, corresponding to an RE. That is, an RE to which the RS is mapped may be represented based on two PRBs of a subframe including 14 OFDM symbols×12 subcarriers in the frequency domain, and the two PRBs are continuous in the time domain.

R0 to R3 shown in FIG. 5A, FIG. 5B, and FIG. 5C indicate REs to which CRSs used for antenna ports 0 to 3 are mapped. Rp indicates an RE that is of an antenna port index P and to which an RS is mapped. As described above, in a case in which there are two antenna ports or four antenna ports, an RE that is in a timeslot and to which an RS of an antenna port is mapped is not used for transmission of another antenna port in the timeslot.

Figure 6A:
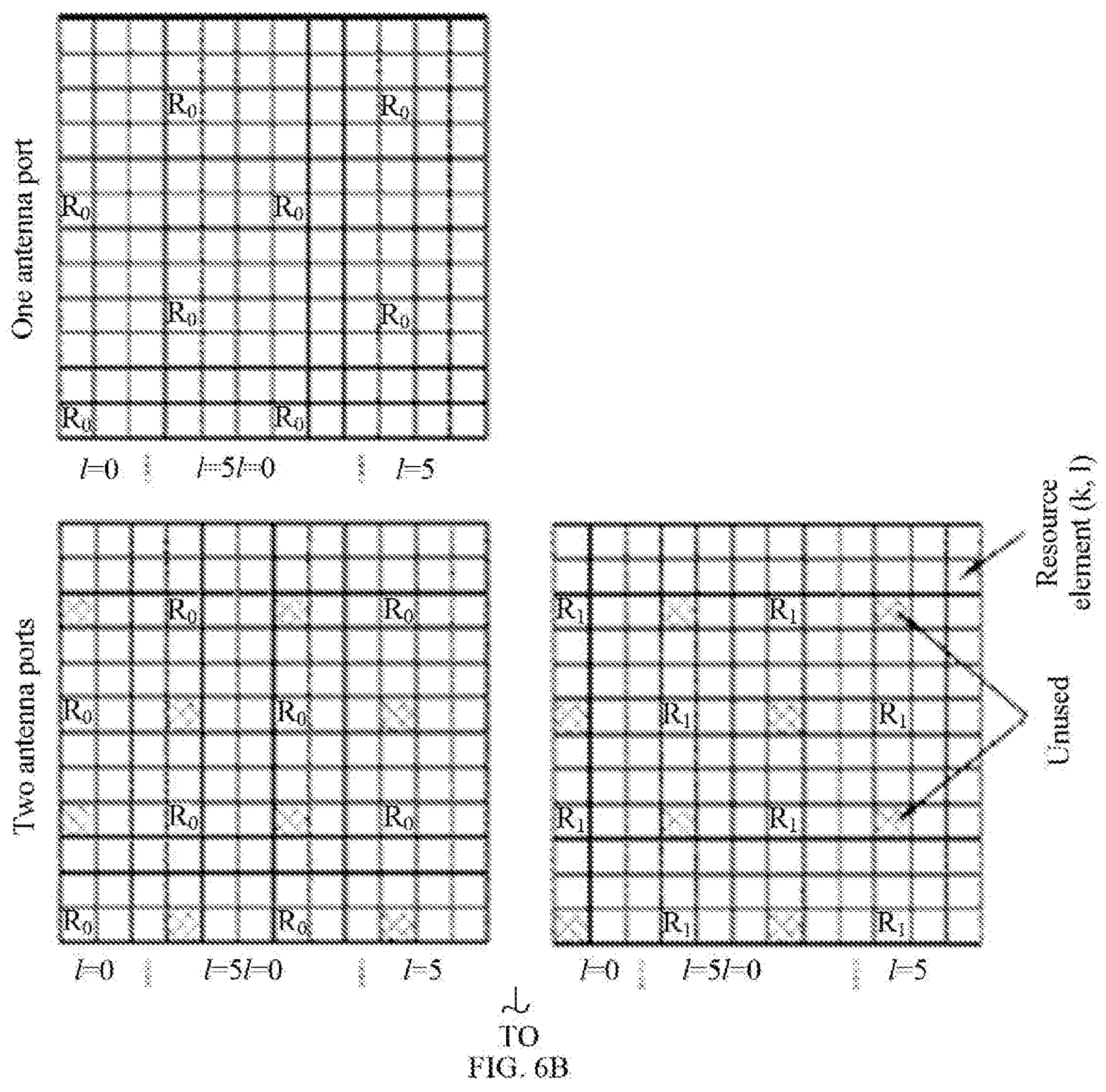
FIG. 6A, FIG. 6B, and FIG. 6C show a diagram of mapping a downlink CRS to an RE in a case of an extended cyclic prefix (CP)
Figure 6B:
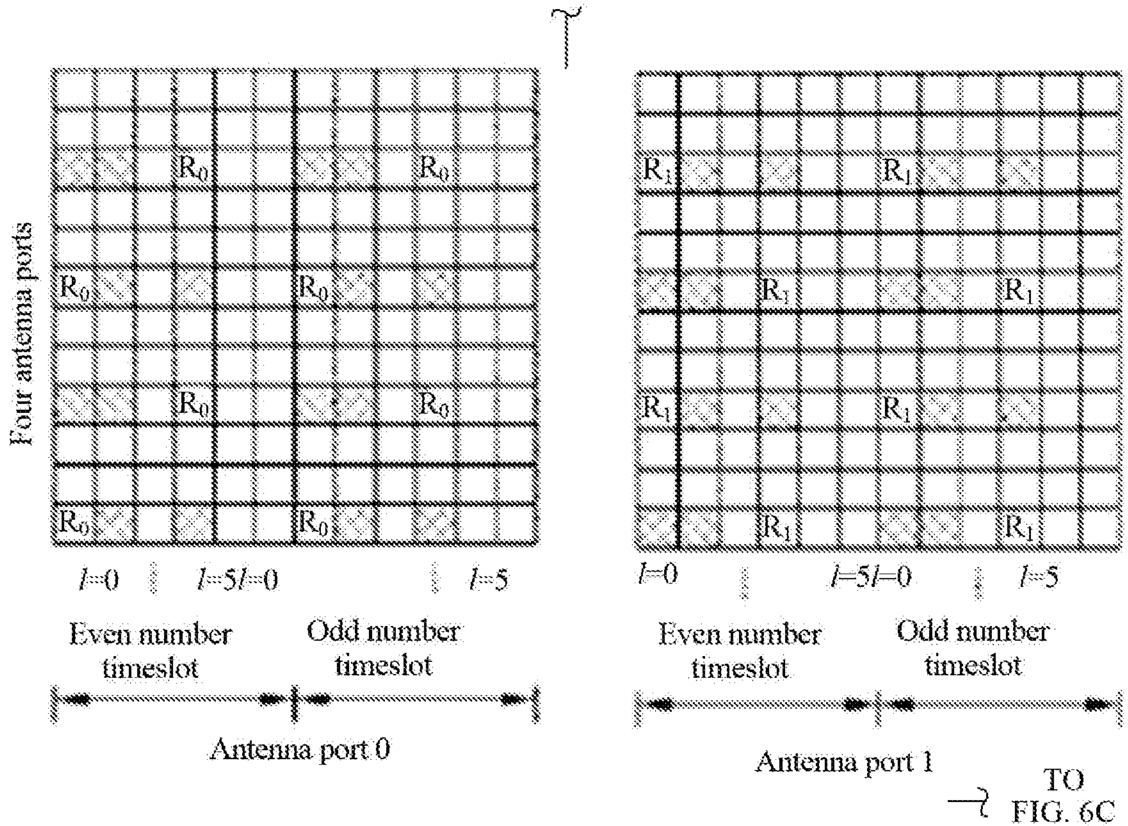
Figure 6C:
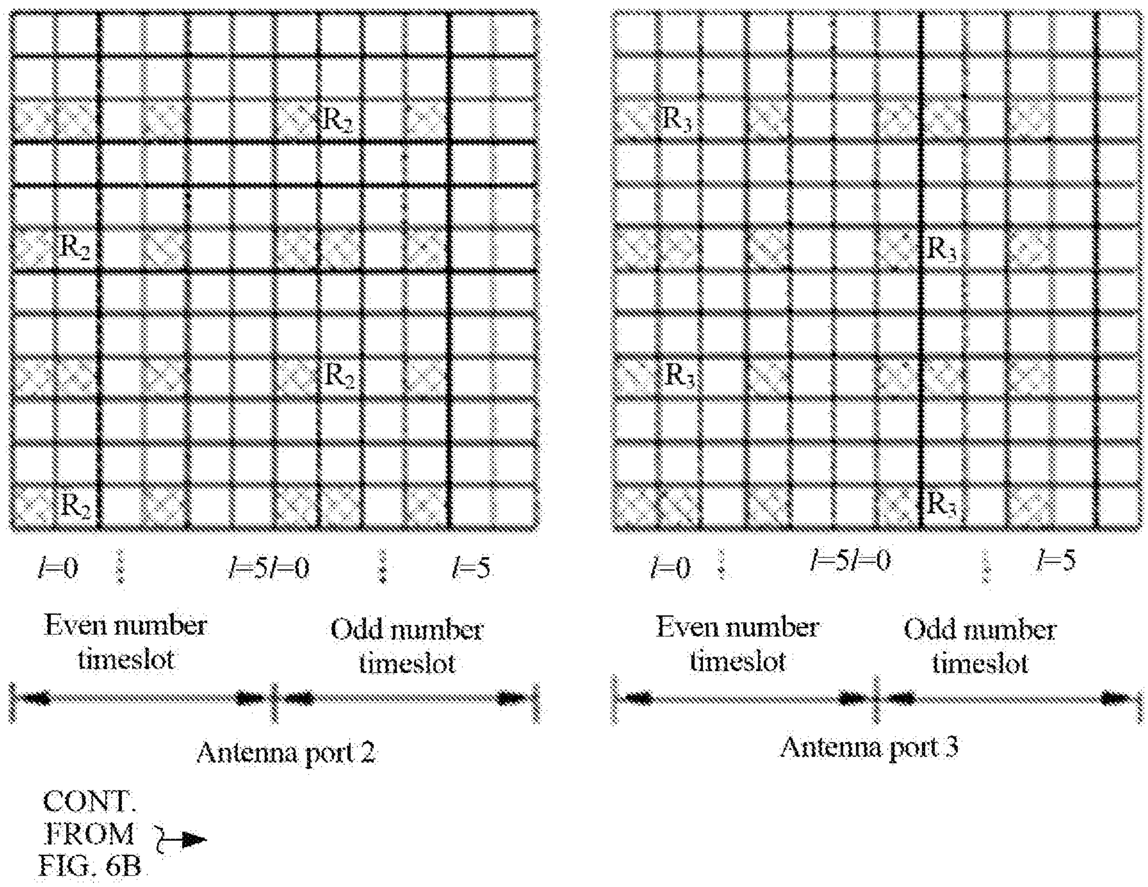

FIG. 6A, FIG. 6B, and FIG. 6C show REs to which CRSs used for antenna ports 0 to 3 are mapped in a case of an extended CP. In the case of the extended CP, because one subframe includes 12 OFDM symbols, mapping units of the REs are represented by 12 OFDM symbols×12 subcarriers in FIG. 6A, FIG. 6B, and FIG. 6C.

Figure 7A:
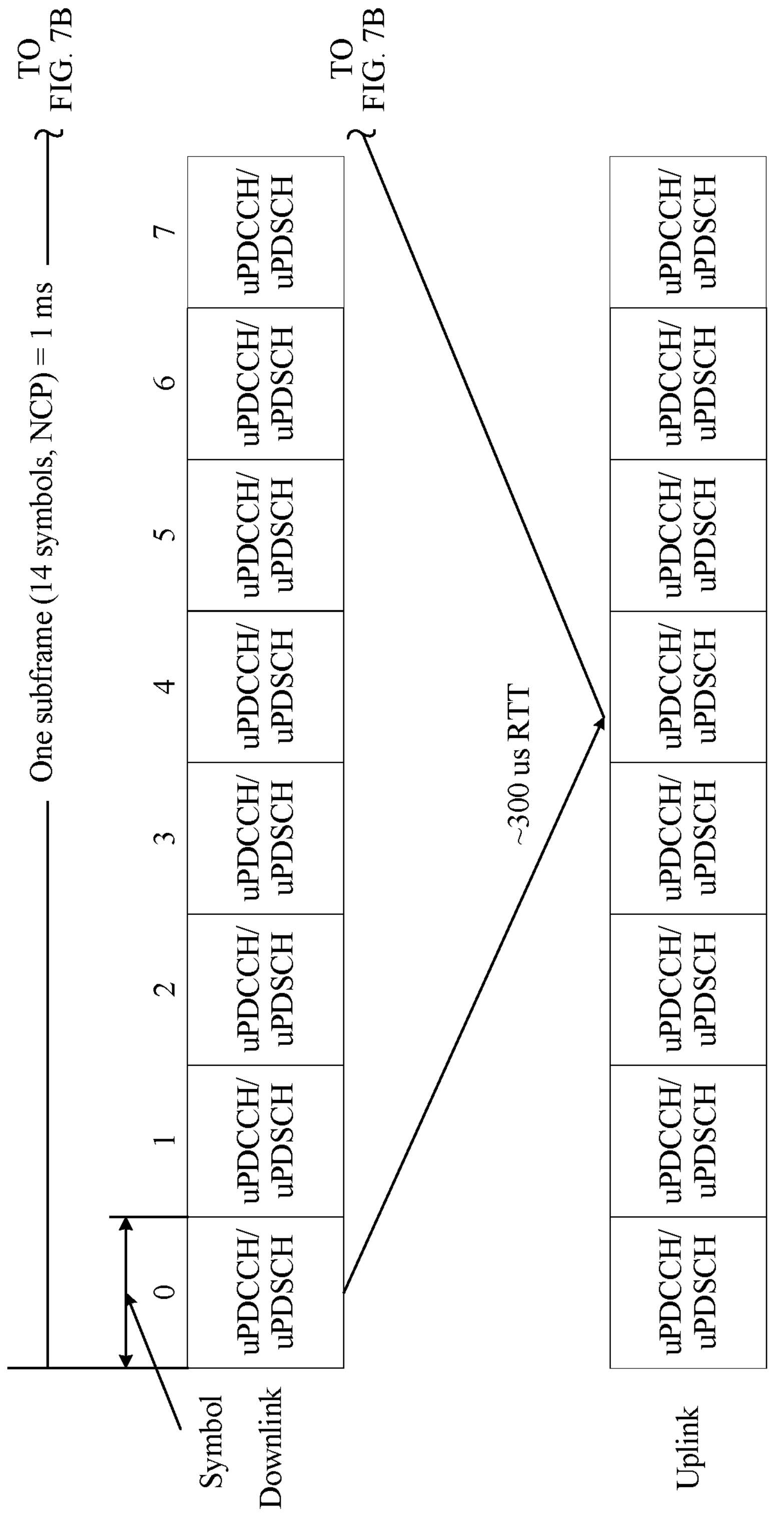
FIG. 7A and FIG. 7B are a schematic diagram of data transmission that one OFDM symbol is transmitted using an LTE technology according to an embodiment of the present disclosure.
Figure 7B:
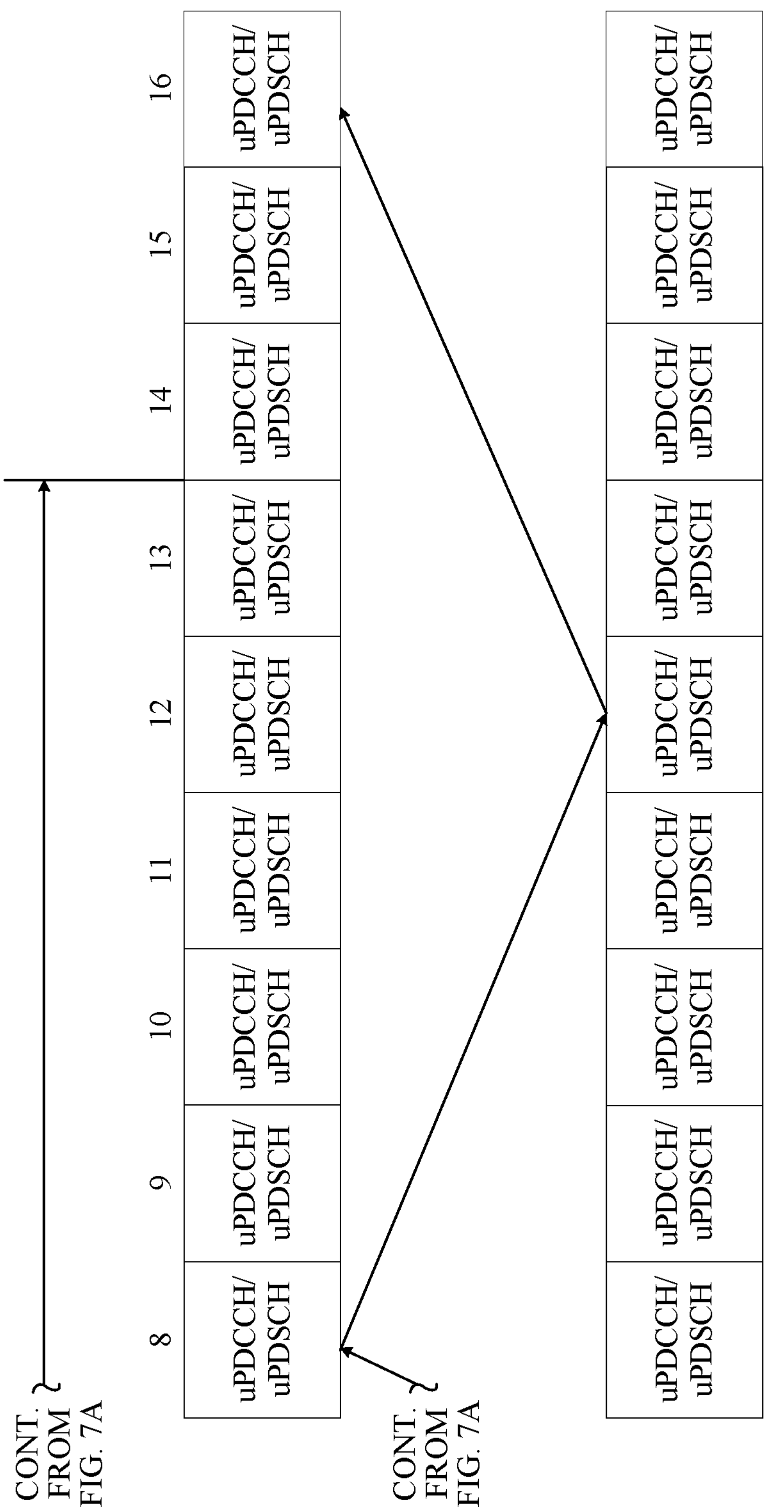

In an existing LTE technology, one subframe includes 12 OFDM symbols (in the case of the extended CP, ECP) or 14 OFDM symbols (in a case of a normal CP, Normal Cyclic Prefix, NCP). As shown in FIG. 7A and FIG. 7B, for a case of an NCP, duration of an OFDM symbol is approximately 70 microsecond (μs). Therefore, if one OFDM symbol is used as a time transmission unit, a requirement that an end-to-end latency is less than 1 ms can be met. For example, as shown in FIG. 7A and FIG. 7B, one OFDM symbol is a time transmission unit, and a HARQ transmission round trip time (RTT) is 70×4=280 μs, which is approximately 300 μs. Therefore, in a solution of the present disclosure, resources occupied by a corresponding control channel and data channel are designed based on the time transmission unit (one OFDM symbol).

In existing LTE, there is a PDCCH and a PDSCH in one subframe. The PDCCH is used to transmit a control signal, and the PDSCH is used to transmit data. Resources occupied by the PDCCH and the PDSCH are as follows.

The PDCCH is prior to the PDSCH in time sequence. The PDCCH occupies first 1 to 3 OFDM symbols of a subframe, and is scheduled to a plurality of users, and remaining symbols are occupied by the PDSCH. Each PDCCH needs one, two, four, or eight control channel element (CCEs), each CCE includes nine resource element group (REGs), and each REG includes four REs. An RE is a minimum physical resource element in an LTE system, and the RE is an OFDM subcarrier in a frequency domain, and is an OFDM symbol in a time domain. In the LTE system, QPSK modulation is used for all PDCCHs, and therefore, each RE includes 2 bits.

In the existing LTE, the resources (RE locations) occupied by the corresponding PDCCH and PDSCH are designed in a unit of one subframe. However, the resources cannot meet a requirement for a lower end-to-end latency in a future 5G system.

If one OFDM symbol or two OFDM symbols or three OFDM symbols are a downlink transmission unit, locations of resources occupied by a corresponding uPDCCH (ULL PDCCH) and uPDSCH (ULL PDSCH), and a corresponding CRS pattern need to be re-designed.

A downlink frame structure is designed for a future 5G low-latency system in the embodiments of the present disclosure, and includes a uPDCCH pattern and a CRS pattern, so that one OFDM symbol or two OFDM symbols or three OFDM symbols can be used as a downlink transmission unit, and a requirement that an end-to-end latency is less than 1 ms in the future 5G low-latency system is met.

Embodiment 1

This embodiment provides a method for transmitting a downlink control signal. The method includes sending, by a base station, Q OFDM symbols to UE according to a predetermined pattern; and receiving, by the base station, a response message sent by the UE, where the response message is a message sent by the terminal device to the base station after the terminal device receives the Q OFDM symbols, the predetermined pattern is a pattern including the Q OFDM symbols in a PRB, Q is a positive integer that is greater than or equal to 1 and less than 12 or 14, and at least one of the Q OFDM symbols in the PRB includes a downlink control signal and downlink data.

According to a method and base station for transmitting downlink data that are provided in this embodiment of the present disclosure, the base station sends the Q OFDM symbols to the UE according to the predetermined pattern, and receives the response message sent by the UE to the base station after the UE receives the Q OFDM symbols. Because Q is a positive integer that is greater than or equal to 1 and less than 12 or 14, an end-to-end transmission latency is reduced by transmitting Q symbols that are less than symbols included in a subframe, so that a ULL requirement can be met. Therefore, in comparison with an existing manner of mapping the downlink control signal to a downlink subframe for transmission, in this embodiment of the present disclosure, Q is a positive integer that is greater than or equal to 1 and less than 12 or 14. Because a quantity of transmitted symbols is less than a quantity of symbols in a subframe, an end-to-end transmission latency from a transmit end to a receive end and then from the receive end to the transmit end can be reduced. Further, when Q is a positive integer that is greater than or equal to 1 and less than or equal to 3, a downlink control signal may be transmitted using one to three OFDM symbols, so as to meet a requirement that an end-to-end latency is less than 1 millisecond.

Embodiment 2

The following conditions are added in this embodiment based on Embodiment 1.

The Q OFDM symbols further include a CRS, and a subcarrier carrying the downlink control signal and at least one subcarrier carrying the CRS are the same or are adjacent in a frequency domain. In this way, because the subcarrier corresponding to the downlink control signal and the subcarrier corresponding to the CRS are the same or adjacent, channel estimation performance of the downlink control signal is relatively good, so that demodulation performance of a receive end can be improved.

Further, in each OFDM symbol, the downlink control signal occupies two resource elements REs in every M PRBs, and M is an integer greater than or equal to 1. When M is greater than 1, a transmission amount of downlink data in each OFDM symbol may increase, so that receiving efficiency of the receive end is improved.

Further, in each PRB, there are at least two OFDM symbols in N OFDM symbols including the downlink control signal in the downlink subframe, where a subcarrier carrying the downlink control signal in an OFDM symbol in the at least two OFDM symbols is different from at least one subcarrier carrying the downlink control signal in another OFDM symbol in the at least two OFDM symbols, and N is a positive integer greater than or equal to 2. In this way, diversity reception of the receive end may be implemented, and a diversity gain and demodulation performance of the receive end may be improved.

The OFDM symbols including the downlink control signal include a CRS; or the OFDM symbols including the downlink control signal do not include a CRS; or in the OFDM symbols including the downlink control signal, a CRS is included in every other OFDM symbol.

When the OFDM symbols including the downlink control signal do not include the CRS, in the predetermined pattern: in an OFDM symbol that does not include the CRS, a subcarrier carrying the downlink control signal and at least one subcarrier carrying the CRS are the same or are adjacent in a frequency domain.

When the OFDM symbols including the downlink control signal include the CRS, or when in the OFDM symbols including the downlink control signal, the CRS is included in every other OFDM symbol, in the predetermined pattern: in an OFDM symbol that includes the CRS, a subcarrier carrying the downlink control signal and at least one subcarrier carrying the CRS are adjacent in a frequency domain; and in an OFDM symbol that does not include the CRS, a subcarrier carrying the downlink control signal and at least one subcarrier carrying the CRS in an OFDM symbol that includes the CRS are the same or are adjacent in a frequency domain.

Embodiment 3

When one OFDM symbol is used as a transmission unit, the OFDM symbol includes a uPDCCH and a uPDSCH. The uPDCCH is a control channel for scheduling for UE, and the uPDSCH is a part used to transmit data to the UE. Each subframe may include a plurality of uPDCCHs, to be scheduled to a plurality of users.

When one OFDM symbol is used as a downlink subframe (that is, a transmission unit) in a low-latency system, an OFDM symbol having a CRS and an OFDM symbol having no CRS are separately designed in this embodiment. There are four design options. Option 1: according to an existing CRS pattern, no uPDCCH pattern is designed for the OFDM symbol having the CRS, and a uPDCCH pattern is designed for the OFDM symbol having no CRS. Option 2: according to an existing CRS pattern, uPDCCH patterns are designed for both the OFDM symbol having the CRS and the OFDM symbol having no CRS. Option 3: a CRS pattern is re-designed, one of every two OFDM symbols includes a CRS, and uPDCCH patterns are designed for both the OFDM symbol having the CRS and the OFDM symbol having no CRS. Option 4: a CRS pattern is re-designed, each OFDM symbol includes a CRS, and a uPDCCH pattern is designed for each OFDM symbol. A uPDCCH occupies two REs in each PRB of each OFDM symbol. For Option 1, a uPDCCH of a next subframe is required to schedule the OFDM symbol having the CRS, and there is a scheduling latency. An advantage of a design in Option 1 is that, for a CRS pattern of one antenna port (a CRS occupies two REs in each PRB of each OFDM symbol), data load of each symbol may be evenly distributed in the design, that is, uPDSCHs of OFDM symbols all occupy a same quantity of REs. However, for a case of two antenna ports or four antenna ports, due to a design of a CRS location (a CRS occupies four REs in each PRB of each OFDM symbol), a condition that uPDSCHs of OFDM symbols all occupy a same quantity of REs cannot be ensured. For Option 2, each OFDM symbol may be scheduled using a uPDCCH of the OFDM symbol, and there is no scheduling latency. For Option 3 and Option 4, because a CRS pattern in existing LTE is designed on a basis that one subframe (1 ms) is a downlink transmission unit, a different CRS pattern is designed in this embodiment using a smaller transmission unit (one symbol, two symbols, or three symbols), so that channel estimation is more accurate, and demodulation performance of a receiver is better. More CRS s are designed in Option 4 than in Option 3. In addition, in this embodiment (Option 1, Option 2, Option 3, and Option 4), two REs of a uPDCCH in the OFDM symbol having no CRS may use different frequencies among different symbols, so as to obtain a frequency diversity gain.

The following analyzes a CRS pattern and a uPDCCH pattern obtained when one OFDM symbol is used as a transmission unit, Option 1 is used, and there is one antenna port, two antenna ports, or four antenna ports.

1. One Antenna Port

Figure 8:
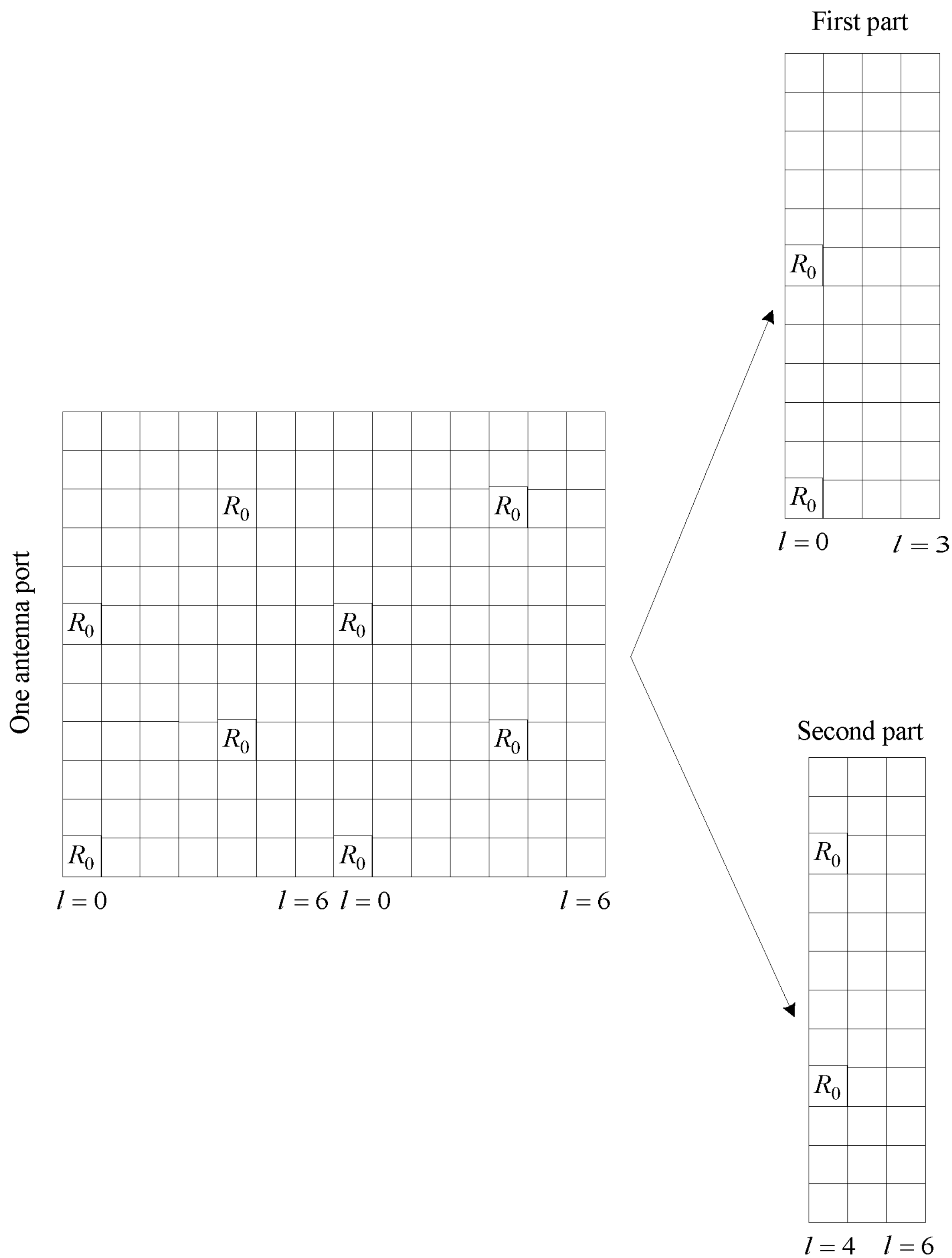
FIG. 8 is a schematic diagram of dividing, into two parts, one timeslot in the diagram shown in FIG. 5A, FIG. 5B, and FIG. 5C in which a downlink CRS is mapped to an RE in the case of an NCP.
Figure 9A:
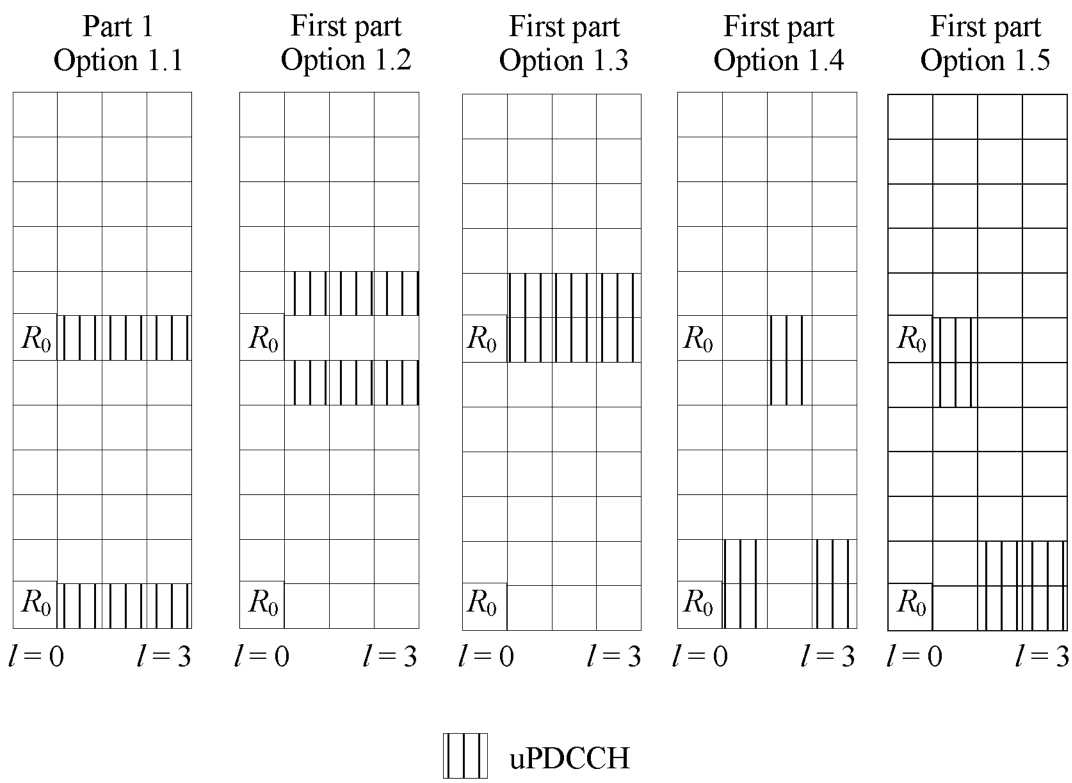
FIG. 9A is CRS and ultra low latency physical downlink control channel (uPDCCH) patterns in a first part of a timeslot in a case of an NCP when a terminal has one antenna port in a first option in Solution 1.
Figure 9B:
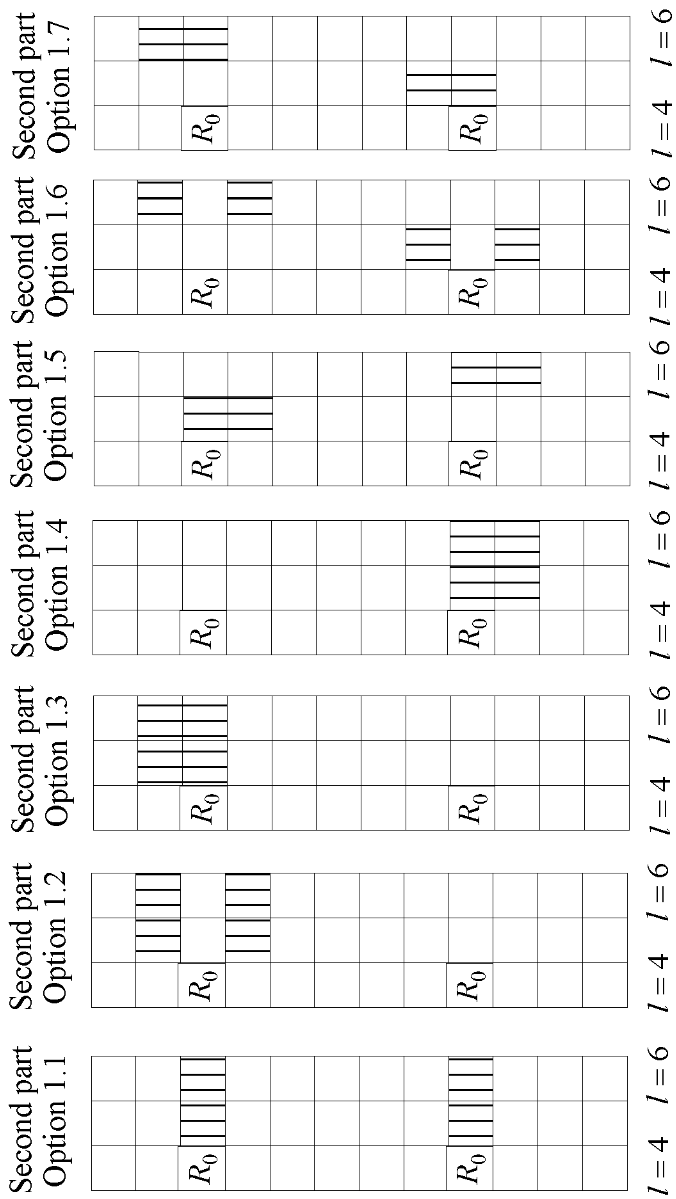
FIG. 9B is CRS and uPDCCH patterns in a second part of a timeslot in a case of an NCP when a terminal has one antenna port in a first option in Solution 1.

For a specific uPDCCH pattern, refer to FIG. 9A and FIG. 9B. As shown in FIG. 8, a CRS pattern may be divided into a first part and a second part. The first part may be corresponding to FIG. 9A, and the second part may be corresponding to FIG. 9B. A first part that is in FIG. 9A and that is corresponding to FIG. 8 and a second part that is in FIG. 9B and that is corresponding to FIG. 8 may be freely combined, and a first timeslot and a second timeslot are symmetric. A frequency diversity gain may be obtained in all options. FIG. 9A and FIG. 9B only show examples of a uPDCCH pattern in a case of an NCP. A uPDCCH pattern in a case of an ECP may be obtained by analogy according to the pattern. For example, in comparison with the uPDCCH pattern in the case of the NCP, the uPDCCH pattern in the case of the ECP lacks only a fourth column of the first part, the fourth column of the first part may be directly removed, and a second part remains unchanged. The first part in the case of the ECP is as follows: a modification herein in the case of the ECP is for the first timeslot, and an operation for the second timeslot and the operation for the first timeslot are the same; the same below.

2. Two Antenna Ports

Figures 10A, 10B:
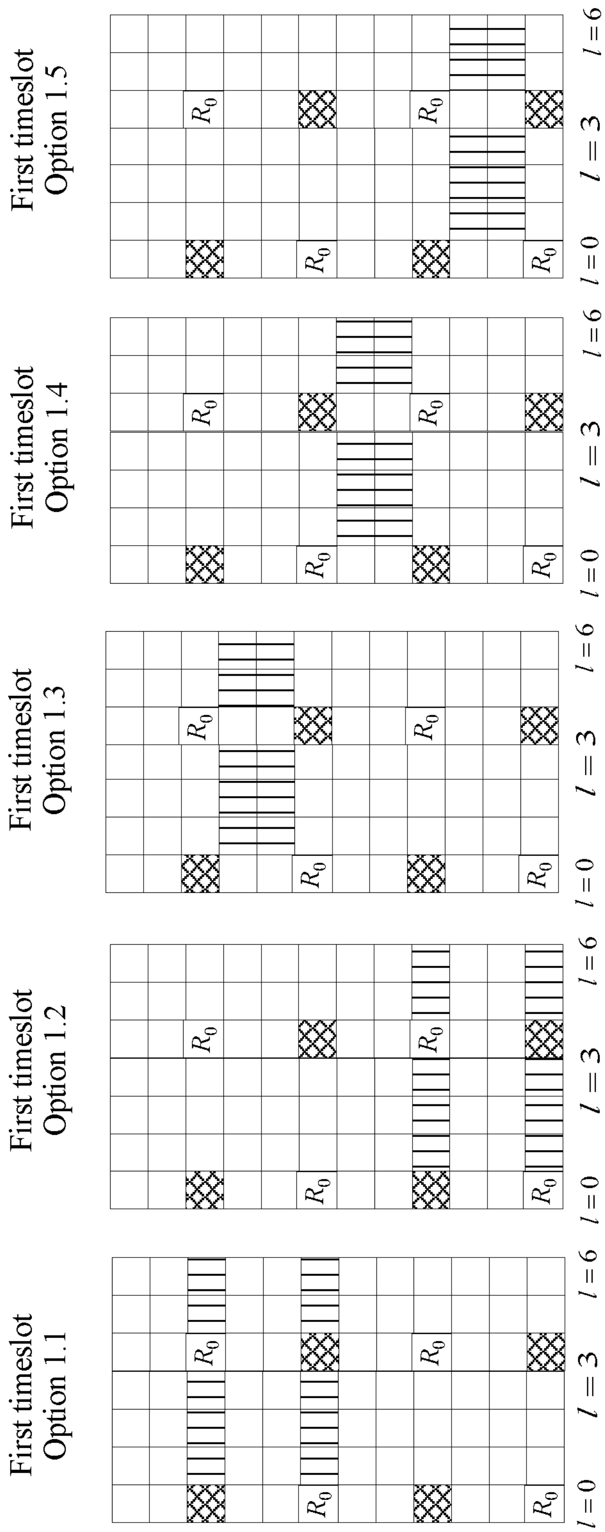
FIG. 10A and FIG. 10B are CRS and uPDCCH patterns in a timeslot in a case of an NCP when a terminal has two antenna ports in a first option in Solution 1.
Figure 10B:
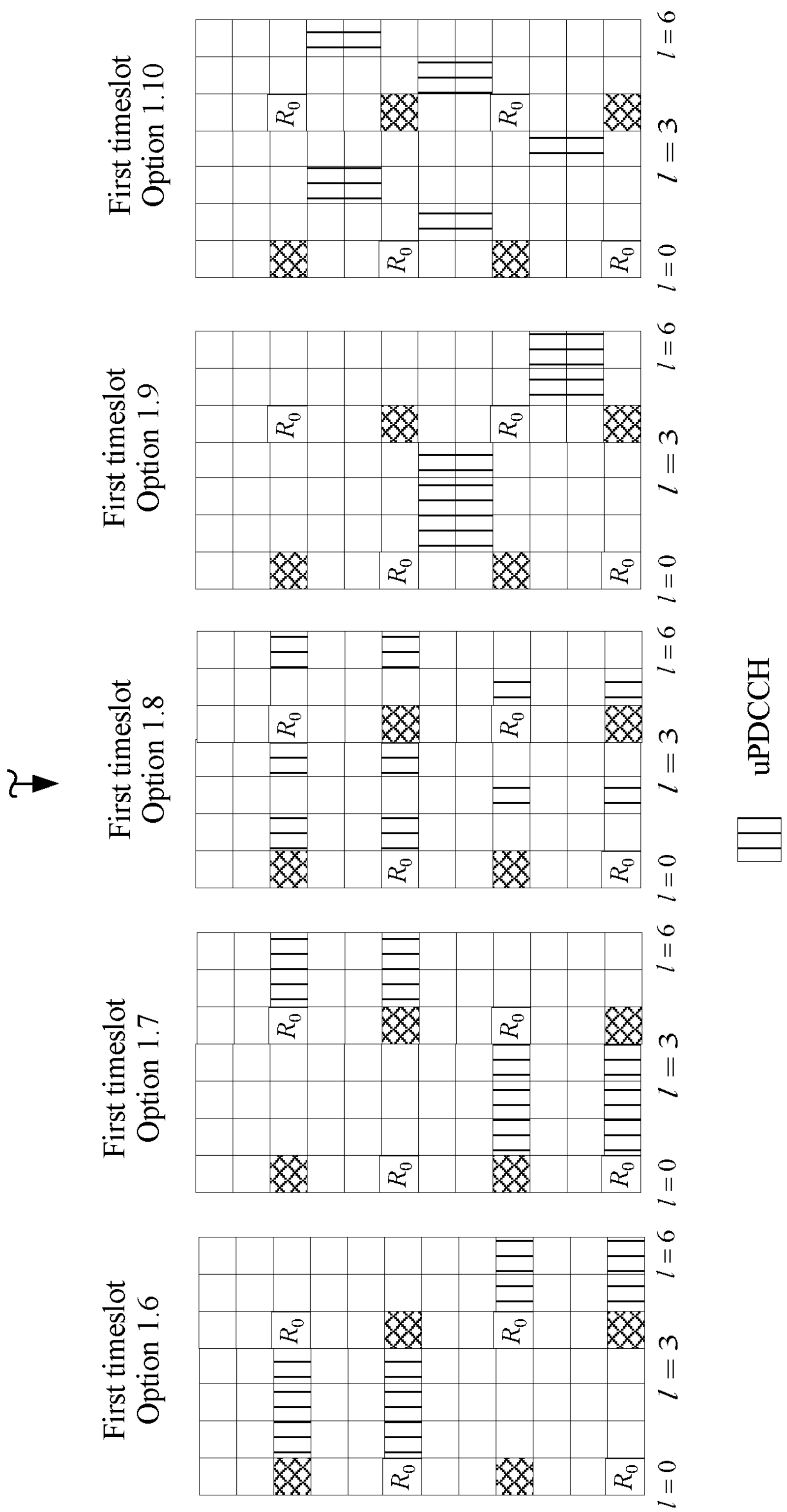

For a specific uPDCCH pattern, refer to FIG. 10A and FIG. 10B. A second timeslot and a first timeslot are symmetric, and a frequency diversity gain may be obtained in all options. In a case of an ECP, a uPDCCH pattern may be obtained by deleting a fourth column of a uPDCCH pattern in a case of an NCP. This is similar to the case in which there is one antenna port.

3. Four Antenna Ports

Figure 11A:
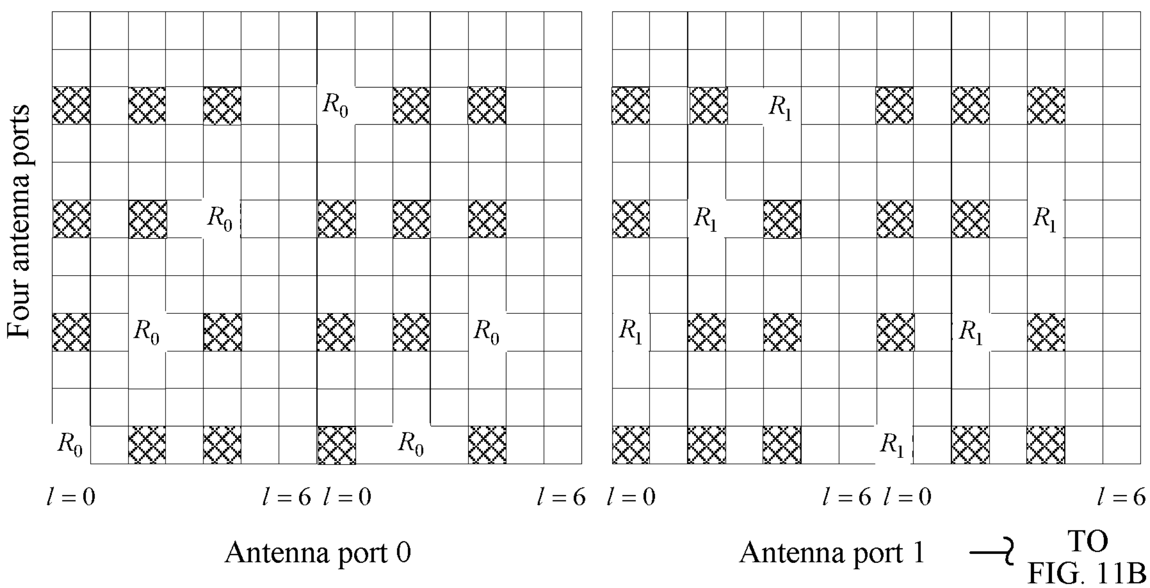
FIG. 11A and FIG. 11B are a CRS pattern in a timeslot in a case of an NCP when a terminal has four antenna ports in a first option in Solution 1.
Figure 11B:
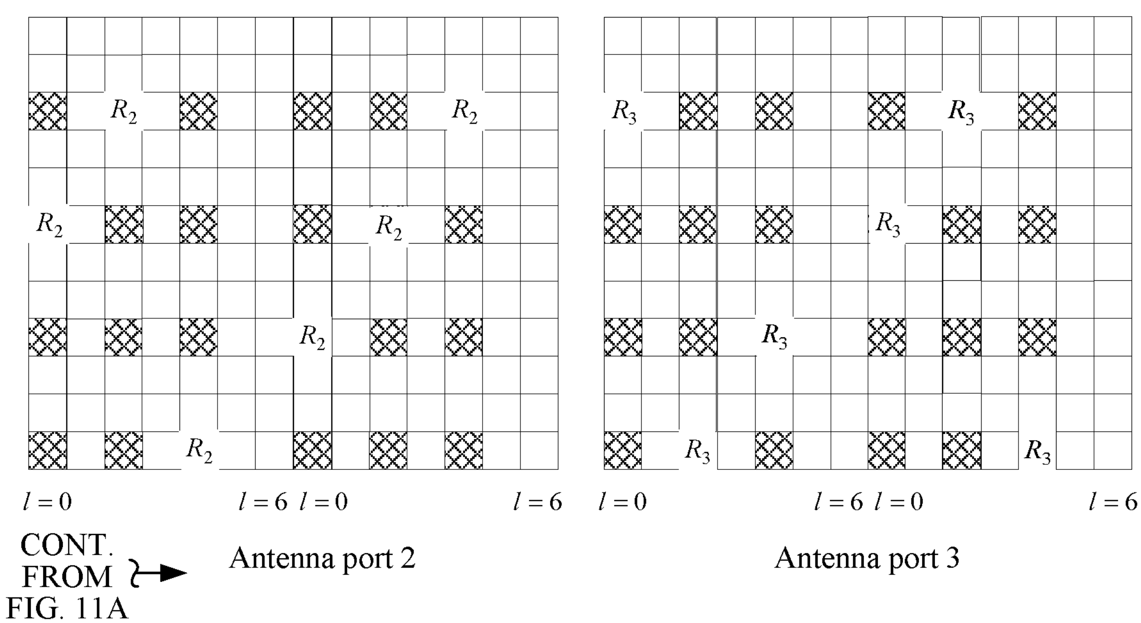
Figure 12A:
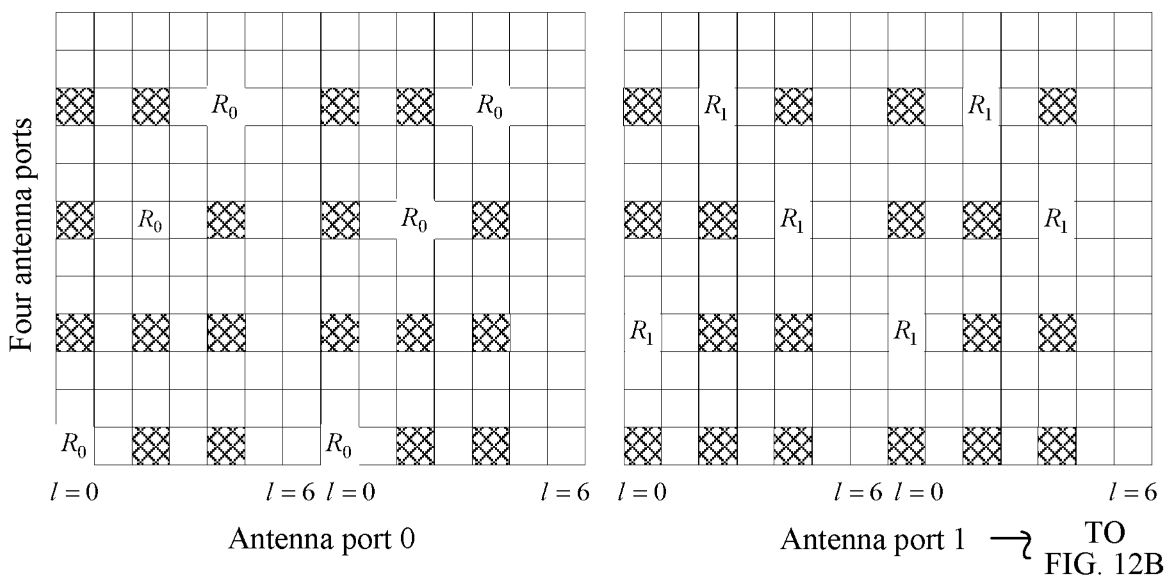
FIG. 12A and FIG. 12B are another CRS pattern in a timeslot in a case of an NCP when a terminal has four antenna ports in a first option in Solution 1.
Figure 12B:
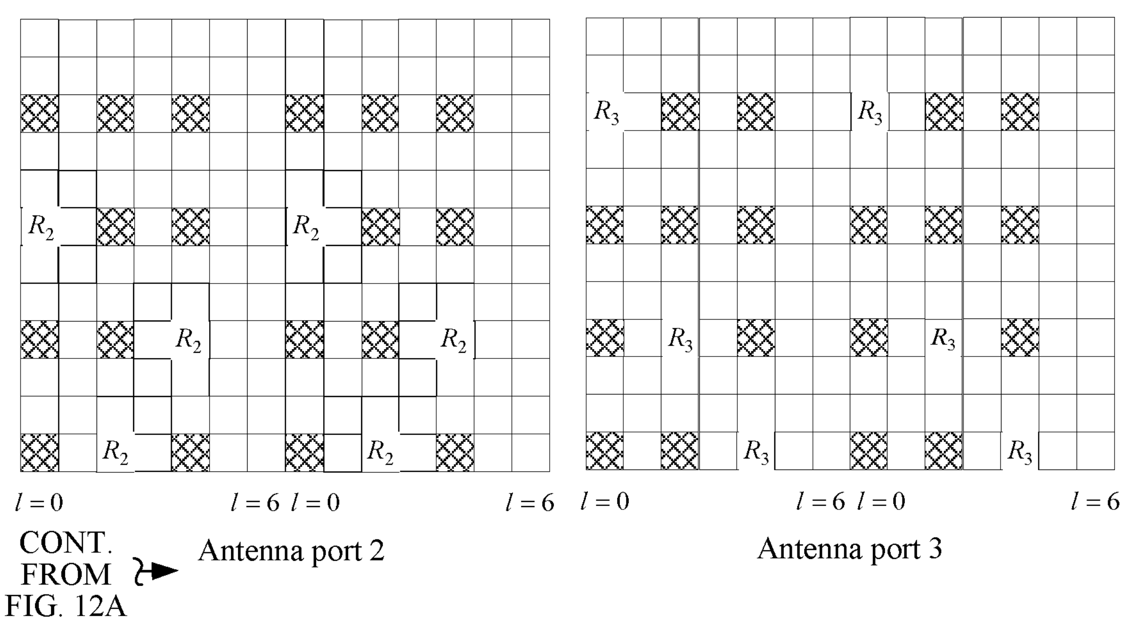
Figure 13A:
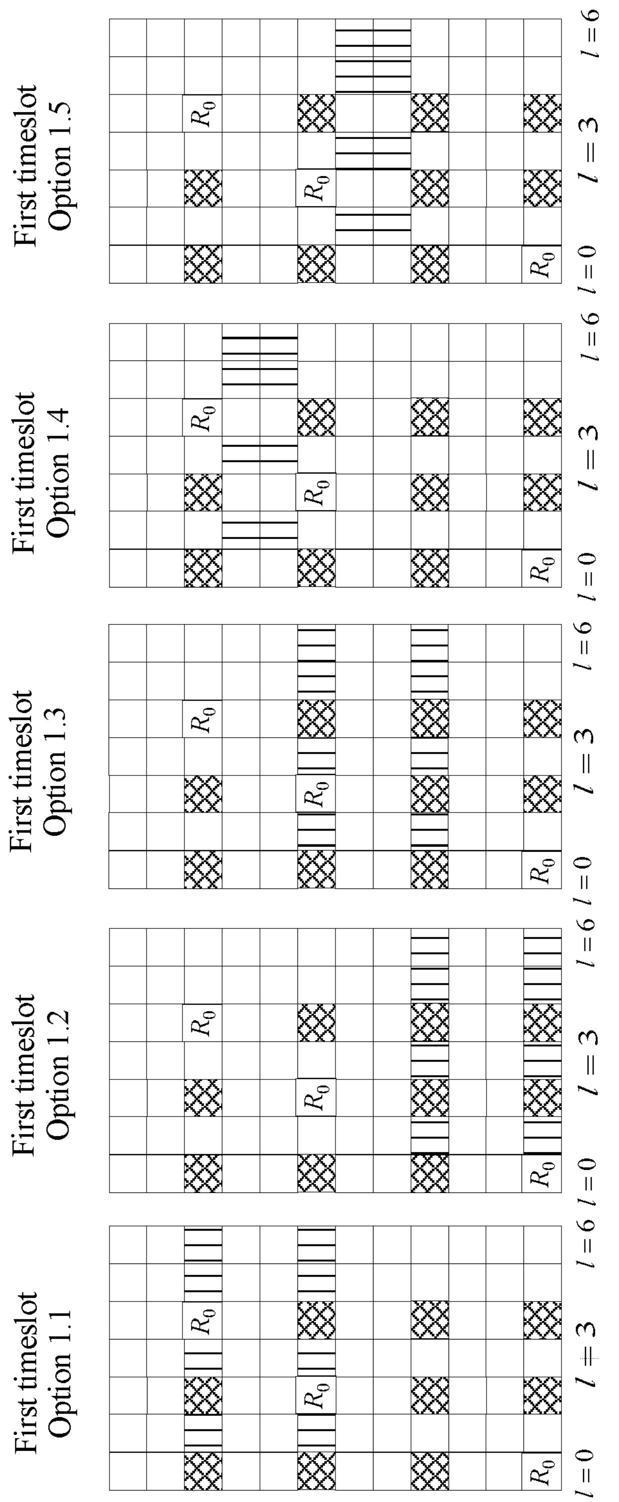
FIG. 13A and FIG. 13B are CRS and uPDCCH patterns in a timeslot in a case of an NCP when a terminal has four antenna ports in a first option in Solution 1.
Figure 13B:
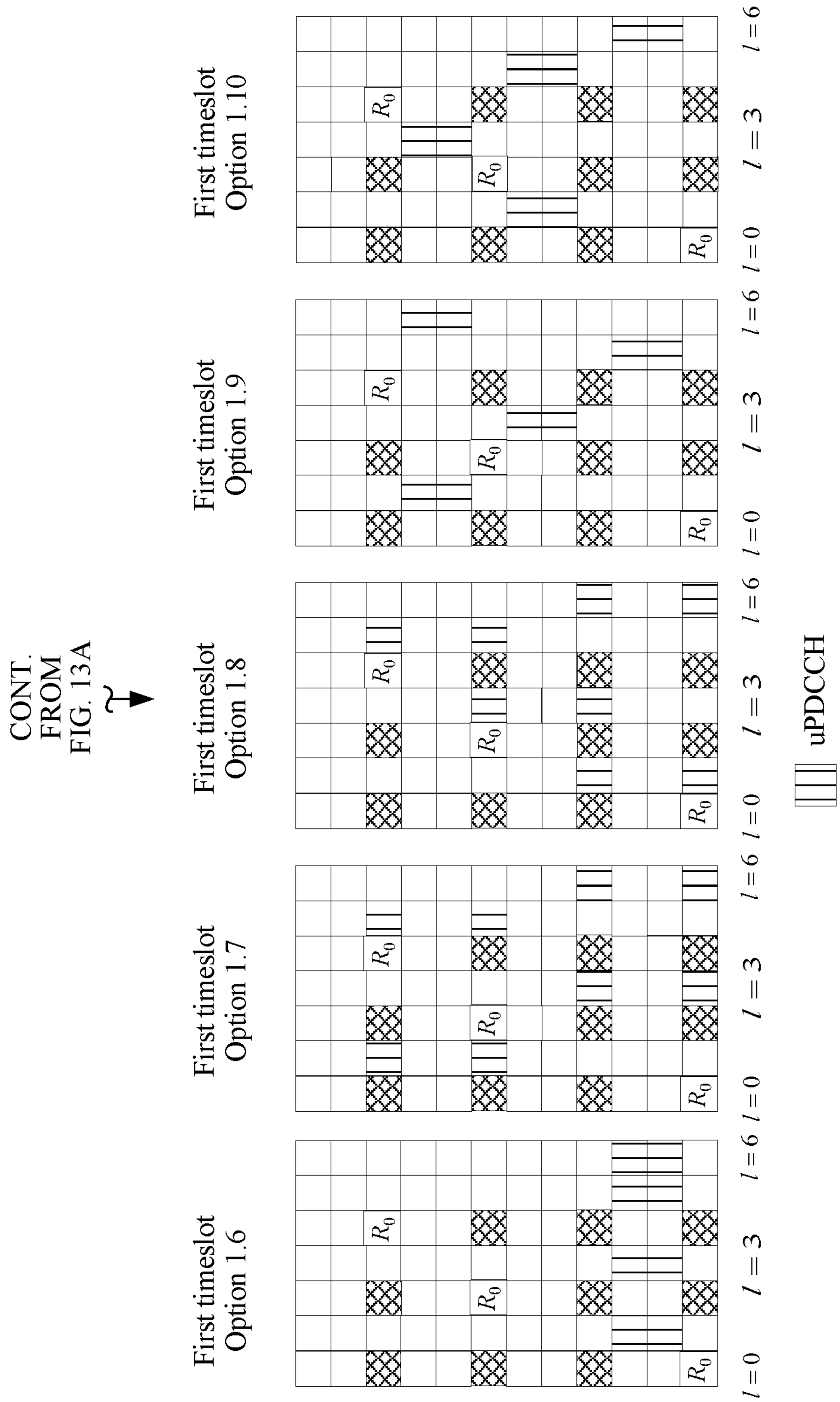

Because an existing preset pattern (such as a CRS pattern) of four antenna ports is not applicable to a ULL system (for an existing CRS pattern of four antenna ports, a case in which there are CRSs of four antenna ports in a same OFDM symbol does not exist), the CRS pattern of four antenna ports is correspondingly modified. First, a symbol having a CRS includes CRSs of four antenna ports, and then two adjacent symbols having a CRS are separated (for this modification, it is mainly considered that a symbol having a CRS does not have a uPDCCH in Option 1 and requires a next symbol for scheduling). For a specific designed CRS pattern, refer to FIG. 11A and FIG. 11B. Certainly, the designed CRS pattern may be another pattern such as a CRS pattern shown in FIG. 12A and FIG. 12B. Based on the re-designed CRS pattern of four antennas, a uPDCCH pattern is designed. For the uPDCCH pattern, refer to FIG. 13A and FIG. 13B. A second timeslot and a first timeslot are symmetric, and a frequency diversity gain may be obtained in all options in FIG. 13A and FIG. 13B. In a case of an ECP, a uPDCCH pattern may be obtained by deleting a seventh column of a uPDCCH pattern in a case of an NCP.

The following analyzes a CRS pattern and a uPDCCH pattern obtained when one OFDM symbol is used as a transmission unit, Option 2 is used, and there is one antenna port, two antenna ports, or four antenna ports.

1. One Antenna Port

Figure 14A:
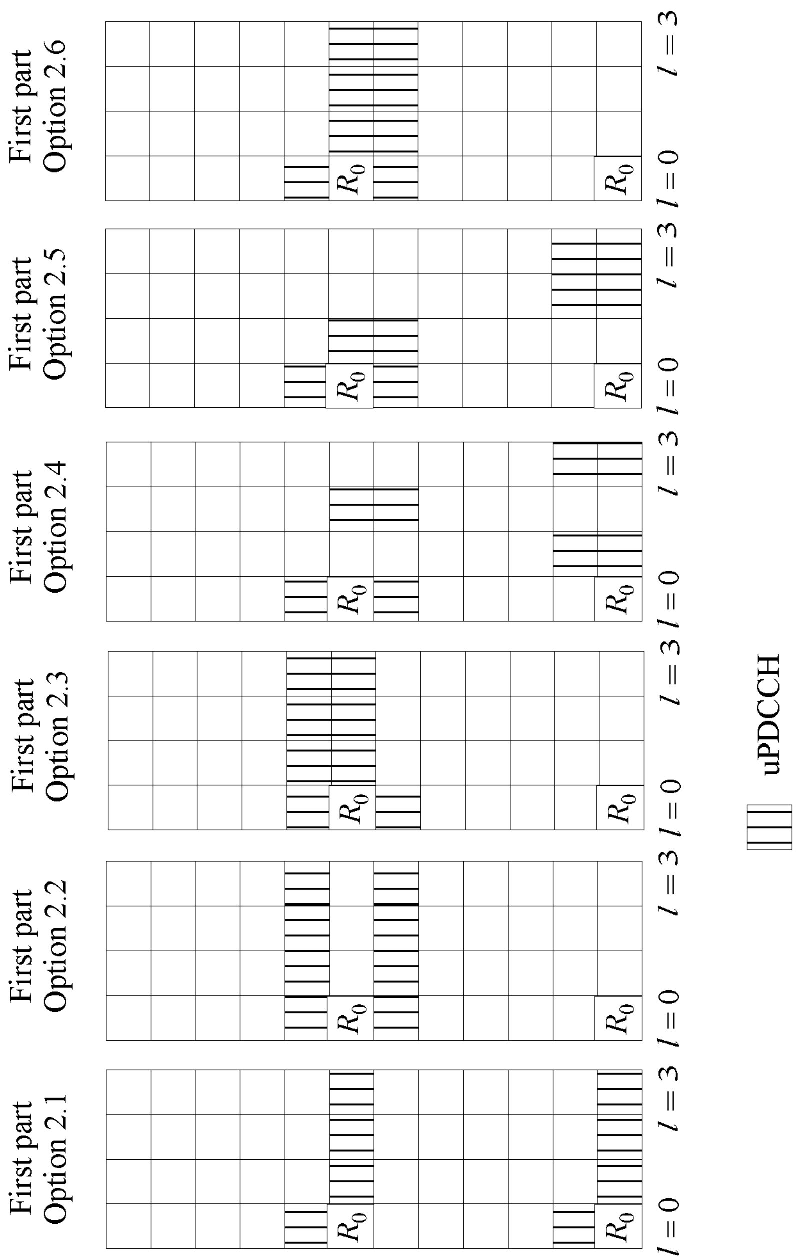
FIG. 14A is CRS and uPDCCH patterns in a first part of a timeslot in a case of an NCP when a terminal has one antenna port in a second option in Solution 1.
Figure 14B:
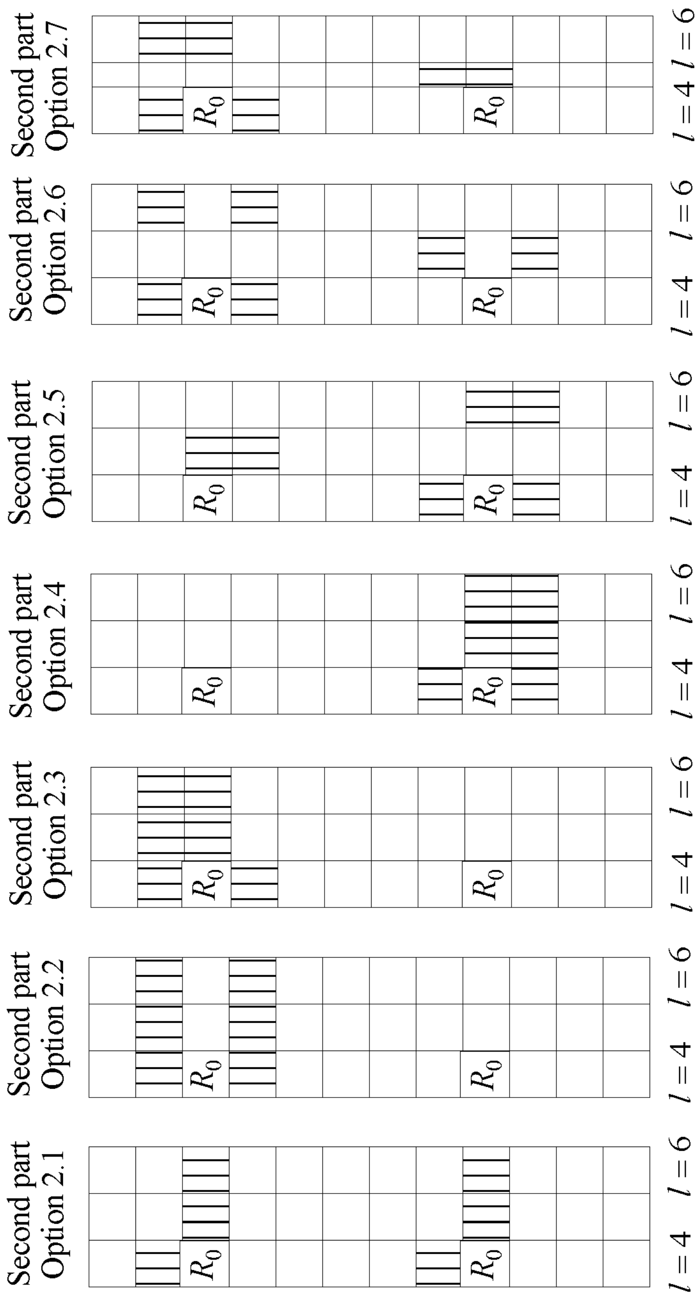
FIG. 14B is CRS and uPDCCH patterns in a second part of a timeslot in a case of an NCP when a terminal has one antenna port in a second option in Solution 1.

For a specific uPDCCH pattern, refer to FIG. 14A and FIG. 14B. A first part in FIG. 14A and a second part in FIG. 14B may be freely combined, and a first timeslot and a second timeslot are symmetric. A frequency diversity gain may be obtained in all options. In a case of an ECP, a uPDCCH pattern may be obtained by deleting a fourth column of a uPDCCH pattern in a case of an NCP.

2. Two Antenna Ports

Figure 15A:
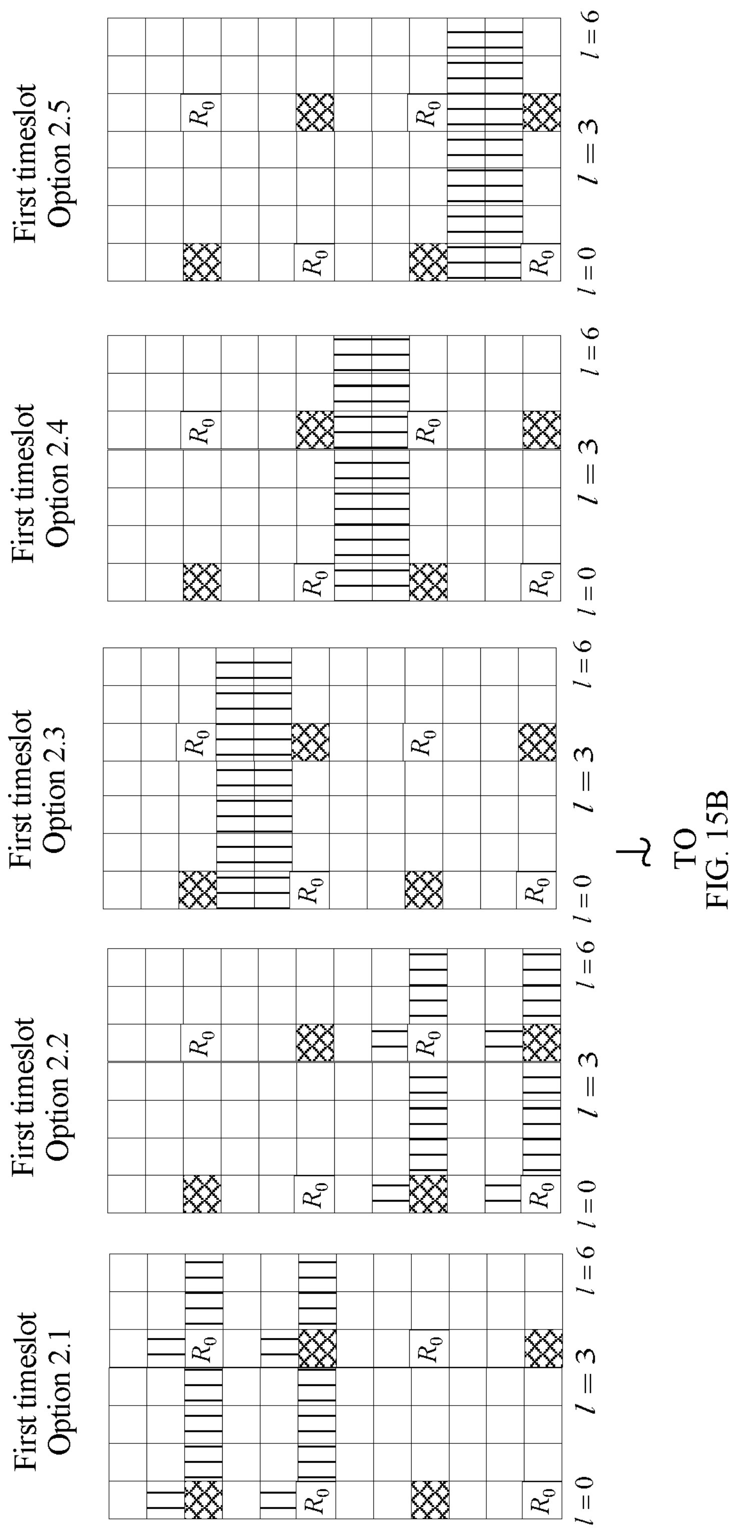
FIG. 15A and FIG. 15B are CRS and uPDCCH patterns in a timeslot in a case of an NCP when a terminal has two antenna ports in a second option in Solution 1.
Figure 15B:
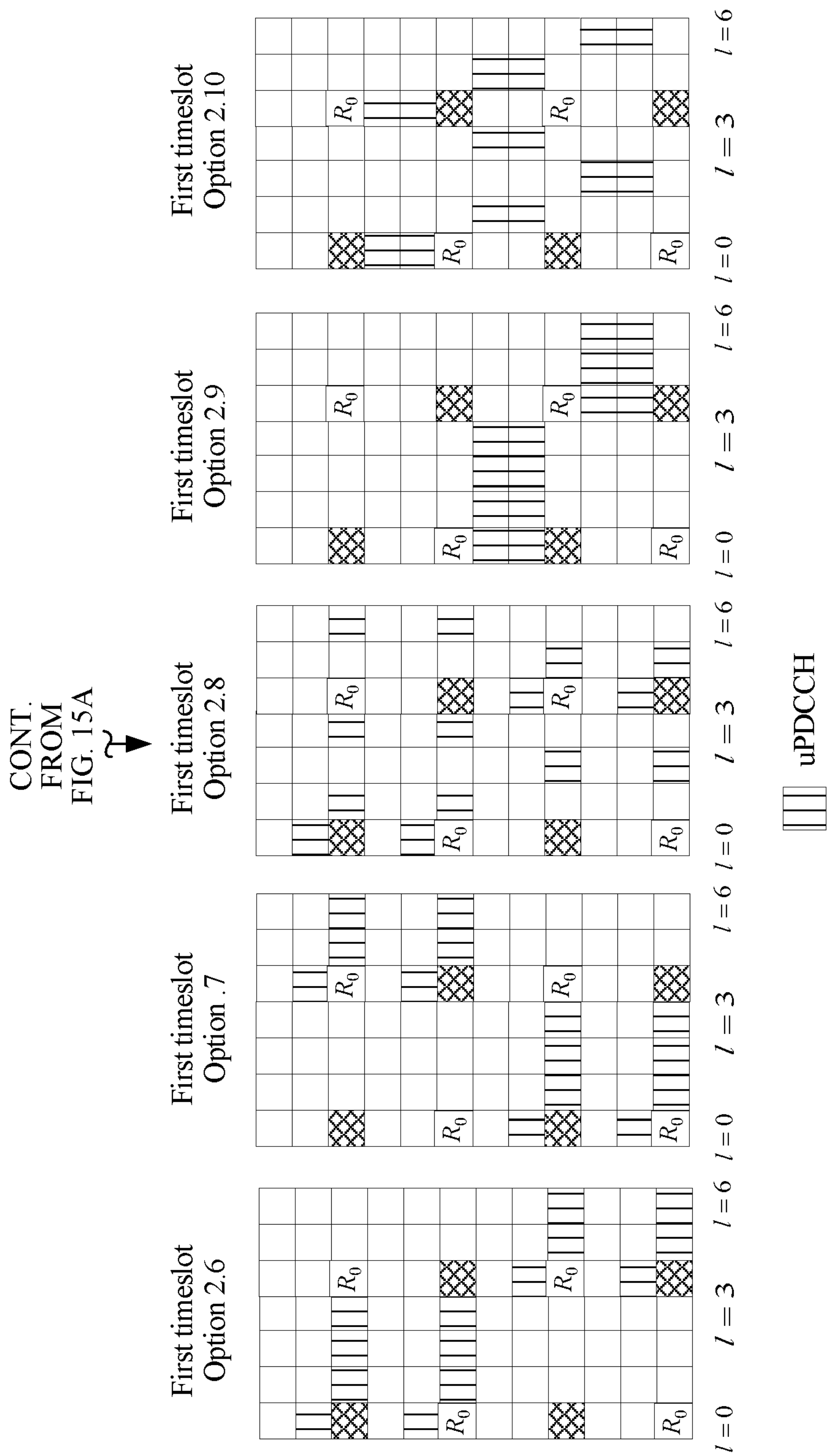

For a specific uPDCCH pattern, refer to FIG. 15A and FIG. 15B. A second timeslot and a first timeslot are symmetric, and a frequency diversity gain may be obtained in all options. In a case of an ECP, a uPDCCH pattern may be obtained by deleting a fourth column of a uPDCCH pattern in a case of an NCP. This is similar to the case in which there is one antenna port.

3. Four Antenna Ports

Figure 16A:
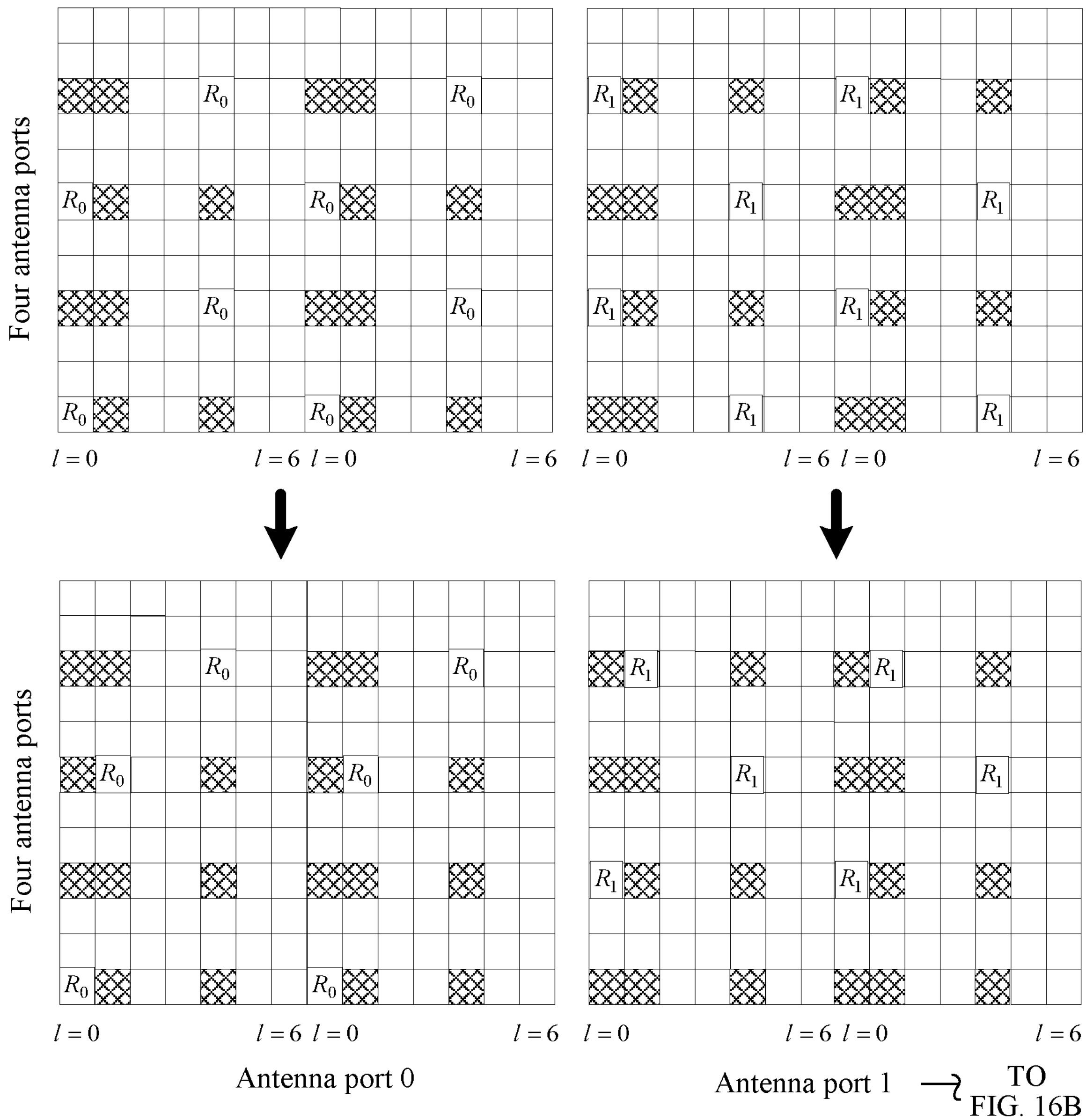
FIG. 16A and FIG. 16B are a CRS pattern in a case of an NCP when a terminal has four antenna ports in a second option in Solution 1.
Figure 16B:
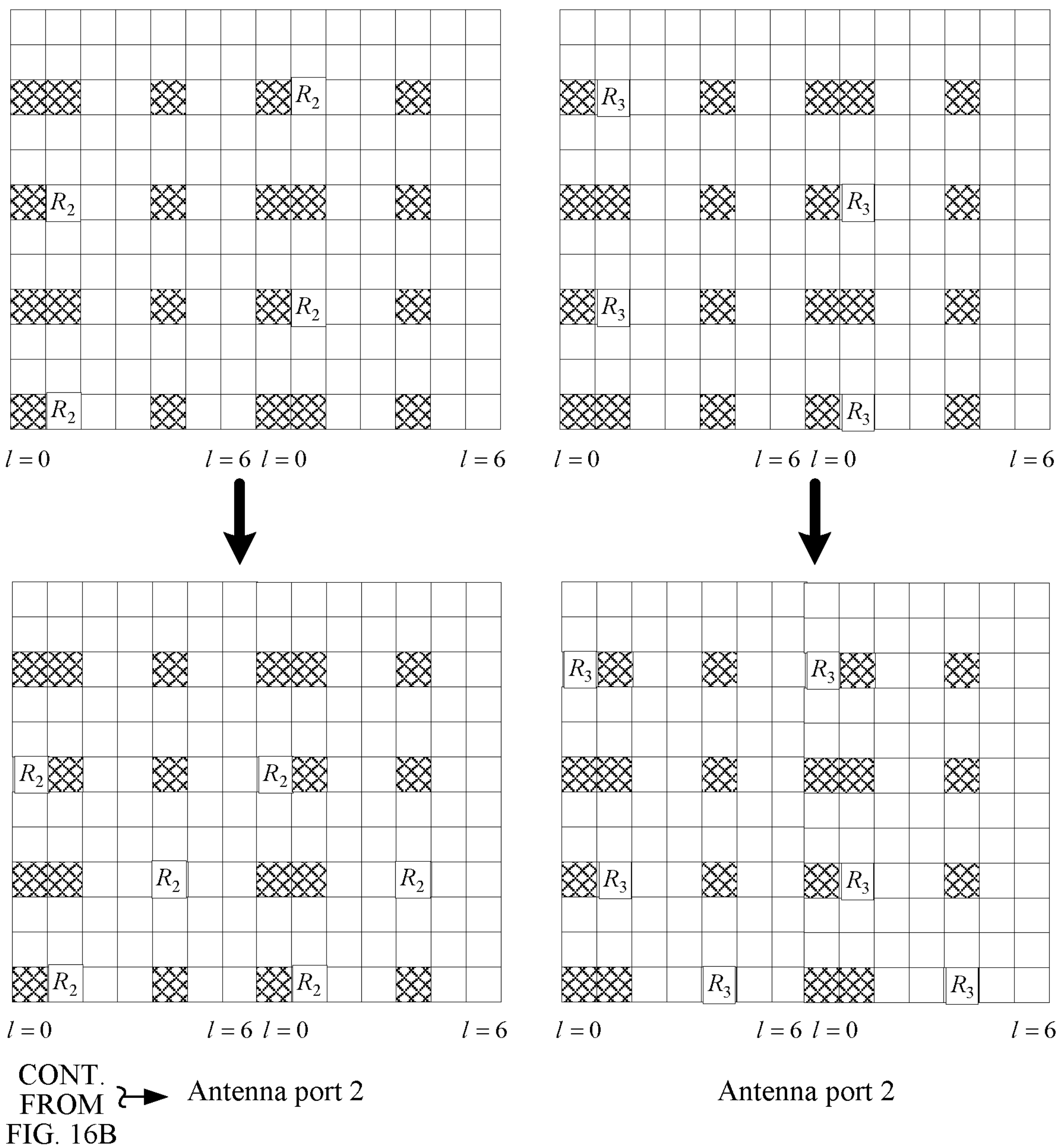
Figure 17A:
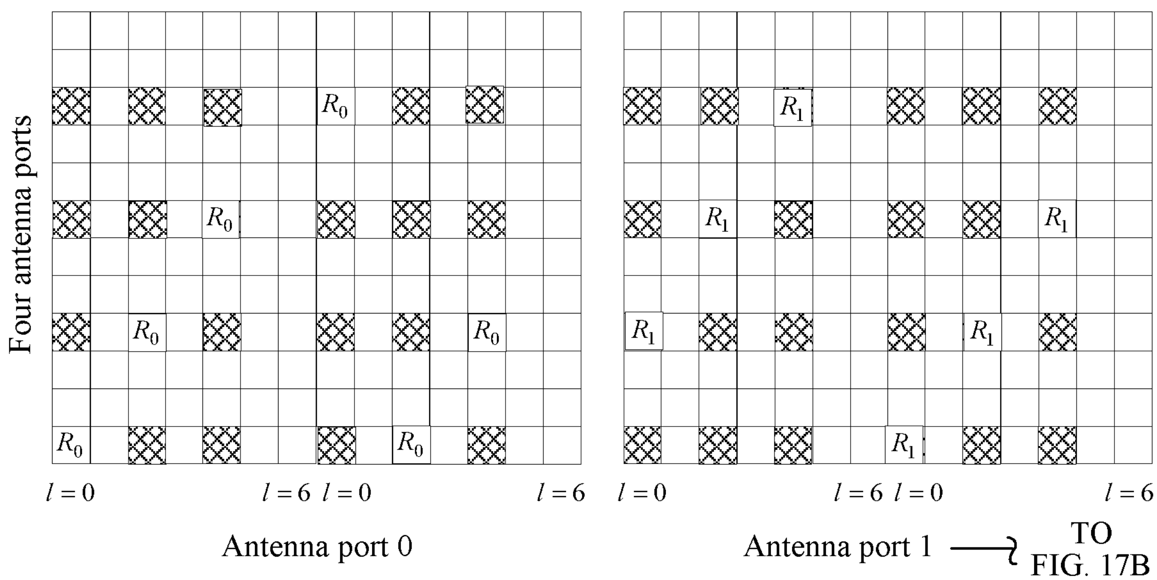
FIG. 17A and FIG. 17B are another CRS pattern in a case of an NCP when a terminal has four antenna ports in a second option in Solution 1.
Figure 17B:
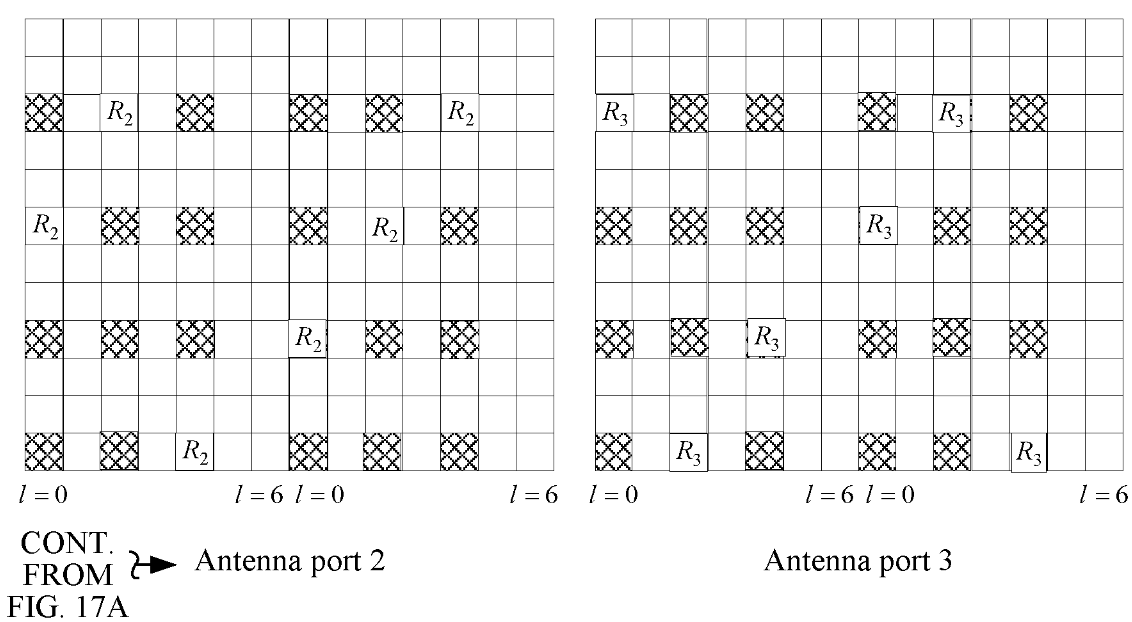
Figure 18A:
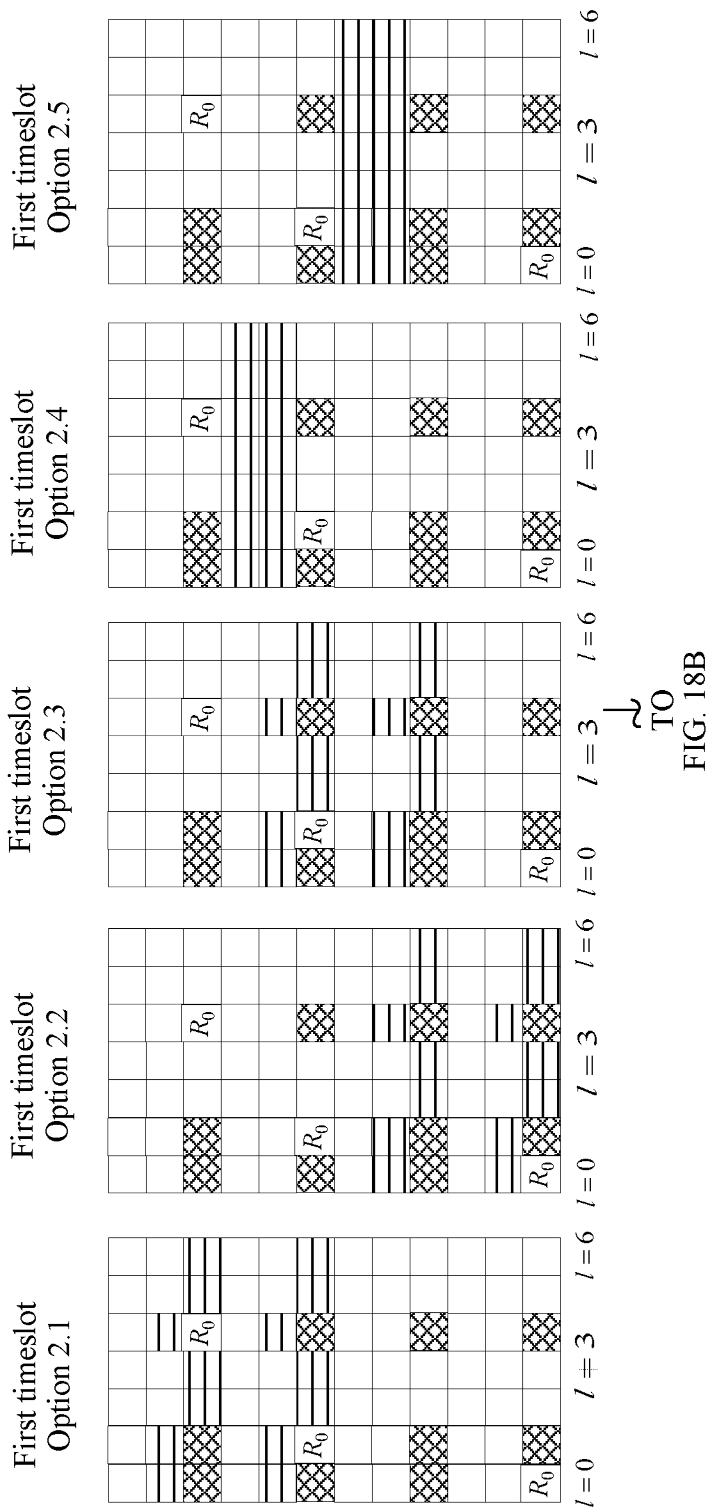
FIG. 18A and FIG. 18B are CRS and uPDCCH patterns in a timeslot in a case of an NCP when a terminal has four antenna ports in a second option in Solution 1.
Figure 18B:
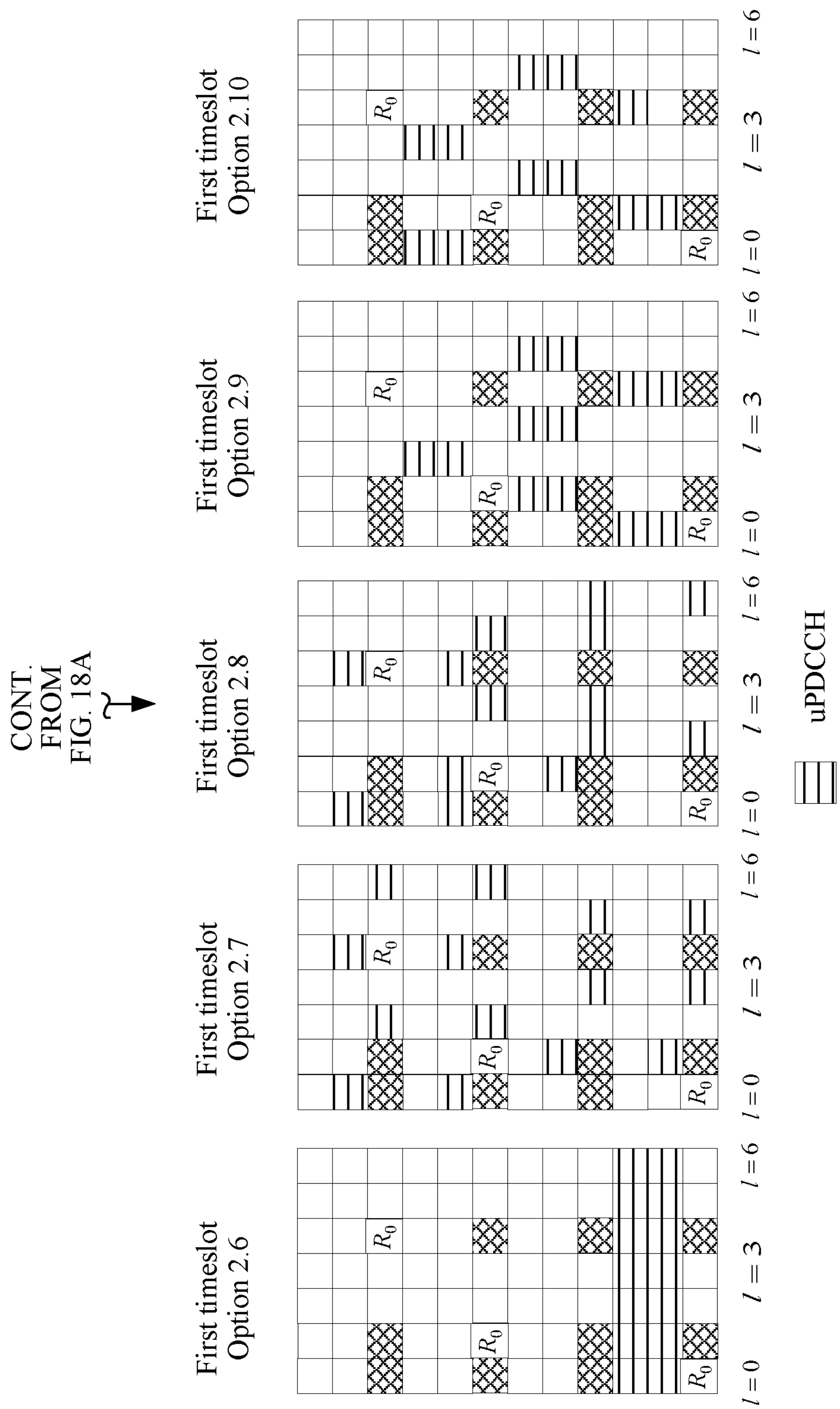

A CRS pattern is re-designed. Two adjacent symbols having a CRS do not need to be separated herein (the limit in Option 1 does not exist herein). For a specific CRS pattern, refer to FIG. 16A and FIG. 16B. As shown in FIG. 17A and FIG. 17B, there may be another CRS pattern. For a specific uPDCCH pattern, refer to FIG. 18A and FIG. 18B. A second timeslot and a first timeslot are symmetric, and a frequency diversity gain may be obtained in all options. In a case of an ECP, a uPDCCH pattern may be obtained by deleting a seventh column of a uPDCCH pattern in a case of an NCP.

The following analyzes a CRS pattern and a uPDCCH pattern obtained when one OFDM symbol is used as a transmission unit, Option 3 is used, and there is one antenna port, two antenna ports, or four antenna ports.

1. One Antenna Port

Figure 19:
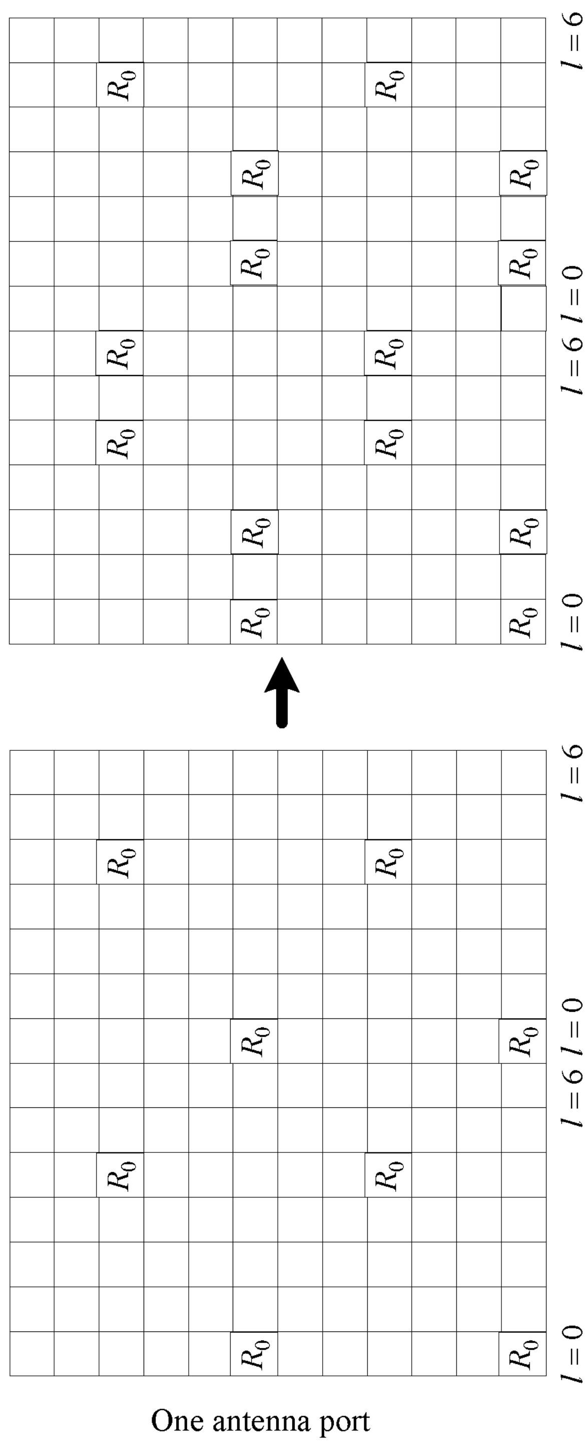
FIG. 19 is a schematic diagram of a change of a CRS pattern in a case of an NCP when a terminal has one antenna port in a third option in Solution 1.

A CRS pattern is designed (as shown in FIG. 19). Certainly, there may also be another CRS pattern. For a specific uPDCCH pattern, refer to FIG. 20A and FIG. 20B. A frequency diversity gain may be obtained in all options in FIG. 20A and FIG. 20B. In a case of an ECP, a uPDCCH pattern may be obtained by deleting a seventh column of a uPDCCH pattern in a case of an NCP, and a CRS pattern in a second timeslot is a repetition of a CRS pattern in a first timeslot.

For a change from an existing CRS pattern to a CRS pattern shown in this embodiment of the present disclosure, further refer to FIG. 21 to FIG. 25.

Figure 21:
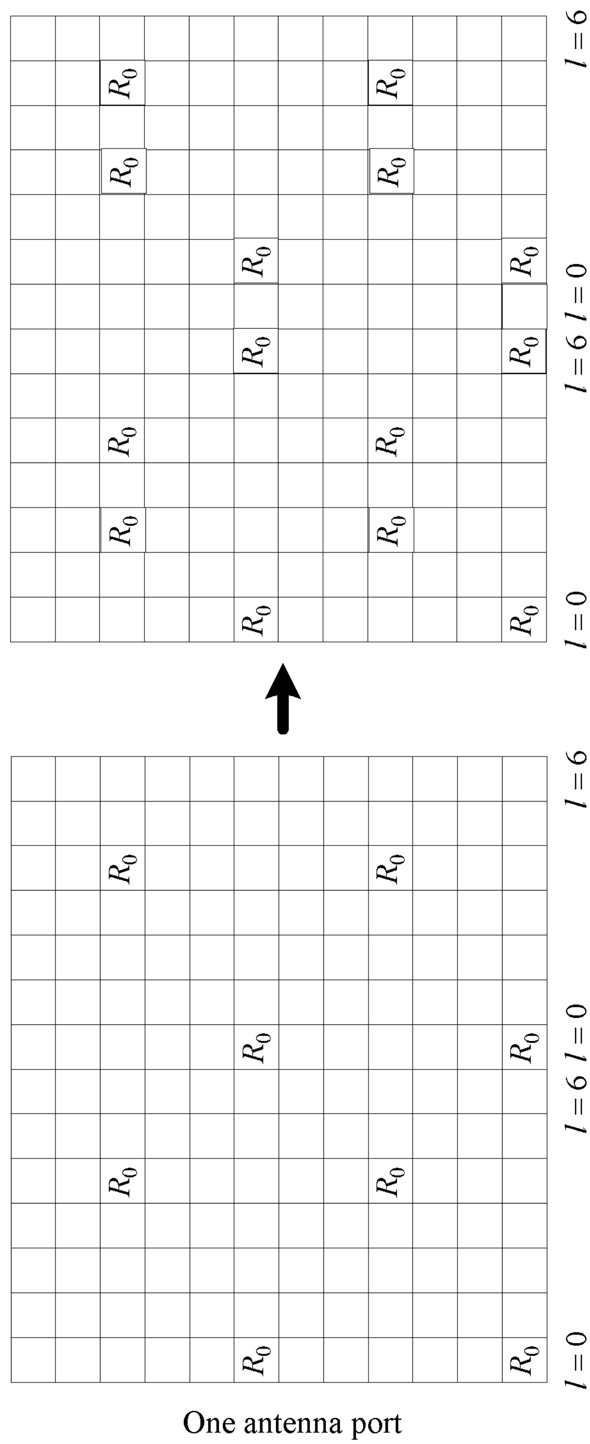
FIG. 21 is a schematic diagram of another change of a CRS pattern in a case of an NCP when a terminal has one antenna port in a third option in Solution 1.

In a changed CRS pattern shown in FIG. 21, a CRS appears in an OFDM symbol twice, and appears in every other OFDM symbol. Therefore, the CRS pattern is relatively evenly designed.

Figure 22:
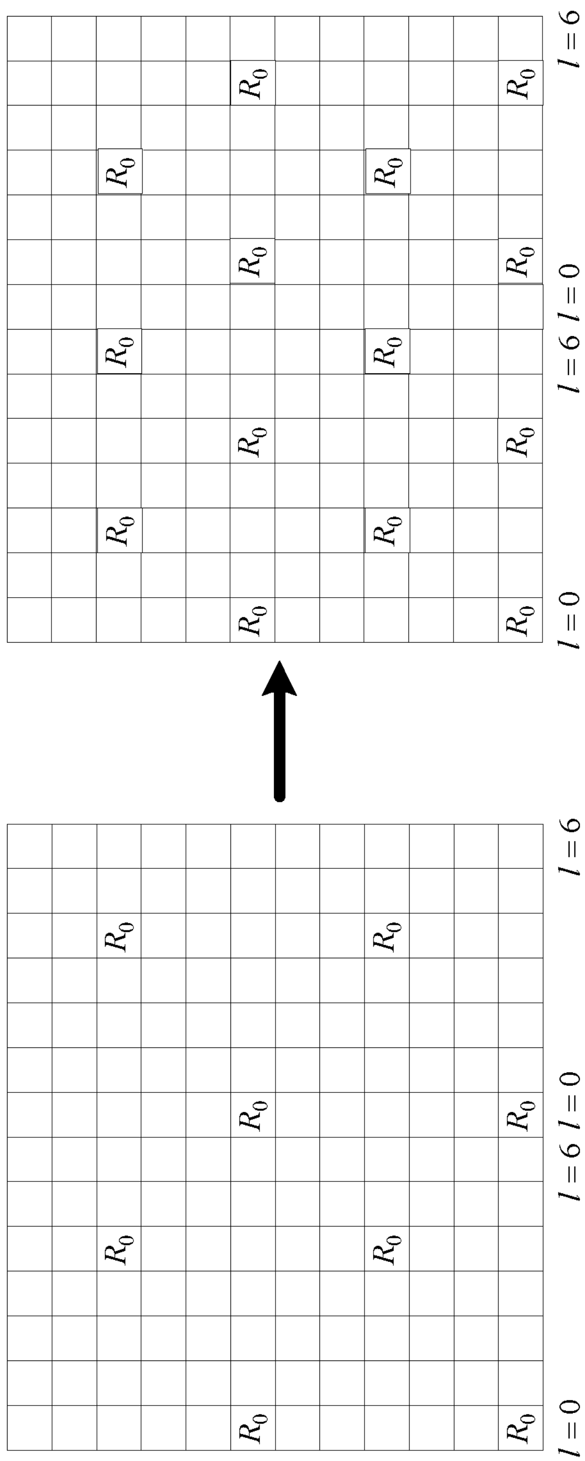
FIG. 22 is a schematic diagram of still another change of a CRS pattern in a case of an NCP when a terminal has one antenna port in a third option in Solution 1.

A CRS pattern shown in FIG. 22 is also relatively evenly designed, and is similar to the designed CRS pattern shown in FIG. 21.

Figure 23:
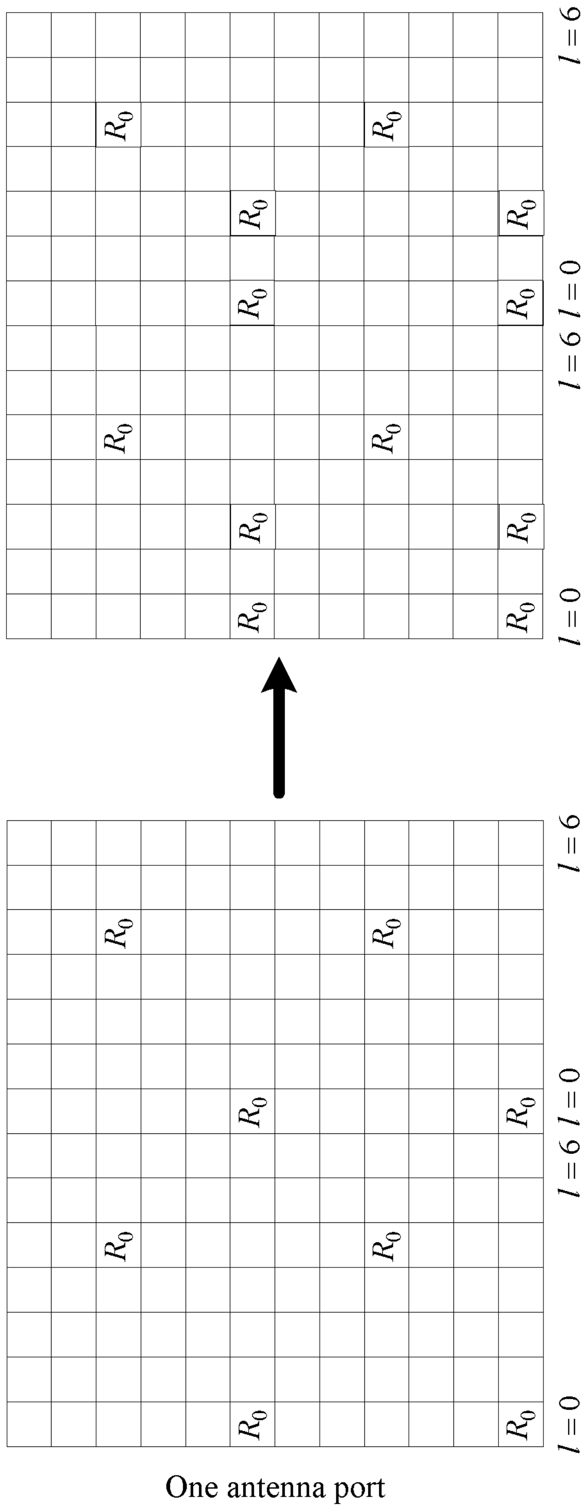
FIG. 23 is a schematic diagram of still another change of a CRS pattern in a case of an NCP when a terminal has one antenna port in a third option in Solution 1.

A CRS pattern shown in FIG. 23 is not even. In the pattern, not every two symbols include one symbol including a CRS. However, it may be ensured that two timeslots in a subframe are symmetric in the pattern. It cannot be ensured that two timeslots in a subframe are symmetric in the design solutions of the even CRS patterns in FIG. 21 and FIG. 22.

Figure 24:
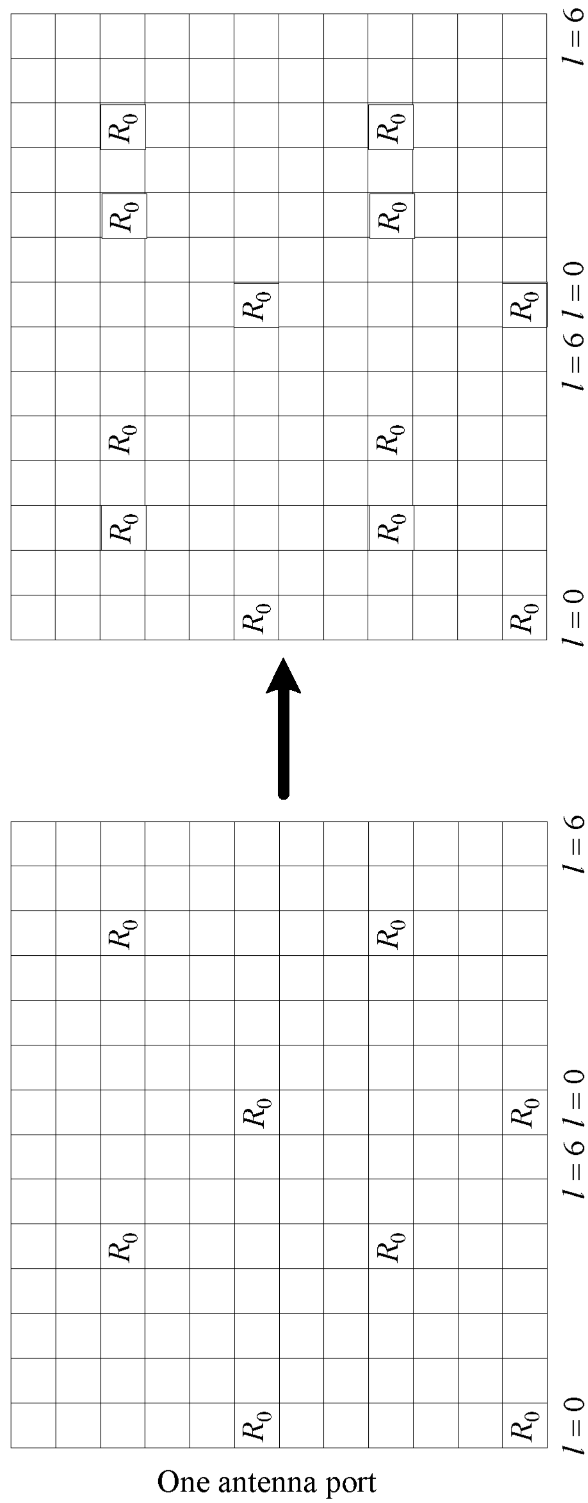
FIG. 24 is a schematic diagram of still another change of a CRS pattern in a case of an NCP when a terminal has one antenna port in a third option in Solution 1.
Figure 25:
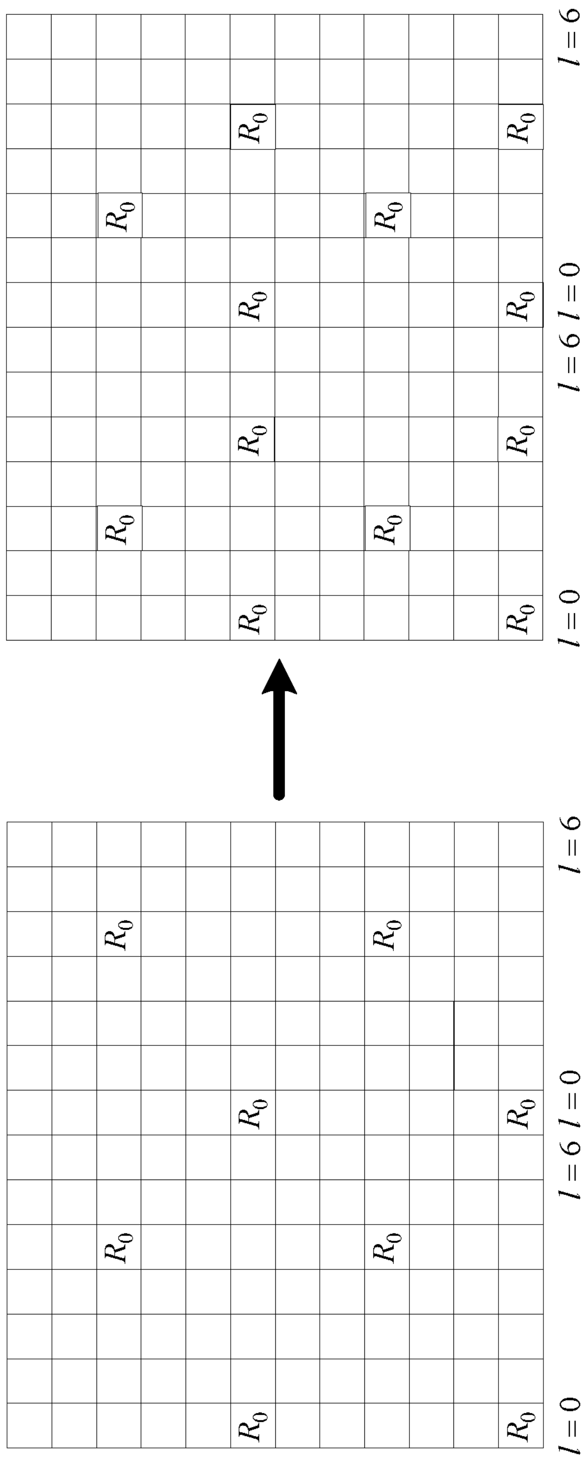
FIG. 25 is a schematic diagram of still another change of a CRS pattern in a case of an NCP when a terminal has one antenna port in a third option in Solution 1.

CRSs in CRS patterns shown in FIG. 24 and FIG. 25 are also not evenly designed.

Figure 20A:
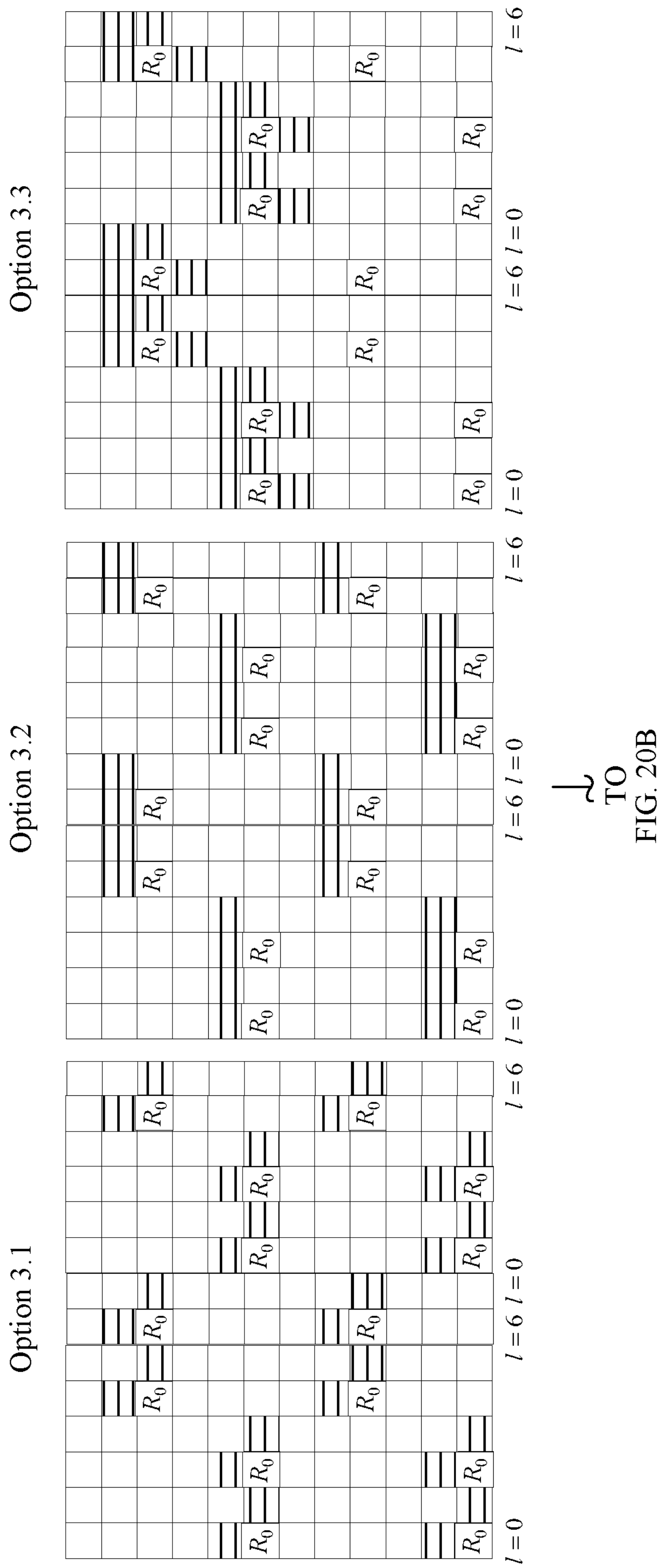
FIG. 20A and FIG. 20B are CRS and uPDCCH patterns in a case of an NCP when a terminal has one antenna port in a third option in Solution 1.
Figure 20B:
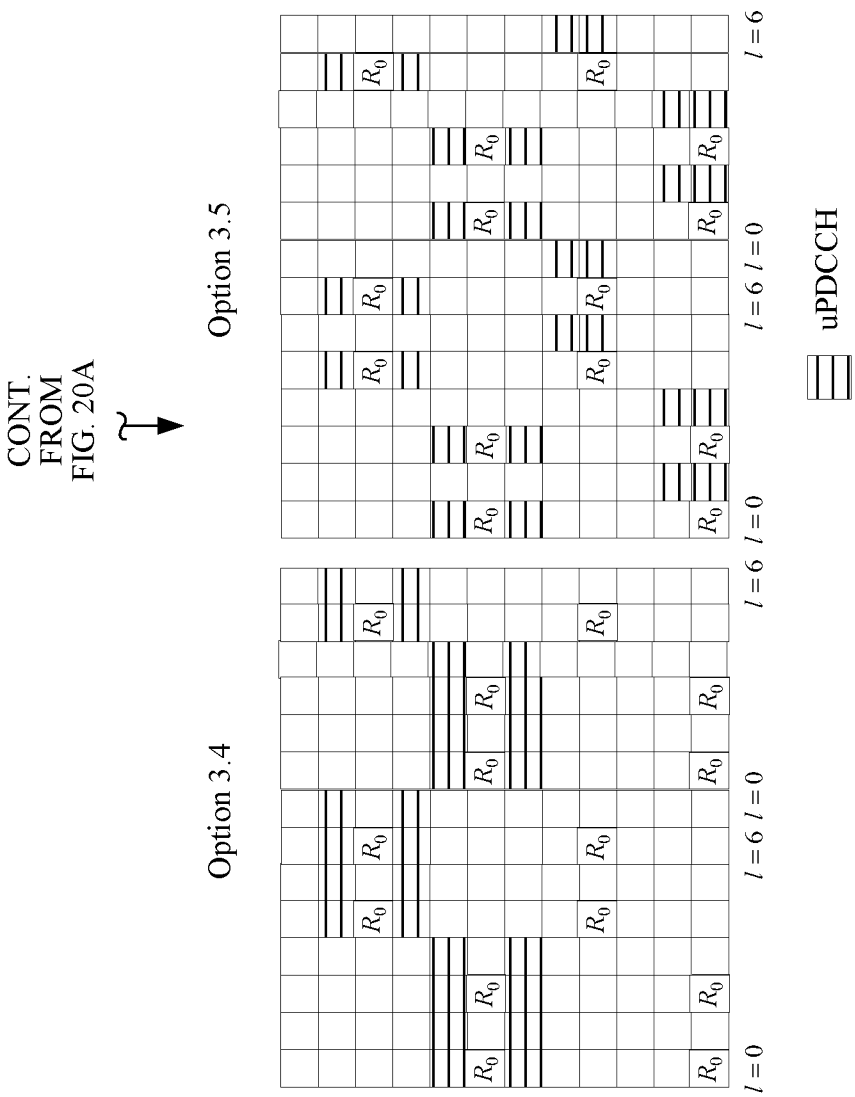

For a uPDCCH pattern designed based on the foregoing CRS pattern, refer to the uPDCCH pattern in FIG. 20A and FIG. 20B. Details are not described herein again.

2. Two Antenna Ports

Figure 26:
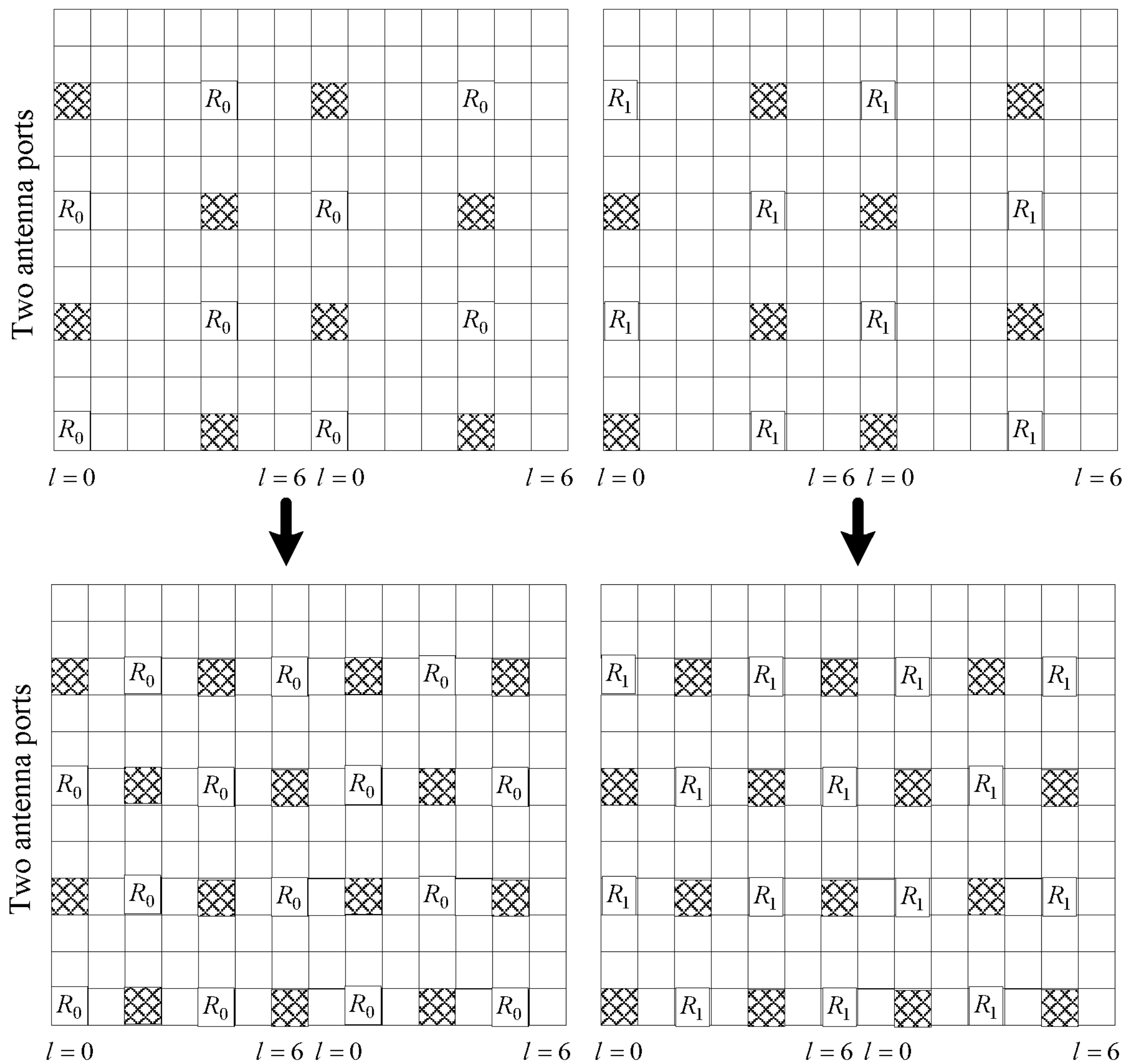
FIG. 26 is a schematic diagram of a change of a CRS pattern in a case of an NCP when a terminal has two antenna ports in a third option in Solution 1.

For a specific CRS pattern, refer to FIG. 26. For a specific uPDCCH pattern, refer to FIG. 27A and FIG. 27B. A frequency diversity gain may be obtained in all options in FIG. 27A and FIG. 27B. In a case of an ECP, a uPDCCH pattern may be obtained by deleting a seventh column of a uPDCCH pattern in a case of an NCP, and a CRS pattern in a second timeslot is a repetition of a CRS pattern in a first timeslot.

For a change from an existing CRS pattern to a CRS pattern shown in this embodiment of the present disclosure, further refer to FIG. 28 to FIG. 32.

Figure 28:
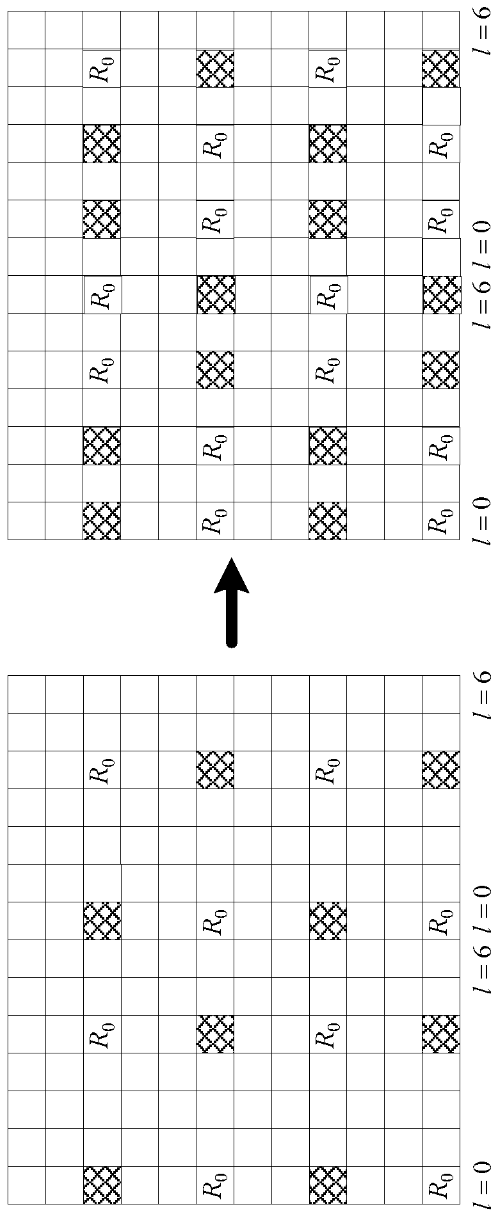
FIG. 28 is a schematic diagram of still another change of a CRS pattern in a case of an NCP when a terminal has two antenna ports in a third option in Solution 1.

In a changed CRS pattern shown in FIG. 28, a CRS appears in an OFDM symbol twice, and appears in every other OFDM symbol. Therefore, the CRS pattern is relatively evenly designed.

Figure 29:
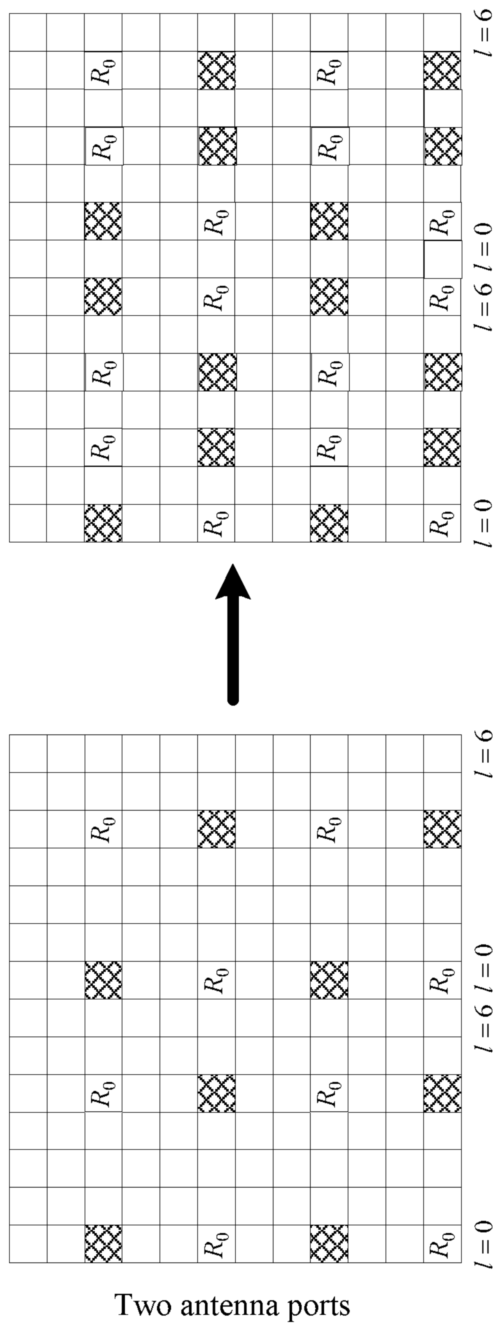
FIG. 29 is a schematic diagram of still another change of a CRS pattern in a case of an NCP when a terminal has two antenna ports in a third option in Solution 1.

A CRS pattern shown in FIG. 29 is also relatively evenly designed, and is similar to the designed CRS pattern shown in FIG. 28.

Figure 30:
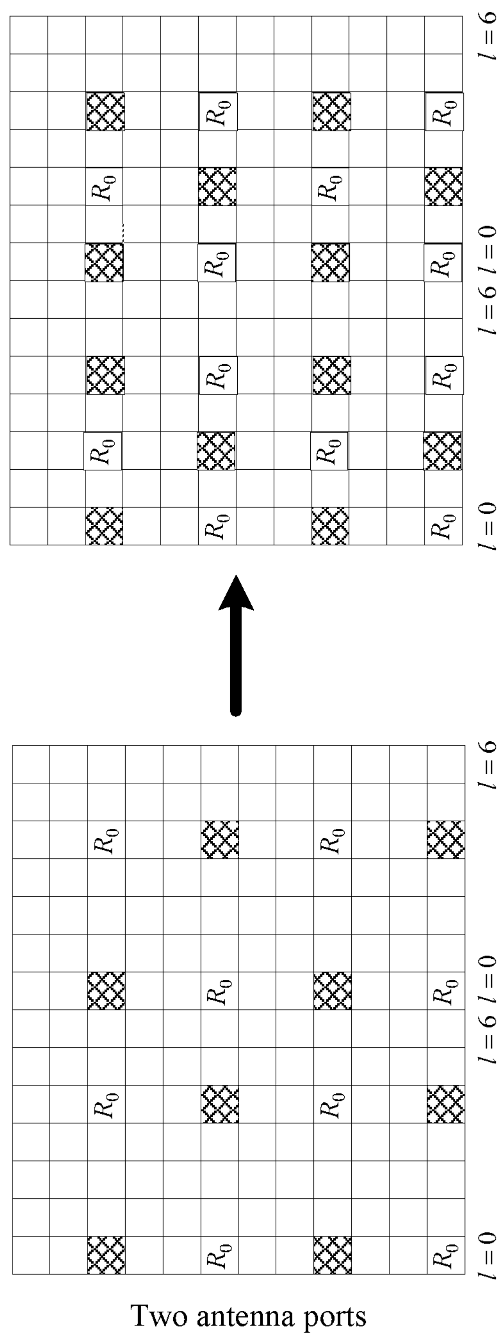
FIG. 30 is a schematic diagram of still another change of a CRS pattern in a case of an NCP when a terminal has two antenna ports in a third option in Solution 1.

A CRS pattern shown in FIG. 30 is not even. In the pattern, not every two symbols include one symbol including a CRS. However, it may be ensured that two timeslots in a subframe are symmetric in the pattern. It cannot be ensured that two timeslots in a subframe are symmetric in the design solutions of the even CRS patterns in FIG. 28 and FIG. 29.

Figure 31:
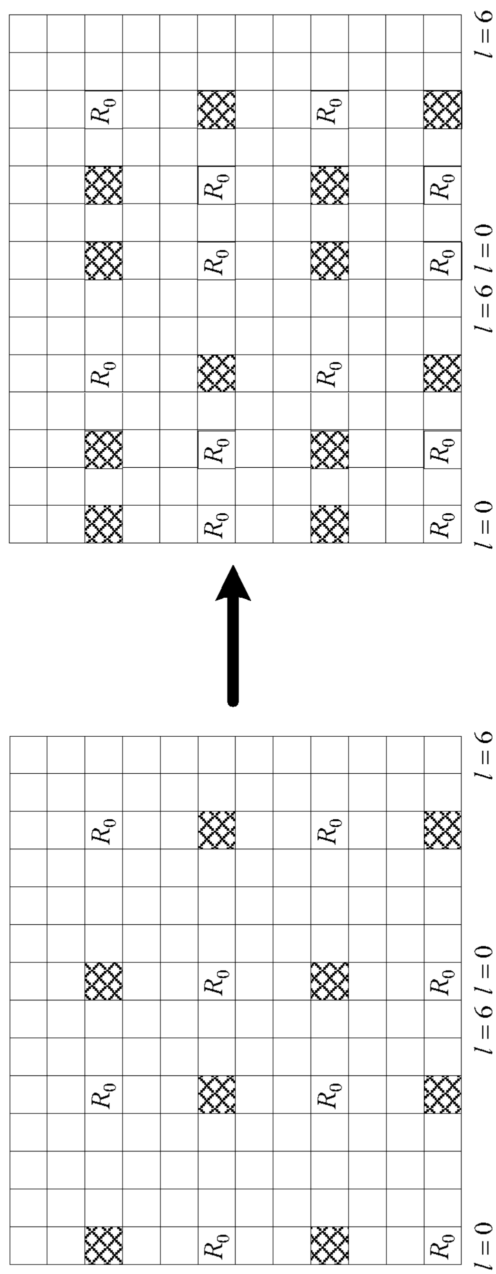
FIG. 31 is a schematic diagram of still another change of a CRS pattern in a case of an NCP when a terminal has two antenna ports in a third option in Solution 1.
Figure 32:
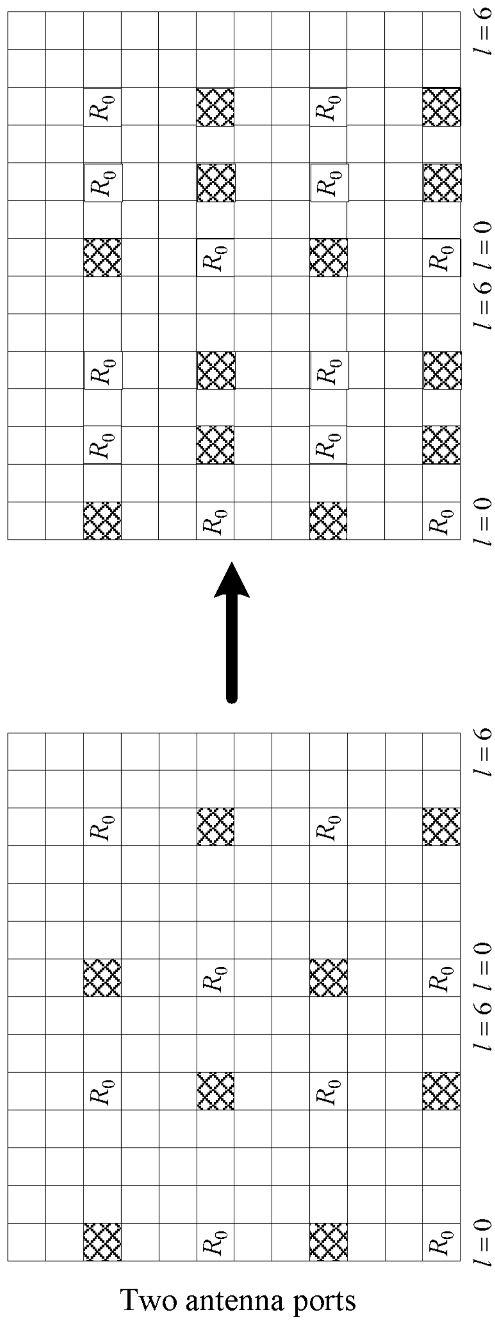
FIG. 32 is a schematic diagram of still another change of a CRS pattern in a case of an NCP when a terminal has two antenna ports in a third option in Solution 1.

CRSs in CRS patterns shown in FIG. 31 and FIG. 32 are also not evenly designed.

Figure 27A:
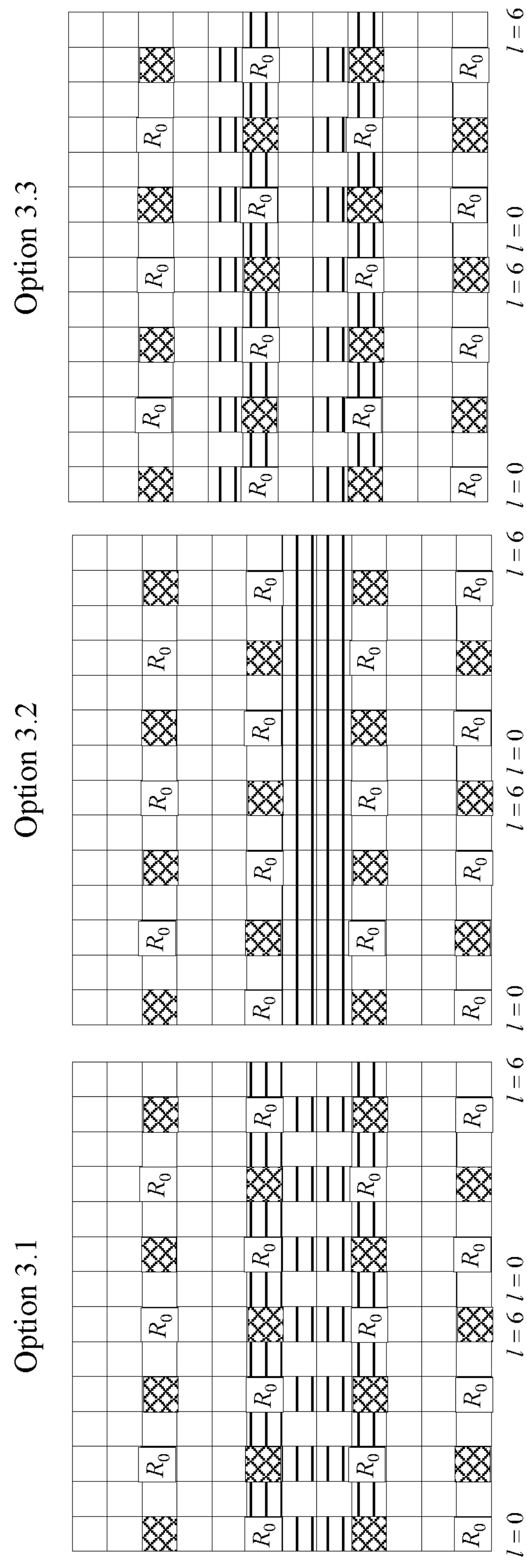
FIG. 27A and FIG. 27B are CRS and uPDCCH patterns in a case of an NCP when a terminal has two antenna ports in a third option in Solution 1.
Figure 27B:
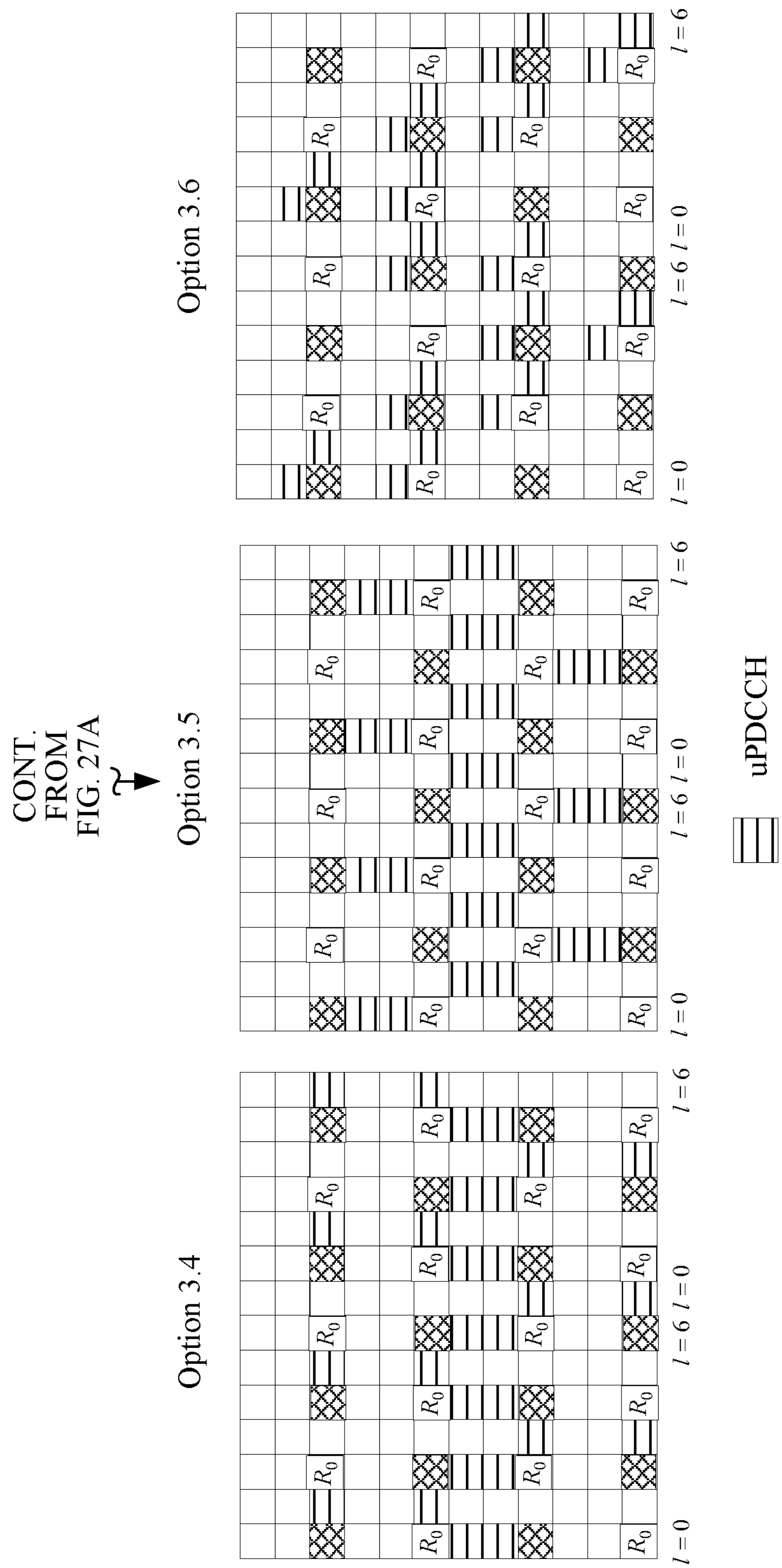

For a uPDCCH pattern designed based on the foregoing CRS pattern, refer to the uPDCCH pattern in FIG. 27A and FIG. 27B. Details are not described herein again.

3. Four Antenna Ports

Figure 33A:
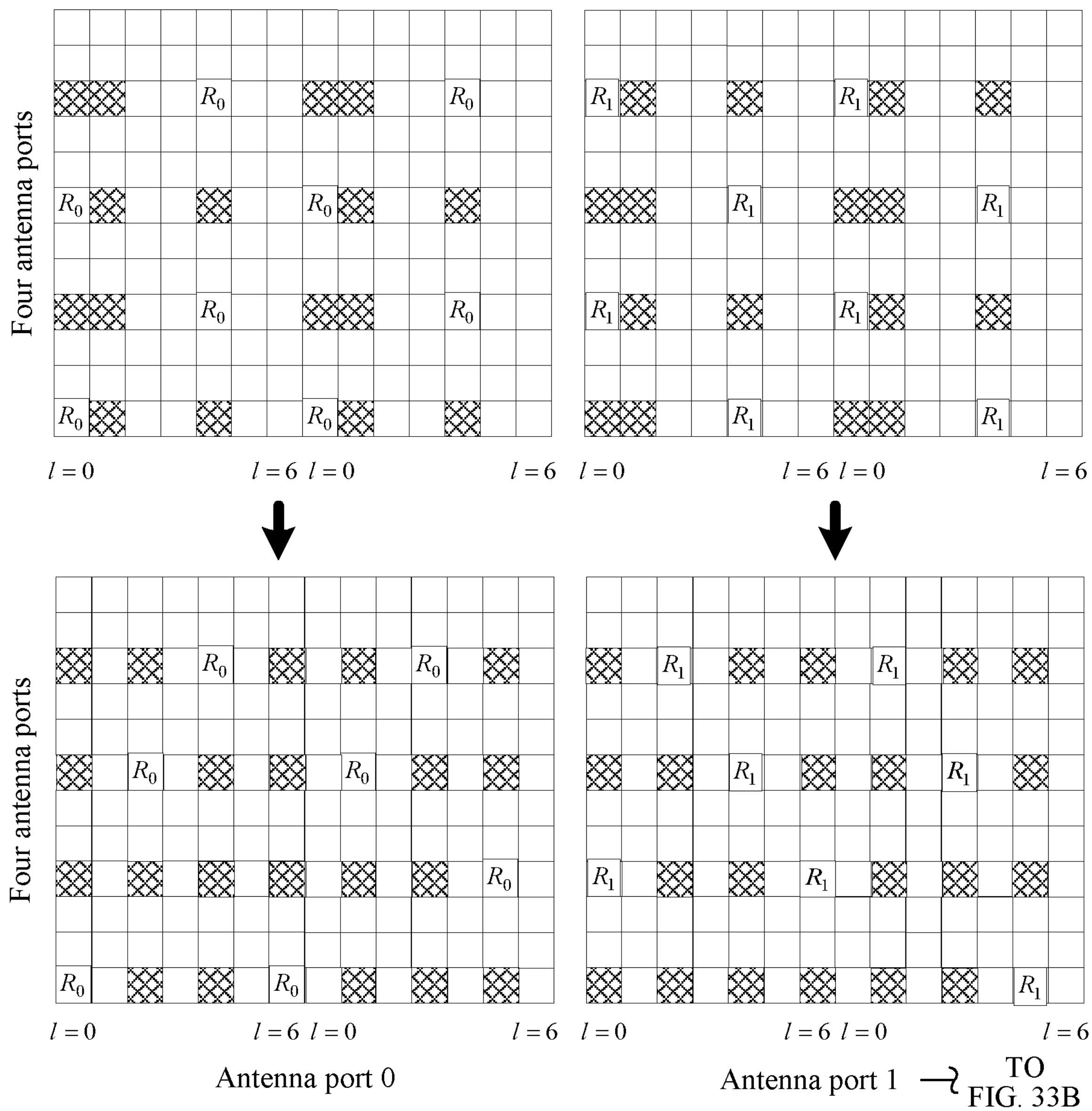
FIG. 33A and FIG. 33B are a schematic diagram of still another change of a CRS pattern in a case of an NCP when a terminal has four antenna ports in a third option in Solution 1.
Figure 33B:
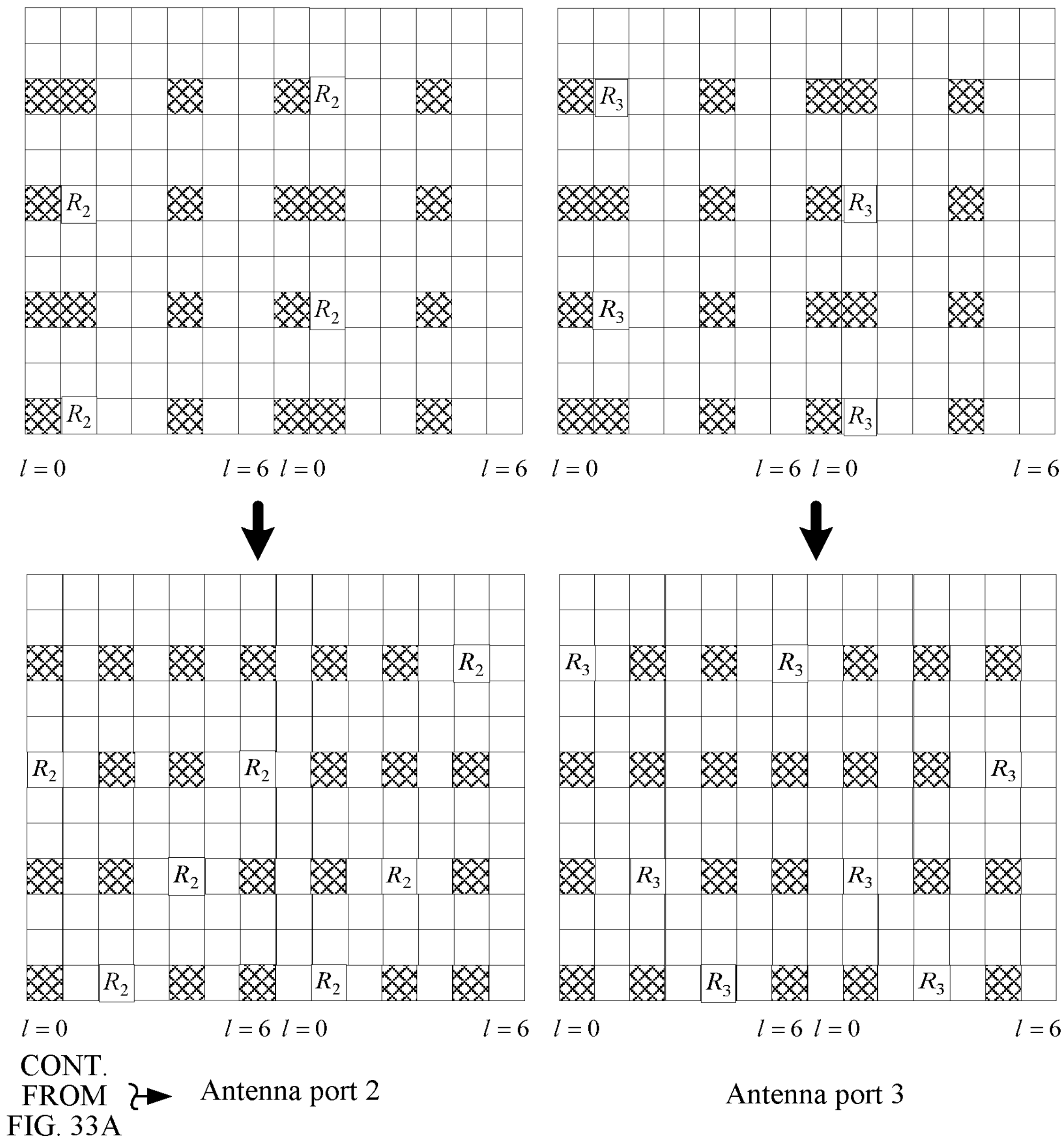

For a specific CRS pattern, refer to FIG. 33A and FIG. 33B. For a specific uPDCCH pattern, refer to FIG. 34A and FIG. 34B. A frequency diversity gain may be obtained in all options in FIG. 34A and FIG. 34B. In a case of an ECP, a uPDCCH pattern may be obtained by deleting a seventh column of a uPDCCH pattern in a case of an NCP, and a CRS pattern in a second timeslot is a repetition of a CRS pattern in a first timeslot.

For a change from an existing CRS pattern to a CRS pattern shown in this embodiment of the present disclosure, further refer to FIG. 35A and FIG. 35B to FIG. 39A and FIG. 39B.

Figure 35A:
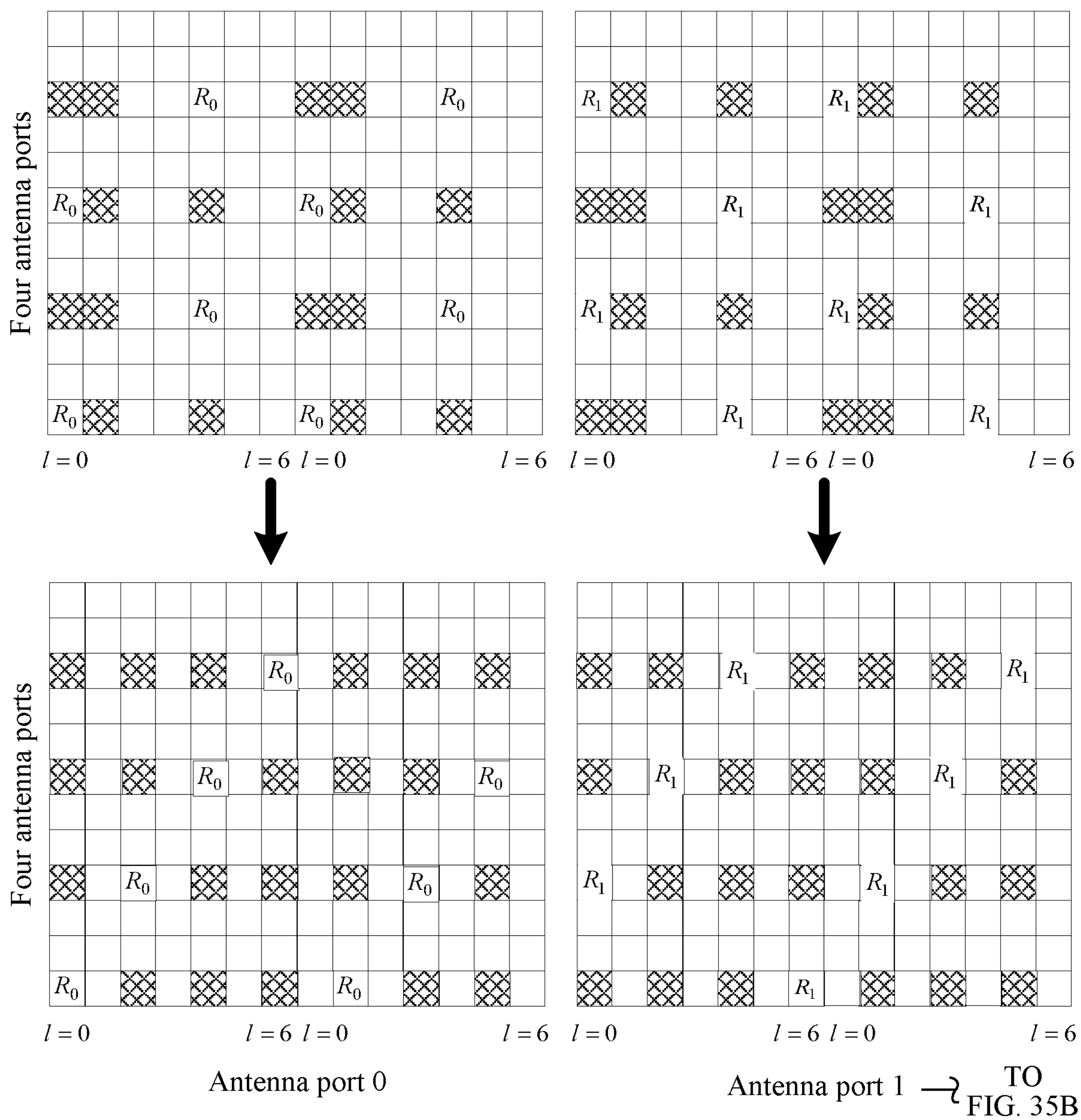
FIG. 35A and FIG. 35B are a schematic diagram of a change of a CRS pattern in a case of an NCP when a terminal has four antenna ports in a third option in Solution 1.
Figure 35B:
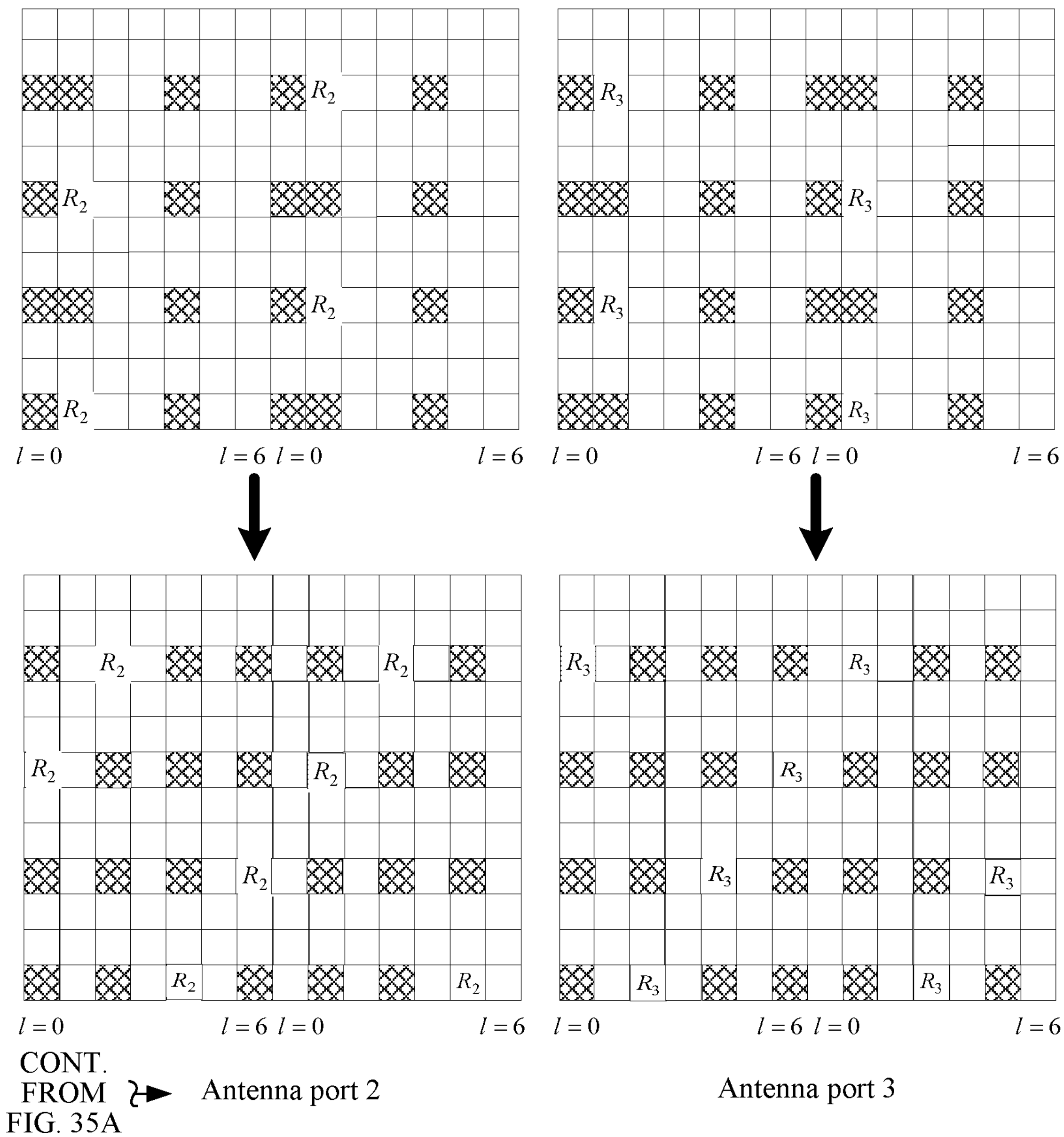

In a changed CRS pattern shown in FIG. 35A and FIG. 35B, a CRS appears in an OFDM symbol once, and appears in every other OFDM symbol. Therefore, the CRS pattern is relatively evenly designed.

Figure 36A:
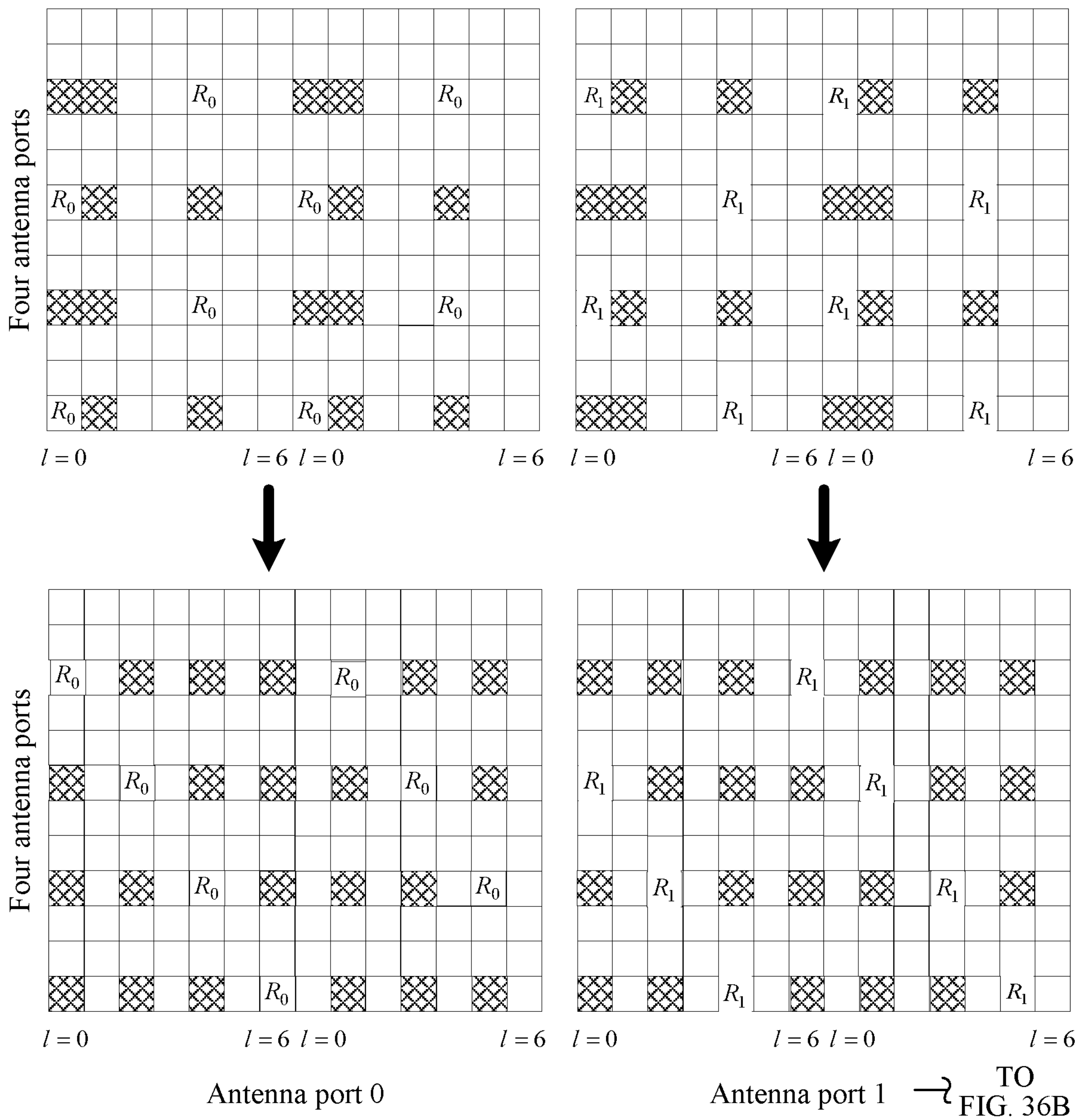
FIG. 36A and FIG. 36B are a schematic diagram of another change of a CRS pattern in a case of an NCP when a terminal has four antenna ports in a third option in Solution 1.
Figure 36B:
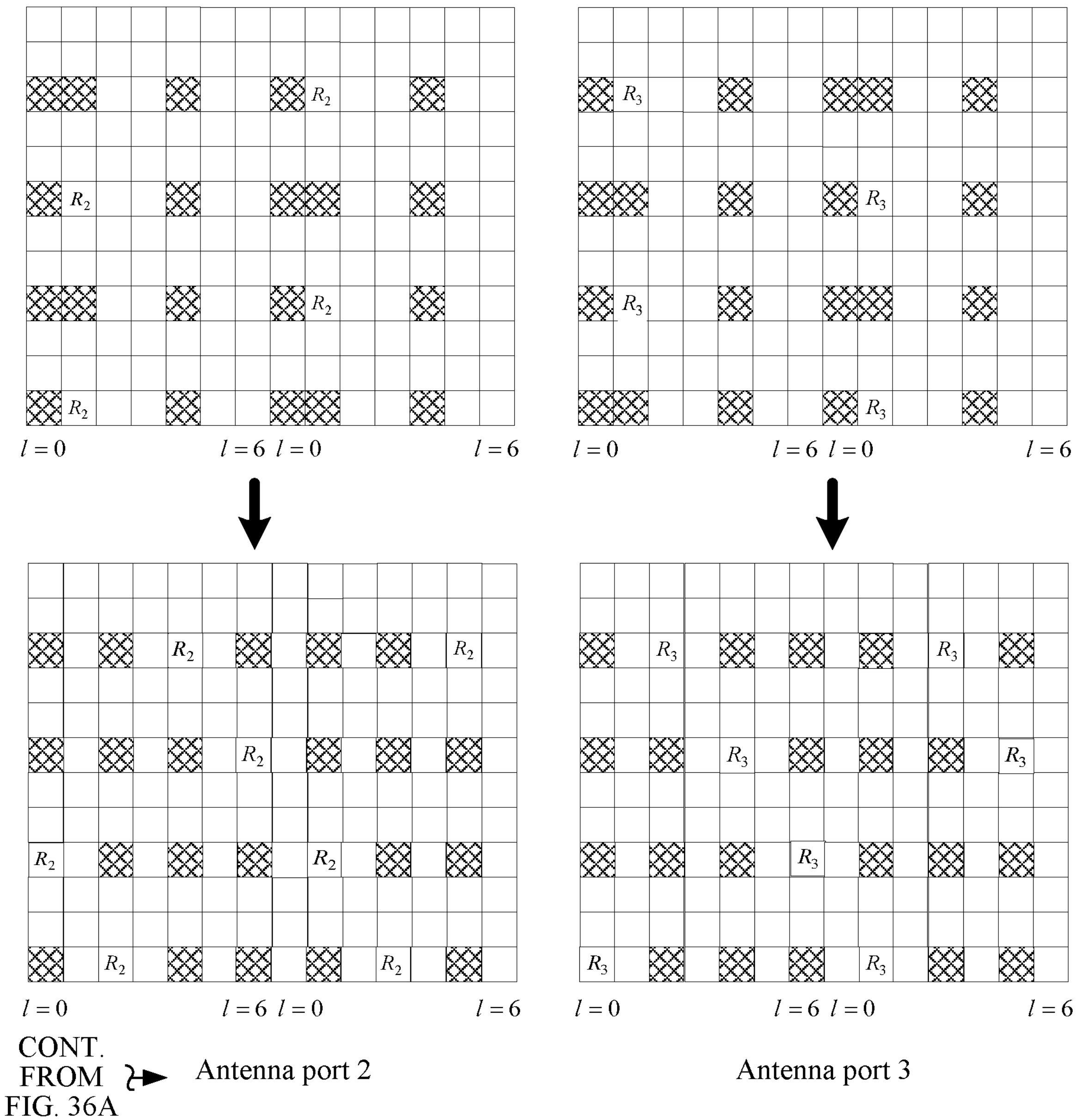

A CRS pattern shown in FIG. 36A and FIG. 36B is also relatively evenly designed, and is similar to the designed CRS pattern shown in FIG. 35A and FIG. 35B.

Figure 37A:
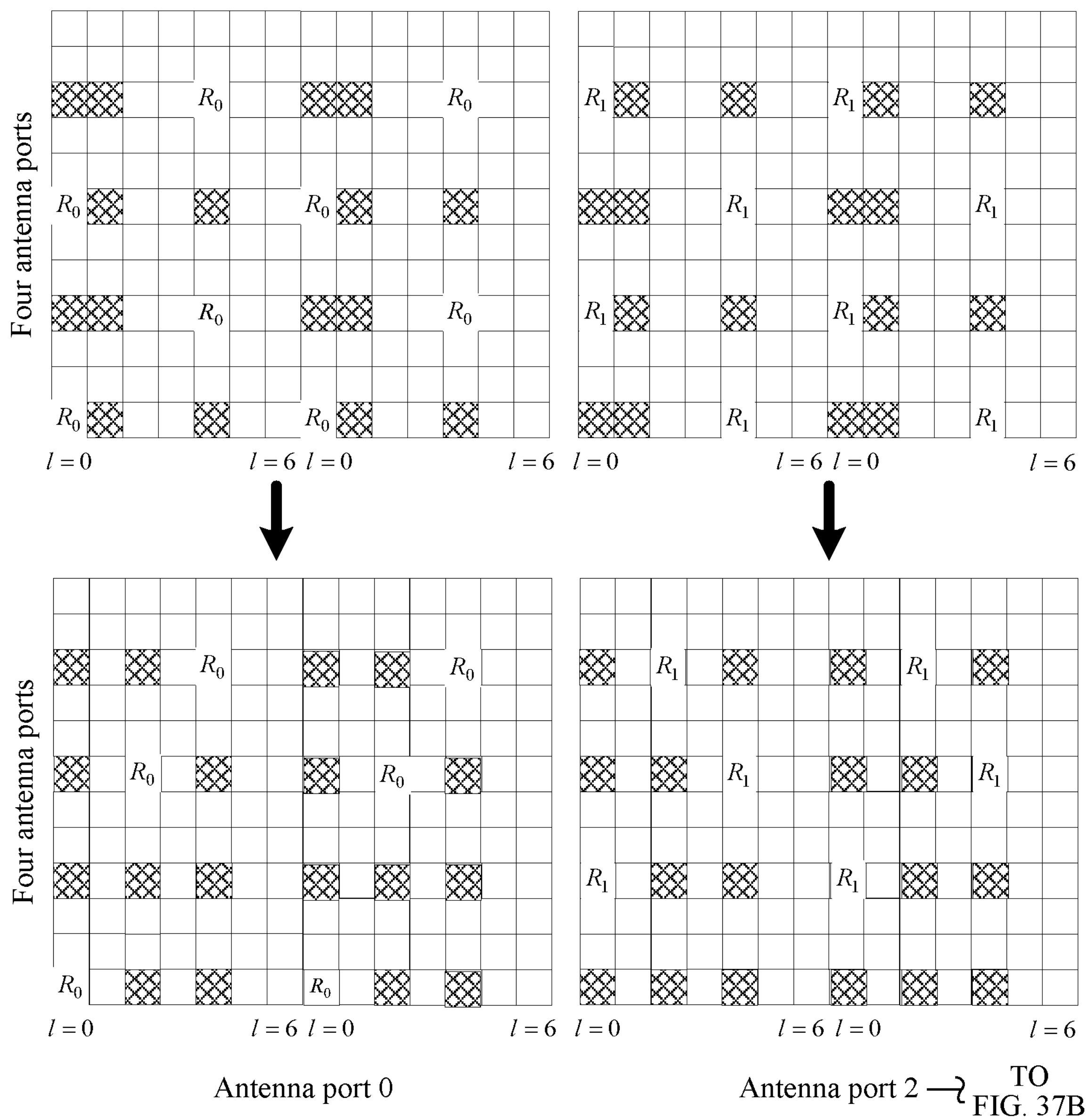
FIG. 37A and FIG. 37B are a schematic diagram of still another change of a CRS pattern in a case of an NCP when a terminal has four antenna ports in a third option in Solution 1.
Figure 37B:
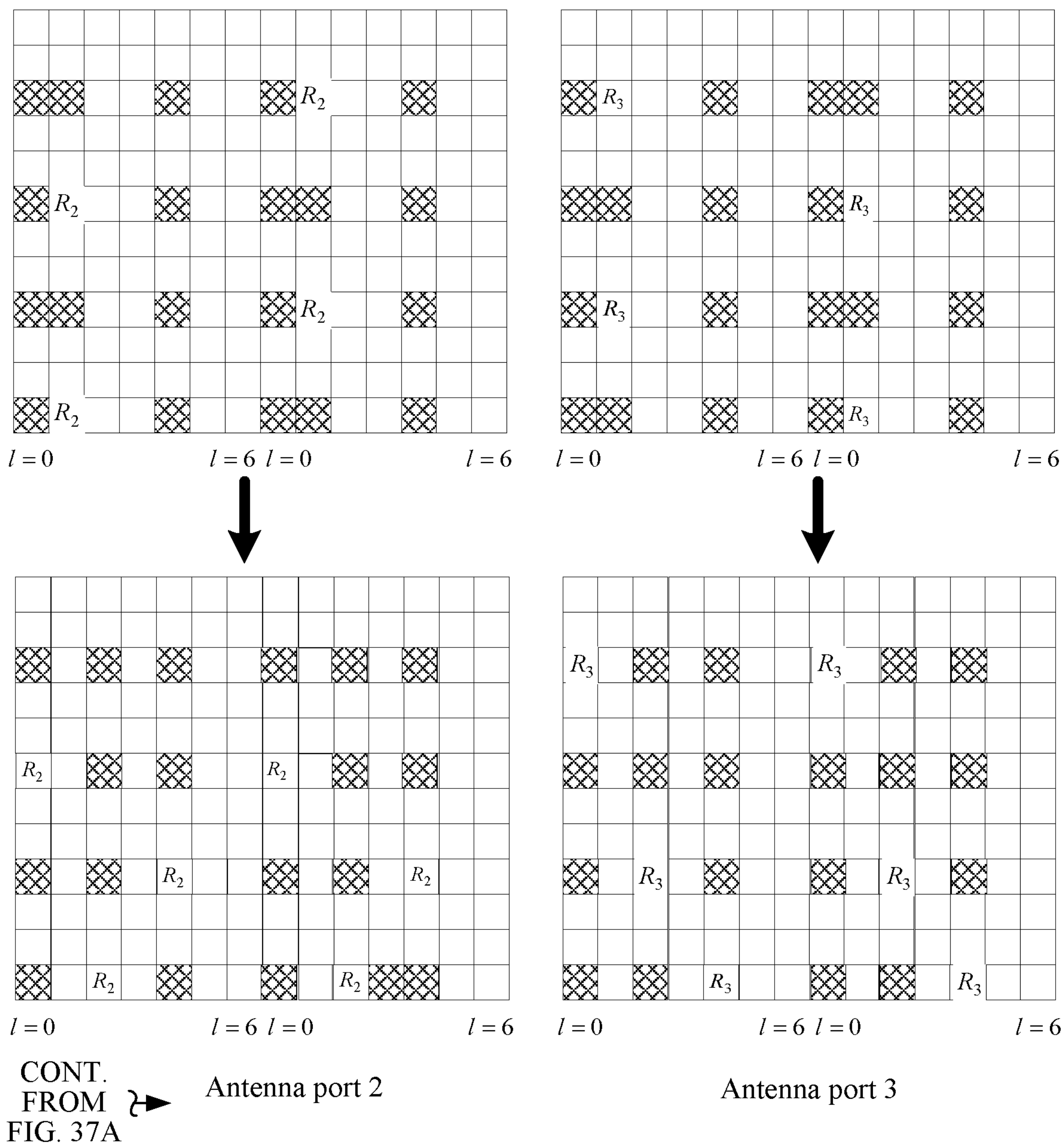
Figure 38A:
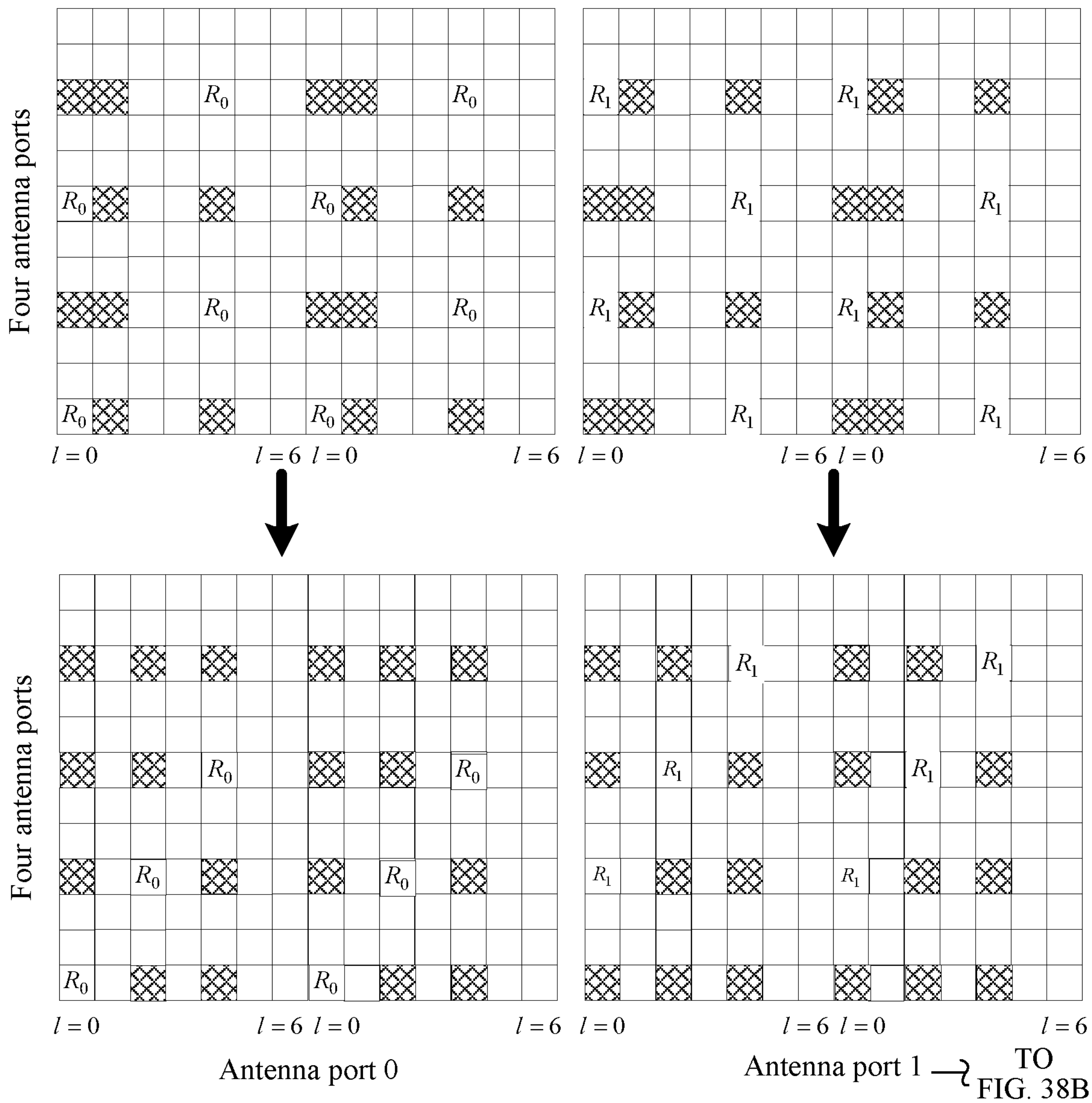
FIG. 38A and FIG. 38B are a schematic diagram of still another change of a CRS pattern in a case of an NCP when a terminal has four antenna ports in a third option in Solution 1.
Figure 38B:
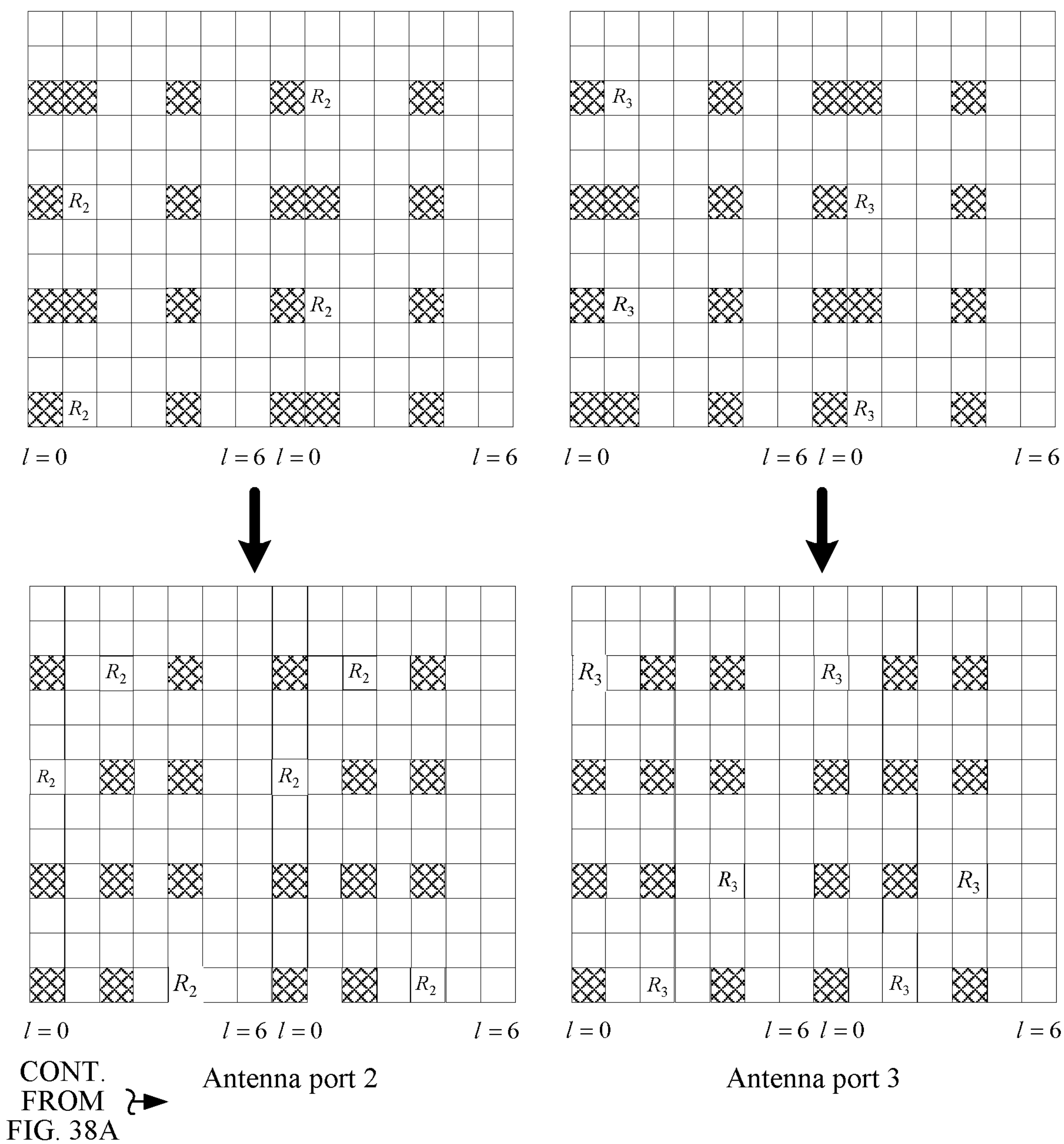
Figure 39A:
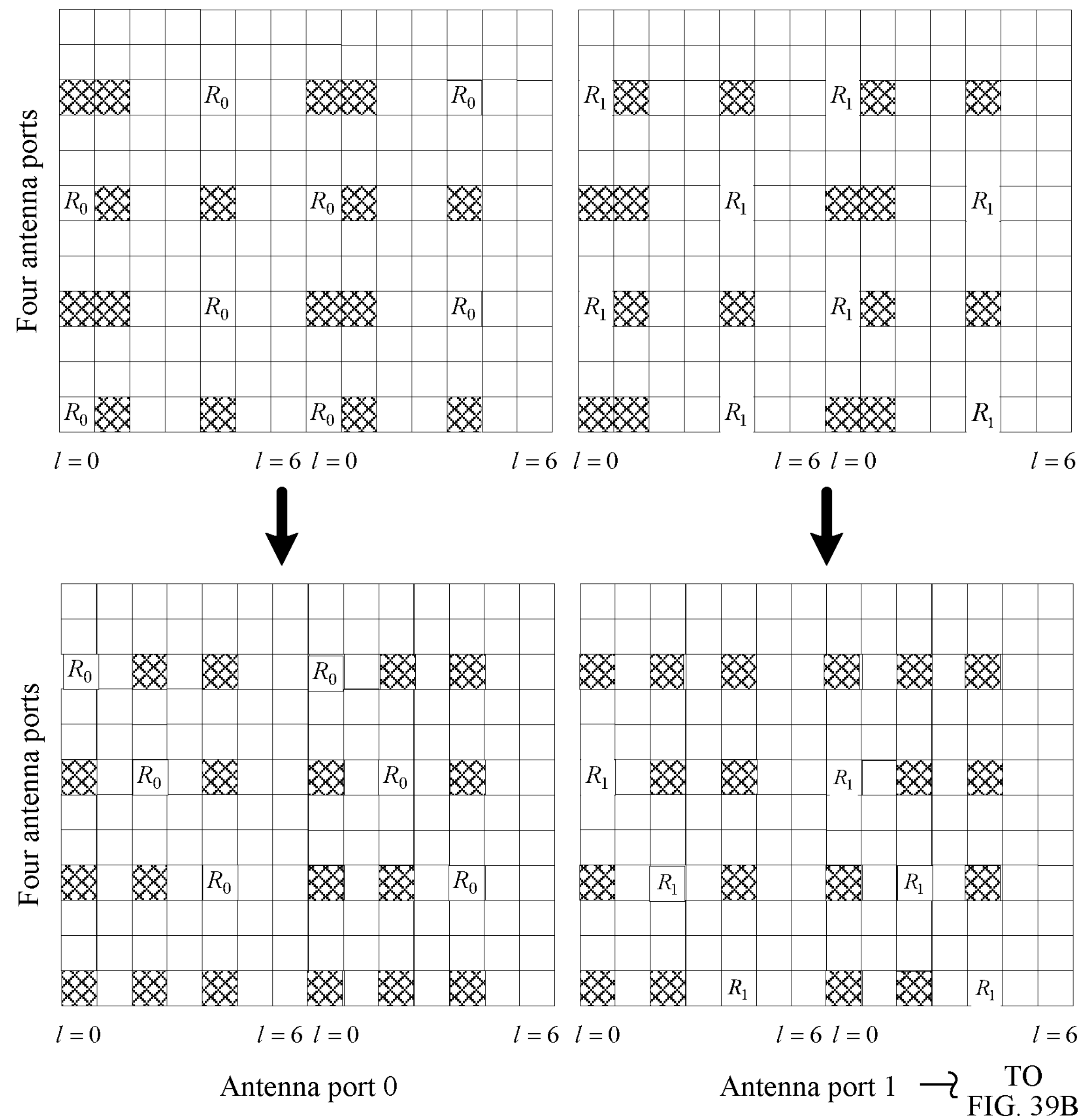
FIG. 39A and FIG. 39B are a schematic diagram of still another change of a CRS pattern in a case of an NCP when a terminal has four antenna ports in a third option in Solution 1.
Figure 39B:
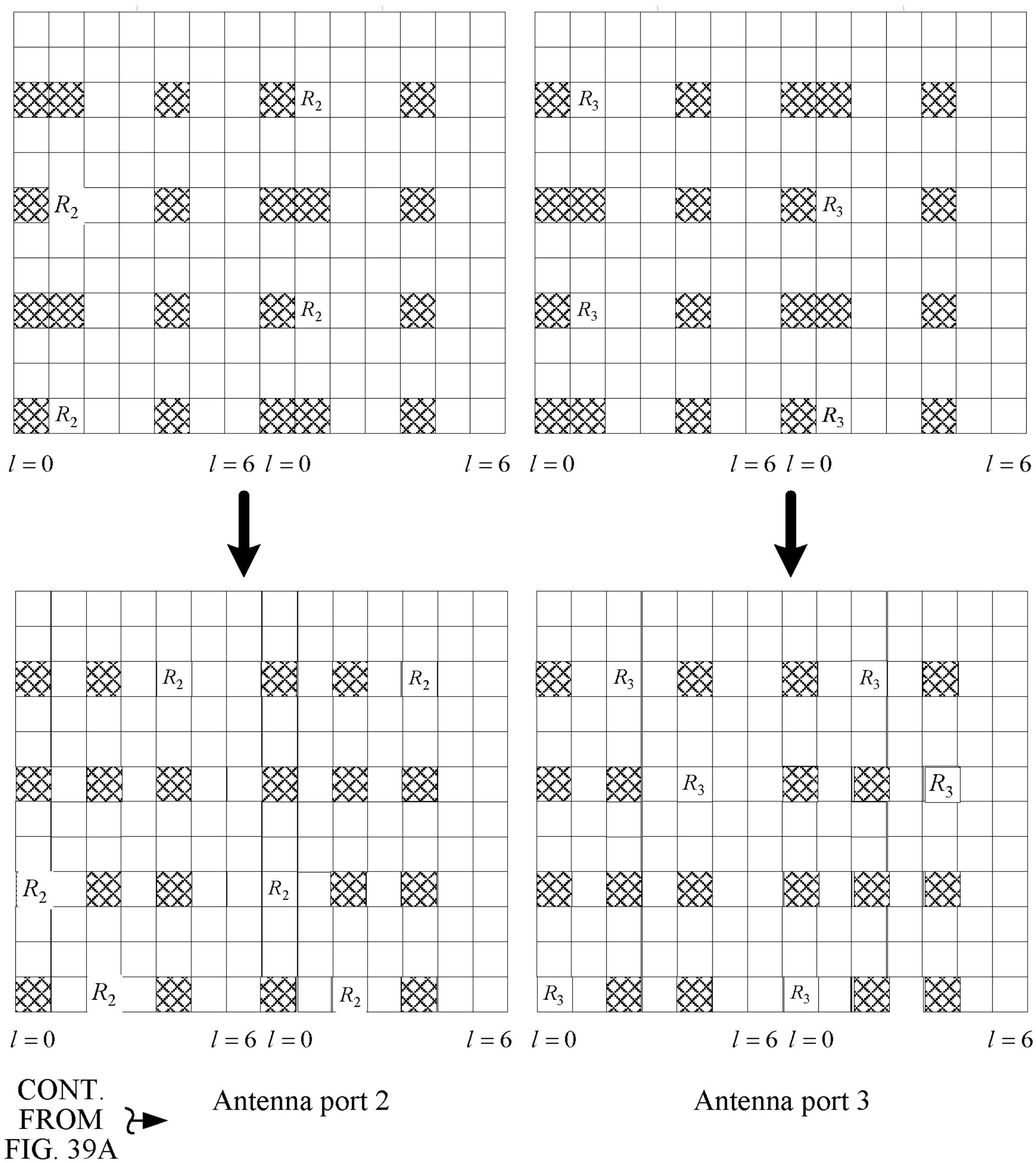

A CRS pattern shown in FIG. 37A and FIG. 37B is not even. In the pattern, not every two symbols include one symbol including a CRS. However, it may be ensured that two timeslots in a subframe are symmetric in the pattern. It cannot be ensured that two timeslots in a subframe are symmetric in the design solutions of the even CRS patterns in FIG. 35A, FIG. 35B, FIG. 36A, and FIG. 36B.

CRSs in CRS patterns shown in FIG. 38A, FIG. 38B, FIG. 39A, and FIG. 39B are also not evenly designed.

Figure 34A:
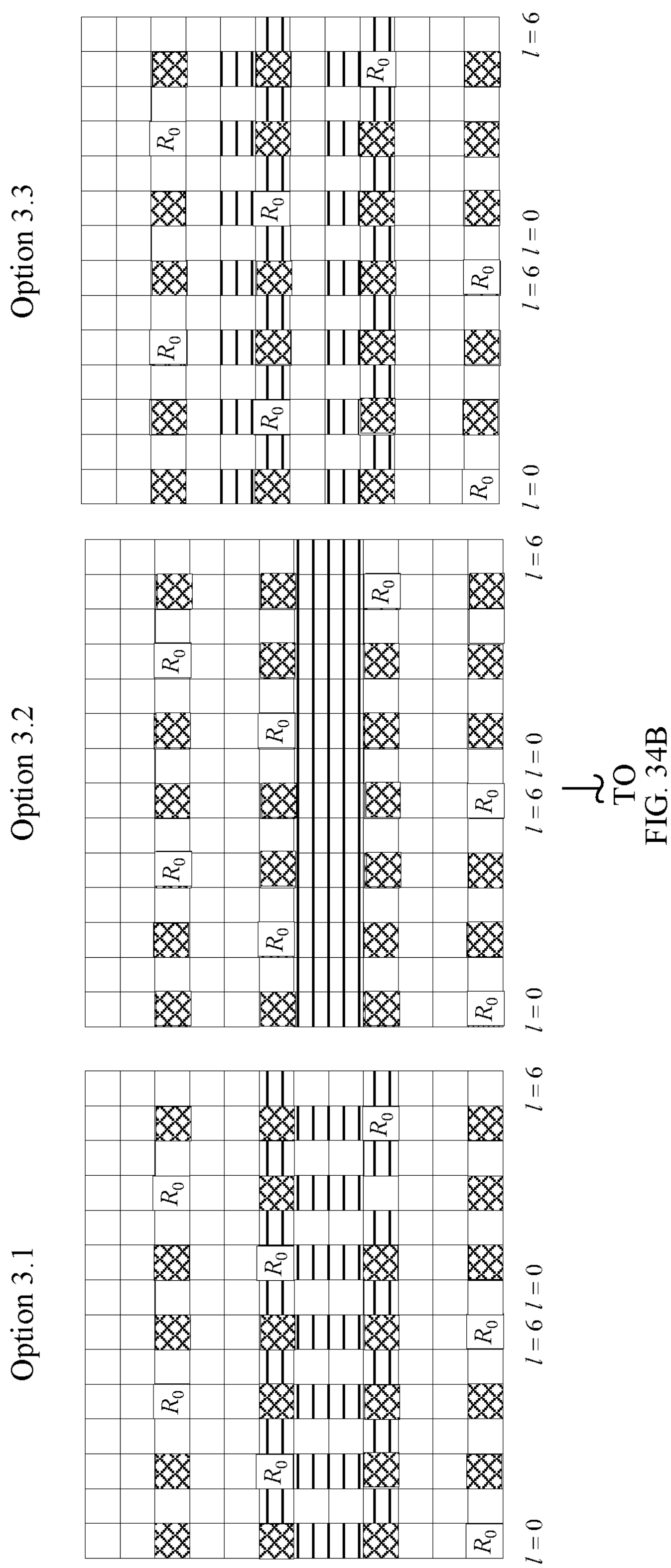
FIG. 34A and FIG. 34B are CRS and uPDCCH patterns in a case of an NCP when a terminal has four antenna ports in a third option in Solution 1.
Figure 34B:
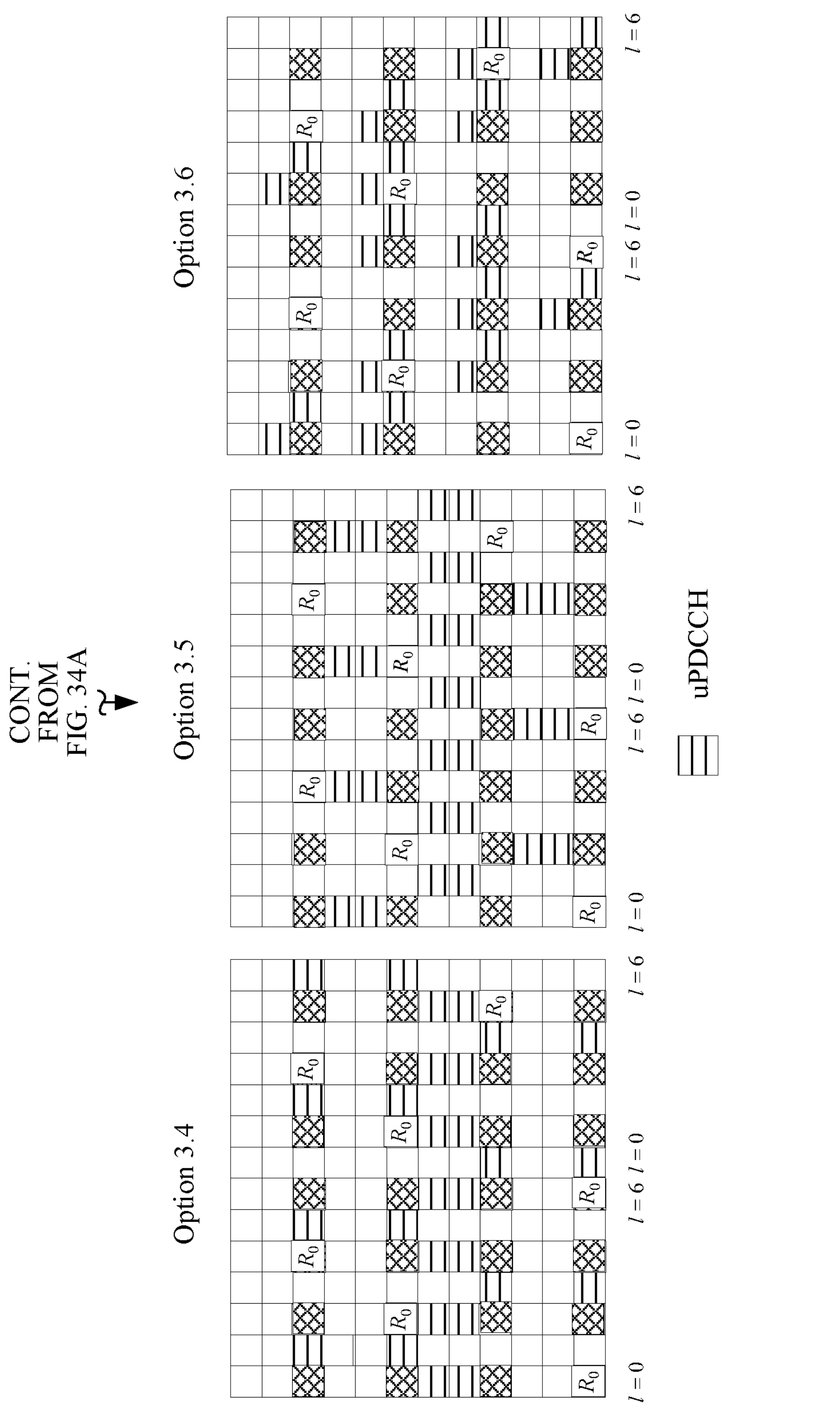

For a uPDCCH pattern designed based on the foregoing CRS pattern, refer to the uPDCCH pattern in FIG. 34A and FIG. 34B. Details are not described herein again.

The following analyzes a CRS pattern and a uPDCCH pattern obtained when one OFDM symbol is used as a transmission unit, Option 4 is used, and there is one antenna port, two antenna ports, or four antenna ports.

Figure 40:
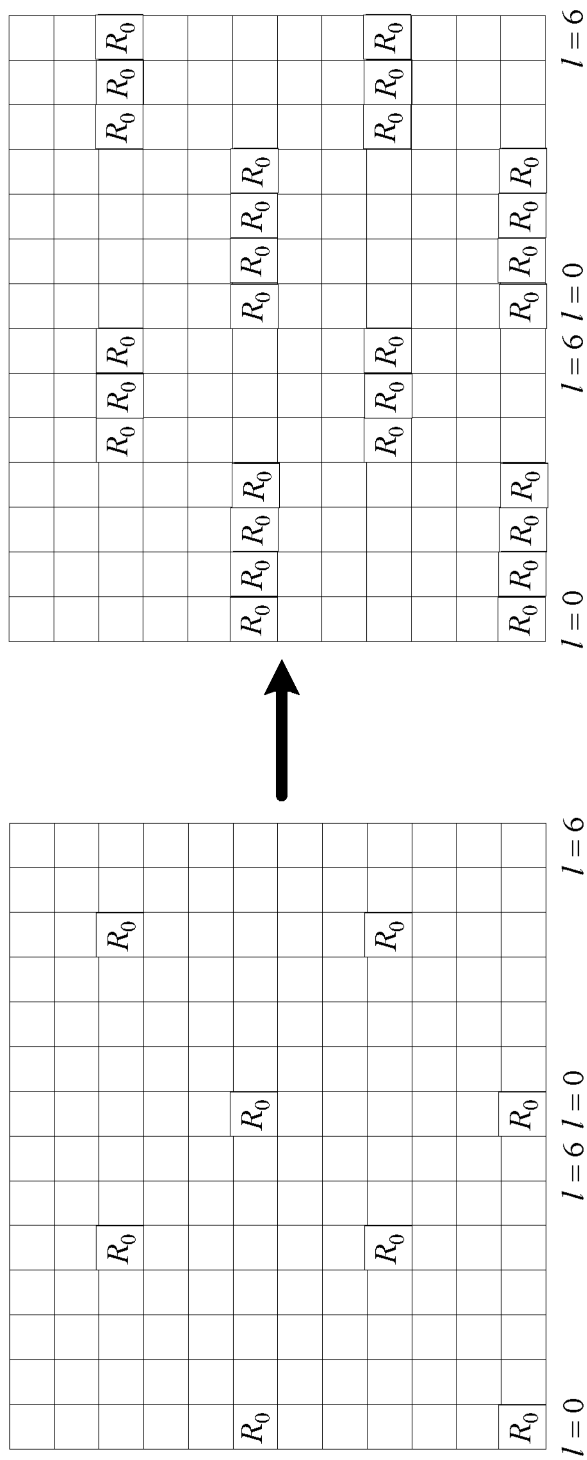
FIG. 40 is a schematic diagram of a change of a CRS pattern in a case of an NCP when a terminal has one antenna port in a fourth option in Solution 1.
Figure 41A:
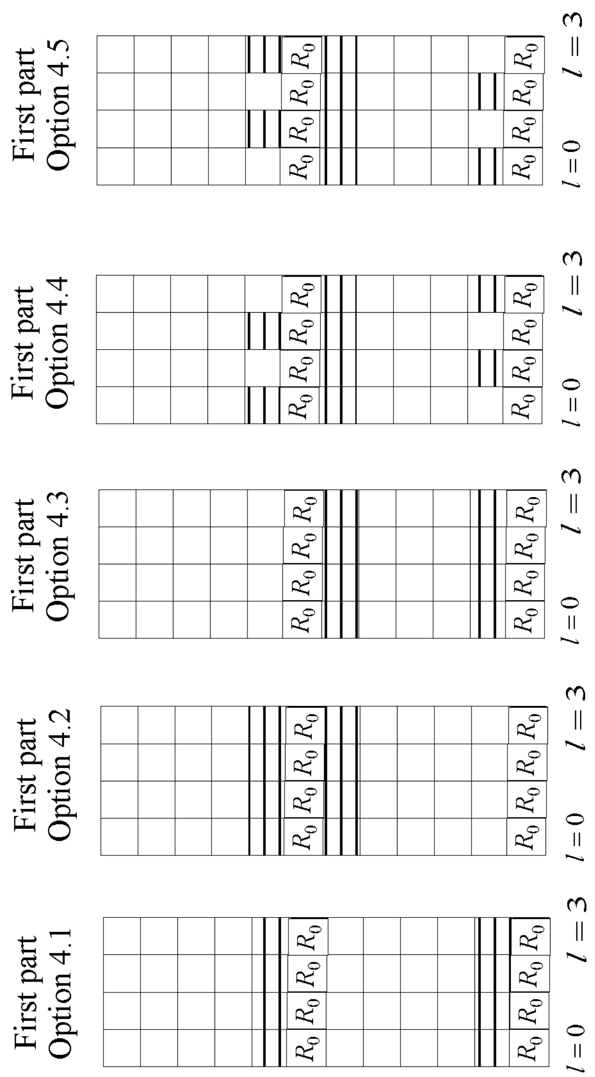
FIG. 41A and FIG. 41B are CRS and uPDCCH patterns in a timeslot in a case of an NCP when a terminal has one antenna port in a fourth option in Solution 1.
Figure 41B:
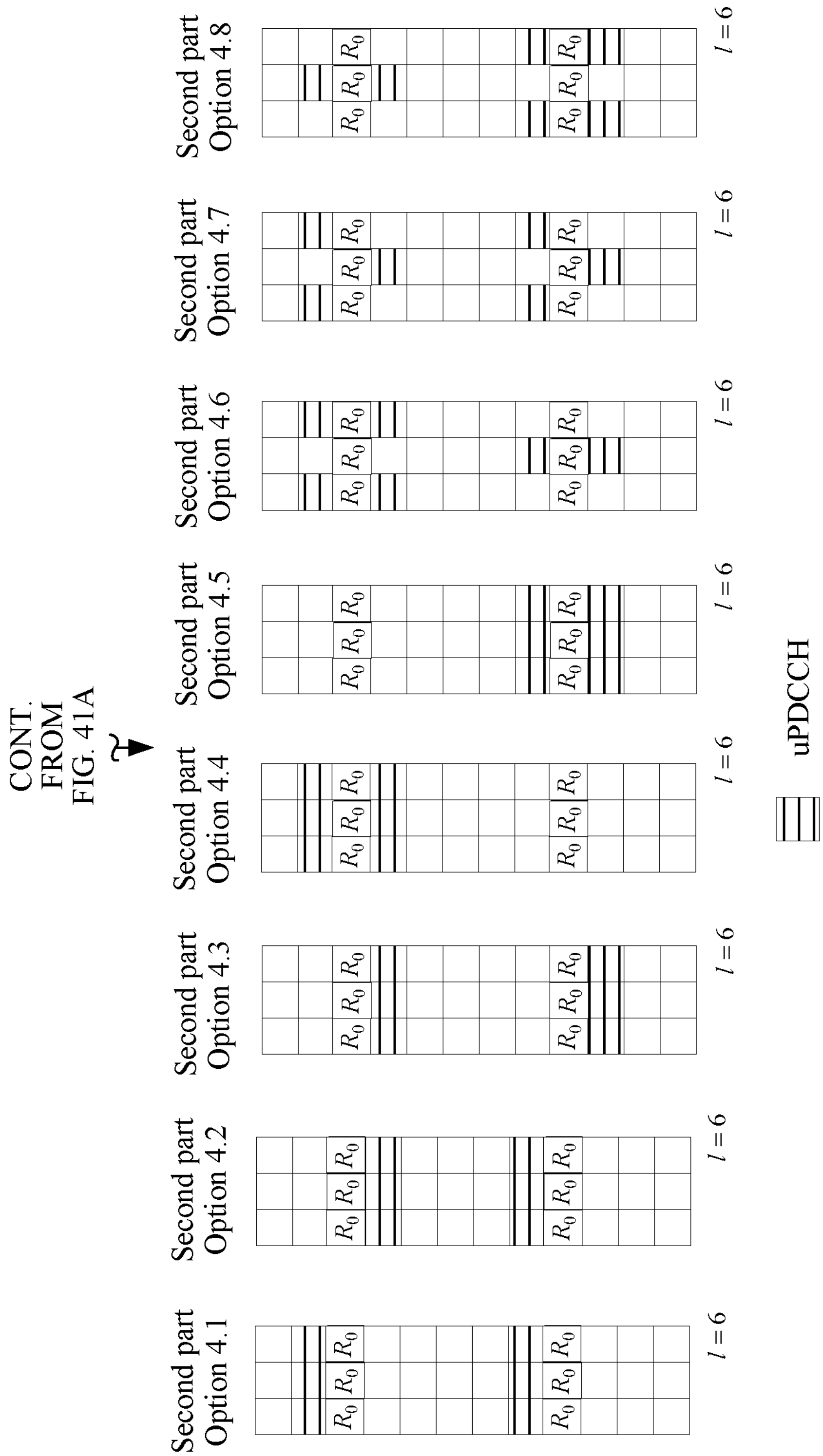

1. One antenna port: For a specific design diagram of a CRS pattern, refer to FIG. 40. Certainly, there may also be another CRS pattern. For a specific uPDCCH pattern, refer to FIG. 41A and FIG. 41B. A first part and a second part may be freely combined, and a first timeslot and a second timeslot are symmetric. A frequency diversity gain may be obtained in all options in FIG. 41A and FIG. 41B. In a case of an ECP, a uPDCCH pattern may be obtained by deleting a fourth column of a uPDCCH pattern in a case of an NCP.

Figure 42:
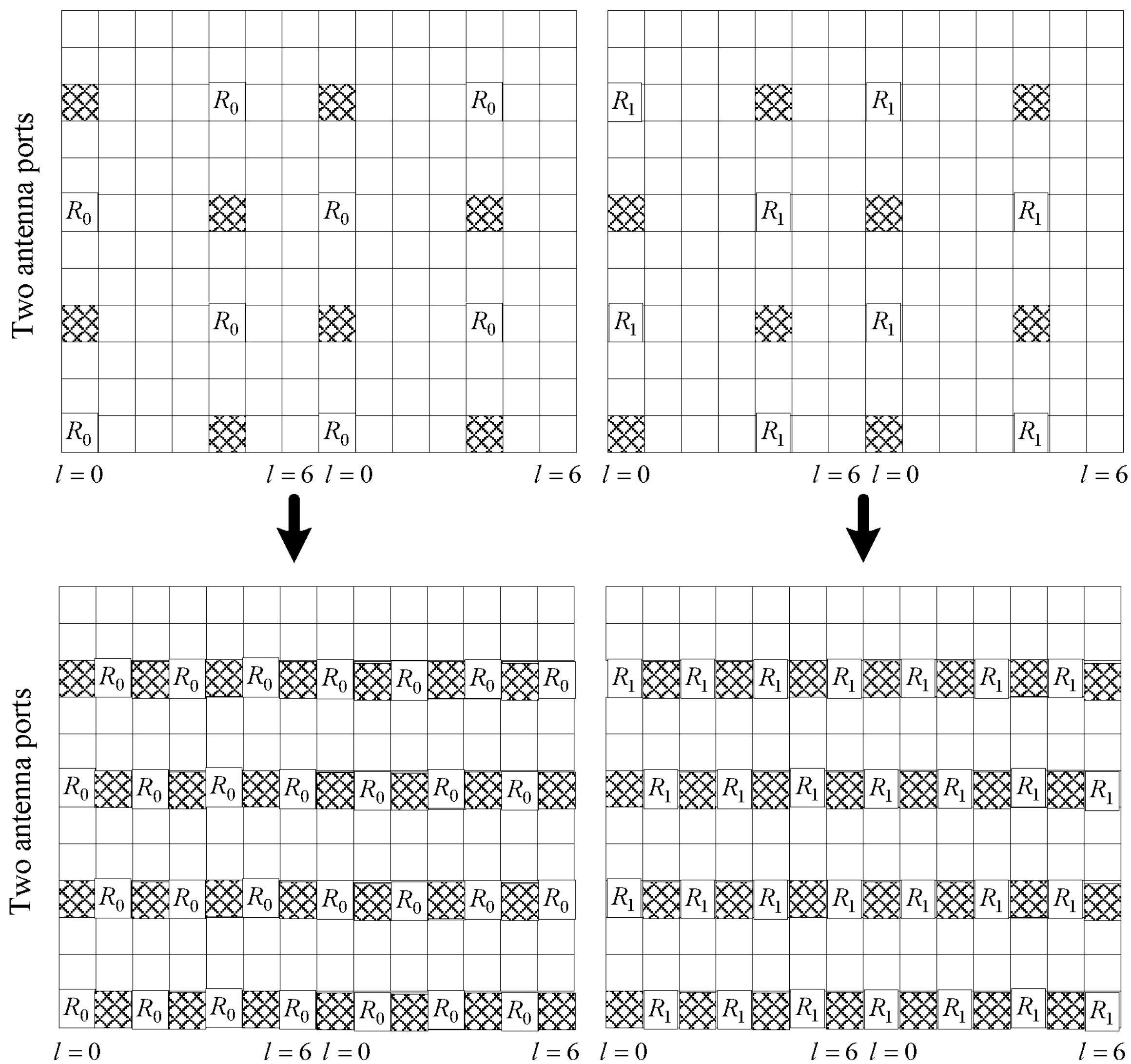
FIG. 42 is a schematic diagram of a change of a CRS pattern in a case of an NCP when a terminal has two antenna ports in a fourth option in Solution 1.
Figure 43A:
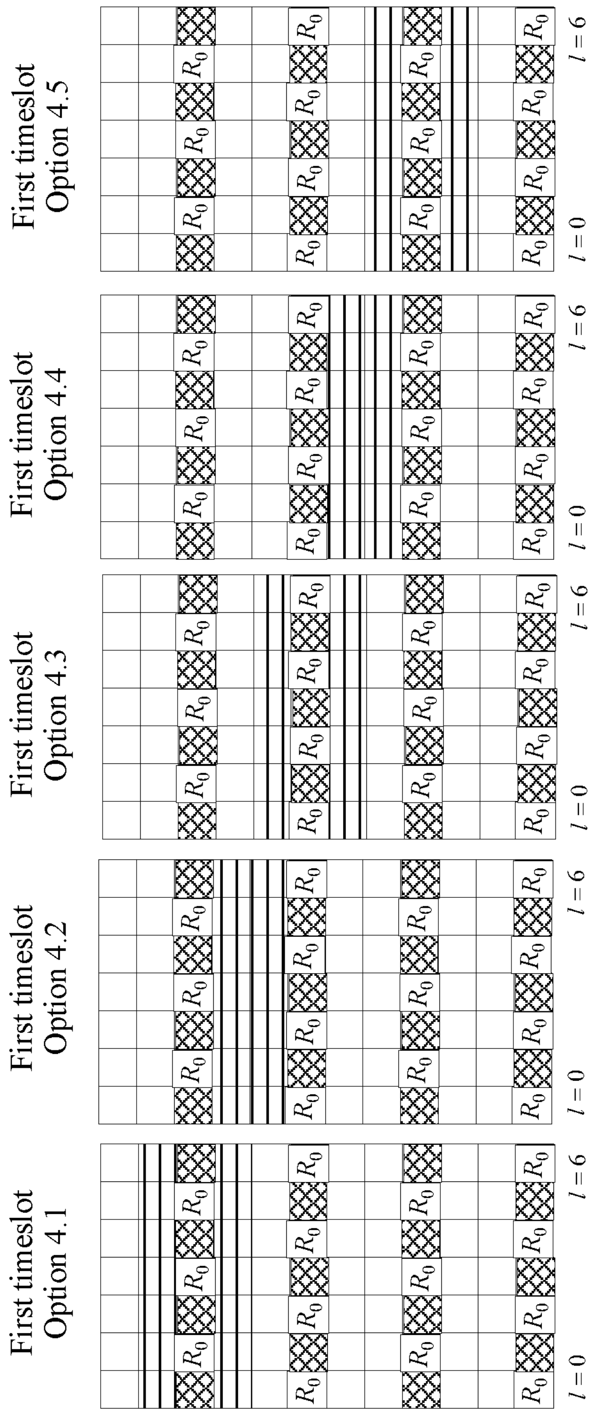
FIG. 43A and FIG. 43B are CRS and uPDCCH patterns in a case of an NCP when a terminal has two antenna ports in a fourth option in Solution 1.
Figure 43B:
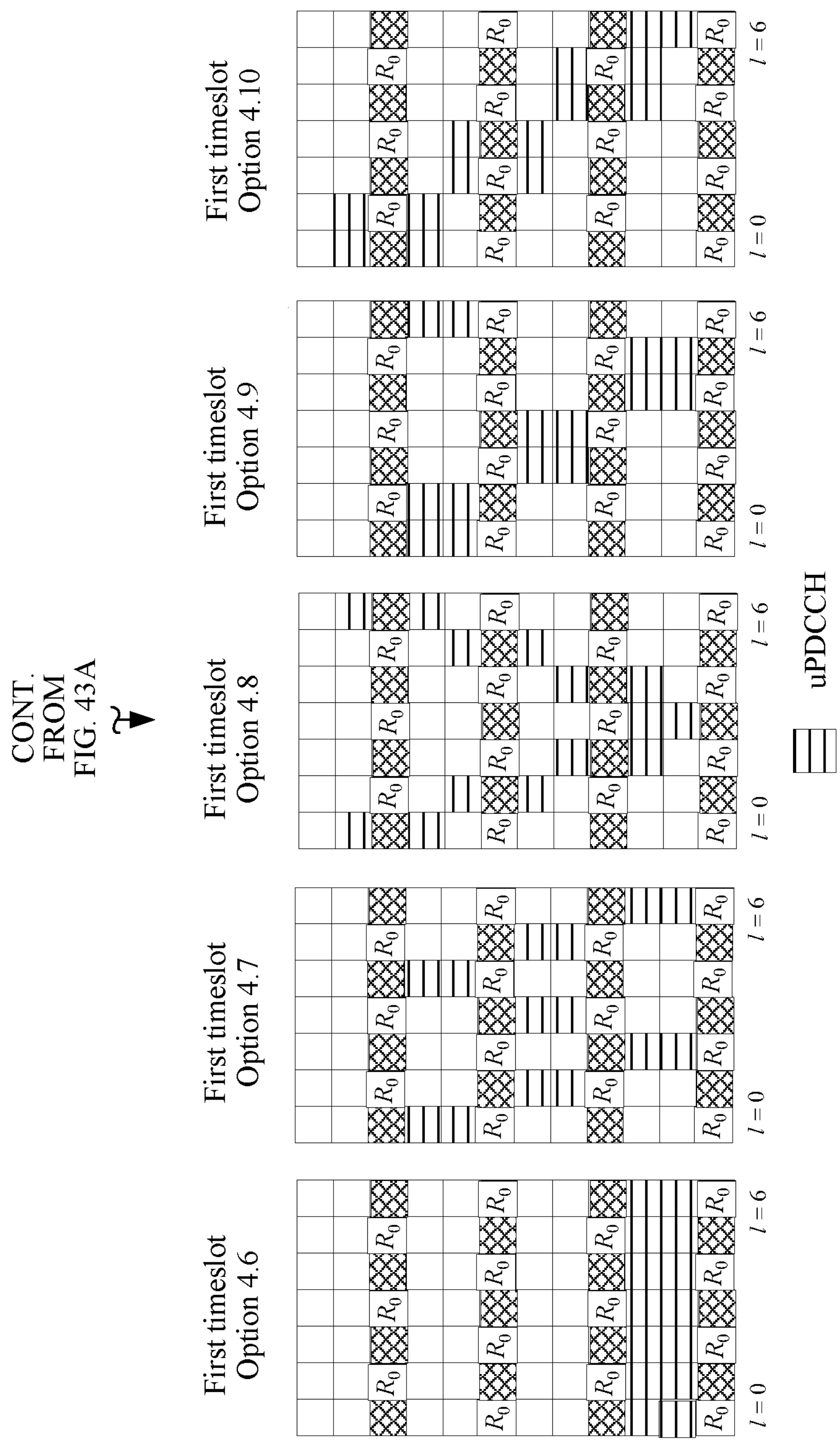

2. Two antenna ports: For a specific CRS pattern, refer to FIG. 42. For a specific uPDCCH pattern, refer to FIG. 43A and FIG. 43B. A first timeslot and a second timeslot are symmetric. A frequency diversity gain may be obtained in all options in FIG. 43A and FIG. 43B. In a case of an ECP, a uPDCCH pattern may be obtained by deleting a fourth column of a uPDCCH pattern in a case of an NCP.

Figure 44A:
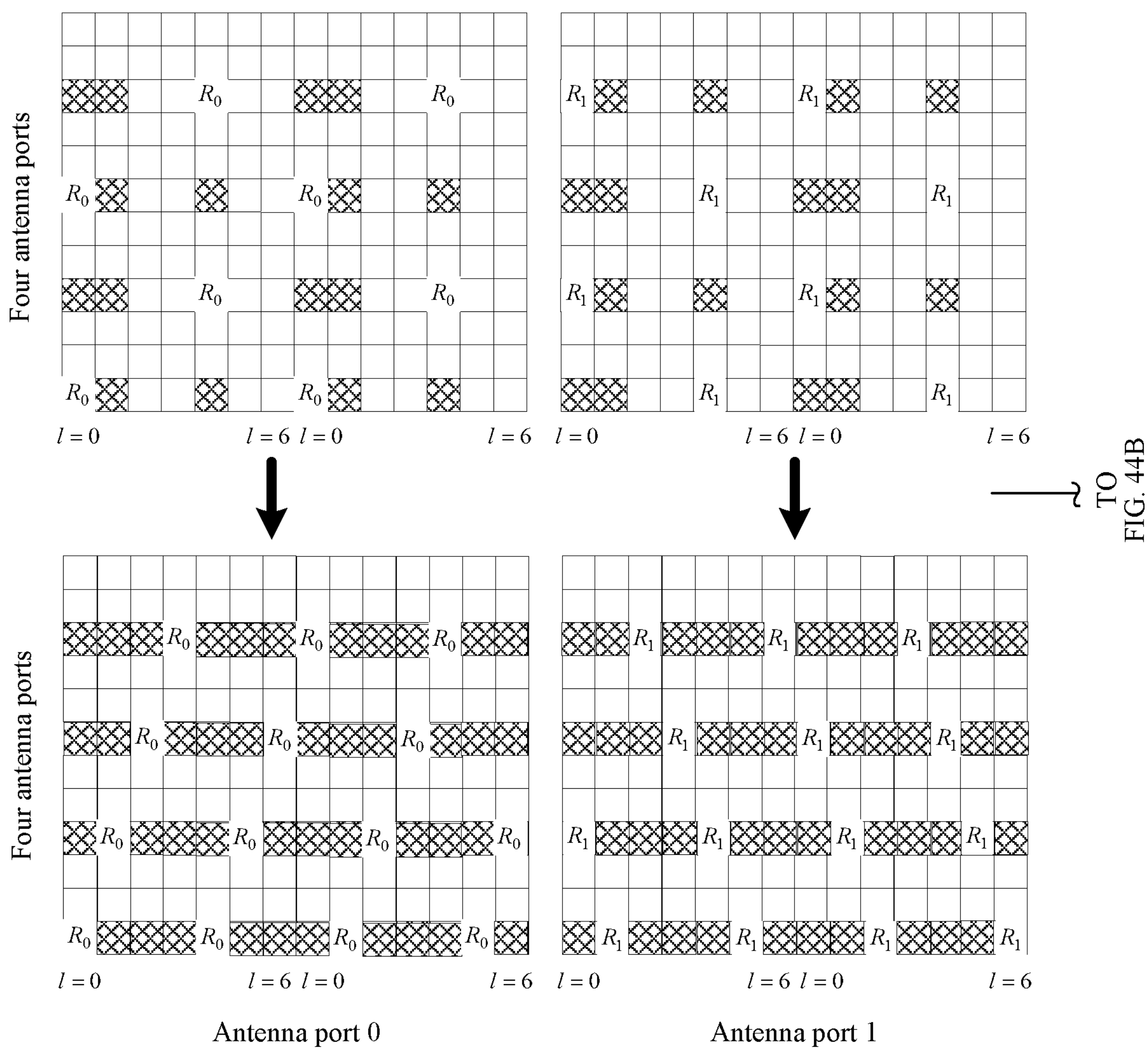
FIG. 44A and FIG. 44B are a schematic diagram of a change of a CRS pattern in a case of an NCP when a terminal has four antenna ports in a fourth option in Solution 1.
Figure 44B:
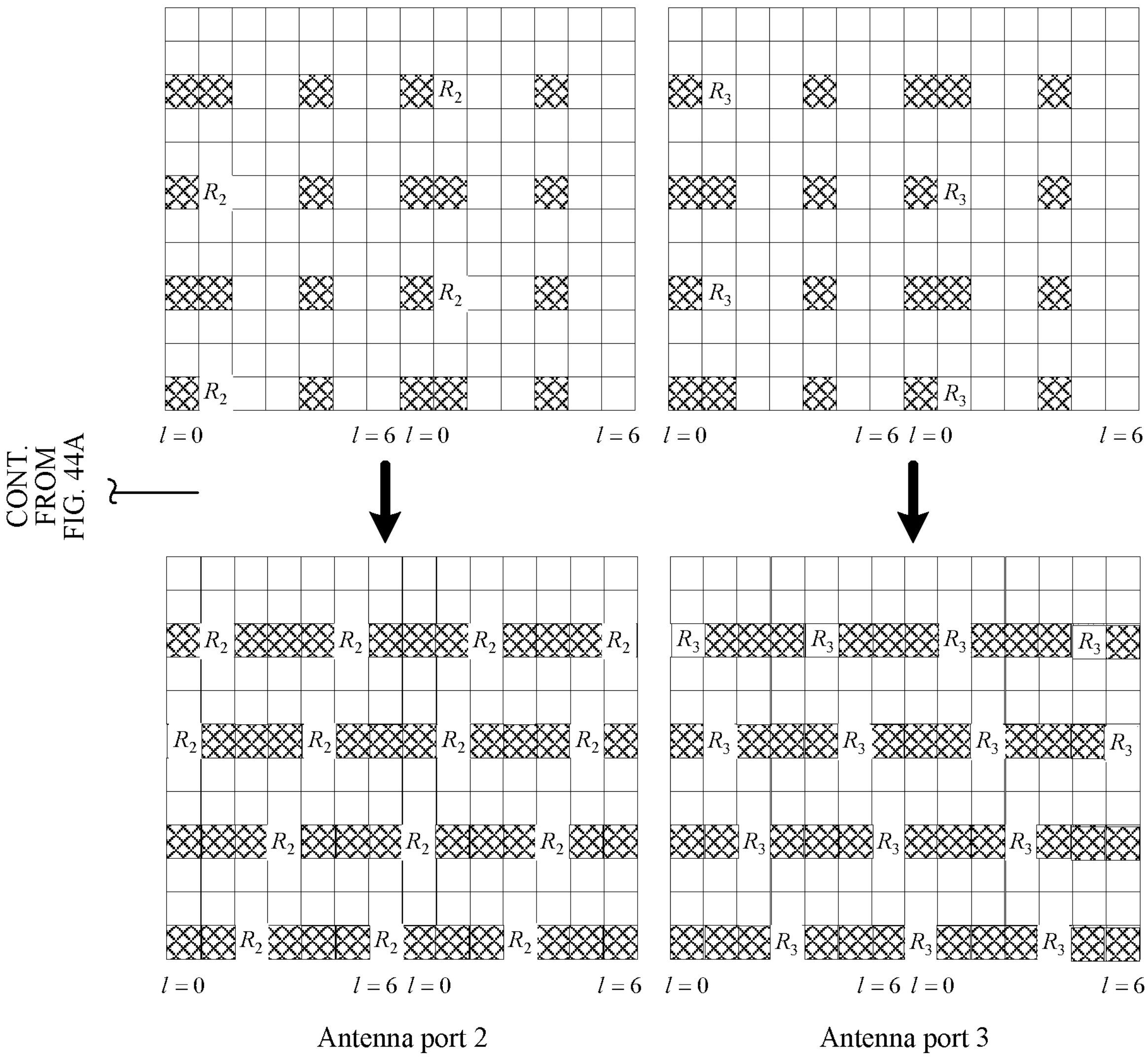
Figure 45A:
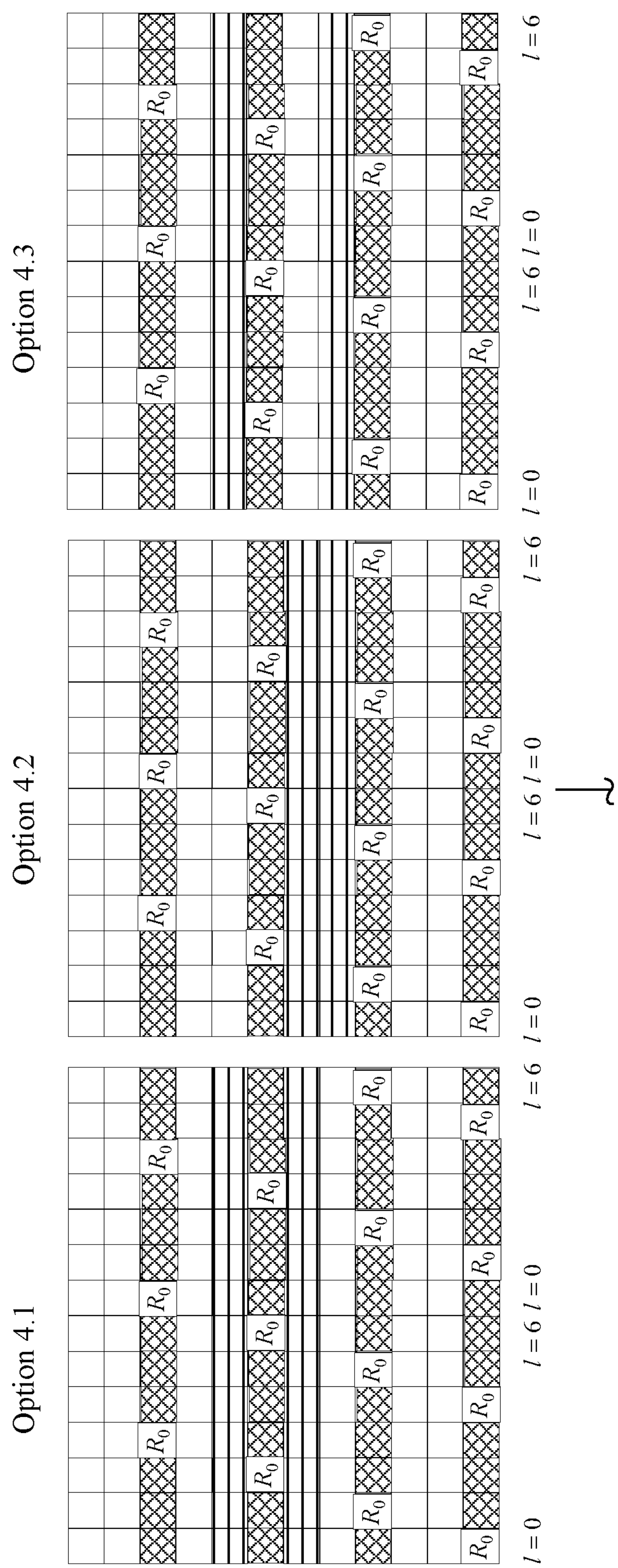
FIG. 45A and FIG. 45B are CRS and uPDCCH patterns in a case of an NCP when a terminal has four antenna ports in a fourth option in Solution 1.
Figure 45B:
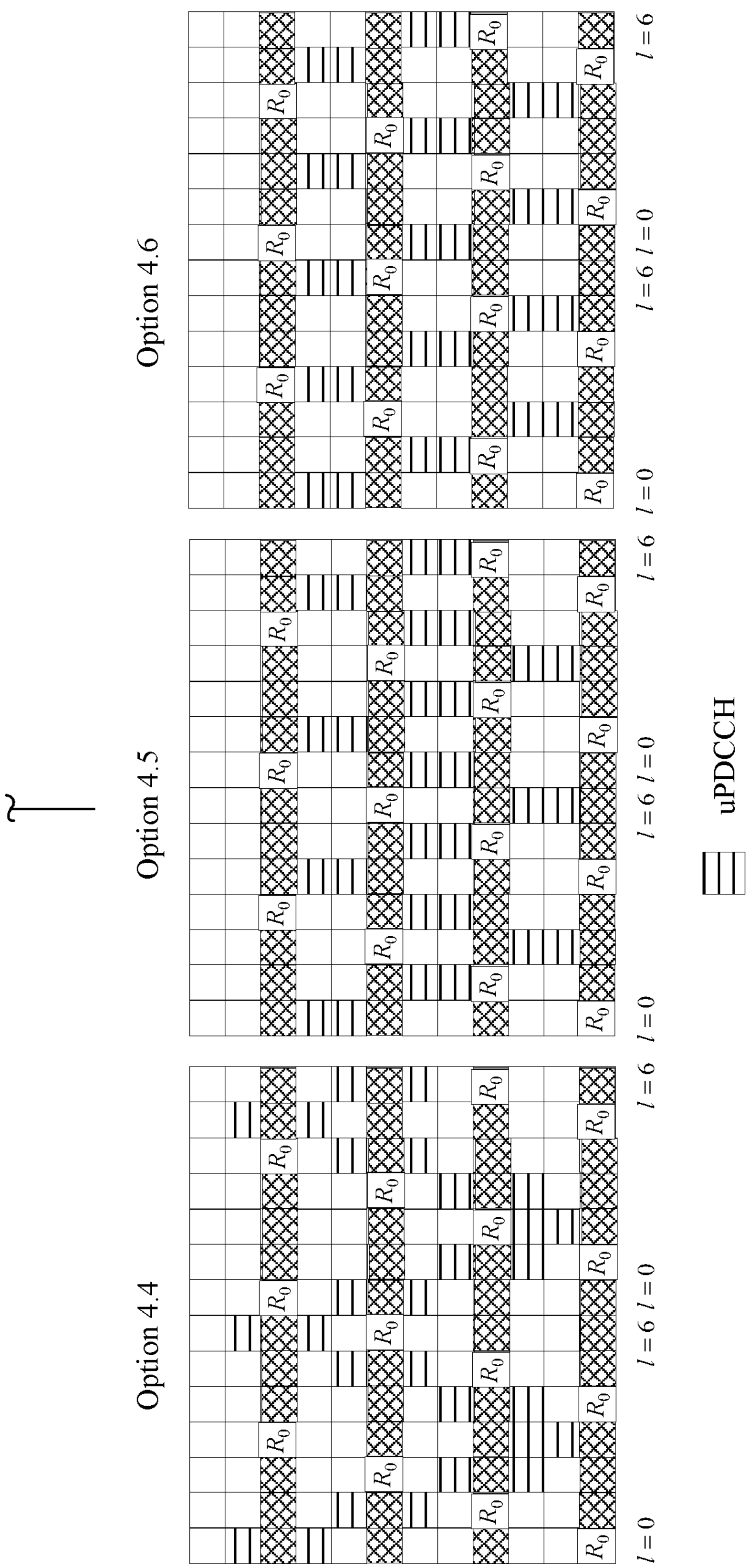

3. Four antenna ports: For a specific CRS pattern, refer to FIG. 44A and FIG. 44B. For a specific uPDCCH pattern, refer to FIG. 45A and FIG. 45B. A frequency diversity gain may be obtained in all options in FIG. 45A and FIG. 45B. In a case of an ECP, a uPDCCH pattern may be obtained by deleting a fourth column of a uPDCCH pattern in a case of an NCP.

Figure 46:
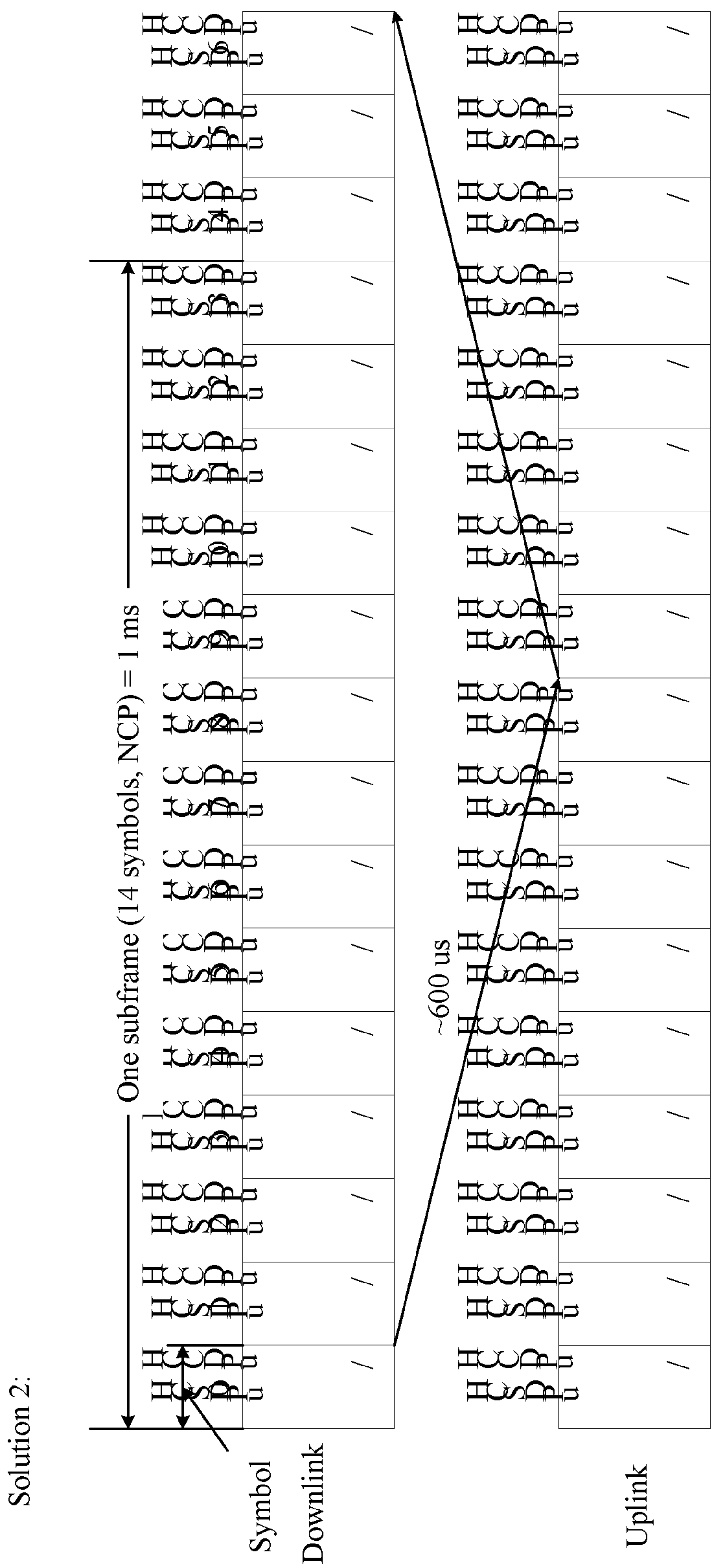
FIG. 46 is a schematic diagram of data transmission that two OFDM symbols are transmitted using an LTE technology according to an embodiment of the present disclosure.

As shown in FIG. 46, for a case of an NCP, duration of an OFDM symbol is approximately 70 μs. Therefore, if two OFDM symbols are used as a time transmission unit, a requirement that an end-to-end latency is less than 1 ms can also be met. For example, as shown in FIG. 46, two OFDM symbols are a time transmission unit, and a HARQ transmission RTT is 70×2×4=560 μs, which is approximately 600 μs. Therefore, in a solution of the present disclosure, resources occupied by a corresponding control channel and data channel are designed based on the time transmission unit (two OFDM symbols). There are also four design options. A specific design criterion of the options is the same as the foregoing design in which one OFDM symbol is used as a time transmission unit, and details are not described herein again. A uPDCCH occupies two or four REs in each PRB of every two OFDM symbols.

The following analyzes a CRS pattern and a uPDCCH pattern obtained when two OFDM symbols are used as a transmission unit, Option 1 is used, and there is one antenna port, two antenna ports, or four antenna ports.

1. One Antenna Port

Figure 47A:
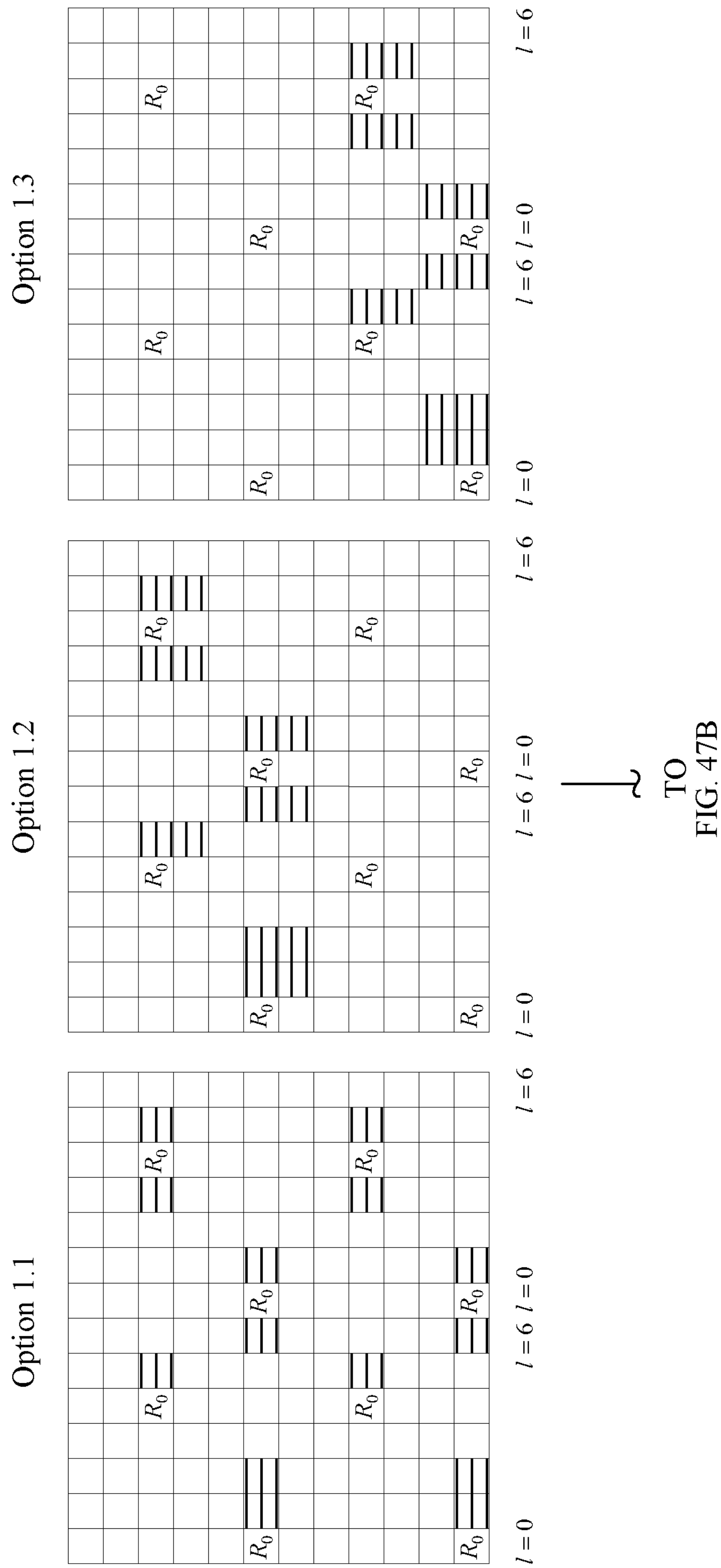
FIG. 47A and FIG. 47B are CRS and uPDCCH patterns in a case of an NCP when a terminal has one antenna port in a first option in Solution 2.
Figure 47B:
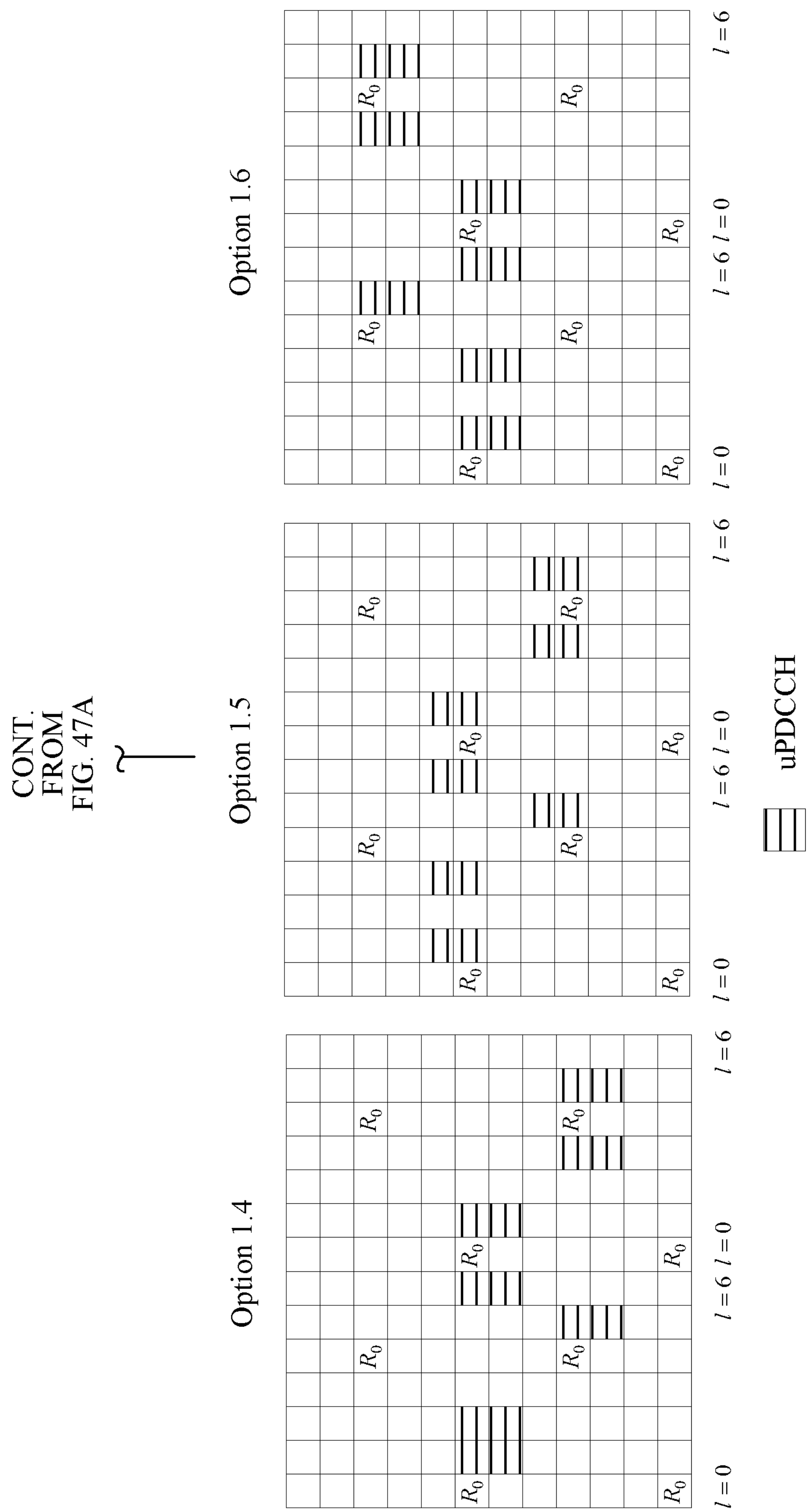

For a specific uPDCCH pattern, refer to FIG. 47A and FIG. 47B. A frequency diversity gain may be obtained in all options in FIG. 47A and FIG. 47B. In a case of an ECP, a specific uPDCCH pattern in a first timeslot is as follows, and a pattern in a second timeslot is a repetition of the pattern in the first timeslot.

Figure 48A:
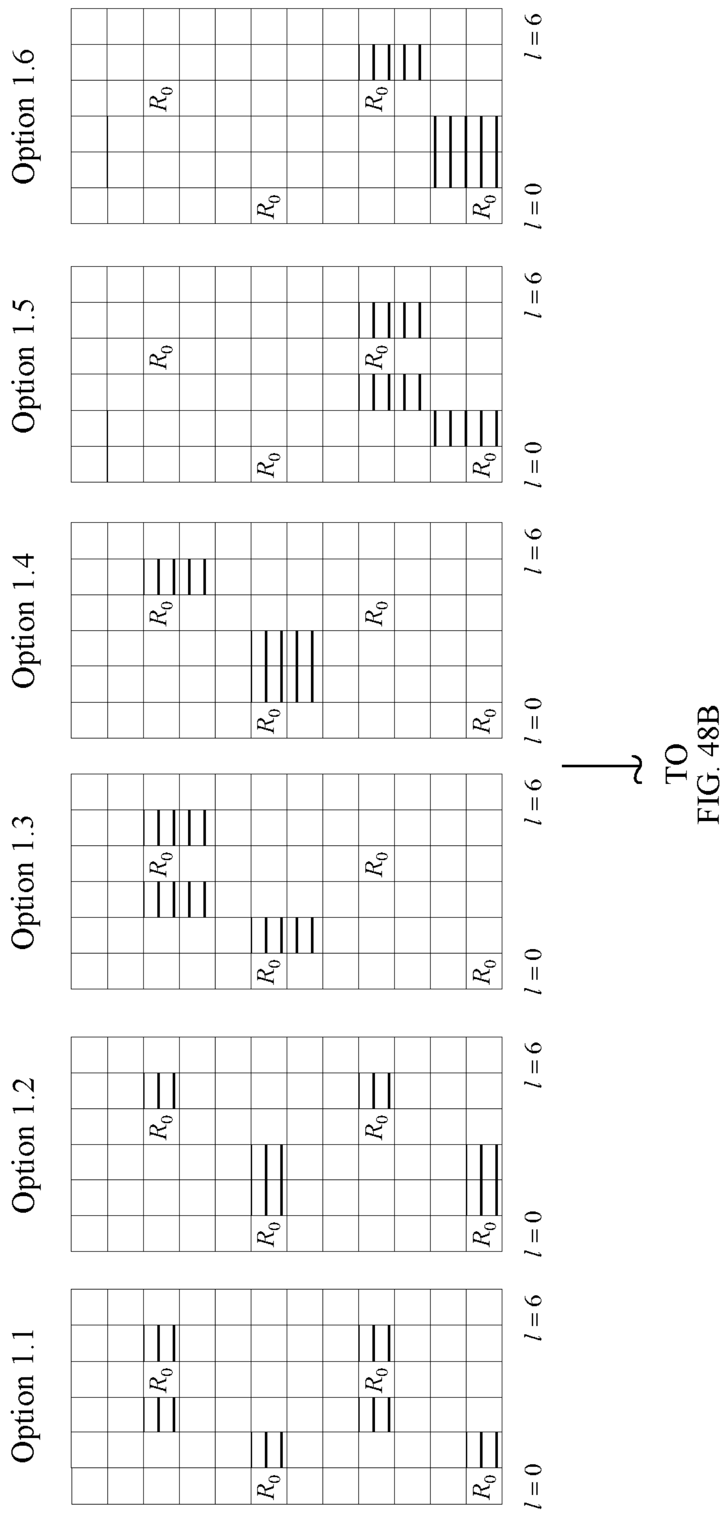
FIG. 48A and FIG. 48B are CRS and uPDCCH patterns in a timeslot in a case of an NCP when a terminal has one antenna port in a first option in Solution 2.
Figure 48B:
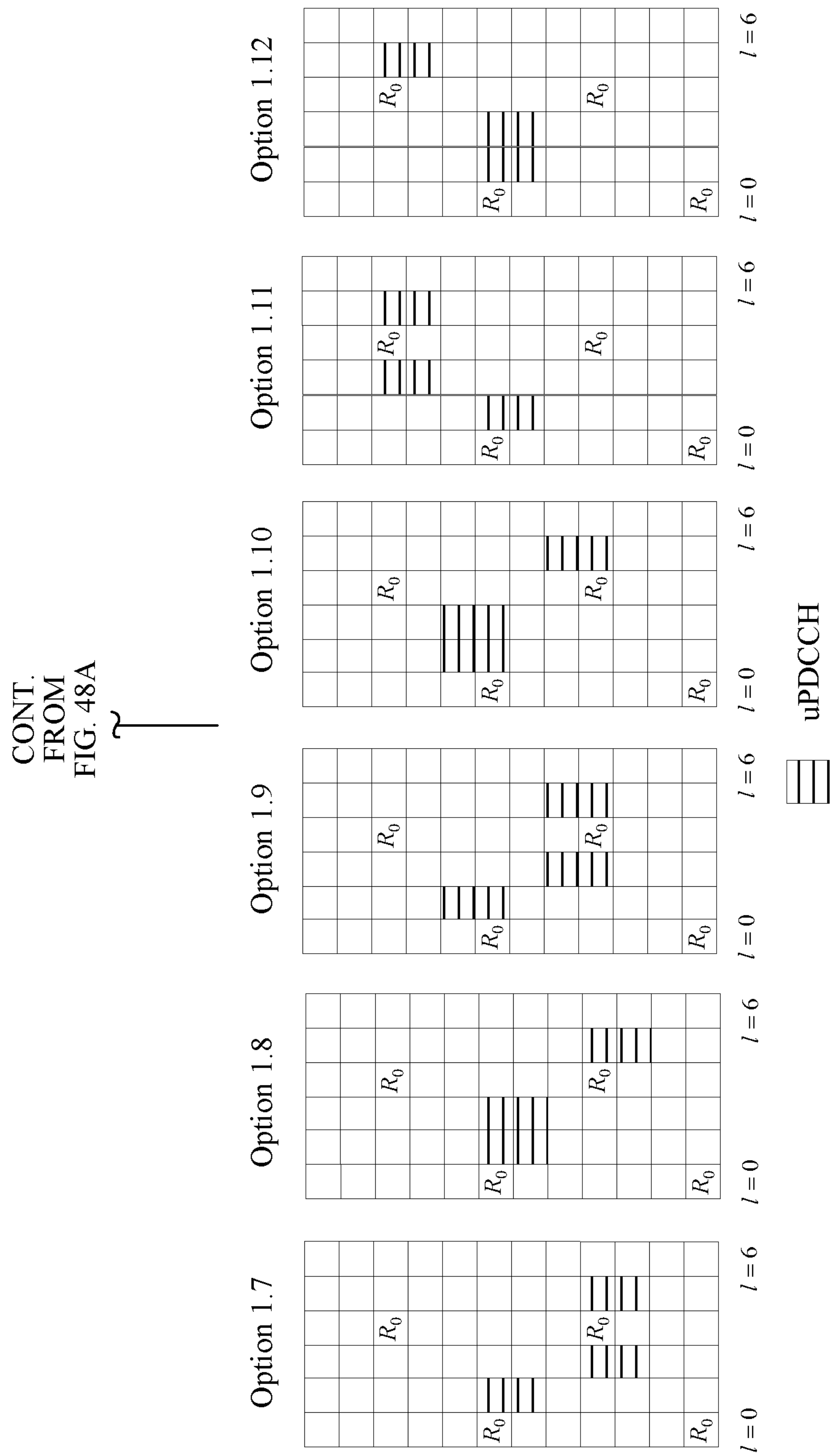

For another group of uPDCCH patterns, refer to FIG. 48A and FIG. 48B. A frequency diversity gain may be obtained in all options in FIG. 48A and FIG. 48B.

2. Two Antenna Ports

Figure 49A:
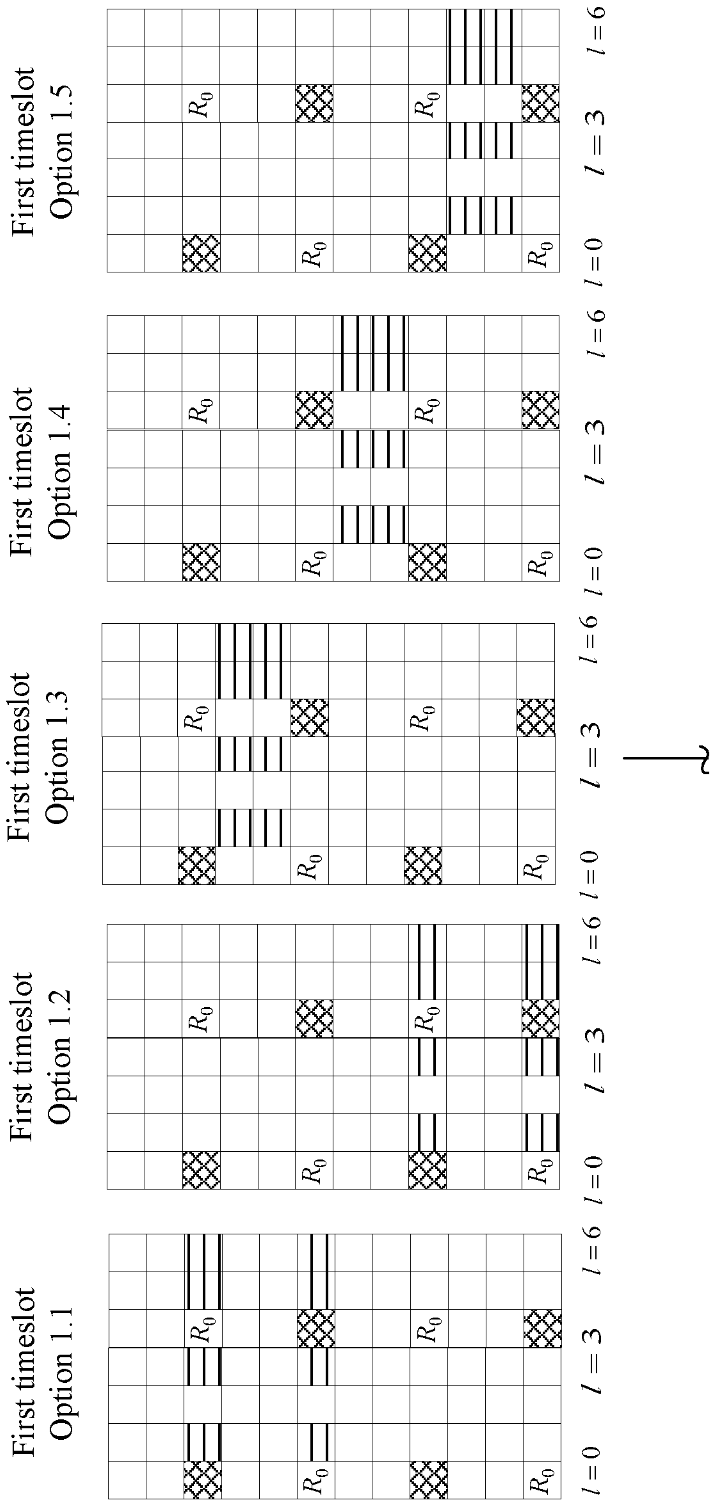
FIG. 49A and FIG. 49B are CRS and uPDCCH patterns in a timeslot in a case of an NCP when a terminal has two antenna ports in a first option in Solution 2.
Figure 49B:
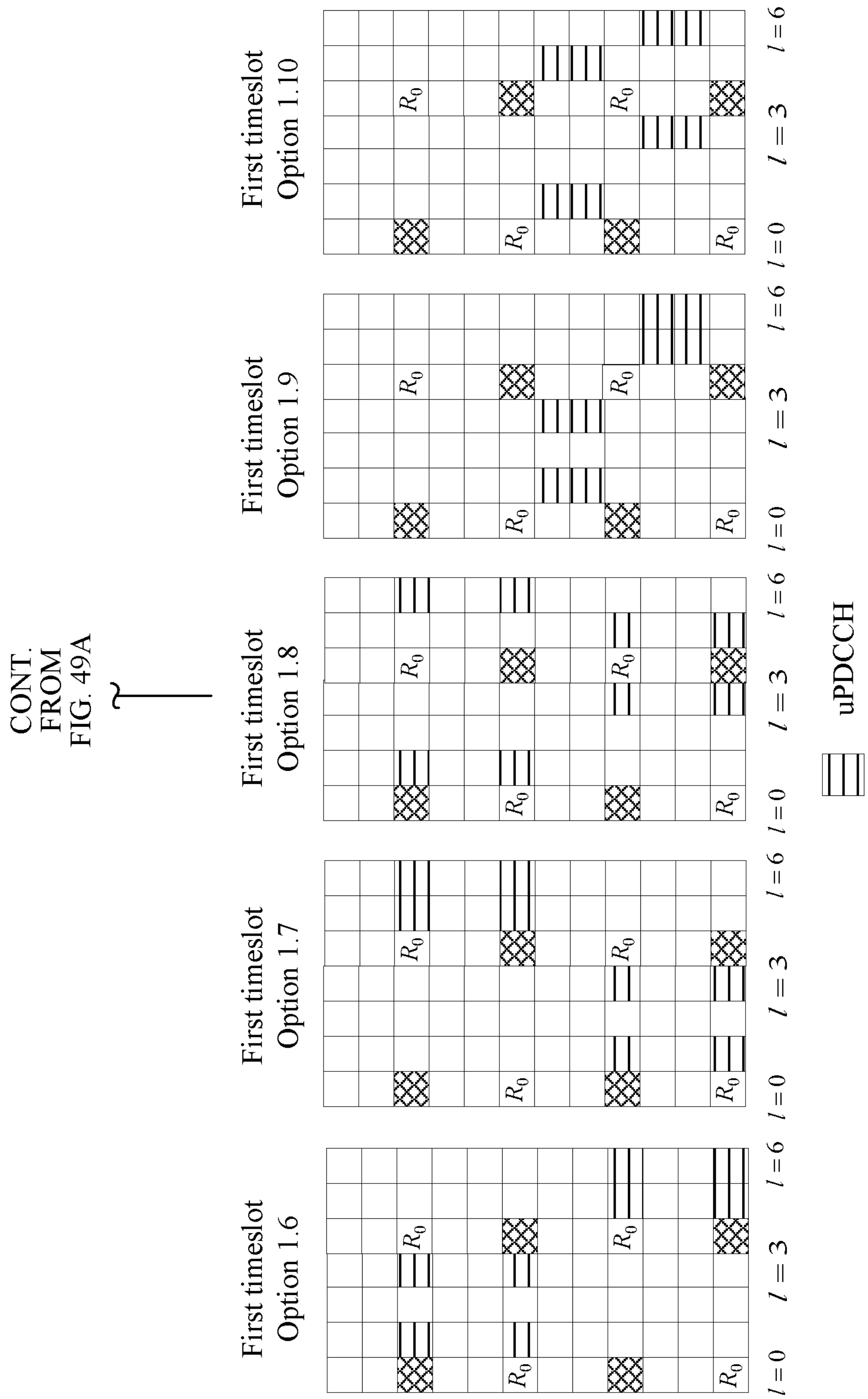

For a specific uPDCCH pattern, refer to FIG. 49A and FIG. 49B. A first timeslot and a second timeslot are symmetric, but a seventh symbol in the second timeslot has no RE of a uPDCCH. A frequency diversity gain may be obtained in all options in FIG. 49A and FIG. 49B. In a case of an ECP, a uPDCCH pattern may be obtained by deleting a third column of a uPDCCH pattern in a case of an NCP, and a seventh column has no RE of a uPDCCH.

3. Four Antenna Ports

Figure 50A:
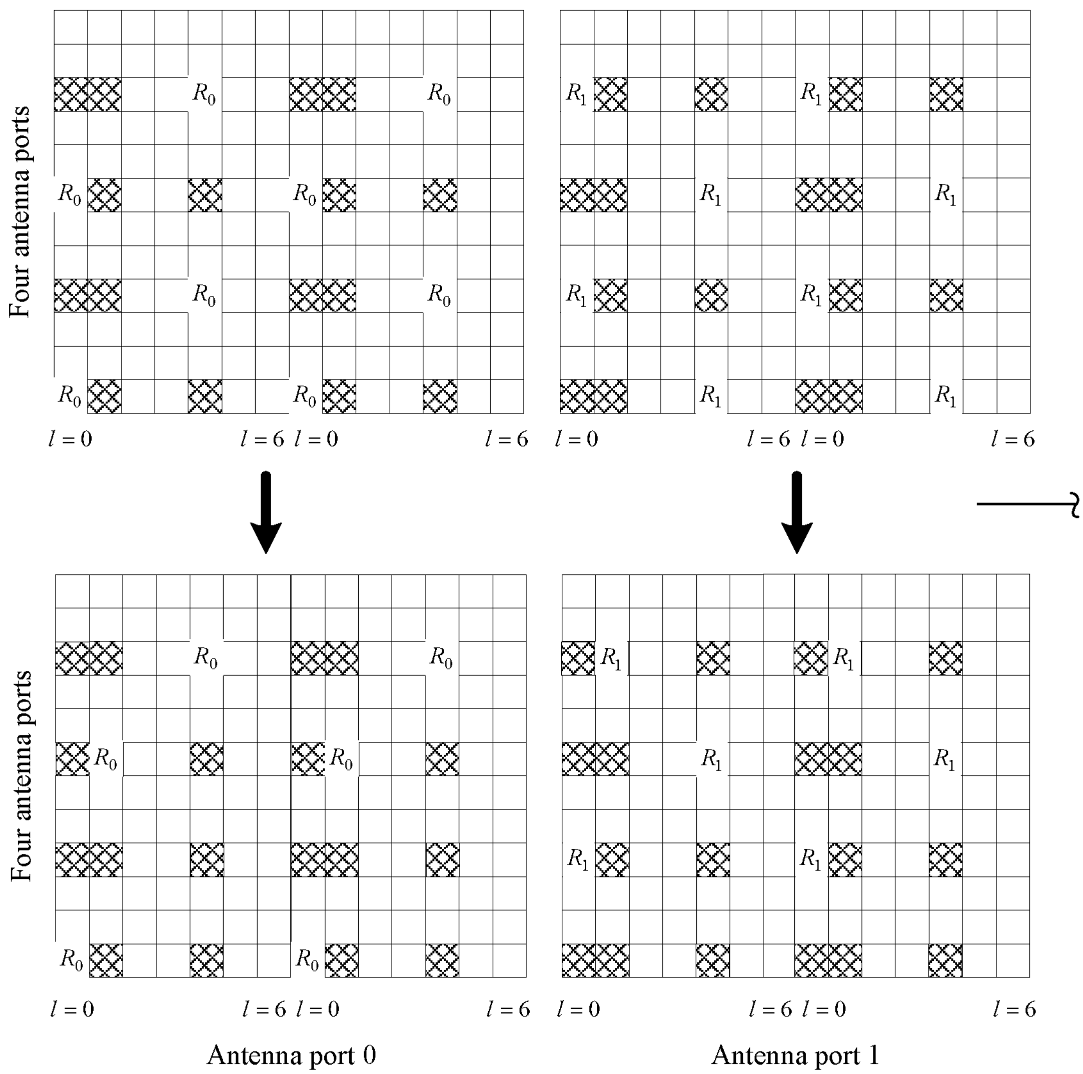
FIG. 50A and FIG. 50B are a schematic diagram of a change of a CRS pattern in a case of an NCP when a terminal has four antenna ports in a first option in Solution 2.
Figure 50B:
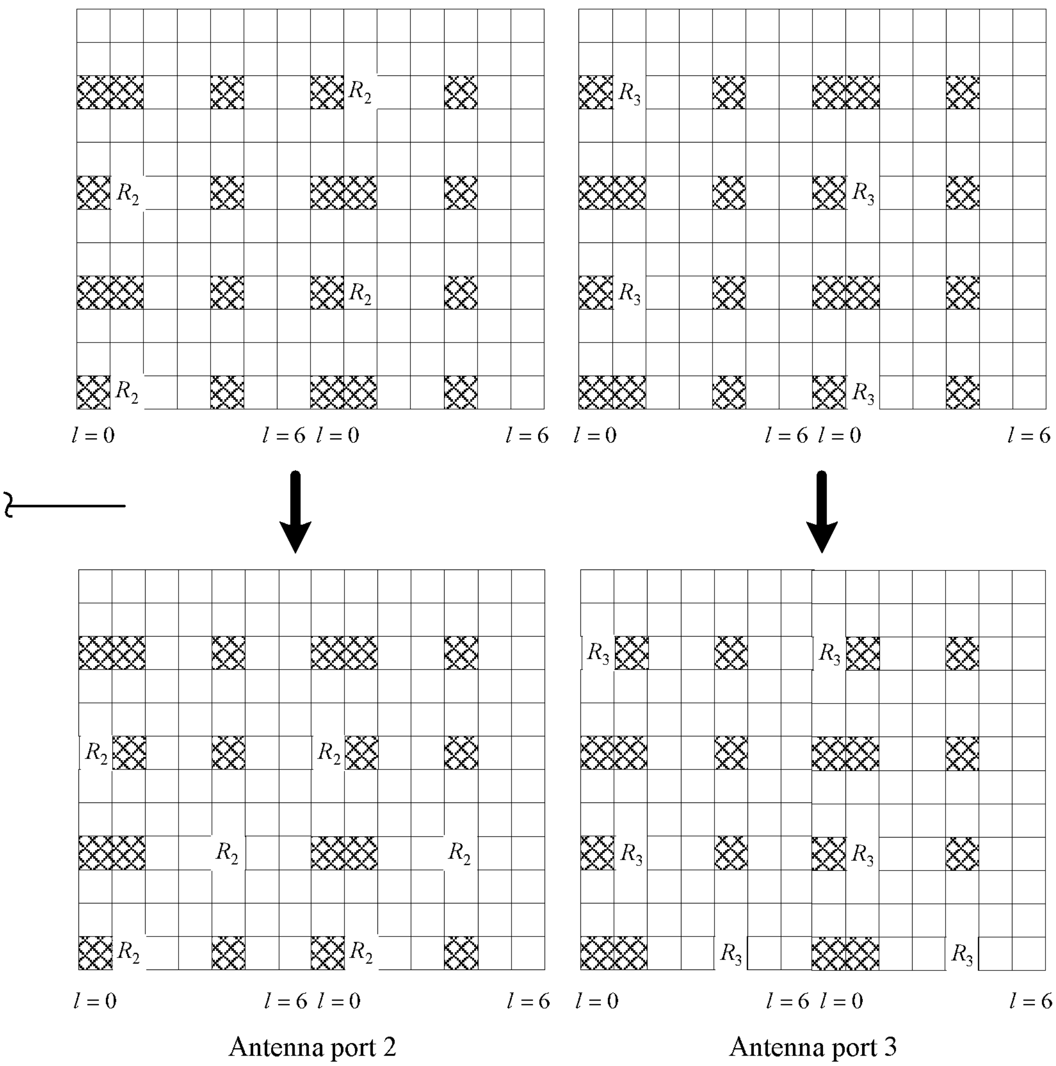
Figure 51A:
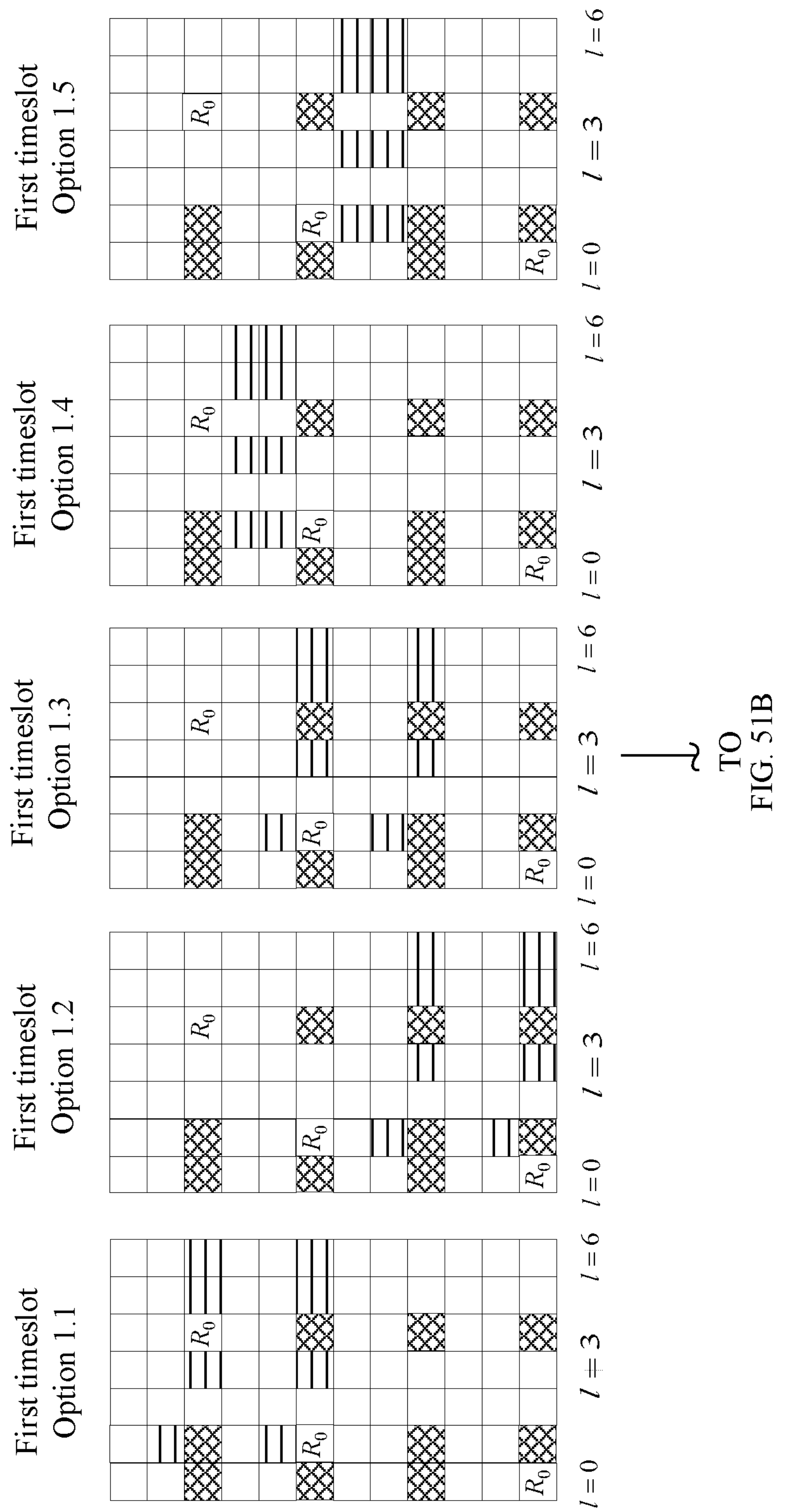
FIG. 51A and FIG. 51B are CRS and uPDCCH patterns in a timeslot in a case of an NCP when a terminal has four antenna ports in a first option in Solution 2.
Figure 51B:
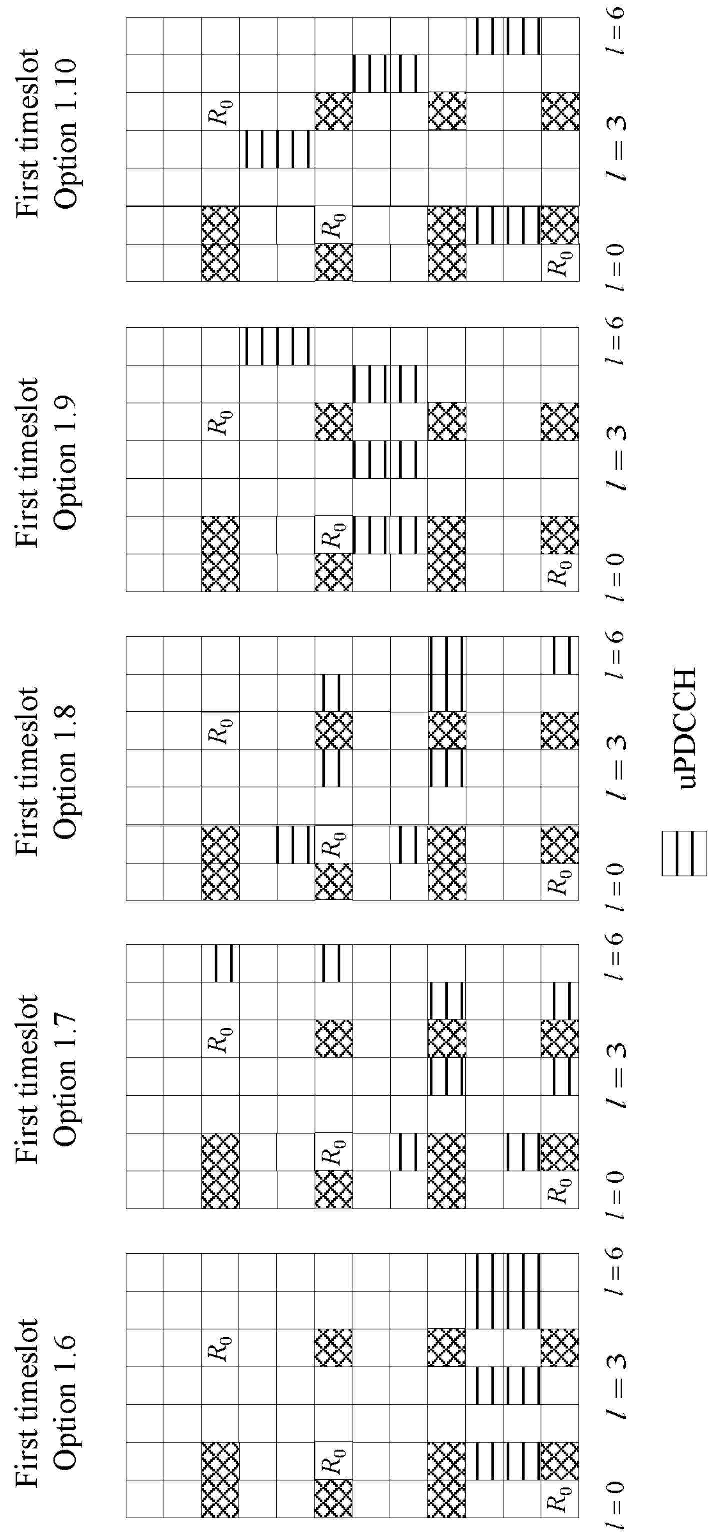

For a specific re-designed CRS pattern, refer to FIG. 50A and FIG. 50B. There may also be another CRS pattern. For a specific uPDCCH pattern, refer to FIG. 51A and FIG. 51B. A first timeslot and a second timeslot are symmetric, but a seventh symbol in the second timeslot has no RE of a uPDCCH. A frequency diversity gain may be obtained in all options in FIG. 51A and FIG. 51B. In a case of an ECP, a uPDCCH pattern may be obtained by deleting a third column of a uPDCCH pattern in a case of an NCP, and a seventh column has no RE of a uPDCCH.

The following analyzes a CRS pattern and a uPDCCH pattern obtained when two OFDM symbols are used as a transmission unit, Option 2 is used, and there is one antenna port, two antenna ports, or four antenna ports.

1. One Antenna Port

Figure 52A:
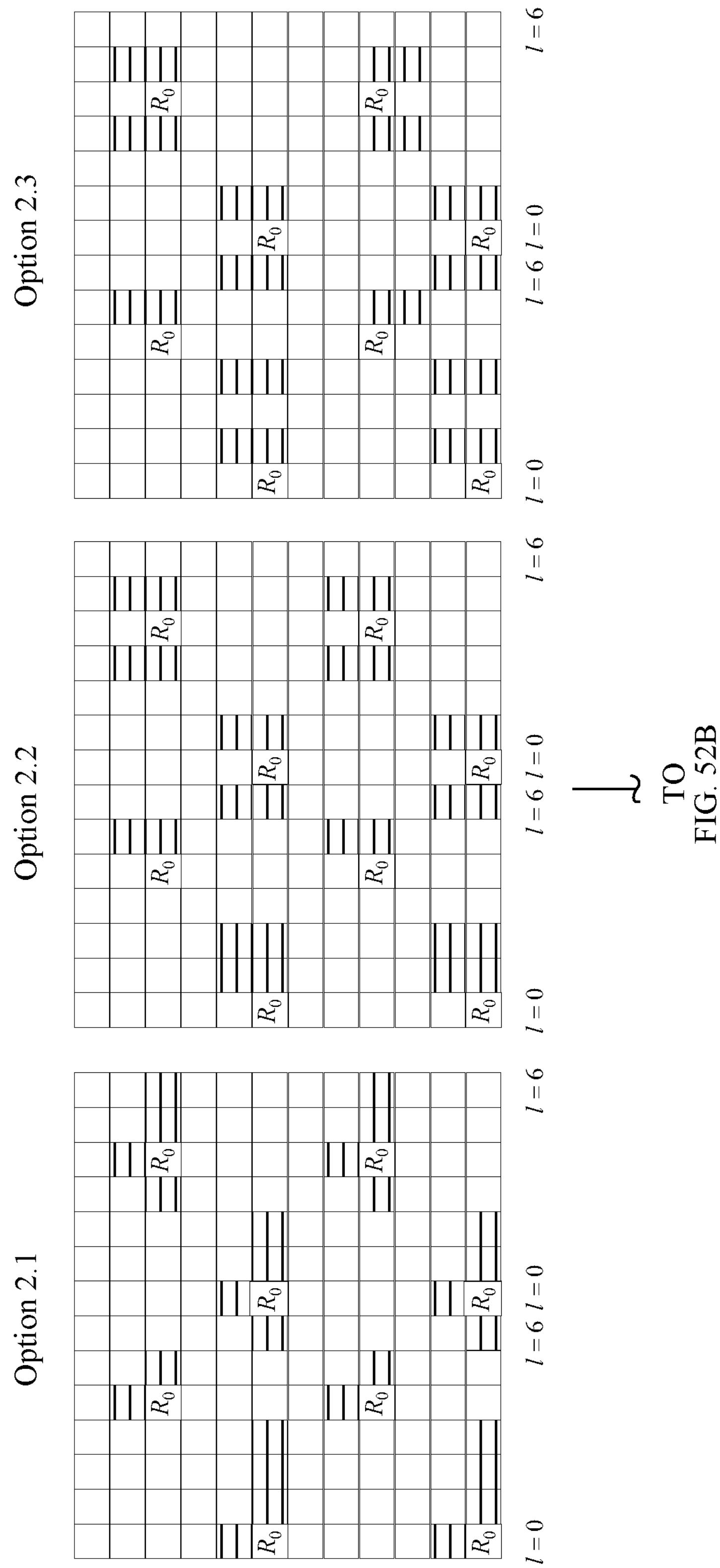
FIG. 52A and FIG. 52B are a schematic diagram of CRS and uPDCCH patterns in a case of an NCP when a terminal has one antenna port in a second option in Solution 2.
Figure 52B:
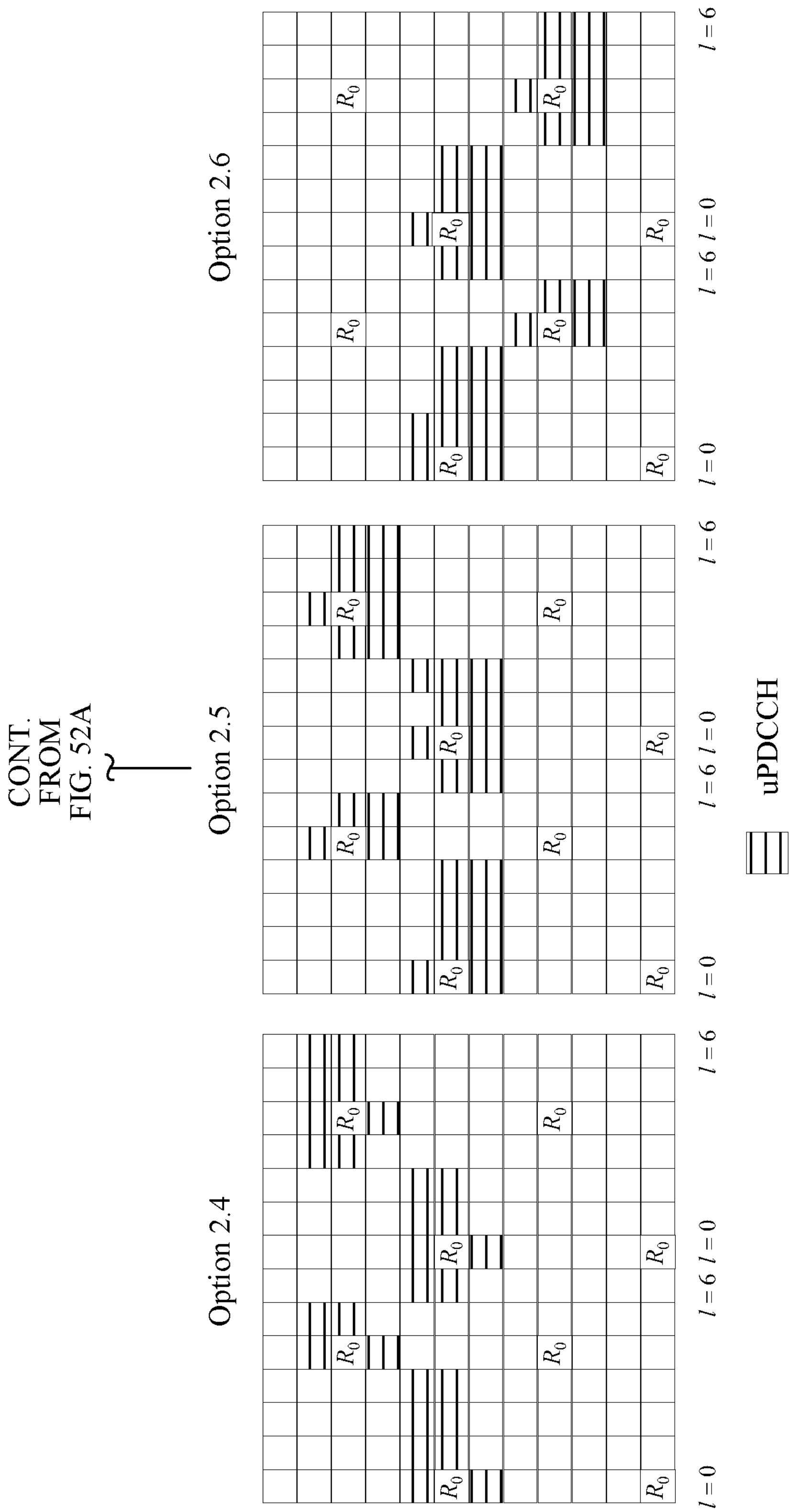

For a specific uPDCCH pattern, refer to FIG. 52A and FIG. 52B. A frequency diversity gain may be obtained in all options in FIG. 52A and FIG. 52B. In a case of an ECP, a uPDCCH pattern may be obtained by deleting a fourth column of a uPDCCH pattern in a case of an NCP.

2. Two Antenna Ports

Figure 53A:
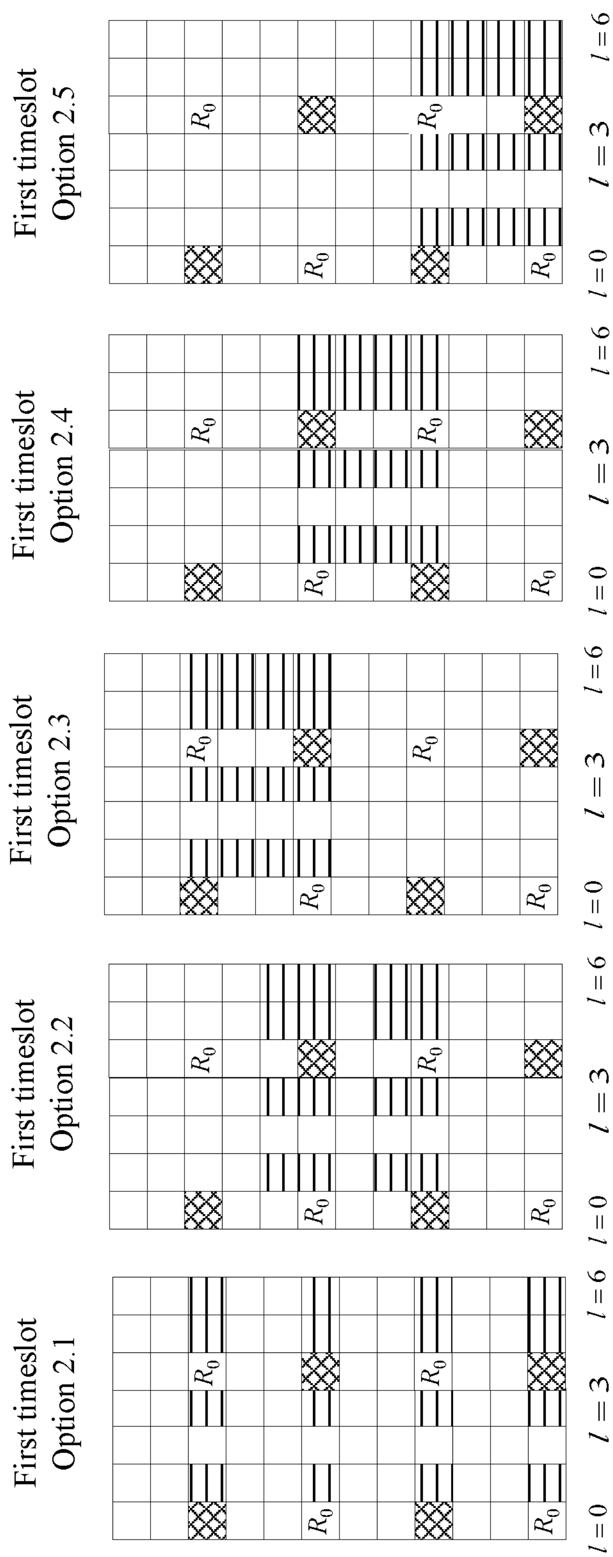
FIG. 53A and FIG. 53B are a schematic diagram of CRS and uPDCCH patterns in a timeslot in a case of an NCP when a terminal has two antenna ports in a second option in Solution 2.
Figure 53B:
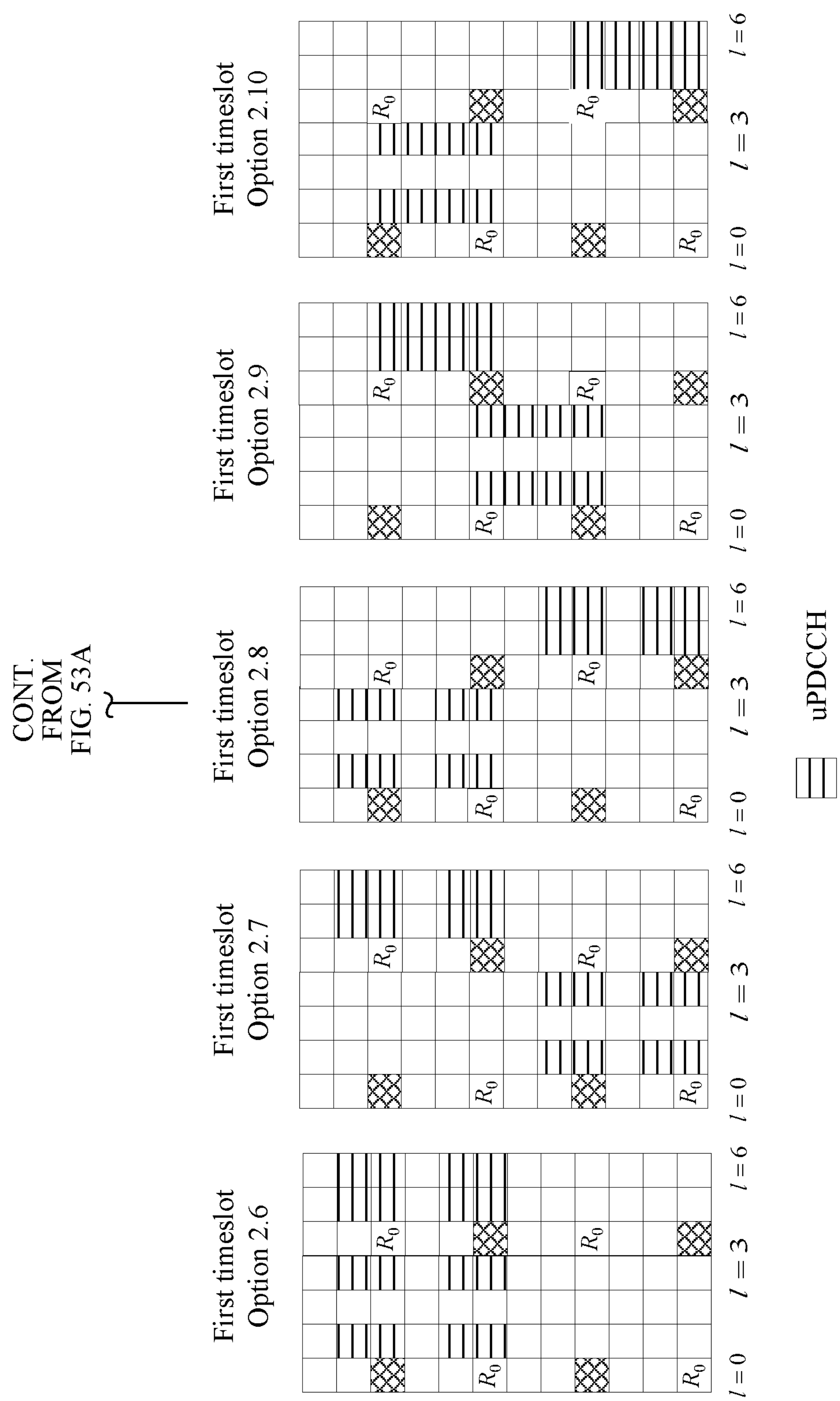

For a specific uPDCCH pattern, refer to FIG. 53A and FIG. 53B. A first timeslot and a second timeslot are symmetric, but a seventh symbol in the second timeslot has no RE of a uPDCCH. A frequency diversity gain may be obtained in all options in FIG. 53A and FIG. 53B. In a case of an ECP, a uPDCCH pattern may be obtained by deleting a third column of a uPDCCH pattern in a case of an NCP, and a seventh column has no RE of a uPDCCH.

3. Four Antenna Ports

Figure 54A:
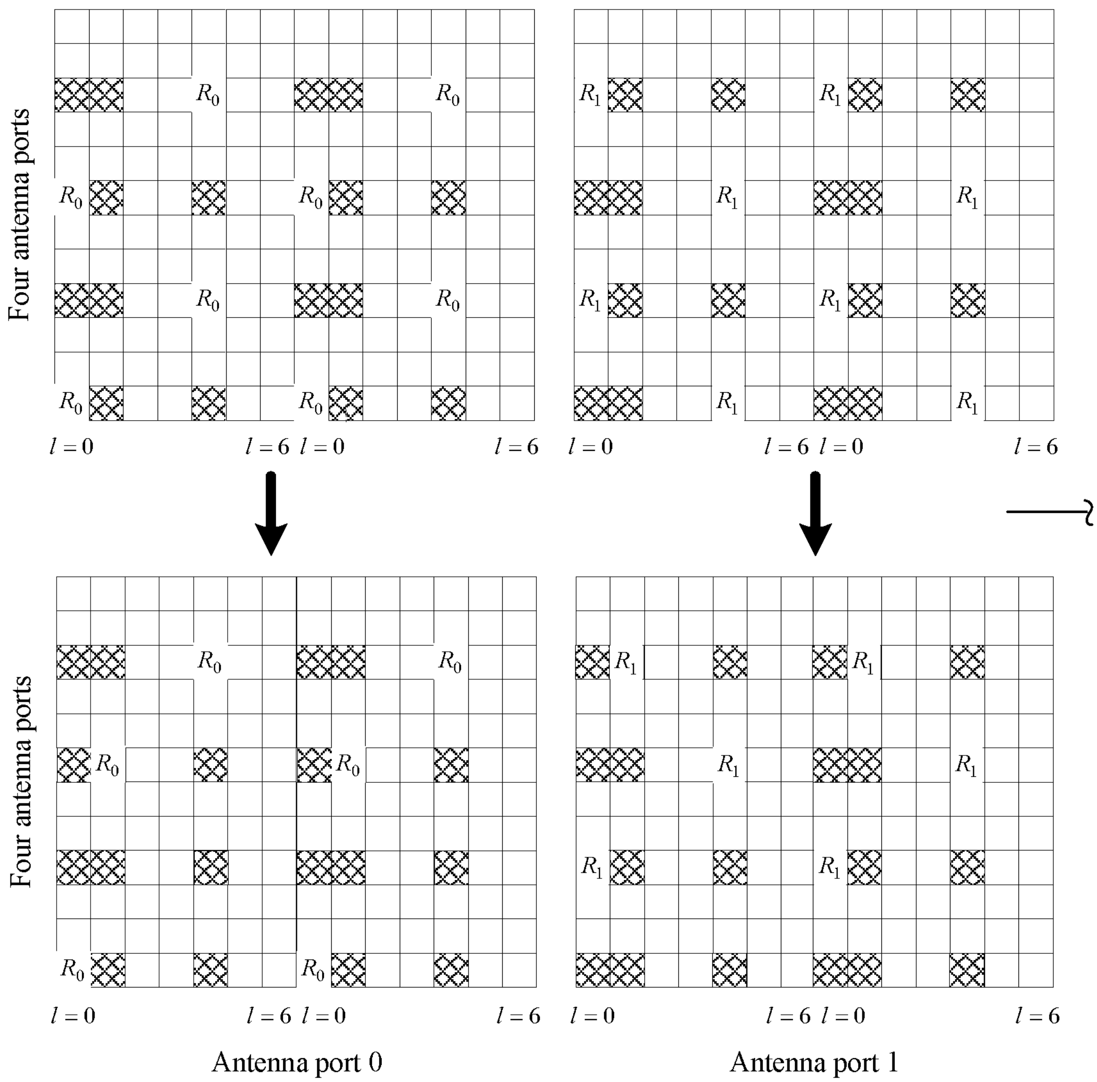
FIG. 54A and FIG. 54B are a schematic diagram of a change of a CRS pattern in a case of an NCP when a terminal has four antenna ports in a second option in Solution 2.
Figure 54B:
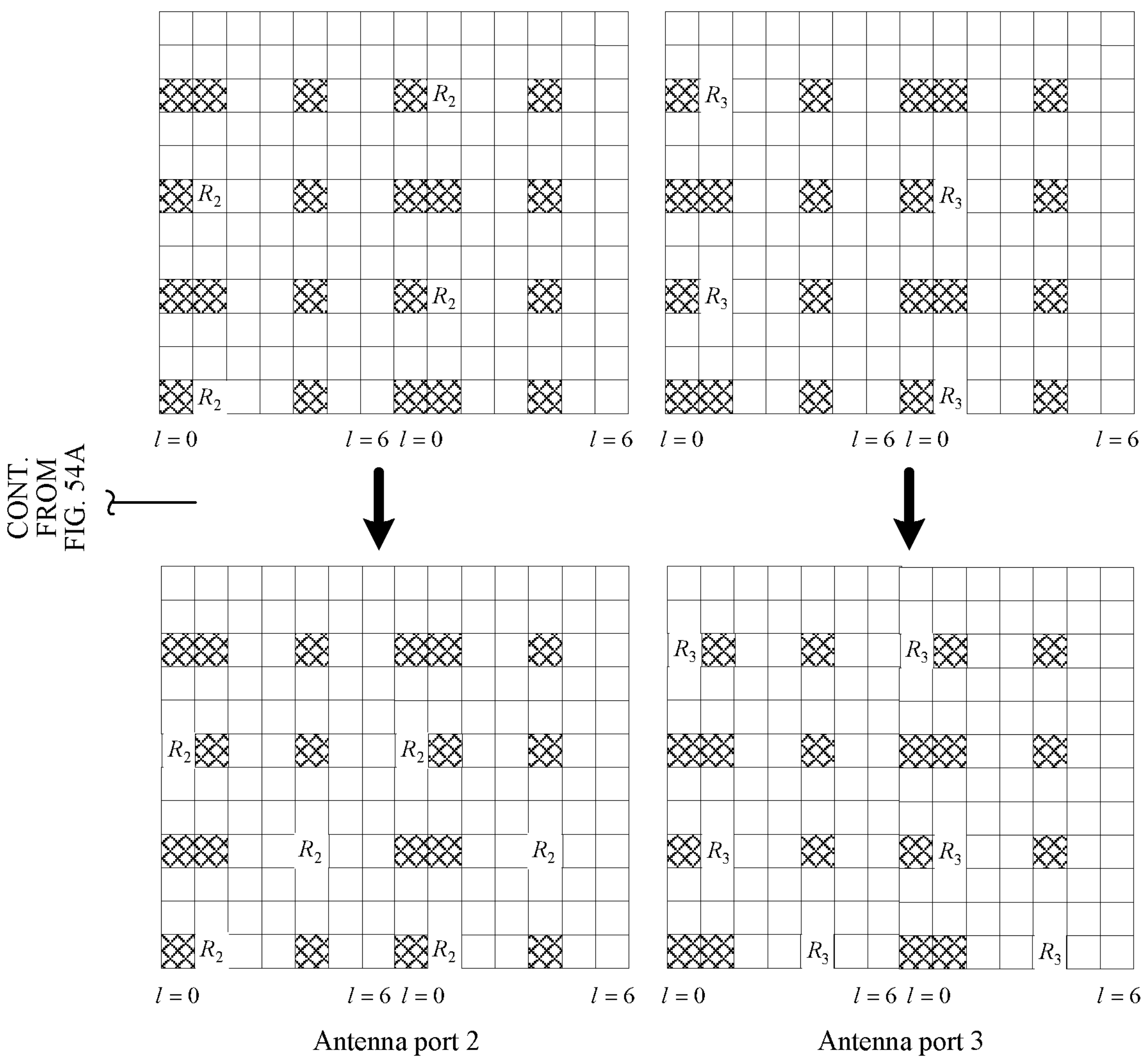
Figure 55A:
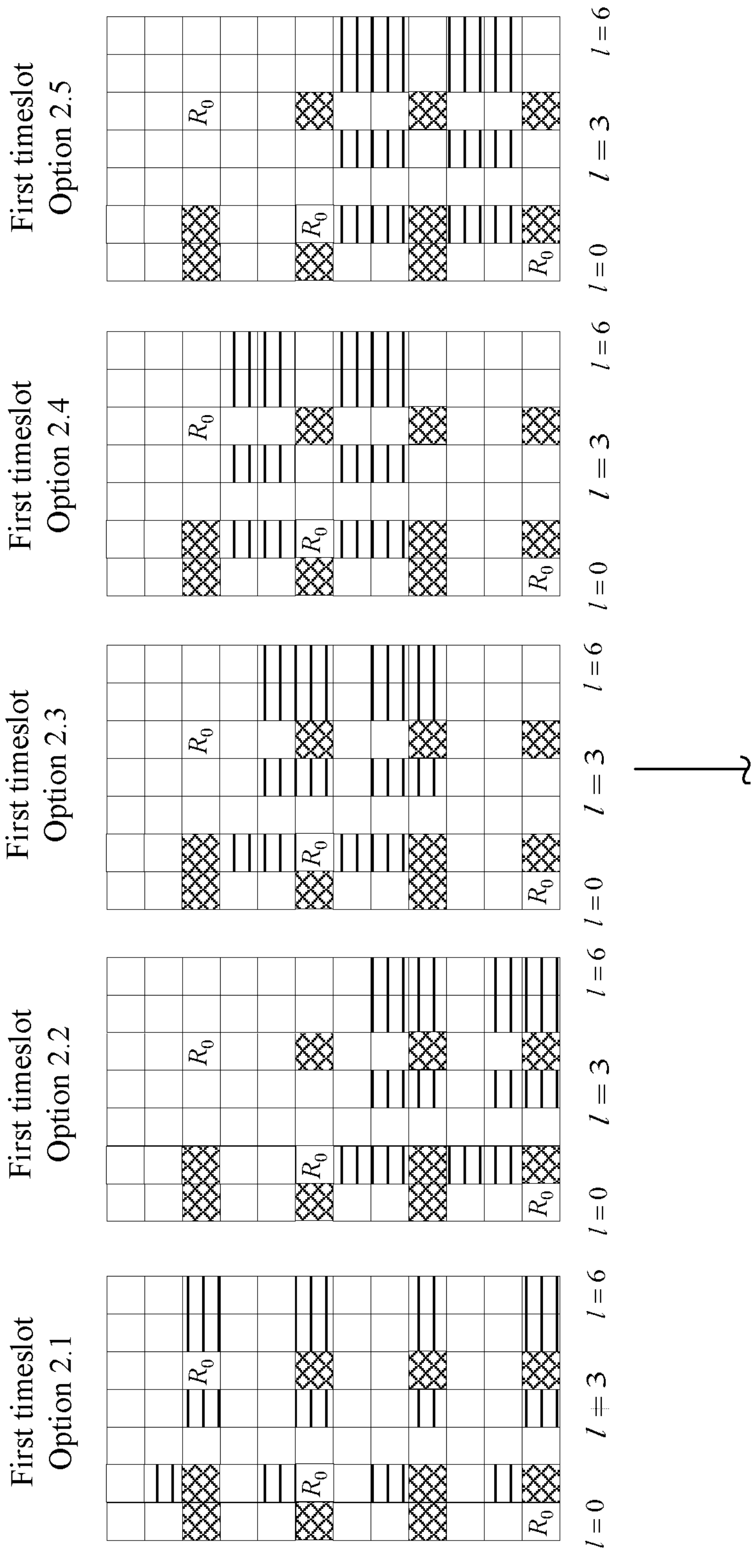
FIG. 55A and FIG. 55B are a schematic diagram of CRS and uPDCCH patterns in a timeslot in a case of an NCP when a terminal has four antenna ports in a second option in Solution 2.
Figure 55B:
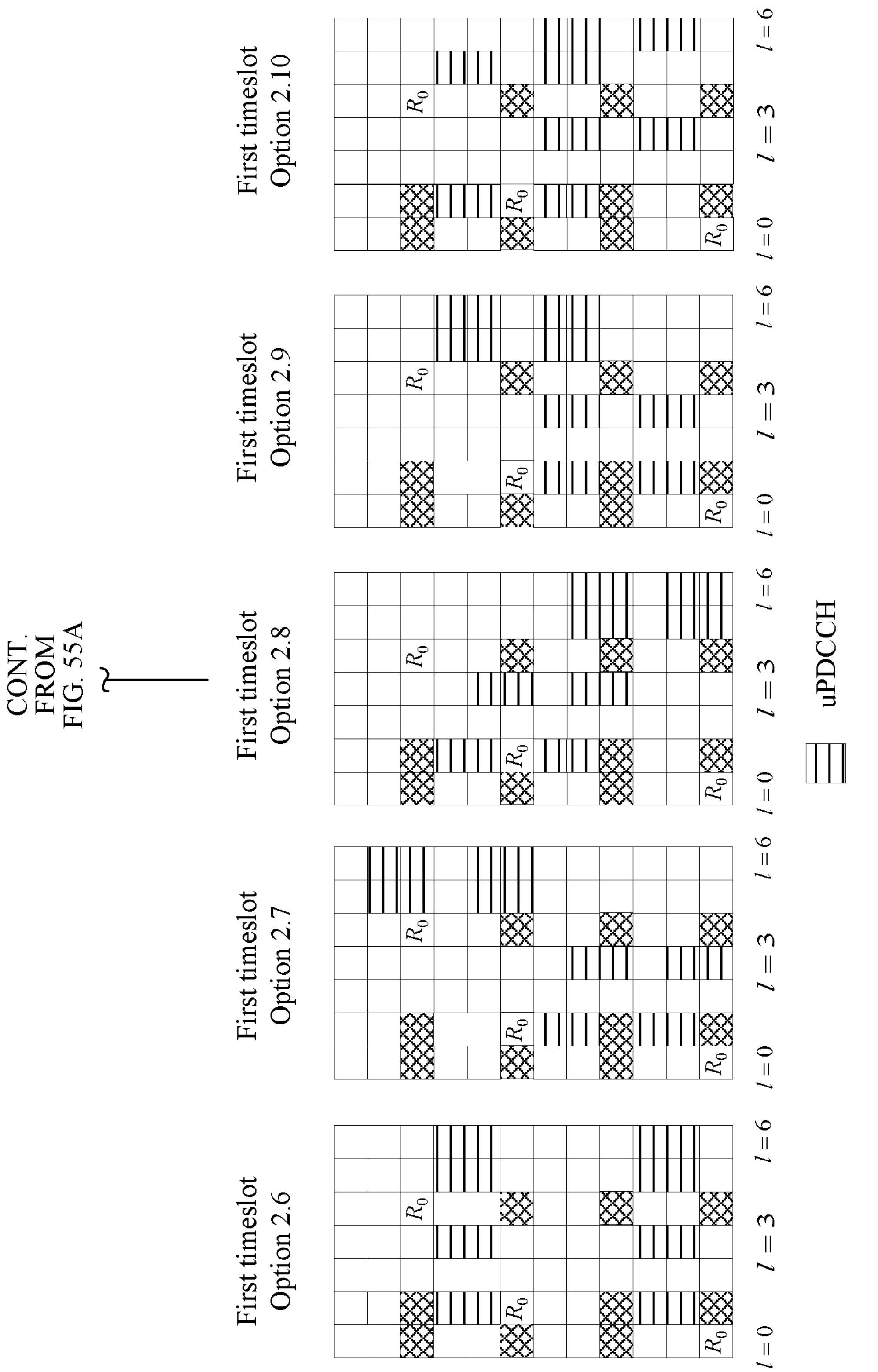

For a specific re-designed CRS pattern, refer to FIG. 54A and FIG. 54B. There may also be another CRS pattern. For a specific uPDCCH pattern, refer to FIG. 55A and FIG. 55B. A first timeslot and a second timeslot are symmetric, but a seventh symbol in the second timeslot has no RE of a uPDCCH. A frequency diversity gain may be obtained in all options in FIG. 55A and FIG. 55B. In a case of an ECP, a uPDCCH pattern may be obtained by deleting a third column of a uPDCCH pattern in a case of an NCP, and a seventh column has no RE of a uPDCCH.

The following analyzes a CRS pattern and a uPDCCH pattern obtained when two OFDM symbols are used as a transmission unit, Option 3 is used, and there is one antenna port, two antenna ports, or four antenna ports.

Figure 56:
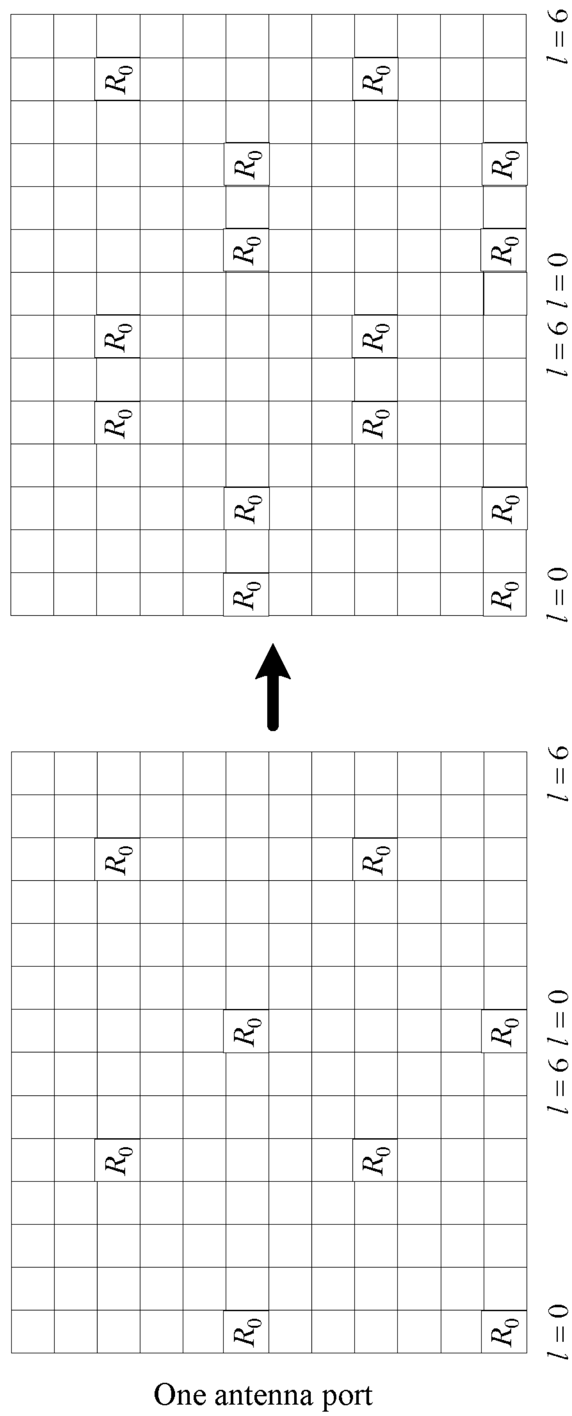
FIG. 56 is a schematic diagram of a change of a CRS pattern in a case of an NCP when a terminal has one antenna port in a third option in Solution 2.
Figure 57A:
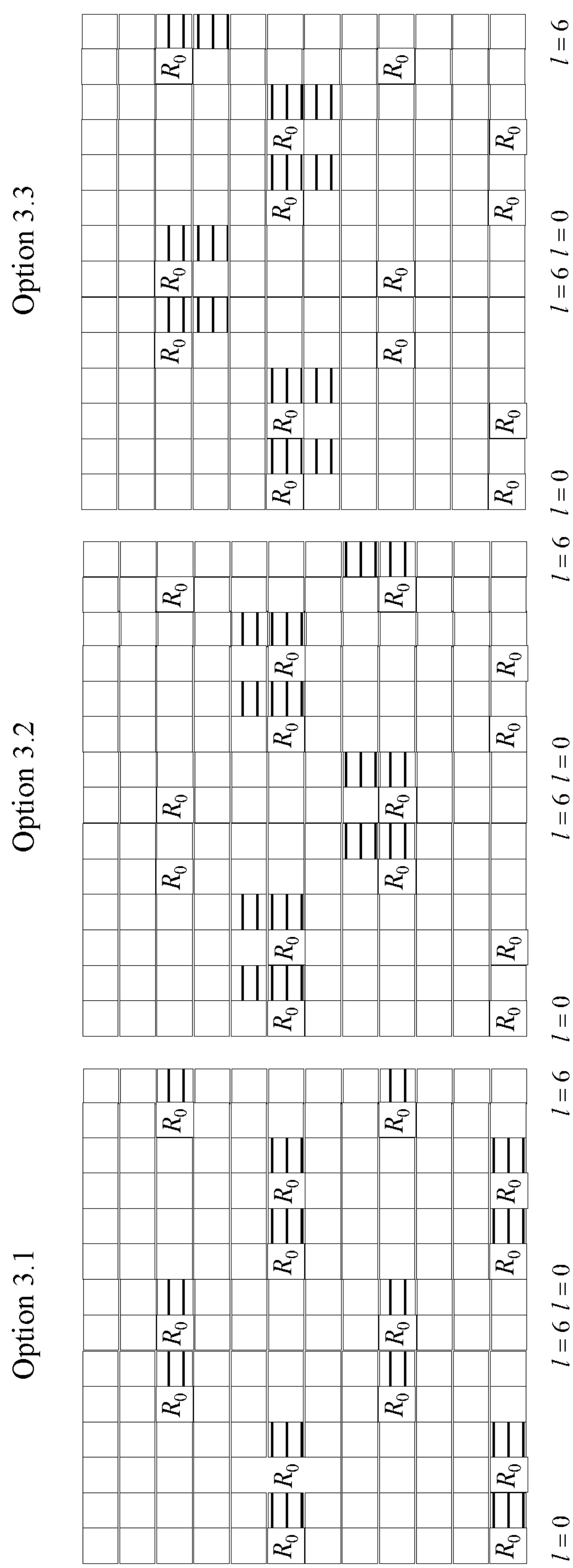
FIG. 57A and FIG. 57B are a schematic diagram of CRS and uPDCCH patterns in a case of an NCP when a terminal has one antenna port in a third option in Solution 2.
Figure 57B:
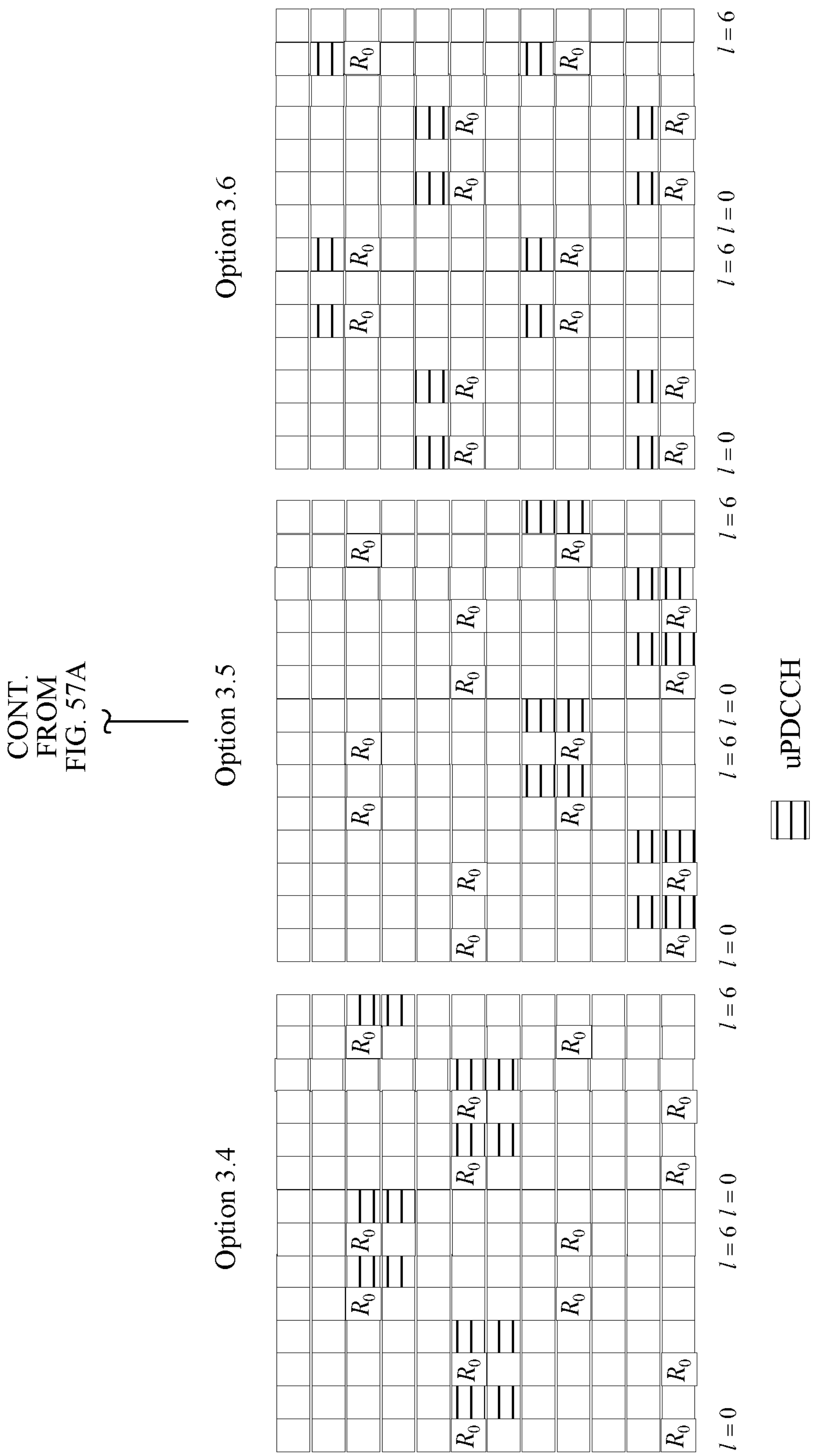
Figure 58A:
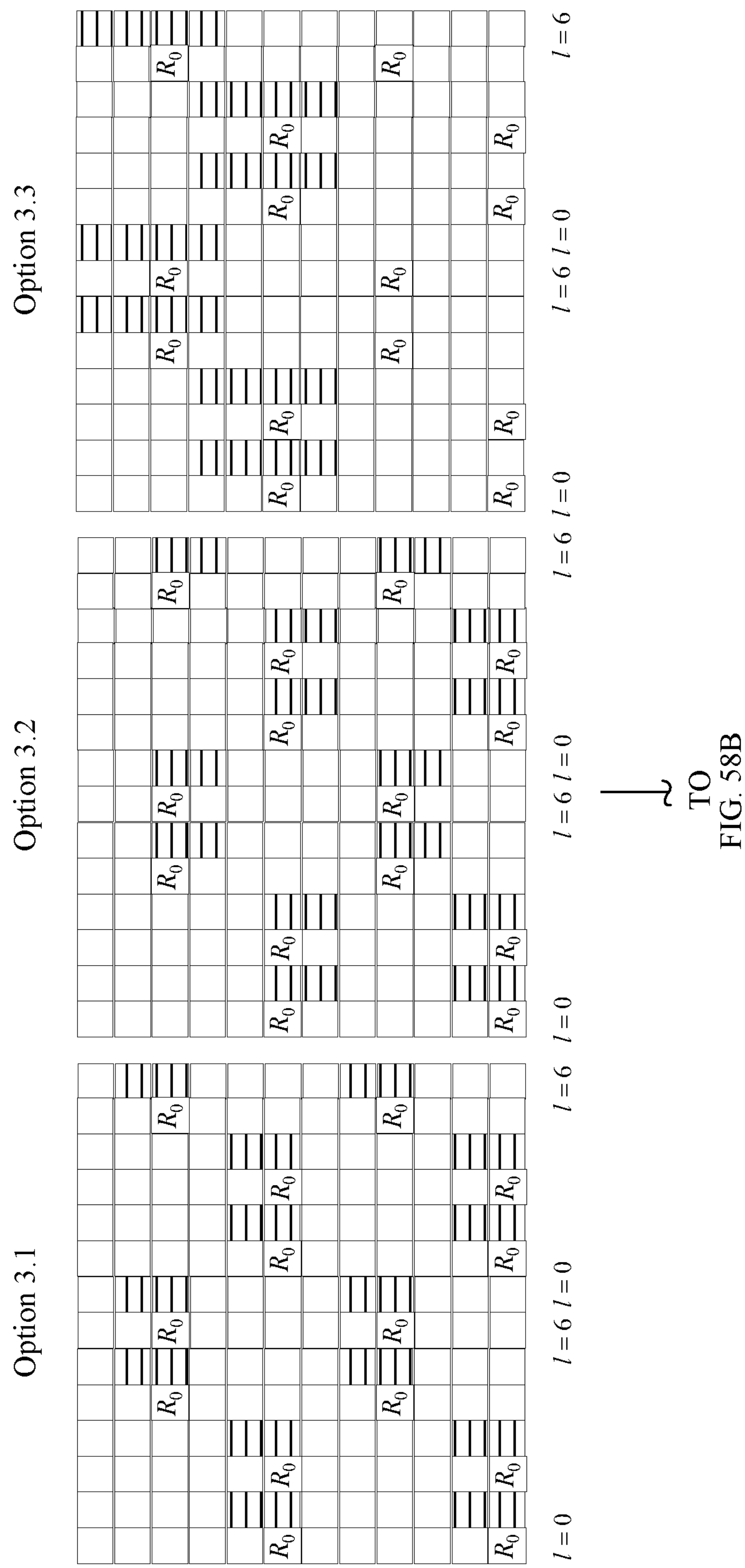
FIG. 58A and FIG. 58B are a schematic diagram of CRS and uPDCCH patterns in a case of an NCP when a terminal has one antenna port in a third option in Solution 2.
Figure 58B:
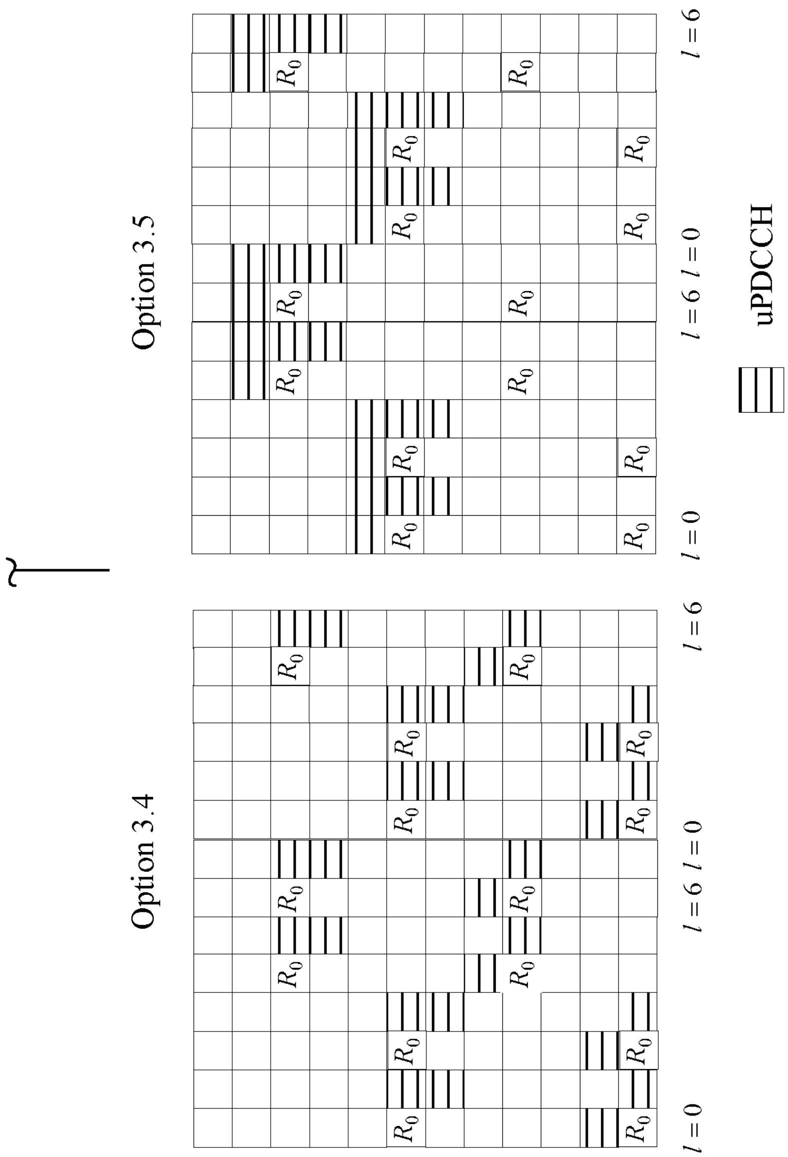

1. One antenna port: For a specific designed CRS pattern, refer to FIG. 56. Certainly, there may also be another CRS pattern. There are two types of specific uPDCCH patterns. For a pattern in which a uPDCCH occupies two REs in every two OFDM symbols, refer to FIG. 57A and FIG. 57B. For a pattern in which a uPDCCH occupies four REs in every two OFDM symbols, refer to FIG. 58A and FIG. 58B. A frequency diversity gain may be obtained in all options in FIG. 57A, FIG. 57B, FIG. 58A, and FIG. 58B. In a case of an ECP, a uPDCCH pattern may be obtained by deleting a seventh column of a uPDCCH pattern in a case of an NCP, and a CRS pattern in a second timeslot is a repetition of a CRS pattern in a first timeslot.

Figure 59:
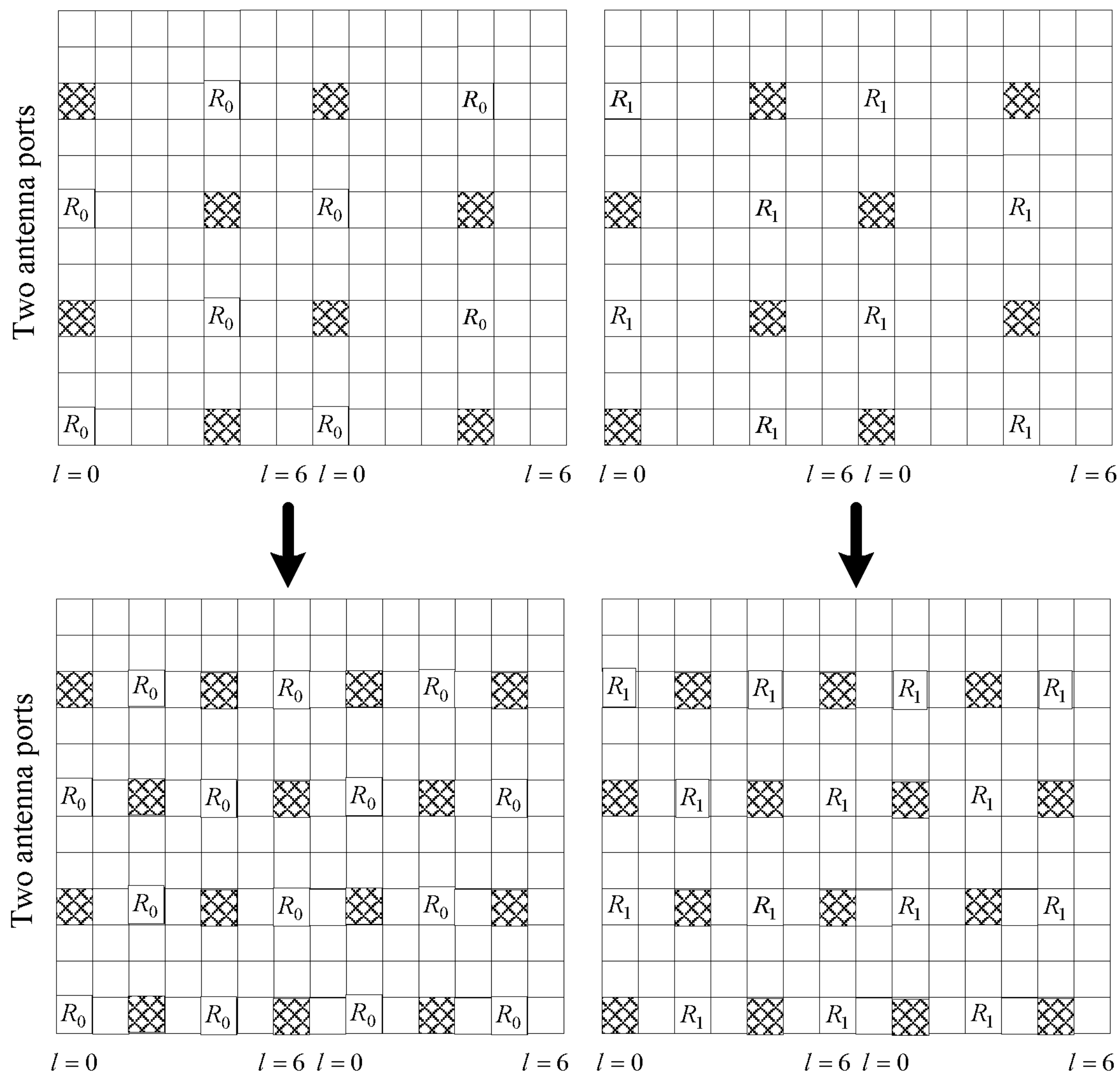
FIG. 59 is a schematic diagram of a change of a CRS pattern in a case of an NCP when a terminal has two antenna ports in a third option in Solution 2.
Figure 60A:
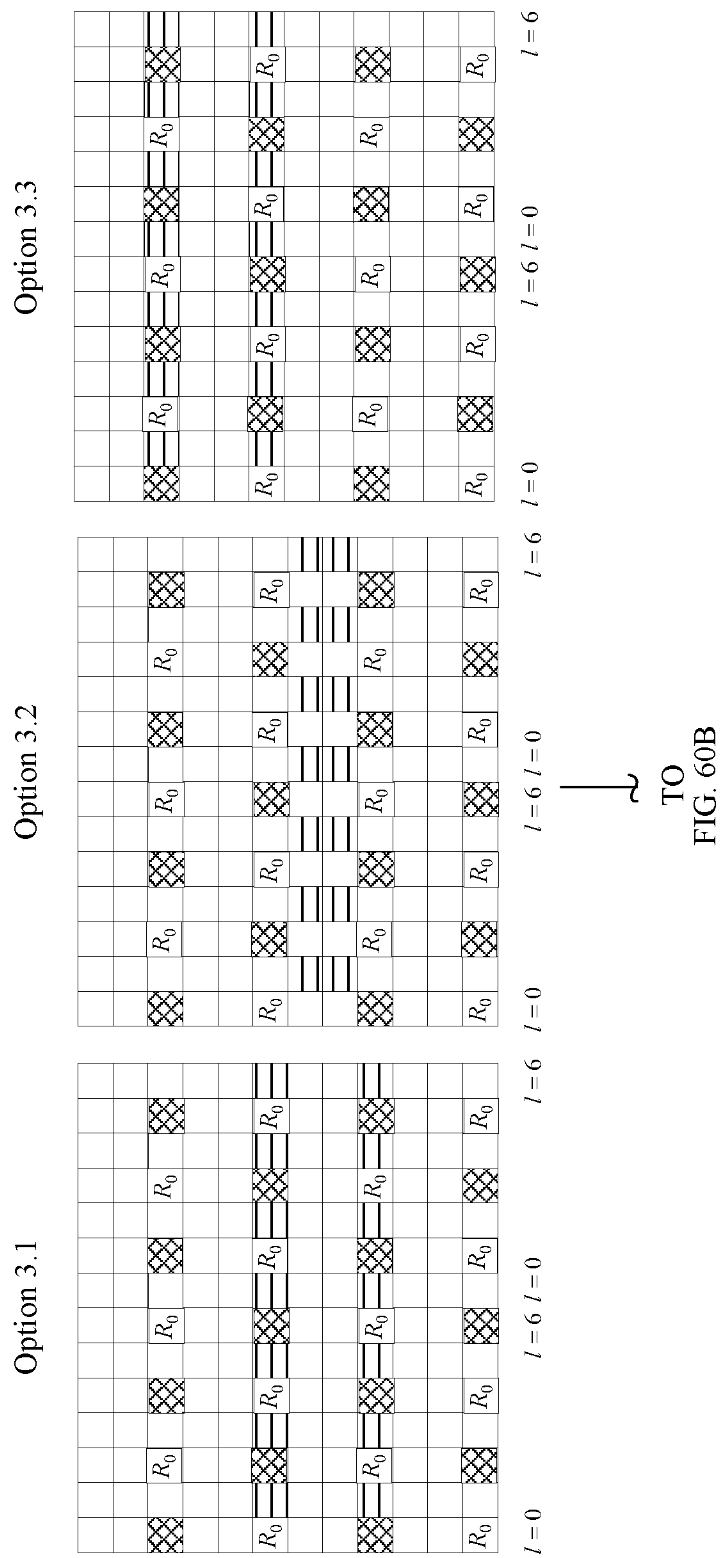
FIG. 60A and FIG. 60B are a schematic diagram of CRS and uPDCCH patterns in a case of an NCP when a terminal has two antenna ports in a third option in Solution 2.
Figure 60B:
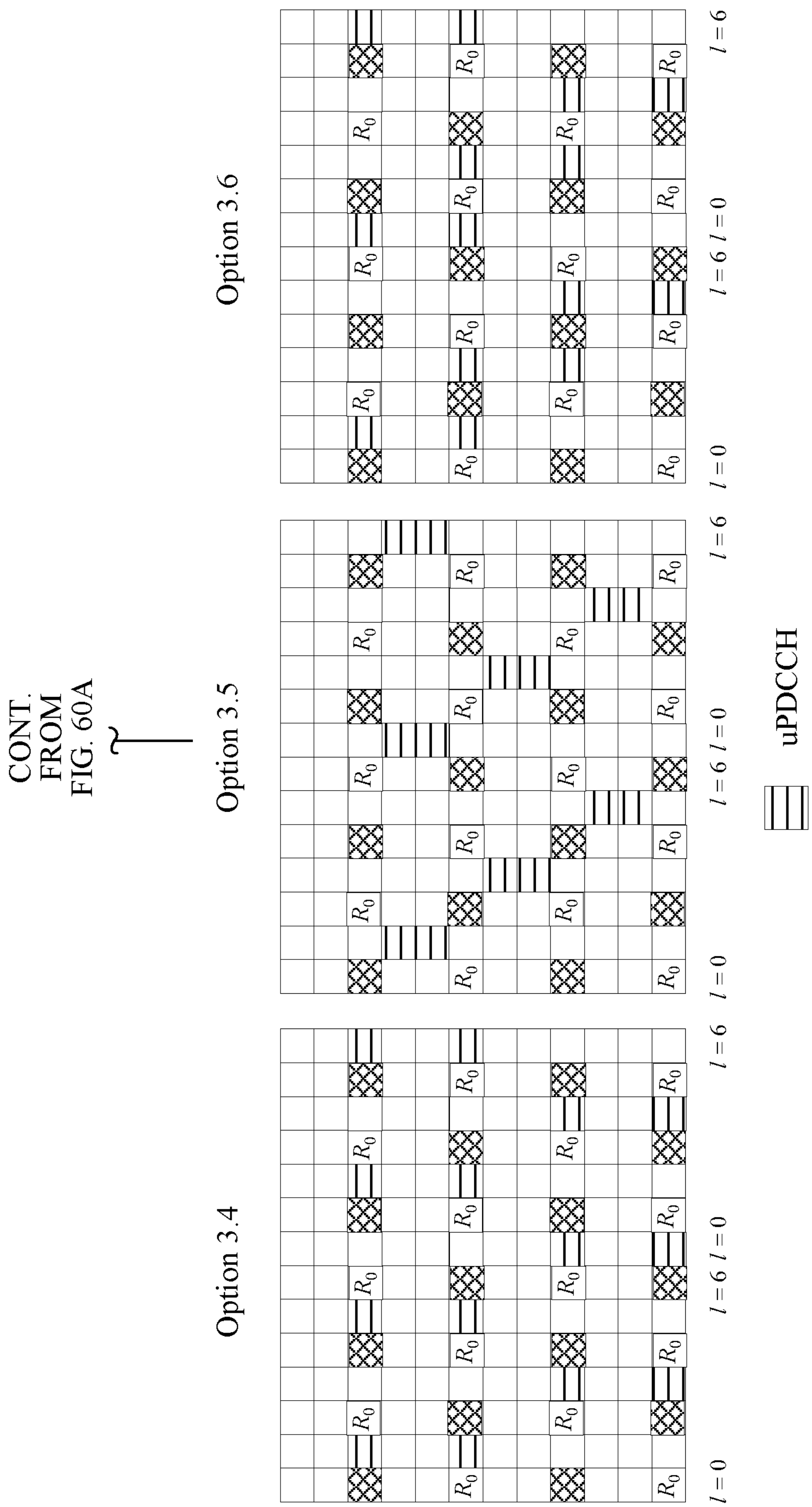
Figure 61A:
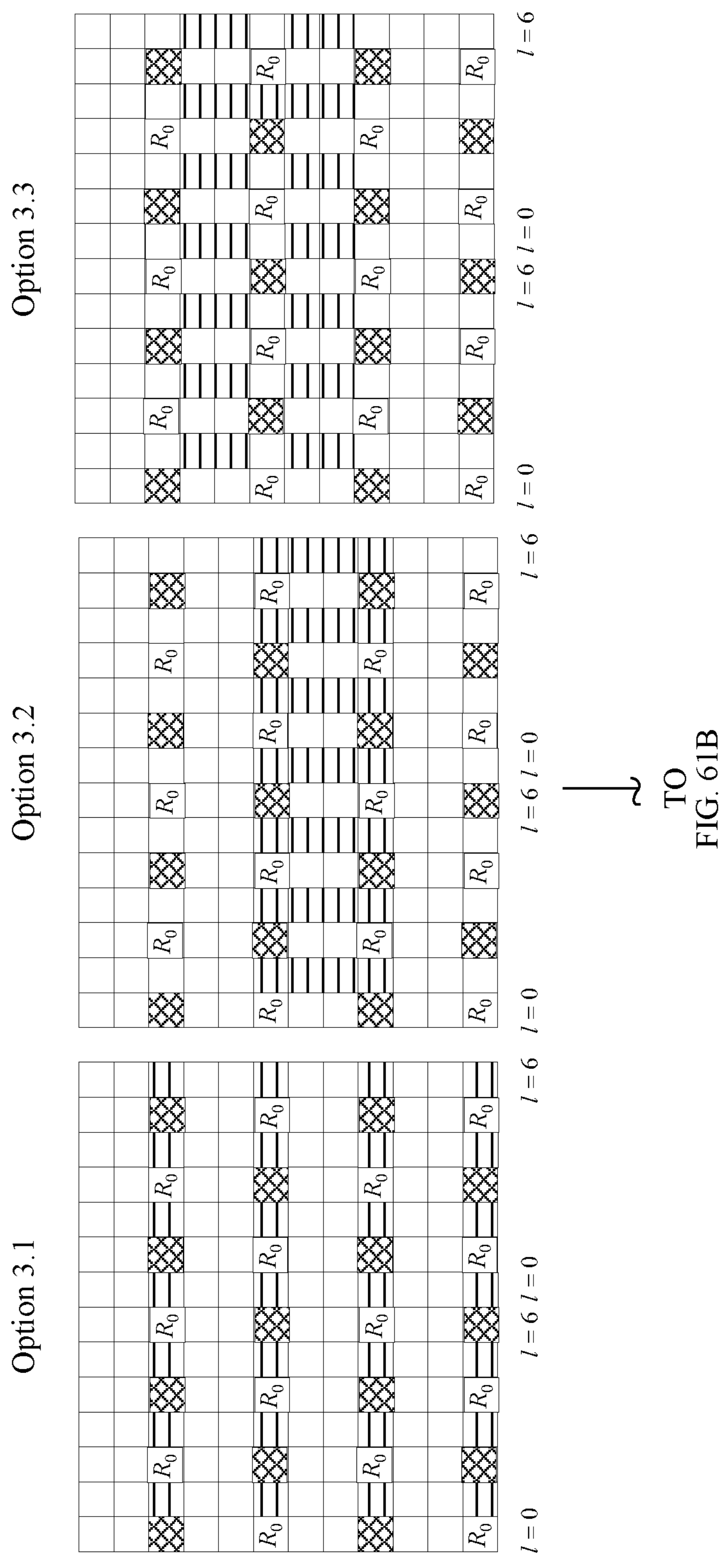
FIG. 61A and FIG. 61B are another schematic diagram of CRS and uPDCCH patterns in a case of an NCP when a terminal has two antenna ports in a third option in Solution 2.
Figure 61B:
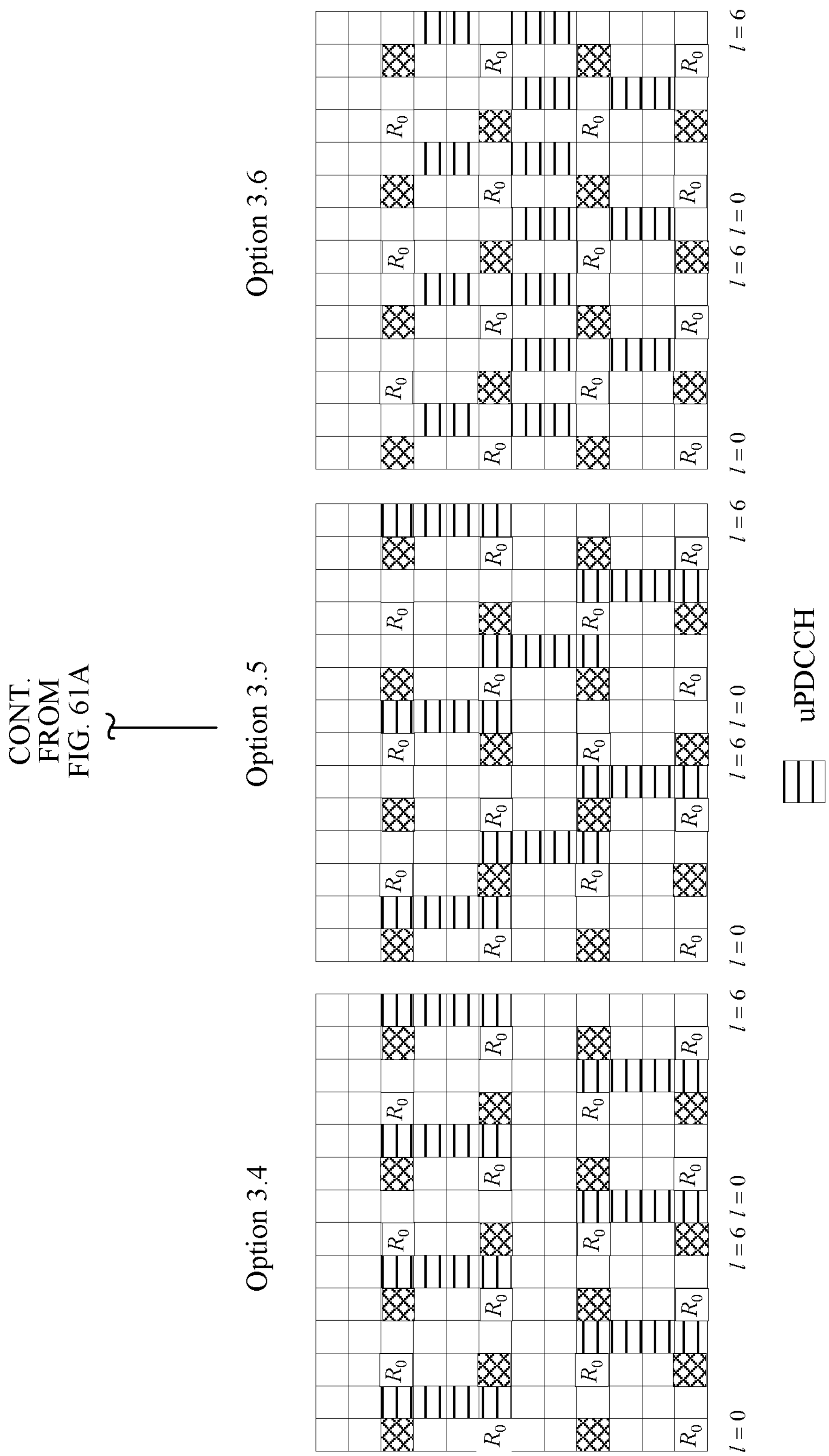

2. Two antenna ports: For a specific designed CRS pattern, refer to FIG. 59. There are two types of specific uPDCCH patterns. For a pattern in which a uPDCCH occupies two REs in every two OFDM symbols, refer to FIG. 60A and FIG. 60B. For a pattern in which a uPDCCH occupies four REs in every two OFDM symbols, refer to FIG. 61A and FIG. 61B. A first timeslot and a second timeslot are symmetric, but a seventh symbol in the second timeslot has no RE of a uPDCCH. For the uPDCCH pattern in which a uPDCCH occupies four REs in every two OFDM symbols, resources of data parts of all symbols are the same. This facilitates continuous scheduling by a base station. A frequency diversity gain may be obtained in all options. In a case of an ECP, a uPDCCH pattern may be obtained by deleting a seventh column of a uPDCCH pattern in a case of an NCP, and a CRS pattern in a second timeslot is a repetition of a CRS pattern in a first timeslot.

Figure 62A:
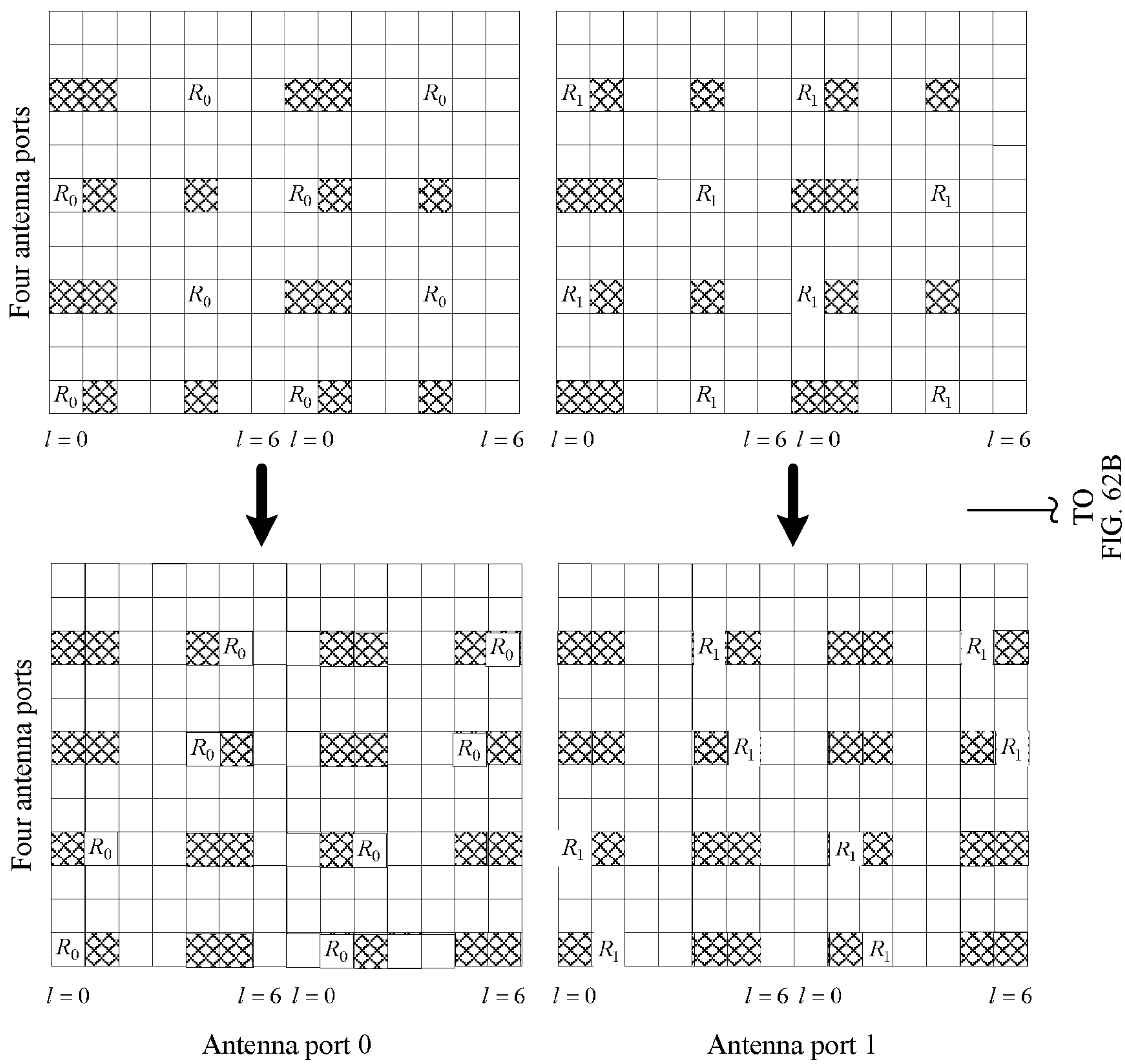
FIG. 62A and FIG. 62B are a schematic diagram of a change of a CRS pattern in a case of an NCP when a terminal has four antenna ports in a third option in Solution 2.
Figure 62B:
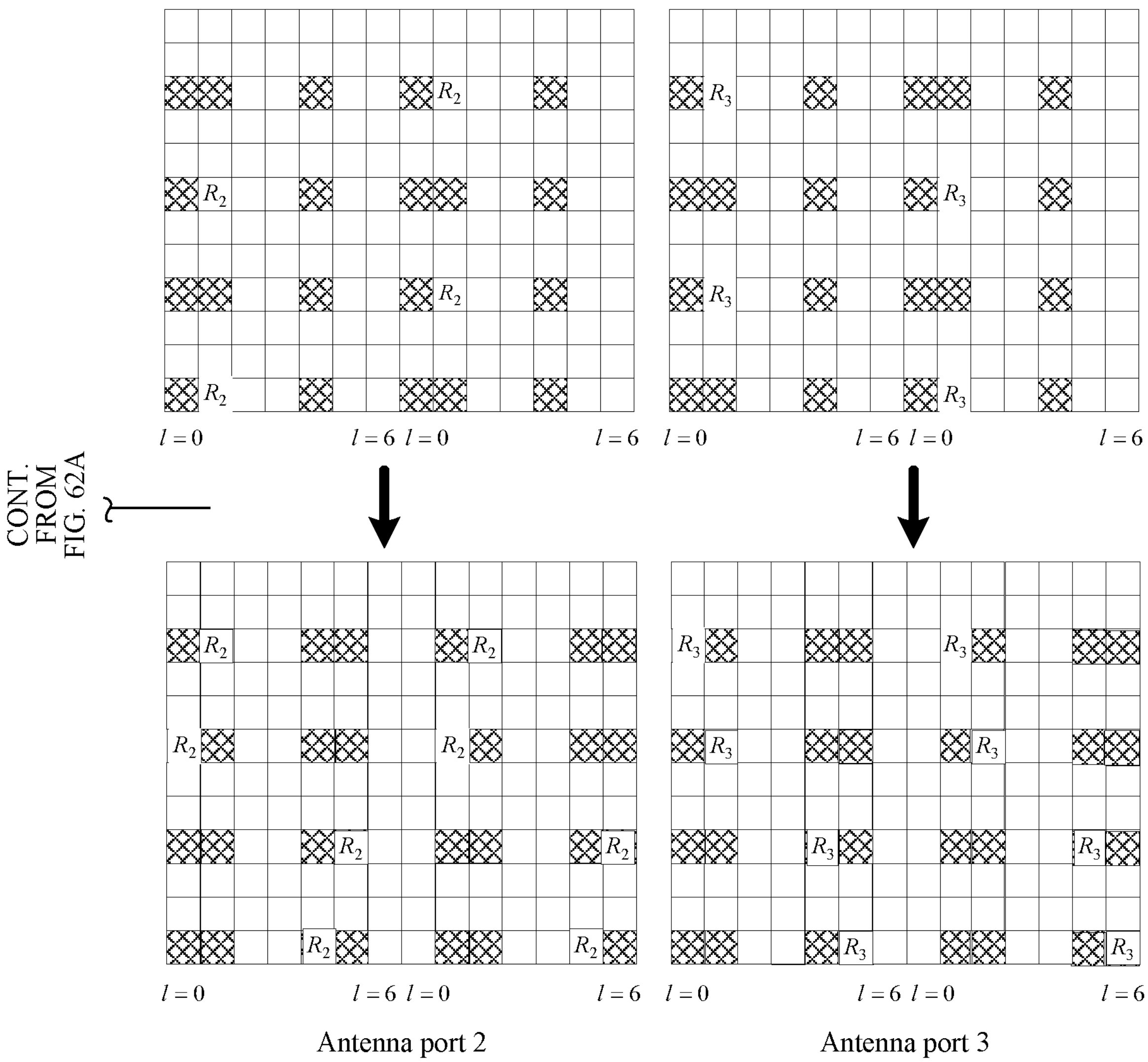
Figure 63A:
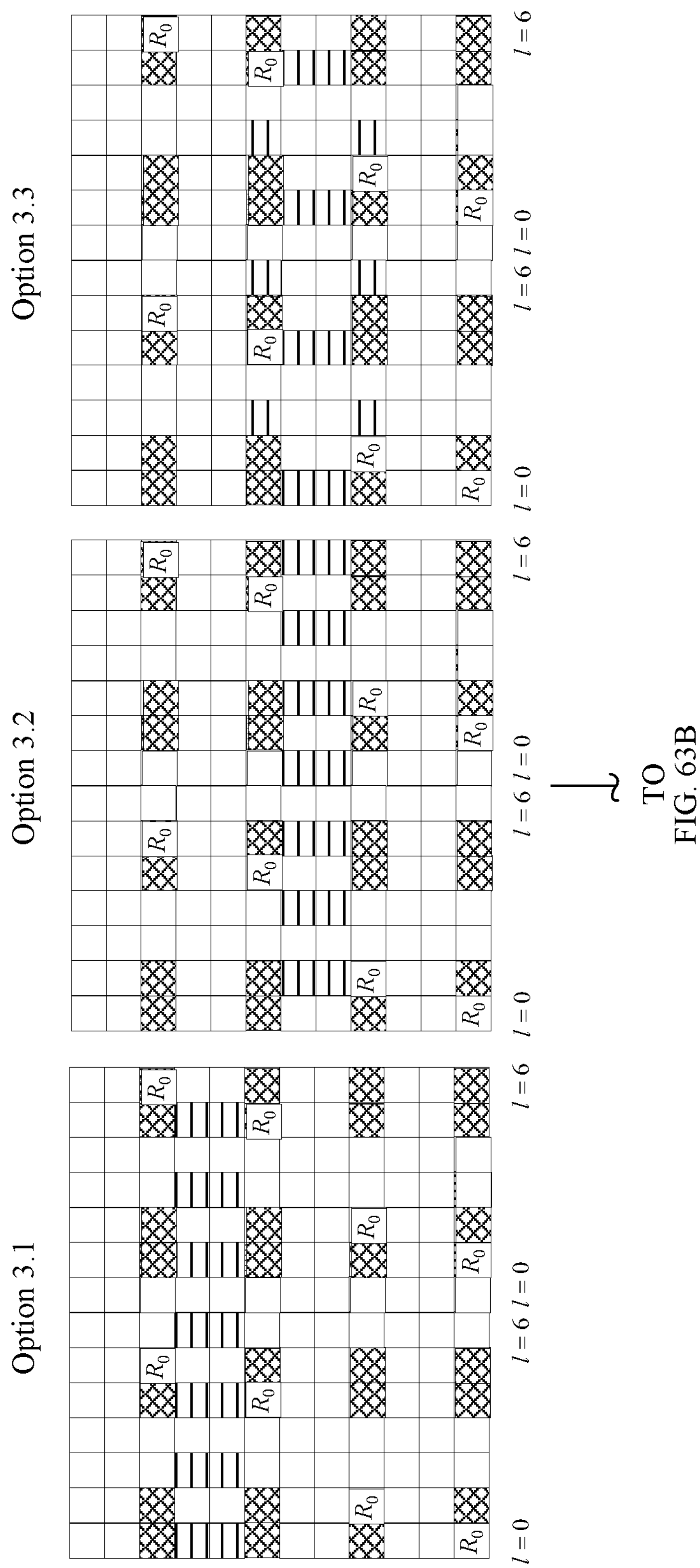
FIG. 63A and FIG. 63B are a schematic diagram of CRS and uPDCCH patterns in a case of an NCP when a terminal has four antenna ports in a third option in Solution 2.
Figure 63B:
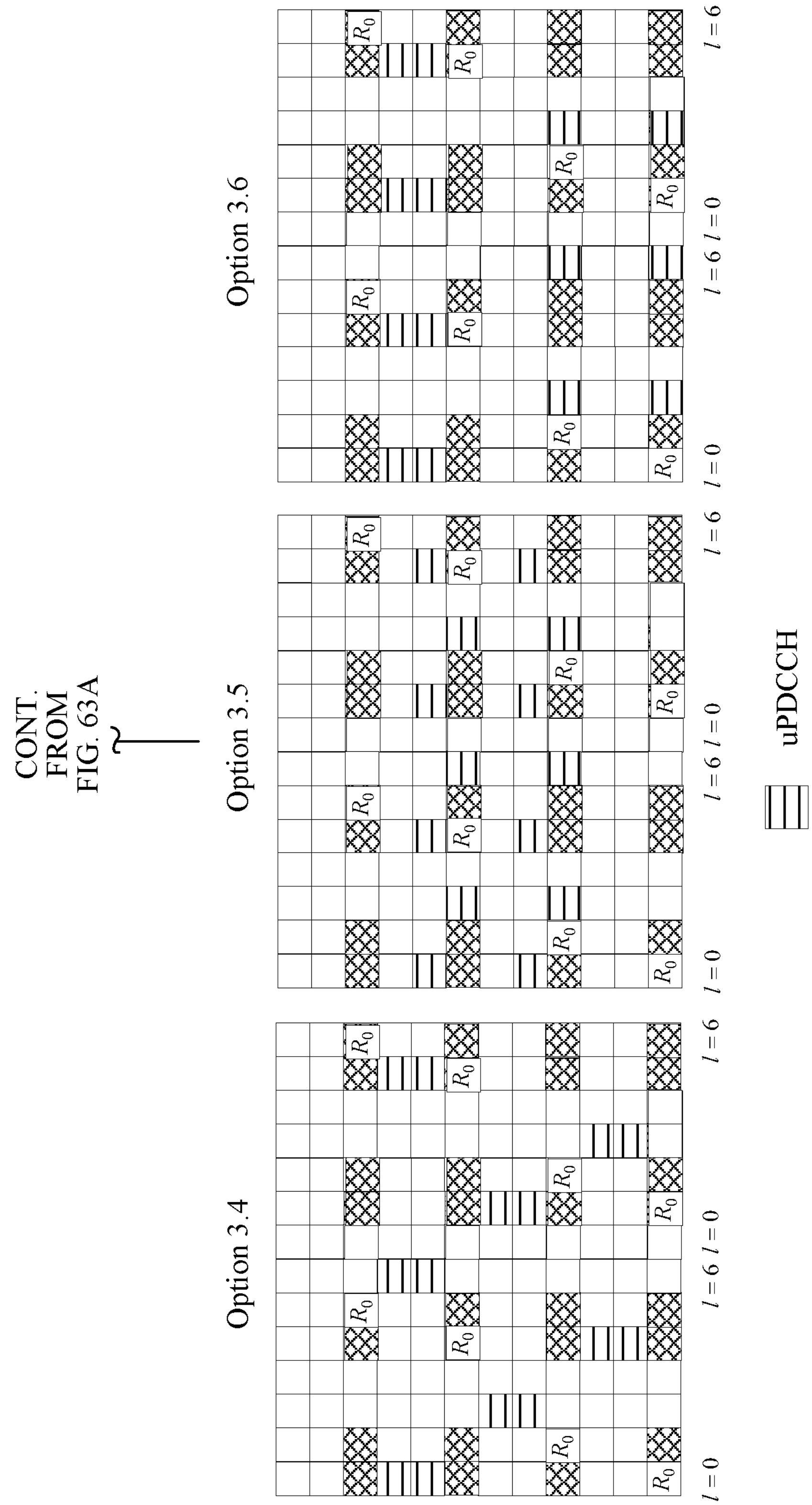
Figure 64A:
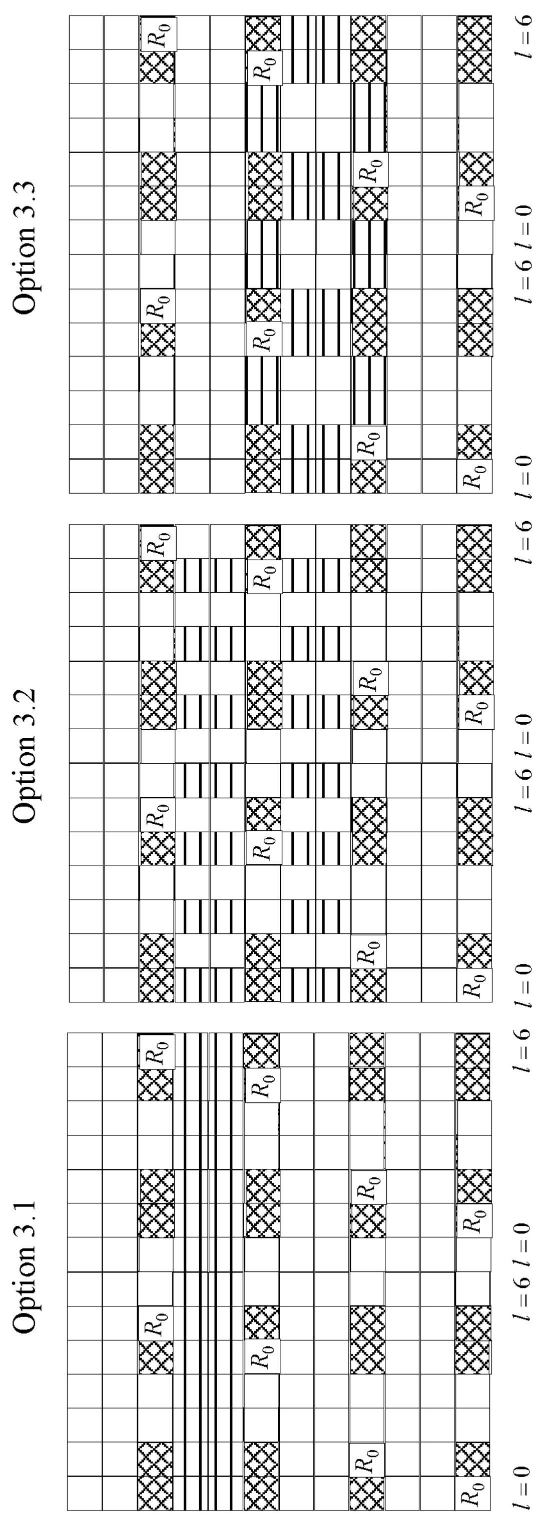
FIG. 64A and FIG. 64B are a schematic diagram of CRS and uPDCCH patterns in a case of an NCP when a terminal has four antenna ports in a third option in Solution 2.
Figure 64B:
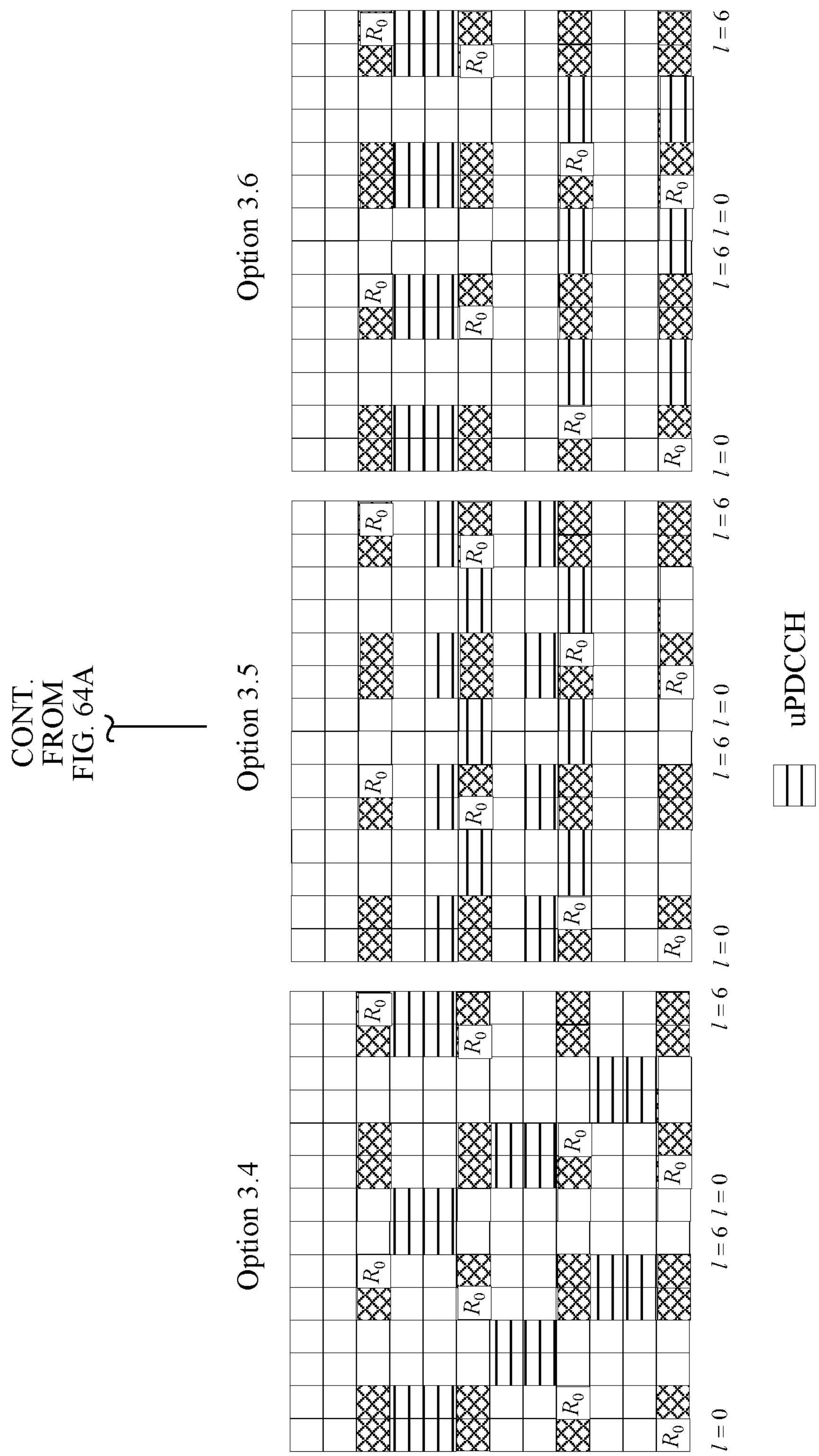

3. Four antenna ports: Because there are more CRSs of four antenna ports, in a designed CRS pattern, two symbols have CRSs, and two symbols have no CRS. The symbols having the CRSs include CRSs of all the four antennas. Certainly, there are many optional CRS patterns. For a specific CRS pattern, refer to FIG. 62A and FIG. 62B. There are two types of specific uPDCCH patterns. For a pattern in which a uPDCCH occupies two REs in every two OFDM symbols, refer to FIG. 63A and FIG. 63B. For a pattern in which a uPDCCH occupies four REs in every two OFDM symbols, refer to FIG. 64A and FIG. 64B. A frequency diversity gain may be obtained in all options in FIG. 63A, FIG. 63B, FIG. 64A, and FIG. 64B. In a case of an ECP, a uPDCCH pattern may be obtained by deleting a thirteenth column and a fourteenth column of a uPDCCH pattern in a case of an NCP.

Figure 65A:
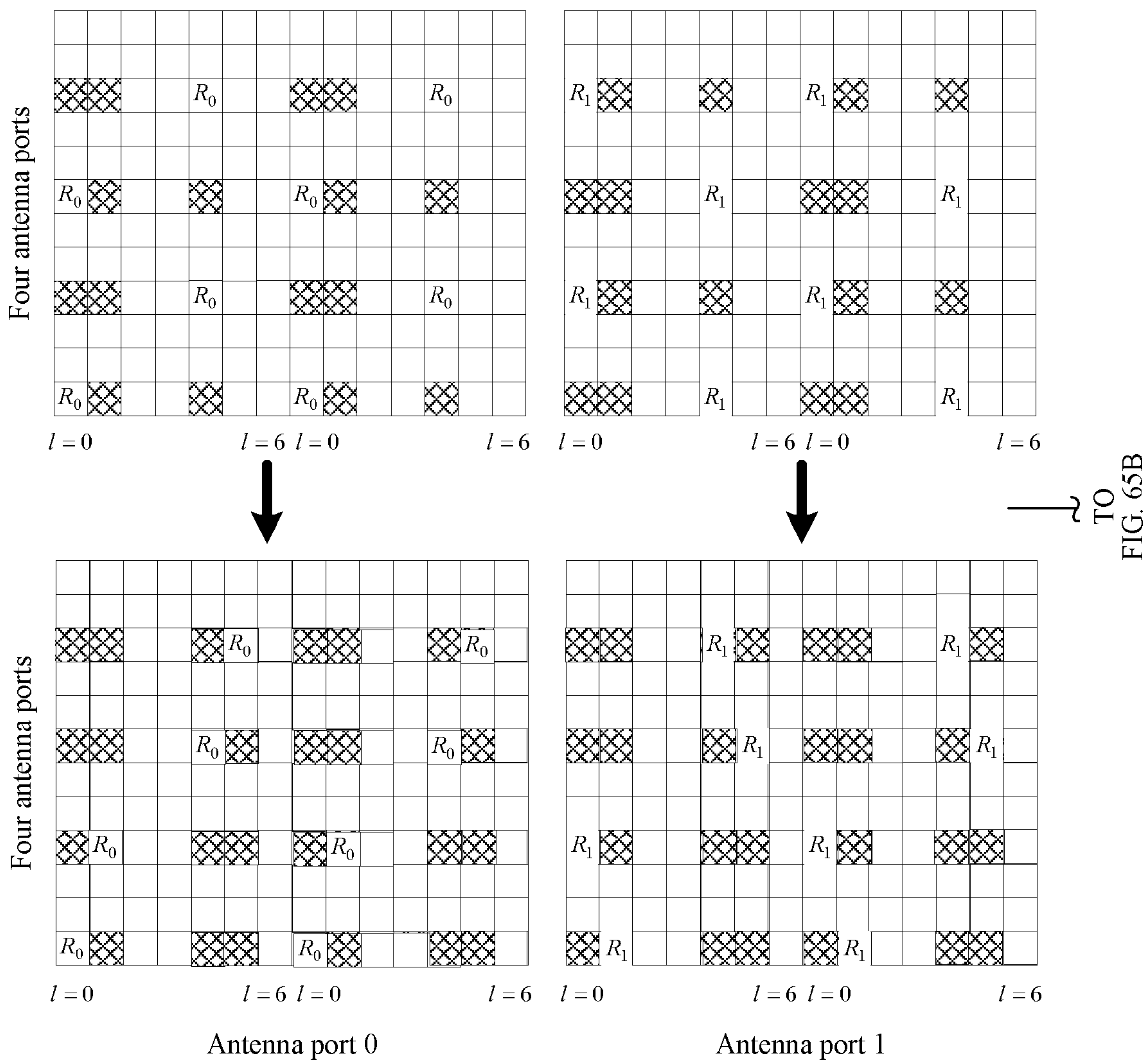
FIG. 65A and FIG. 65B are a schematic diagram of a change of a CRS pattern in a case of an NCP when a terminal has four antenna ports in a third option in Solution 2.
Figure 65B:
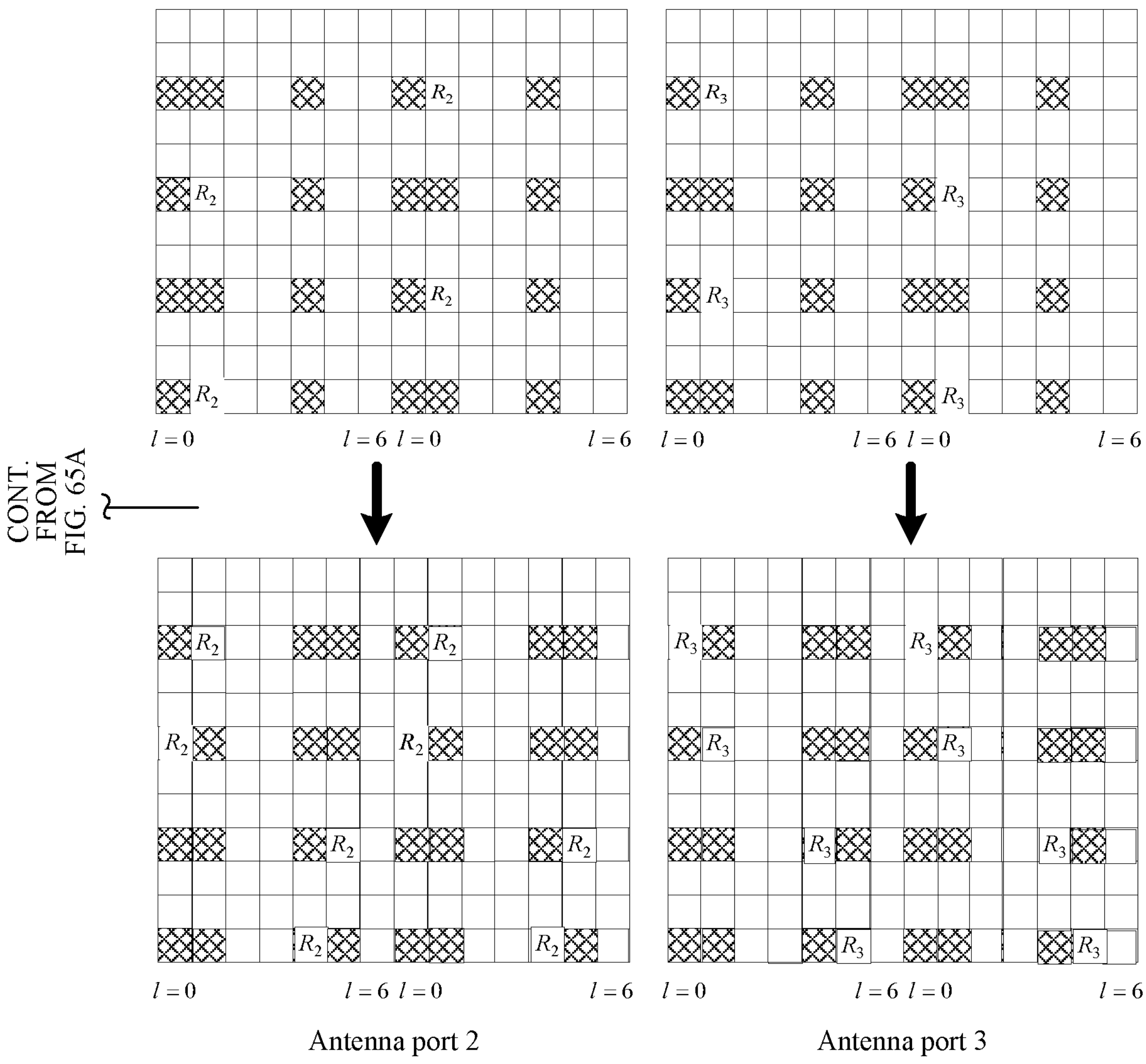

The foregoing solution of the CRS pattern is a solution of the even CRS pattern. In another solution of an even CRS pattern, locations of R0, R1, R2, and R3 may be interchanged, to implement other even locations. FIG. 65A and FIG. 65B show an example of an uneven CRS pattern, so that a first timeslot and a second timeslot are symmetric. Similarly, another example of an uneven CRS pattern may be implemented by interchanging the locations of R0, R1, R2, and R3.

The following analyzes a CRS pattern and a uPDCCH pattern obtained when two OFDM symbols are used as a transmission unit, Option 4 is used, and there is one antenna port, two antenna ports, or four antenna ports.

1. One Antenna Port

Figure 66:
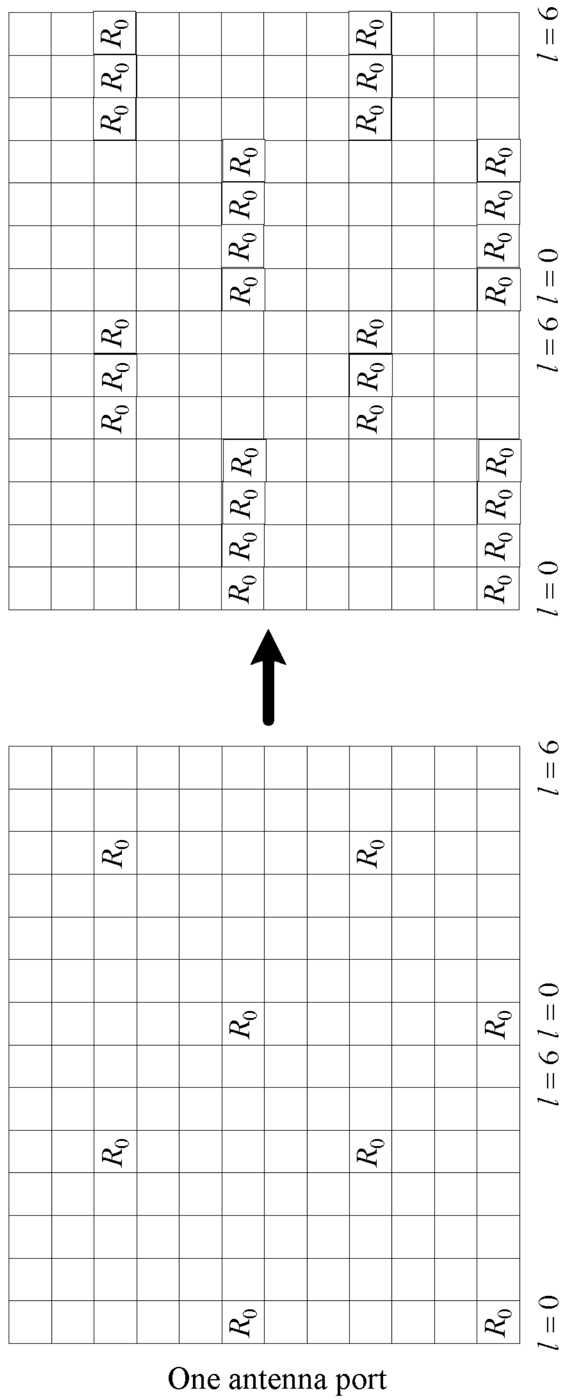
FIG. 66 is a schematic diagram of a change of a CRS pattern in a case of an NCP when a terminal has one antenna port in a fourth option in Solution 2.
Figure 67A:
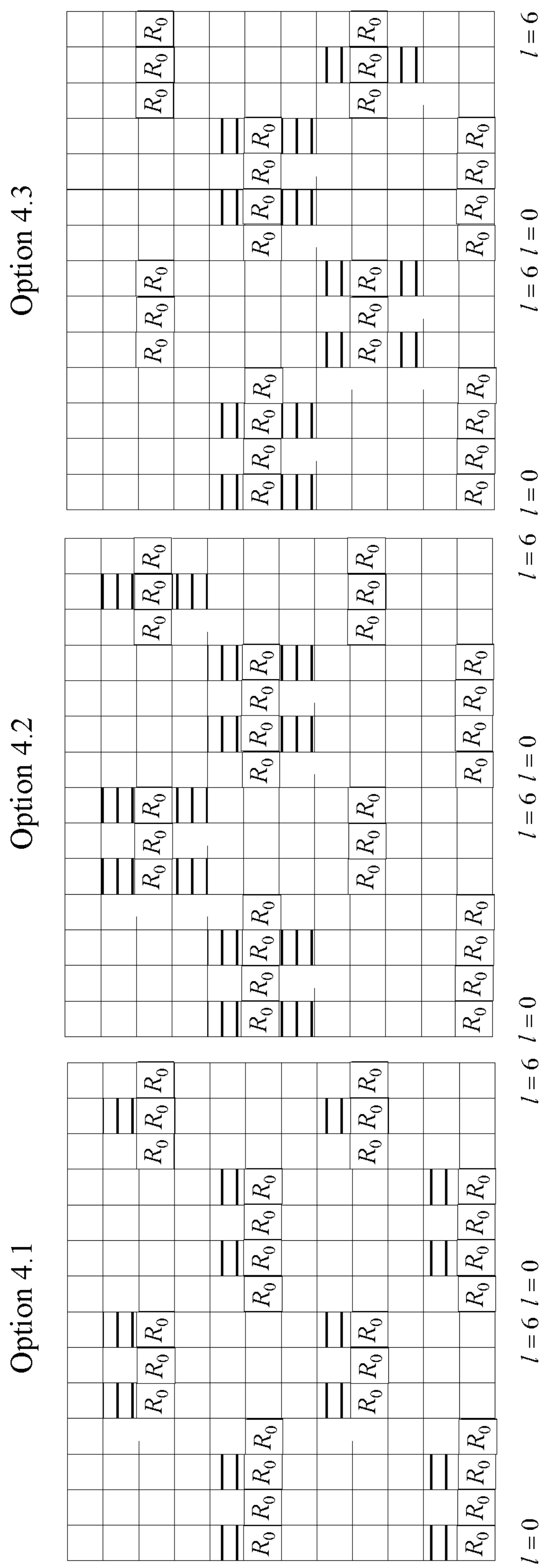
FIG. 67A and FIG. 67B are a schematic diagram of CRS and uPDCCH patterns in a case of an NCP when a terminal has one antenna port in a fourth option in Solution 2.
Figure 67B:
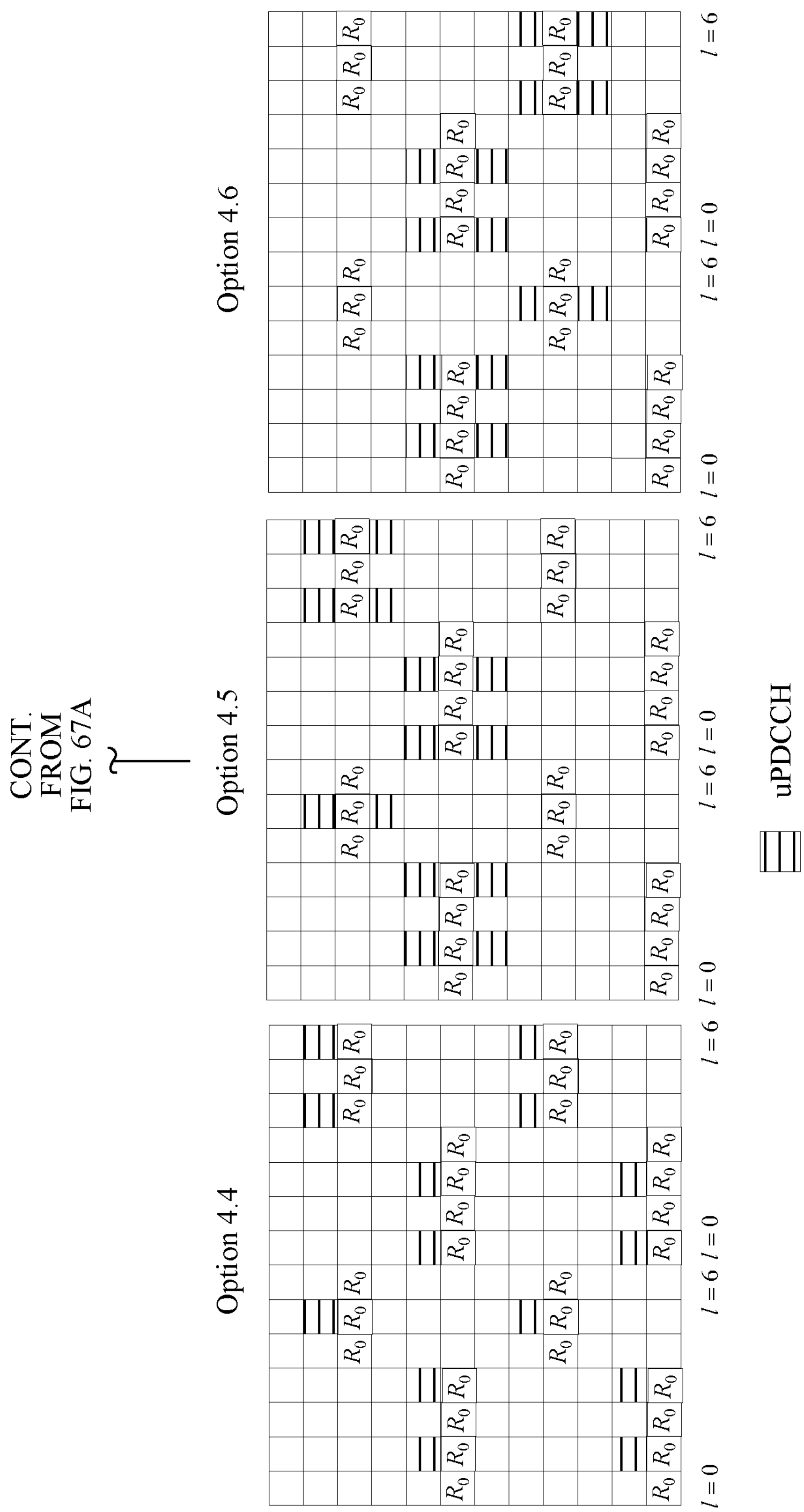
Figure 68A:
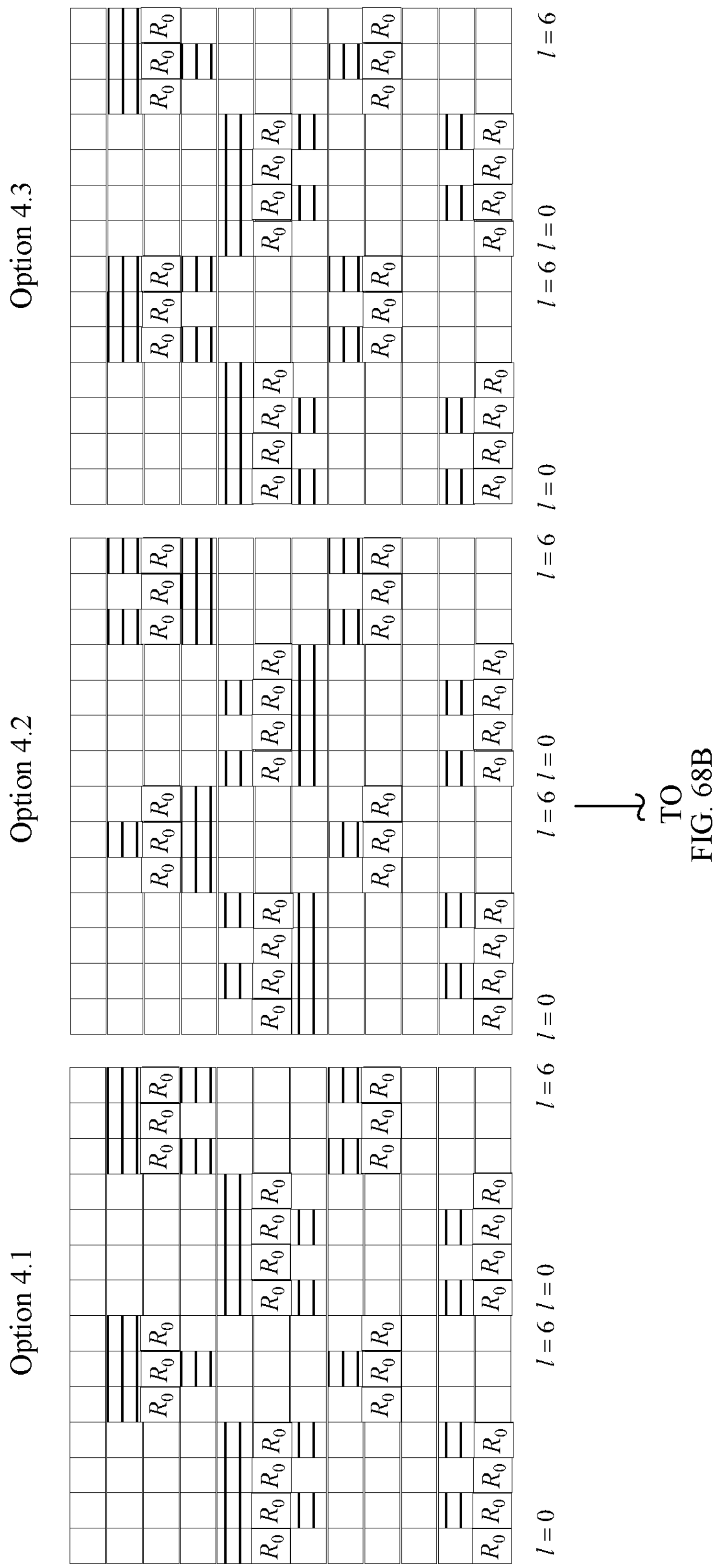
FIG. 68A and FIG. 68B are another schematic diagram of CRS and uPDCCH patterns in a case of an NCP when a terminal has one antenna port in a fourth option in Solution 2.
Figure 68B:
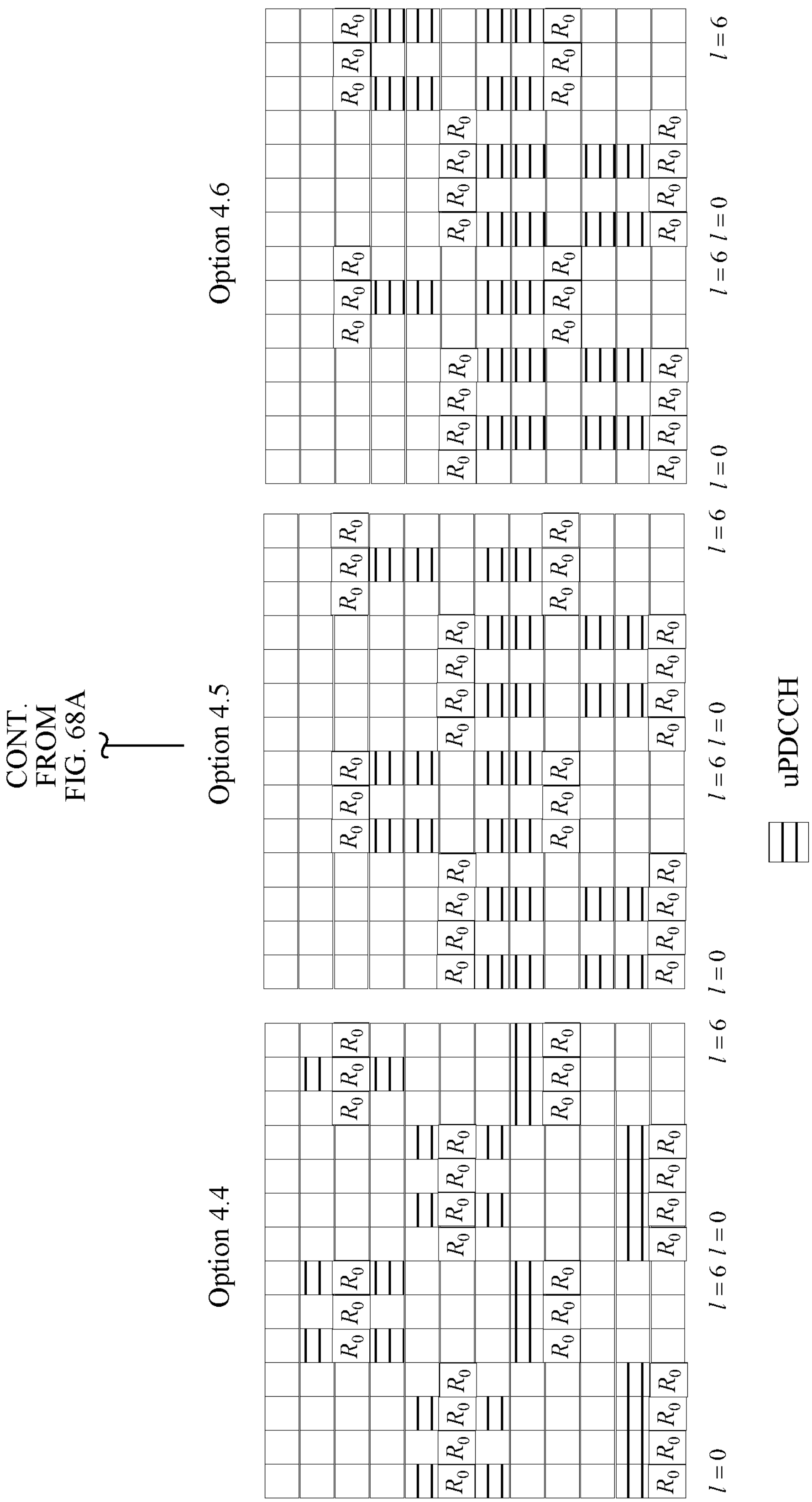

For a specific designed CRS pattern, refer to FIG. 66. Certainly, there may also be another CRS pattern. There are two types of specific uPDCCH patterns. For a pattern in which a uPDCCH occupies two REs in every two OFDM symbols, refer to FIG. 67A and FIG. 67B. For a pattern in which a uPDCCH occupies four REs in every two OFDM symbols, refer to FIG. 68A and FIG. 68B. A frequency diversity gain may be obtained in all options in FIG. 67A, FIG. 67B, FIG. 68A, and FIG. 68B. In a case of an ECP, a uPDCCH pattern may be obtained by deleting a fourth column of a uPDCCH pattern in a case of an NCP.

2. Two Antenna Ports

Figure 69:
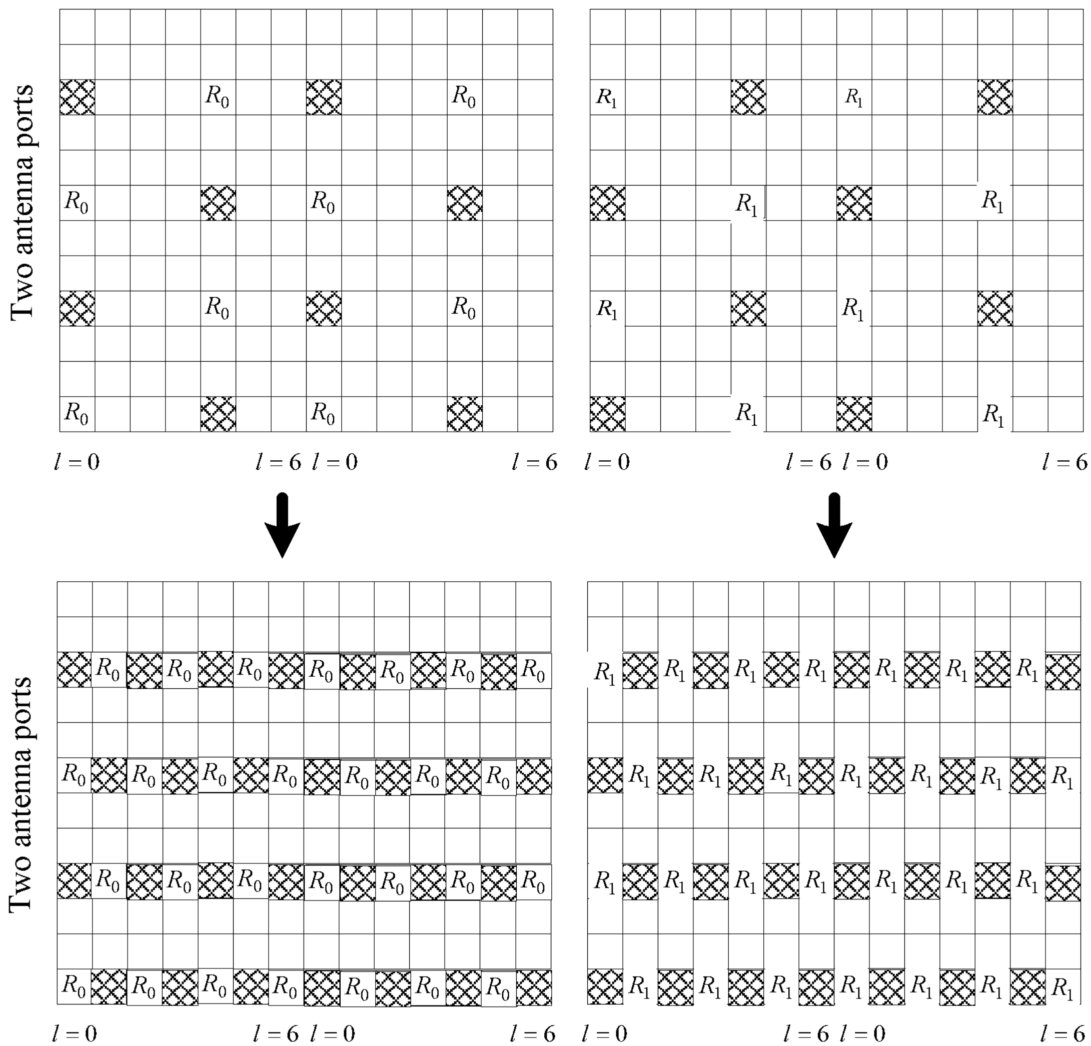
FIG. 69 is a schematic diagram of a change of a CRS pattern in a case of an NCP when a terminal has two antenna ports in a fourth option in Solution 2.
Figure 70A:
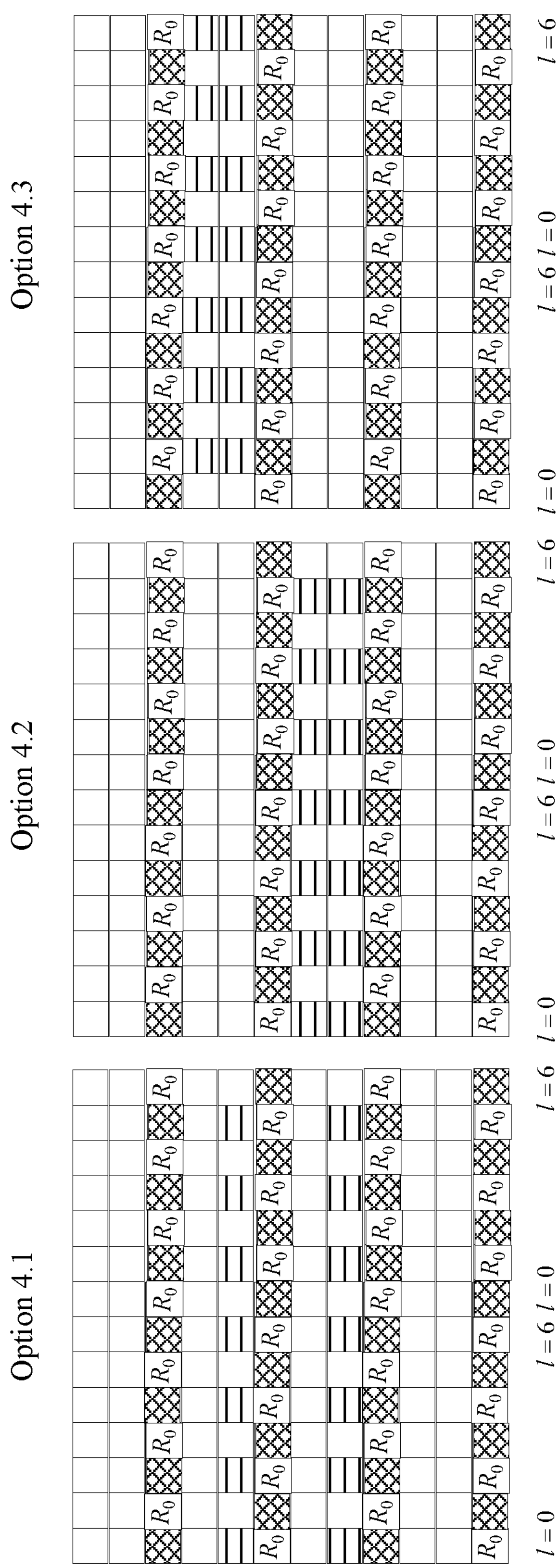
FIG. 70A and FIG. 70B are a schematic diagram of CRS and uPDCCH patterns in a case of an NCP when a terminal has two antenna ports in a fourth option in Solution 2.
Figure 70B:
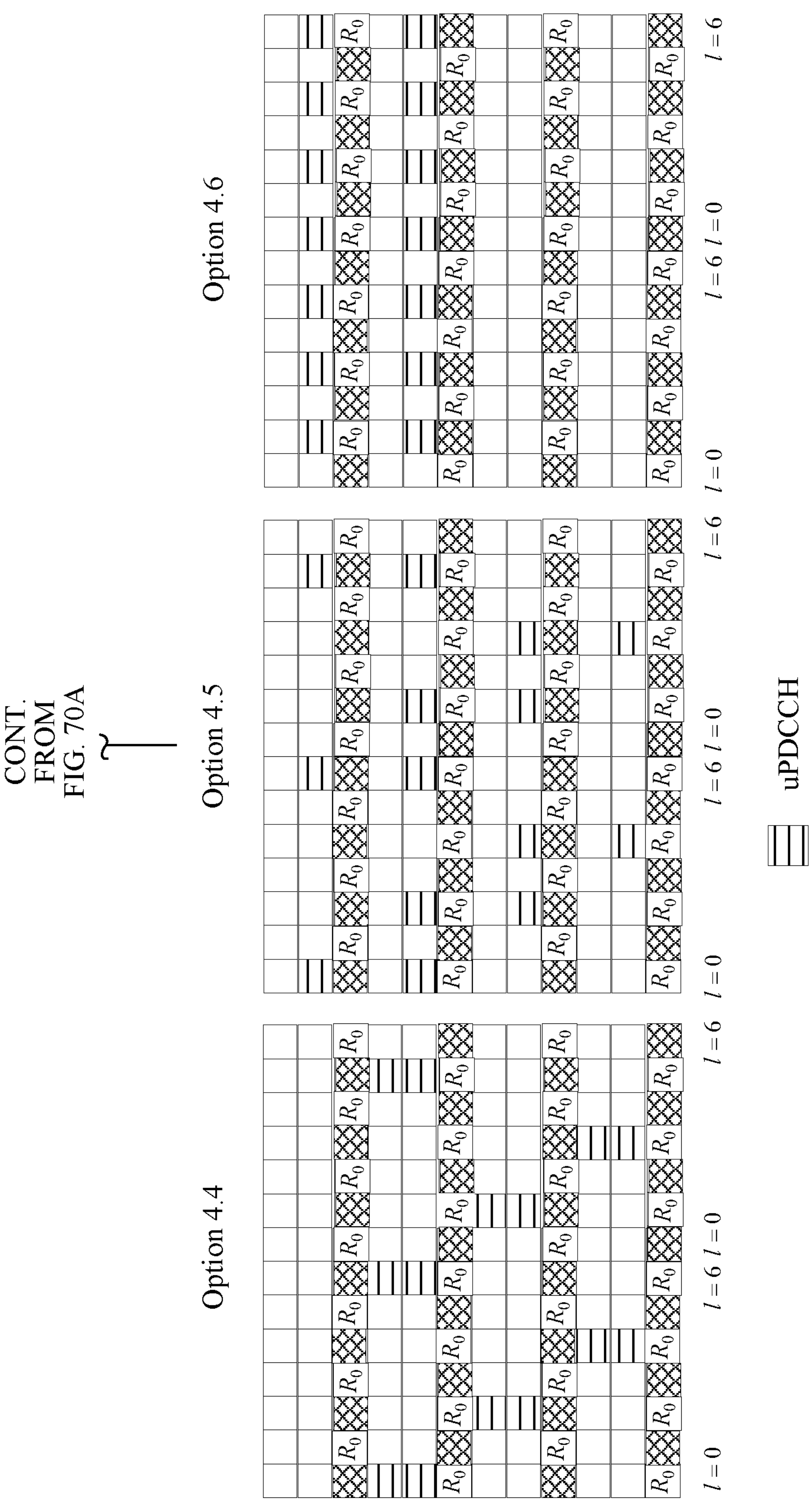
Figure 71A:
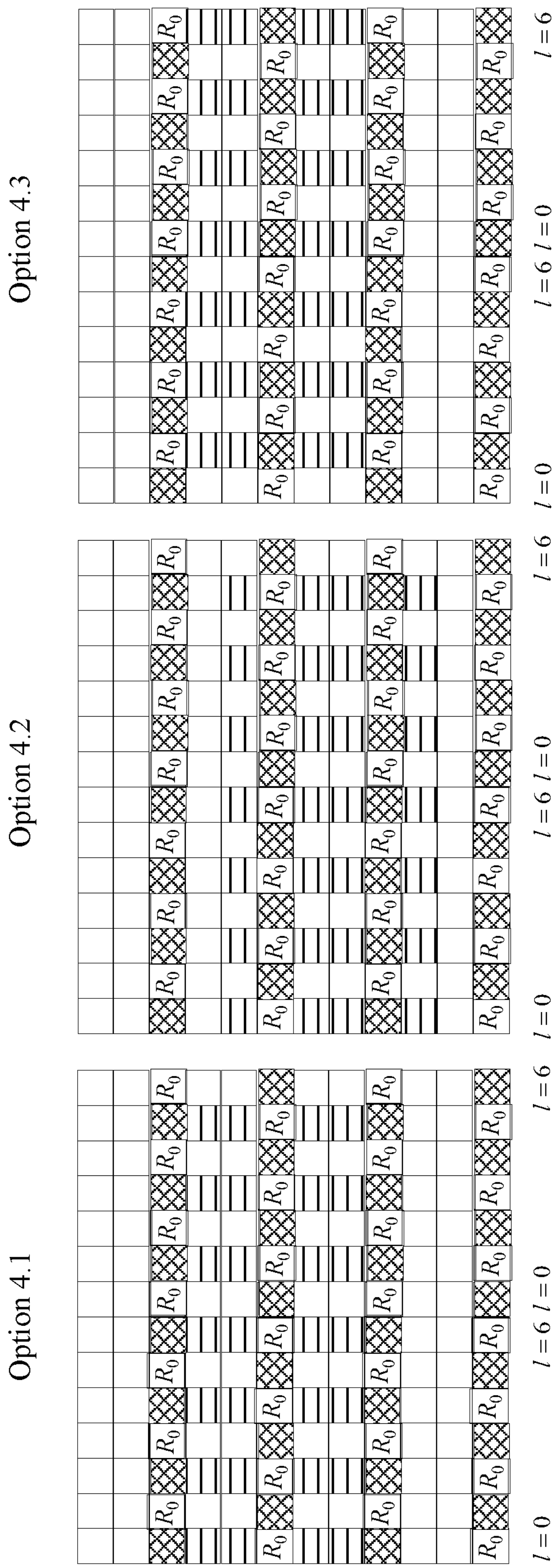
FIG. 71A and FIG. 71B are a schematic diagram of CRS and uPDCCH patterns in a case of an NCP when a terminal has two antenna ports in a fourth option in Solution 2.
Figure 71B:
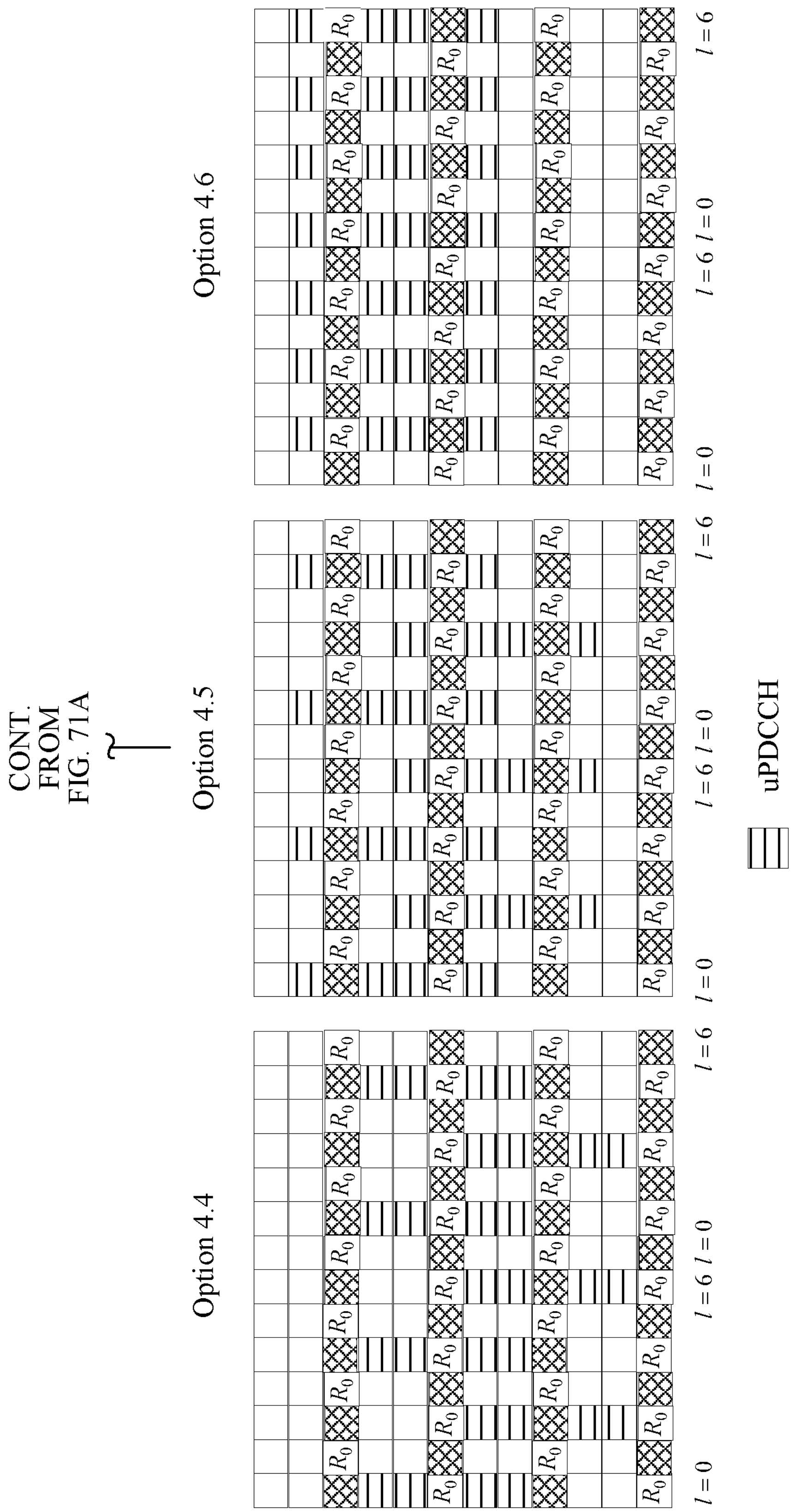

For a specific designed CRS pattern, refer to FIG. 69. There are two types of specific uPDCCH patterns. For a pattern in which a uPDCCH occupies two REs in every two OFDM symbols, refer to FIG. 70A and FIG. 70B. For a pattern in which a uPDCCH occupies four REs in every two OFDM symbols, refer to FIG. 71A and FIG. 71B. A frequency diversity gain may be obtained in all options in FIG. 70A, FIG. 70B, FIG. 71A, and FIG. 71B. In a case of an ECP, a uPDCCH pattern may be obtained by deleting a fourth column of a uPDCCH pattern in a case of an NCP.

3. Four Antenna Ports

Figure 72A:
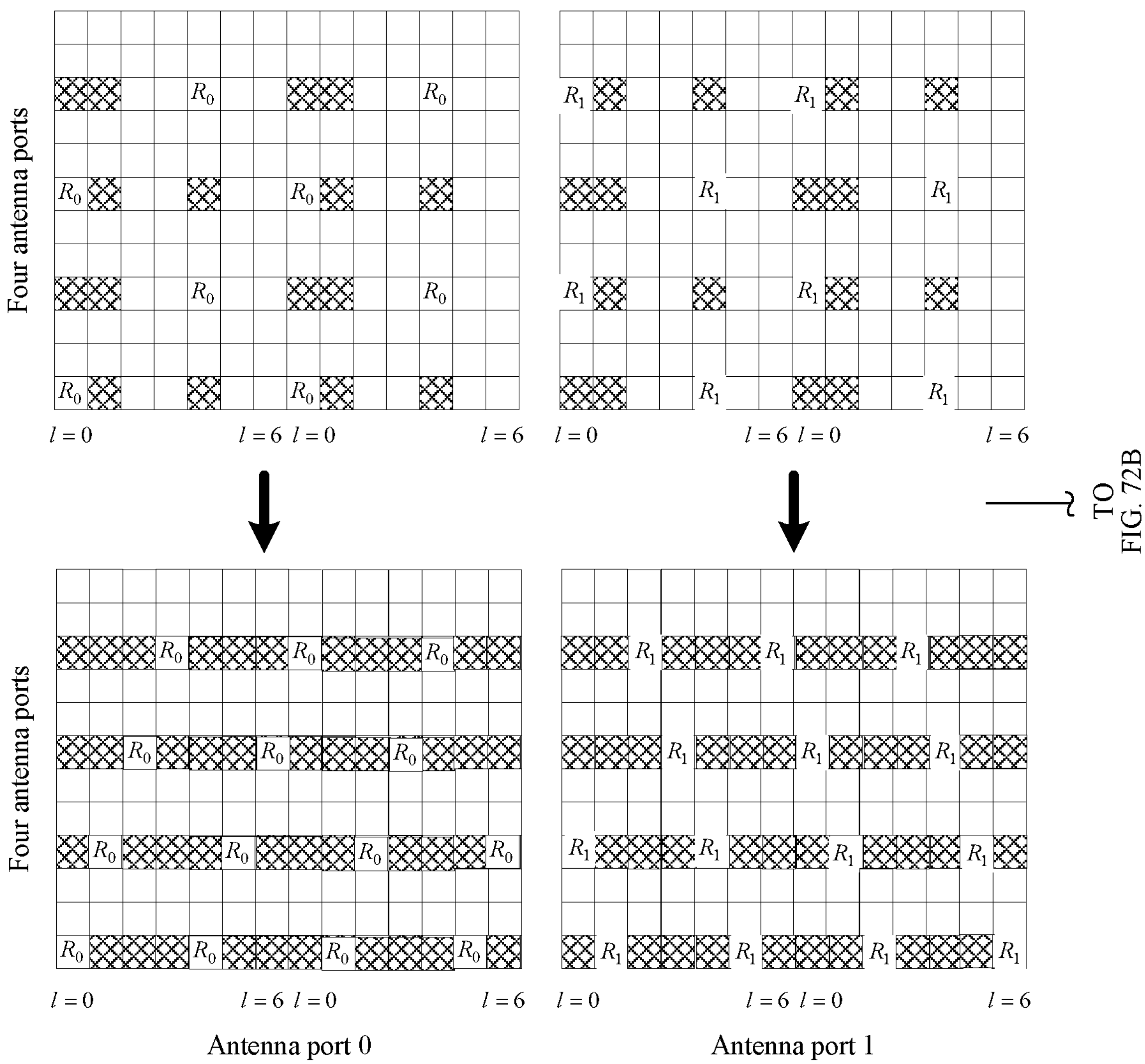
FIG. 72A and FIG. 72B are a schematic diagram of a change of a CRS pattern in a case of an NCP when a terminal has four antenna ports in a fourth option in Solution 2.
Figure 72B:
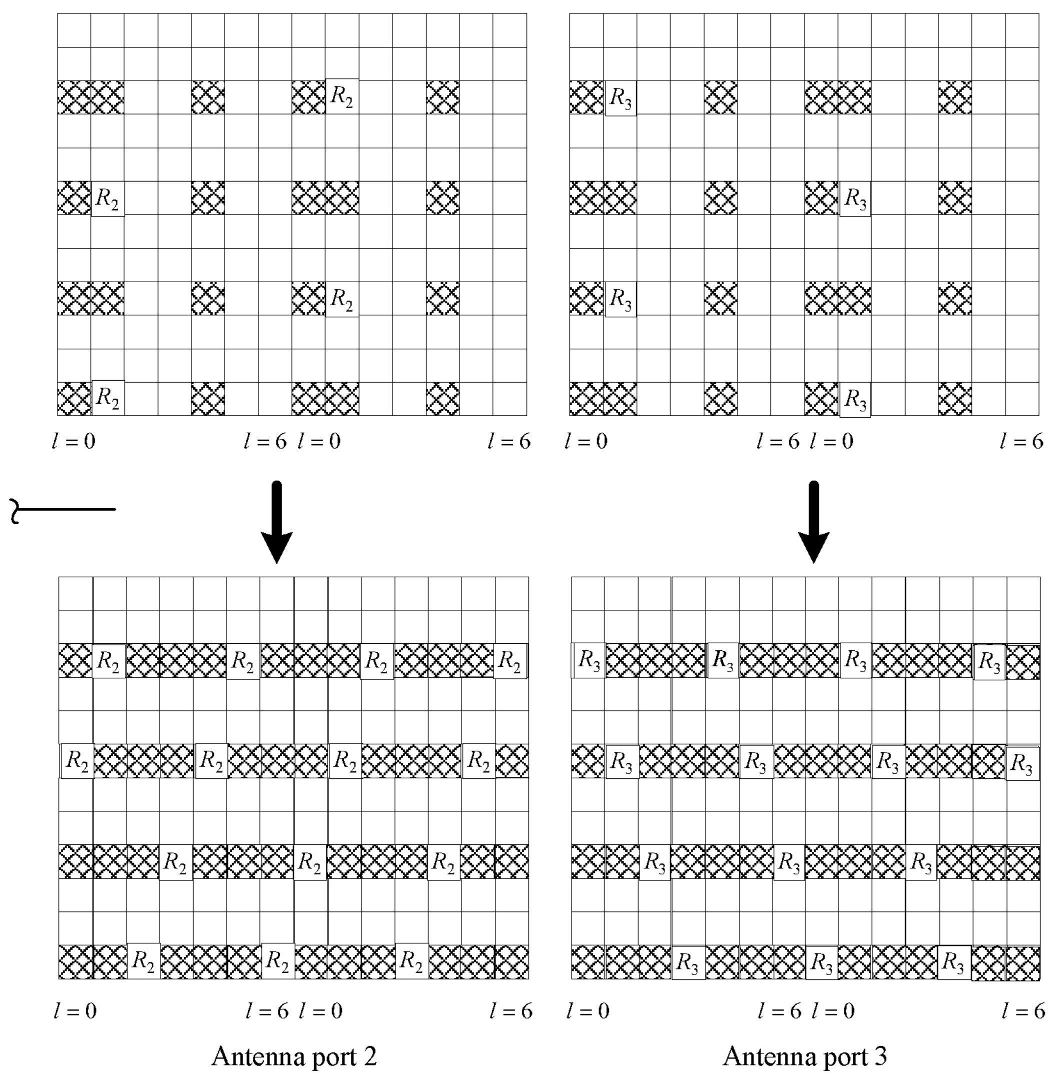
Figure 73A:
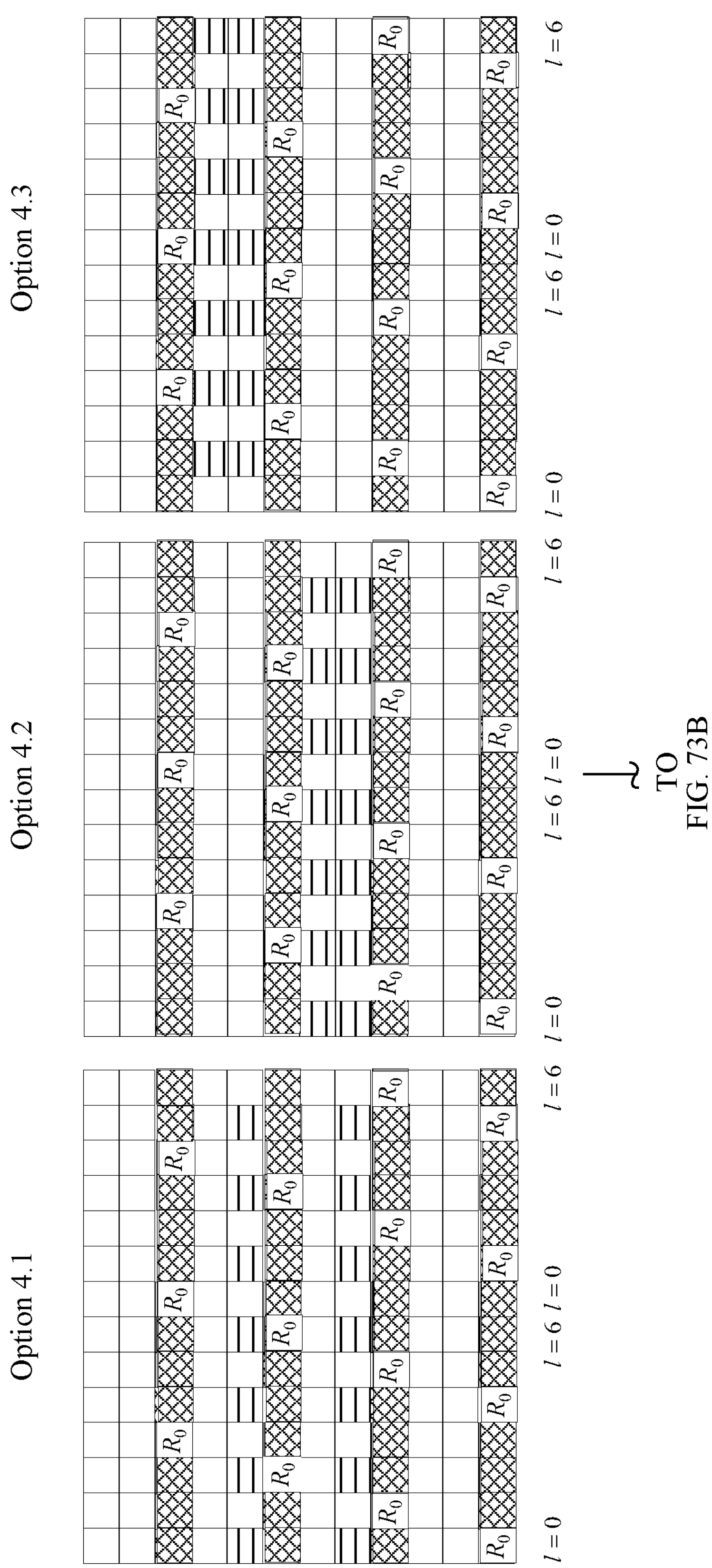
FIG. 73A and FIG. 73B are a schematic diagram of CRS and uPDCCH patterns in a case of an NCP when a terminal has four antenna ports in a fourth option in Solution 2.
Figure 73B:
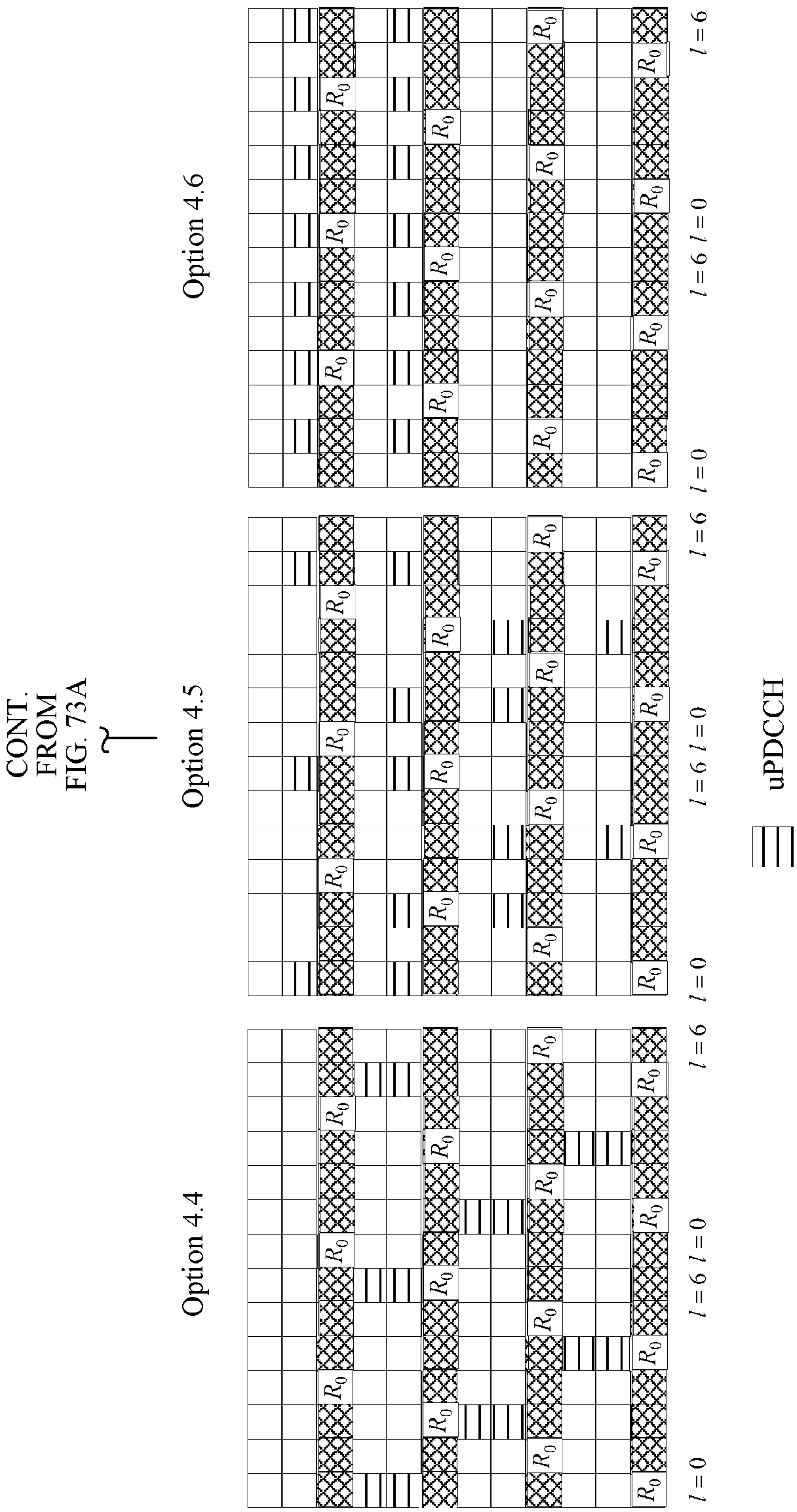
Figure 74A:
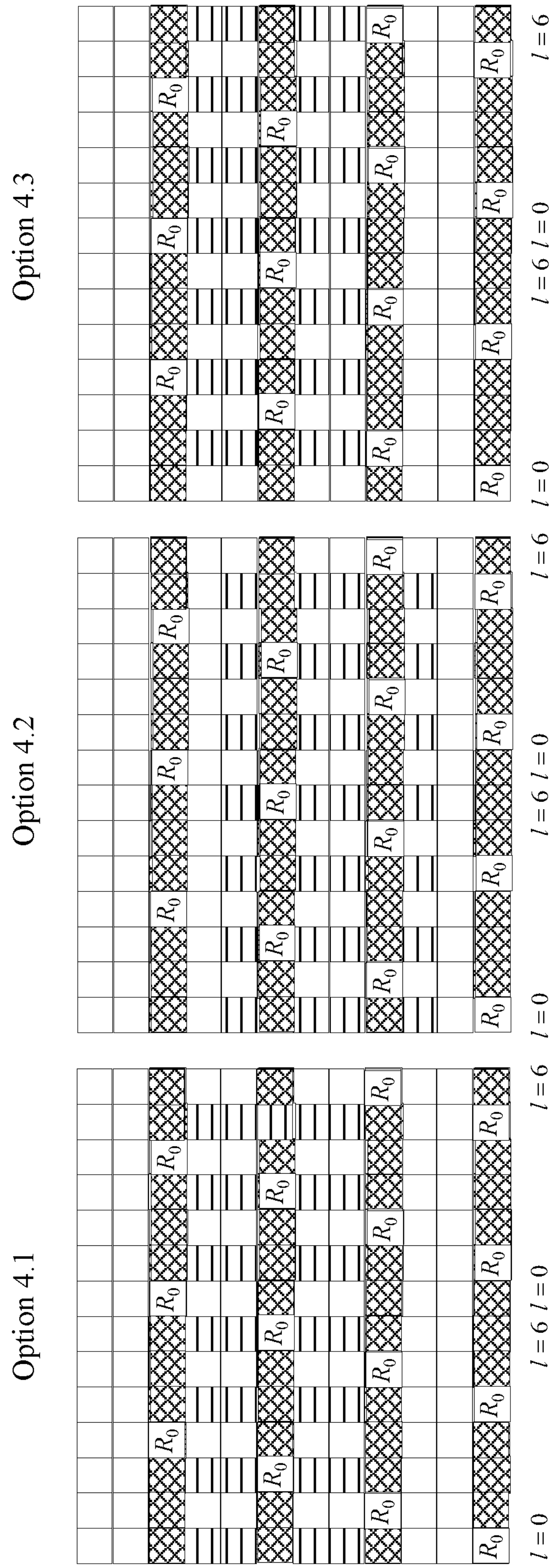
FIG. 74A and FIG. 74B are another schematic diagram of CRS and uPDCCH patterns in a case of an NCP when a terminal has four antenna ports in a fourth option in Solution 2.
Figure 74B:
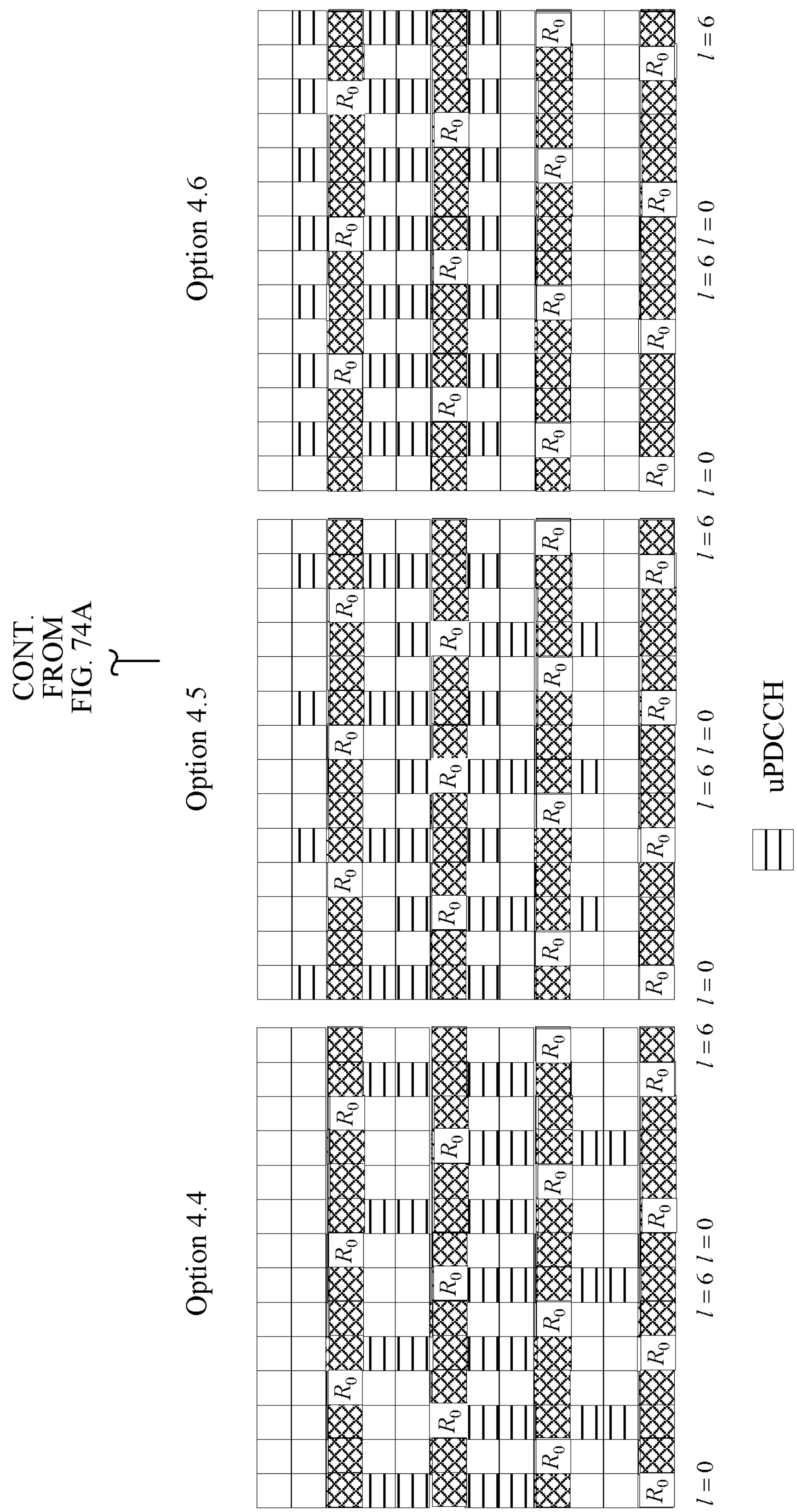

For a specific CRS pattern, refer to FIG. 72A and FIG. 72B. There are two types of specific uPDCCH patterns. For a pattern in which a uPDCCH occupies two REs in every two OFDM symbols, refer to FIG. 73A and FIG. 73B. For a pattern in which a uPDCCH occupies four REs in every two OFDM symbols, refer to FIG. 74A and FIG. 74B. A frequency diversity gain may be obtained in all options in FIG. 73A, FIG. 73B, FIG. 74A, and FIG. 74B. In a case of an ECP, a uPDCCH pattern may be obtained by deleting a fourth column of a uPDCCH pattern in a case of an NCP. The analysis herein is for a first timeslot, and a second timeslot is a repetition of the first timeslot; the same above.

Figure 75:
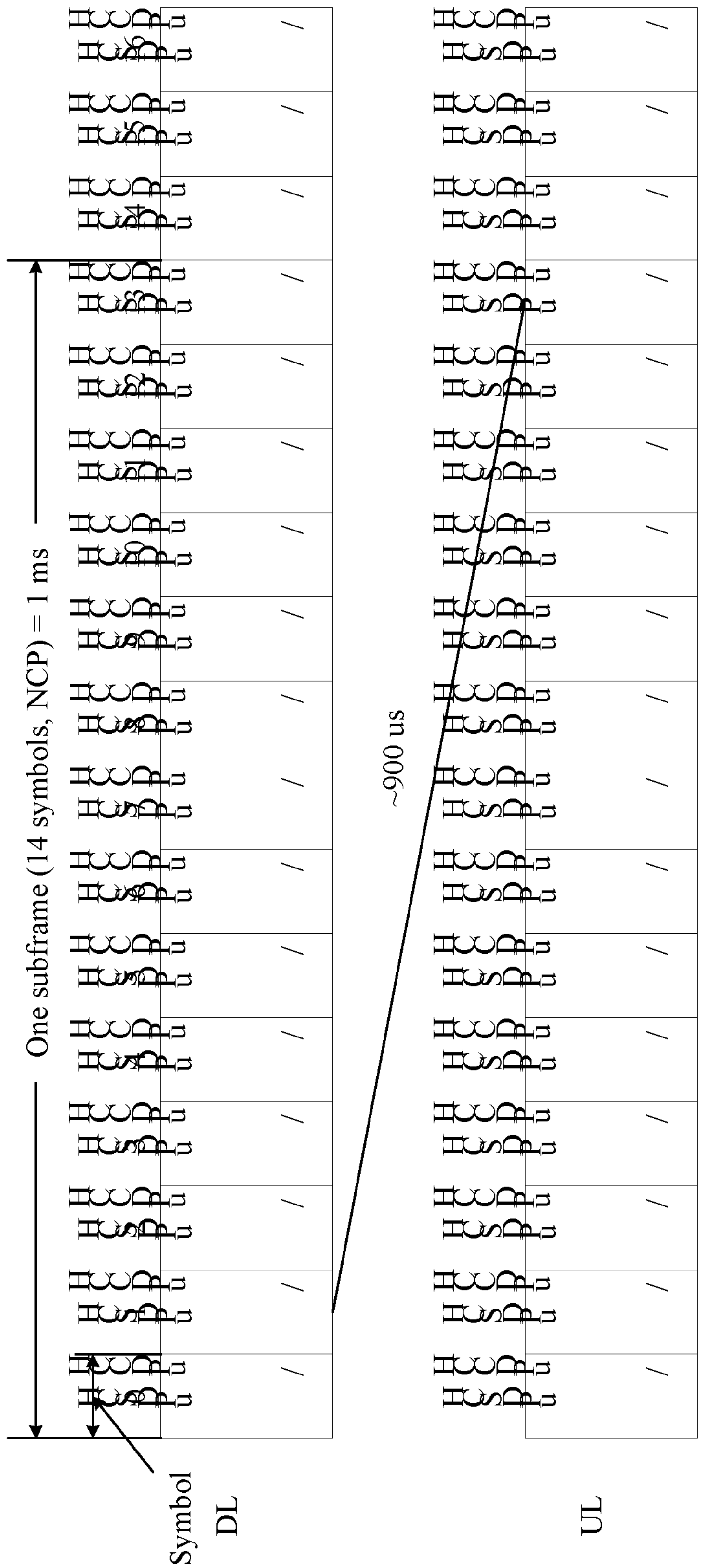
FIG. 75 is a schematic diagram of data transmission that three OFDM symbols are transmitted using an LTE technology according to an embodiment of the present disclosure.

As shown in FIG. 75, for a case of an NCP, duration of an OFDM symbol is approximately 70 μs. Therefore, if three OFDM symbols are used as a time transmission unit, a requirement that an end-to-end latency is less than 1 ms can be met. For example, as shown in FIG. 75, three OFDM symbols are a time transmission unit, and a HARQ transmission RTT is 70×3×4=840 μs, which is approximately 900 μs. Therefore, in a solution of the present disclosure, resources occupied by a corresponding control channel and data channel are designed based on the time transmission unit (three OFDM symbols).

A main design principle is as follows. Similar to that in the foregoing description, an RE of a uPDCCH is configured around an RE of a CRS, and may be closely adjacent to the RE of the CRS. An advantage is that channel estimation performance of the uPDCCH is relatively good, so that demodulation performance can be improved.

It should be noted herein that, an existing LTE subframe has 12 or 14 symbols in total. For a subframe having 14 symbols, every three symbols are a ULL downlink subframe. The symbols cannot be averaged, and therefore, a symbol of a next subframe needs to be used. In the following example of 14 subframes shown in the figure, the subframes need to be cyclically considered. Therefore, this solution has only Option 1 and Option 2. A specific design criterion of Option 1 and Option 2 is the same as the foregoing design in which one OFDM symbol is used as a time transmission unit, and details are not described herein again. A uPDCCH occupies six REs in each PRB of every three OFDM symbols.

The following analyzes a uPDCCH pattern obtained when three OFDM symbols are used as a transmission unit, Option 1 is used, and there is one antenna port or two antenna ports. For details, separately refer to FIG. 76 and FIG. 77.

Figure 76:
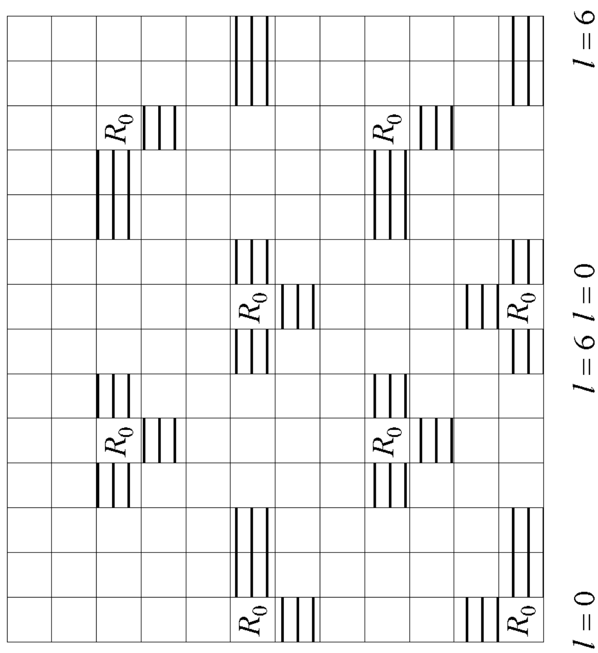
FIG. 76 is a schematic diagram of CRS and uPDCCH patterns in a case of an NCP when a terminal has one antenna port in a first option in Solution 3.
Figure 76:
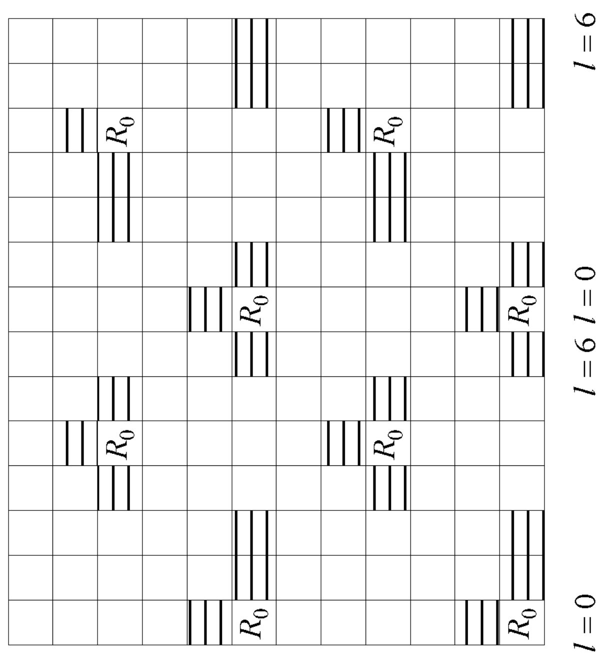
Figure 77:
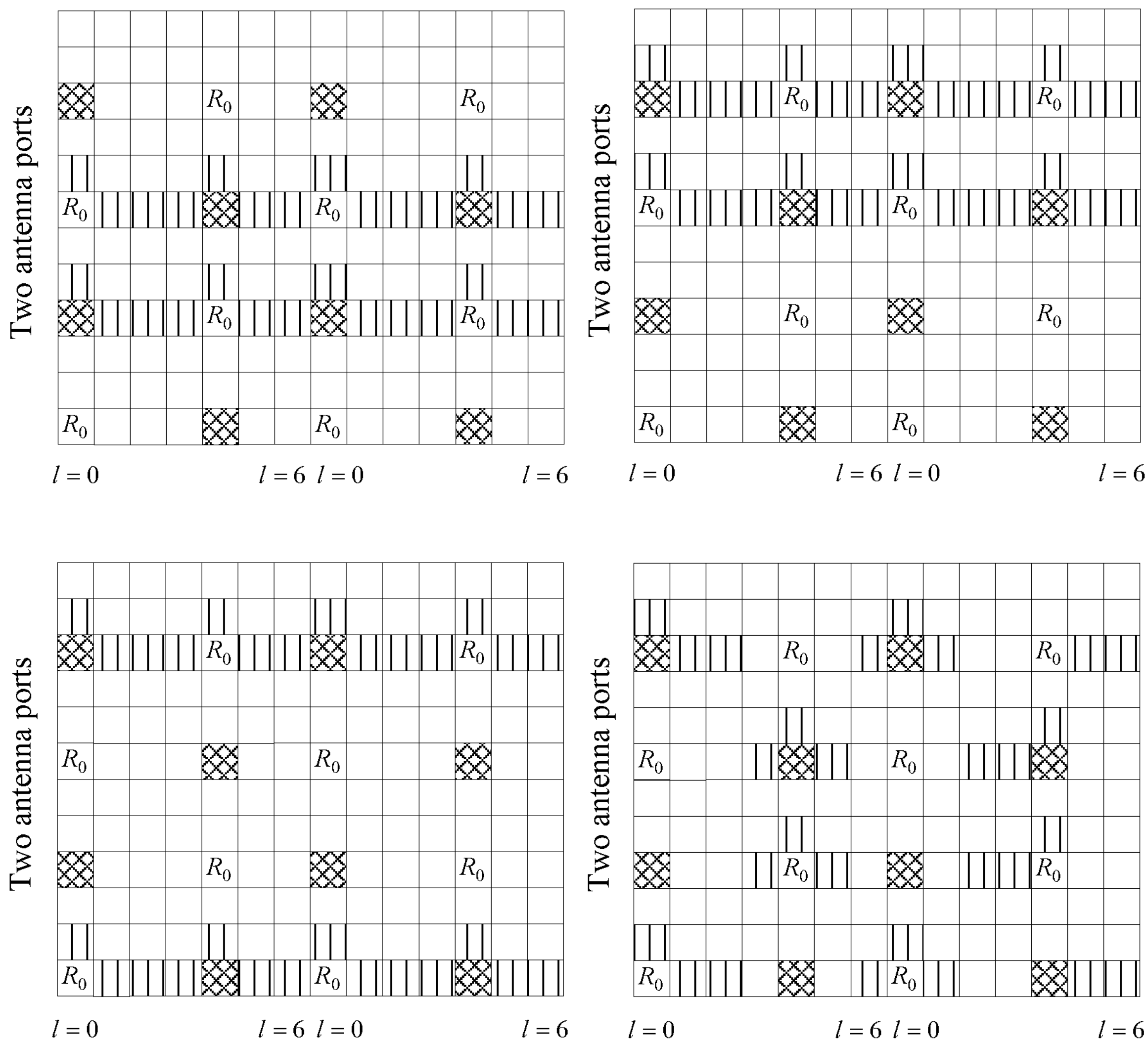
FIG. 77 is a schematic diagram of CRS and uPDCCH patterns in a case of an NCP when a terminal has two antenna ports in a first option in Solution 3.

In FIG. 76 and FIG. 77, an RE that is of a uPDCCH and that is above a reference signal may also be placed below the reference signal.

For an existing CRS pattern (a pattern of four antenna ports needs to be re-designed, and re-designing is not involved in this option. For a specific design, refer to Option 2), a uPDCCH occupies six REs in every three OFDM symbols.

Figure 78:
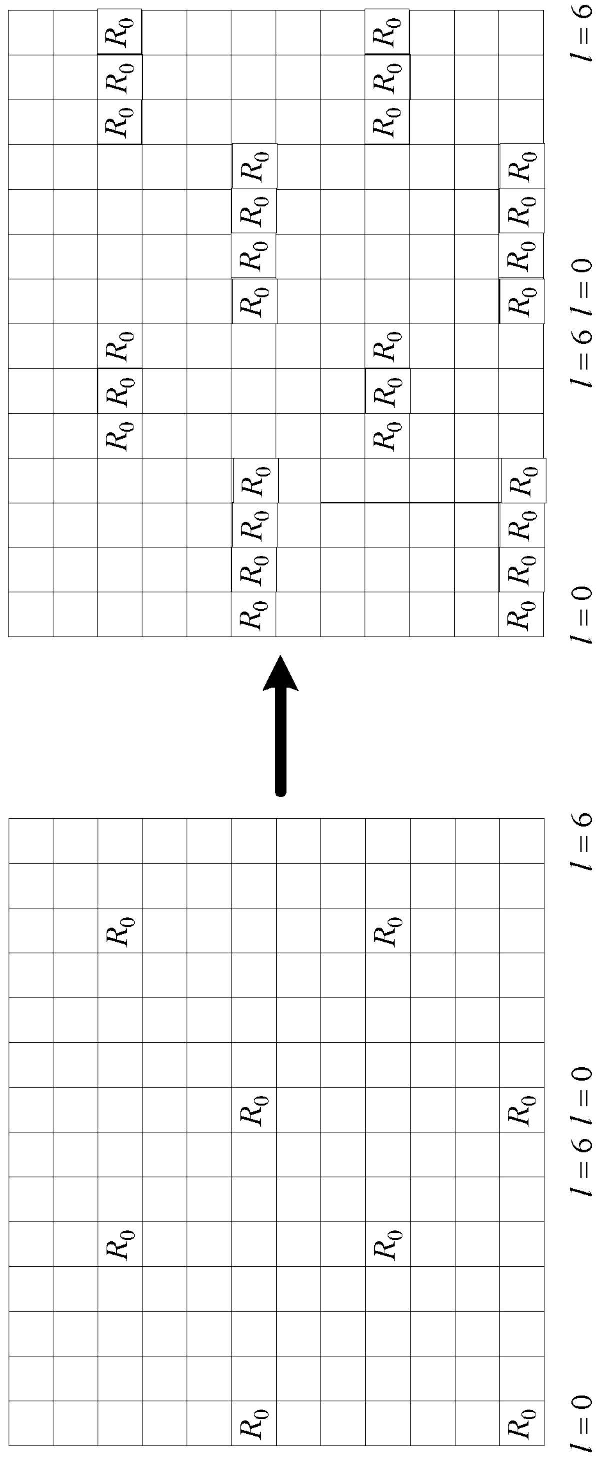
FIG. 78 is a schematic diagram of a change of a CRS pattern in a case of an NCP when a terminal has one antenna port in a second option in Solution 3.
Figure 79:
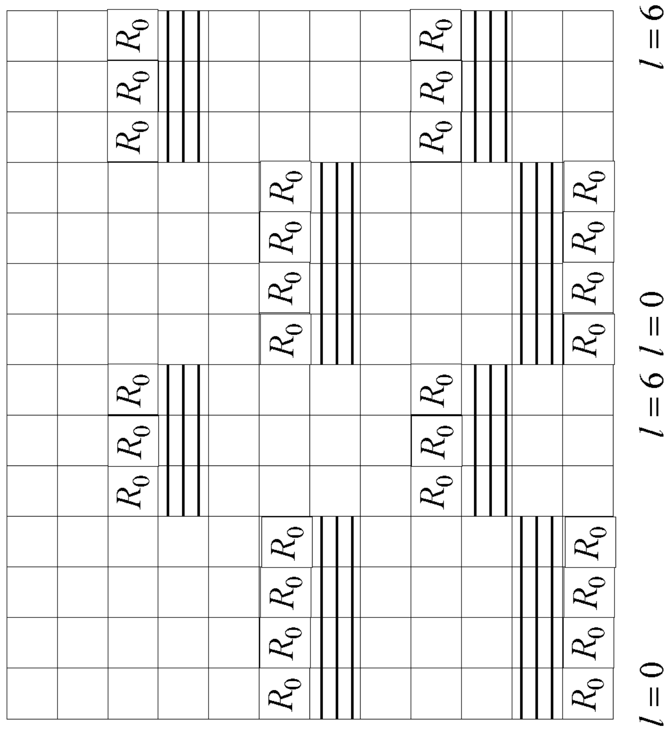
FIG. 79 is a schematic diagram of CRS and uPDCCH patterns in a case of an NCP when a terminal has one antenna port in a second option in Solution 3.
Figure 79:
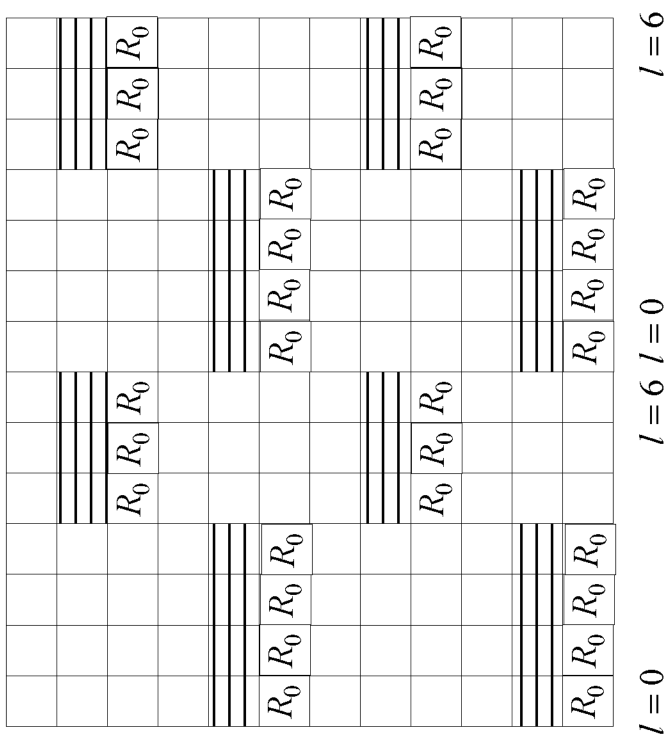

When three OFDM symbols are used as a transmission unit, Option 2 is used, and there is one antenna port, for a CRS pattern and a uPDCCH pattern, separately refer to FIG. 78 and FIG. 79.

Figure 80:
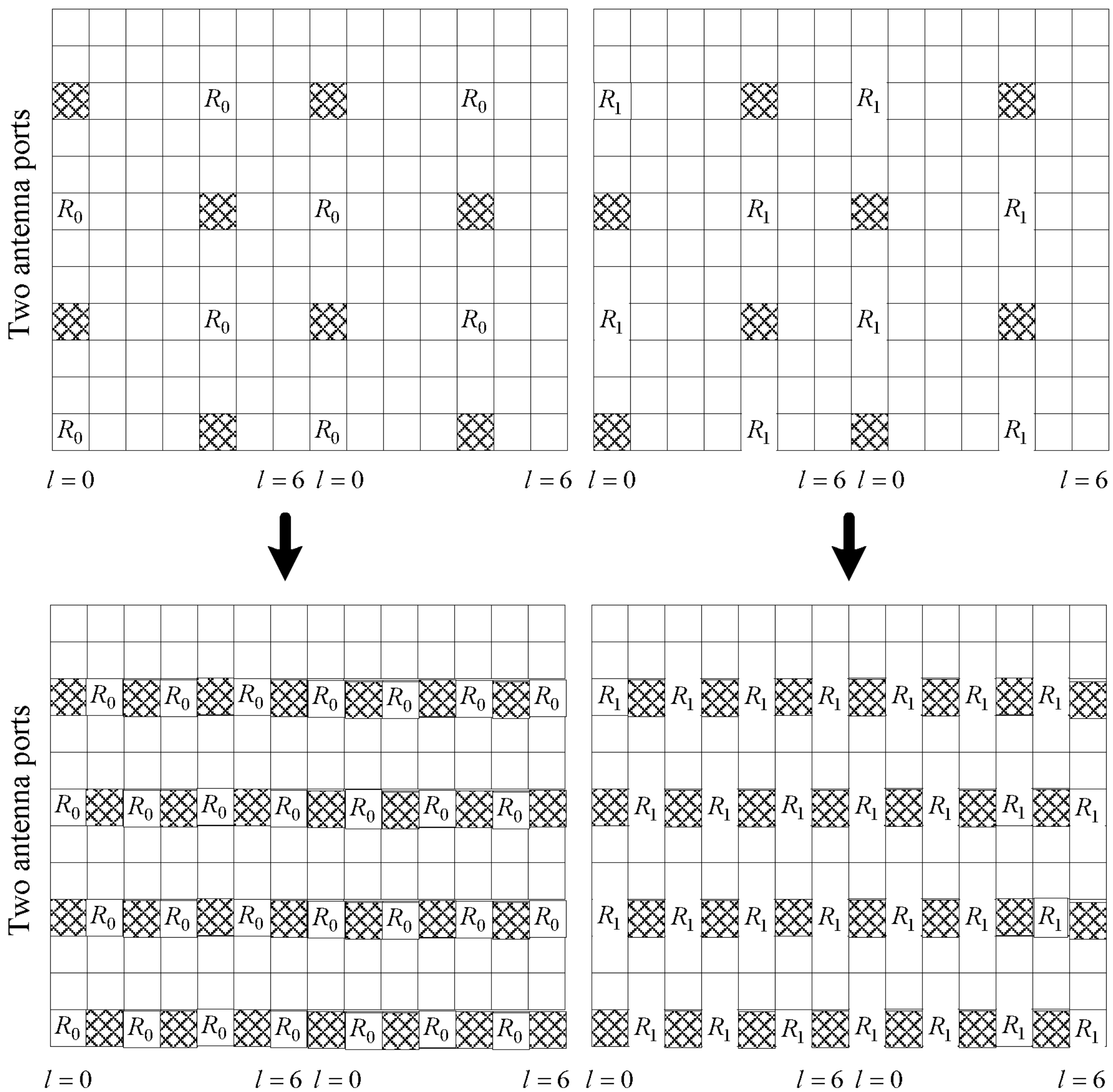
FIG. 80 is a schematic diagram of a change of a CRS pattern in a case of an NCP when a terminal has two antenna ports in a second option in Solution 3.
Figure 81:
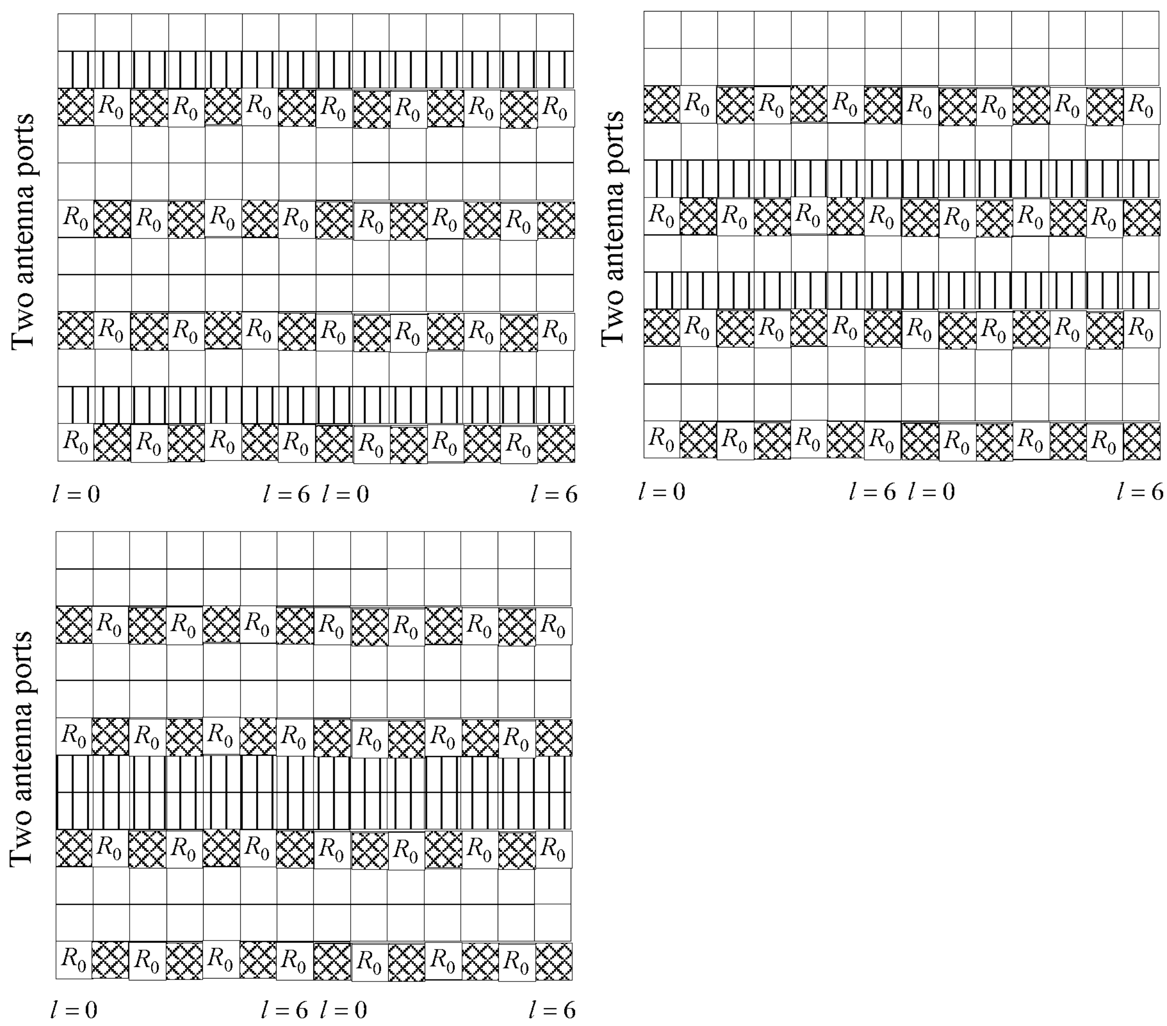
FIG. 81 is a schematic diagram of CRS and uPDCCH patterns in a case of an NCP when a terminal has two antenna ports in a second option in Solution 3.

When three OFDM symbols are used as a transmission unit, Option 2 is used, and there are two antenna ports, for a CRS pattern and a uPDCCH pattern, separately refer to FIG. 80 and FIG. 81.

Figure 82A:
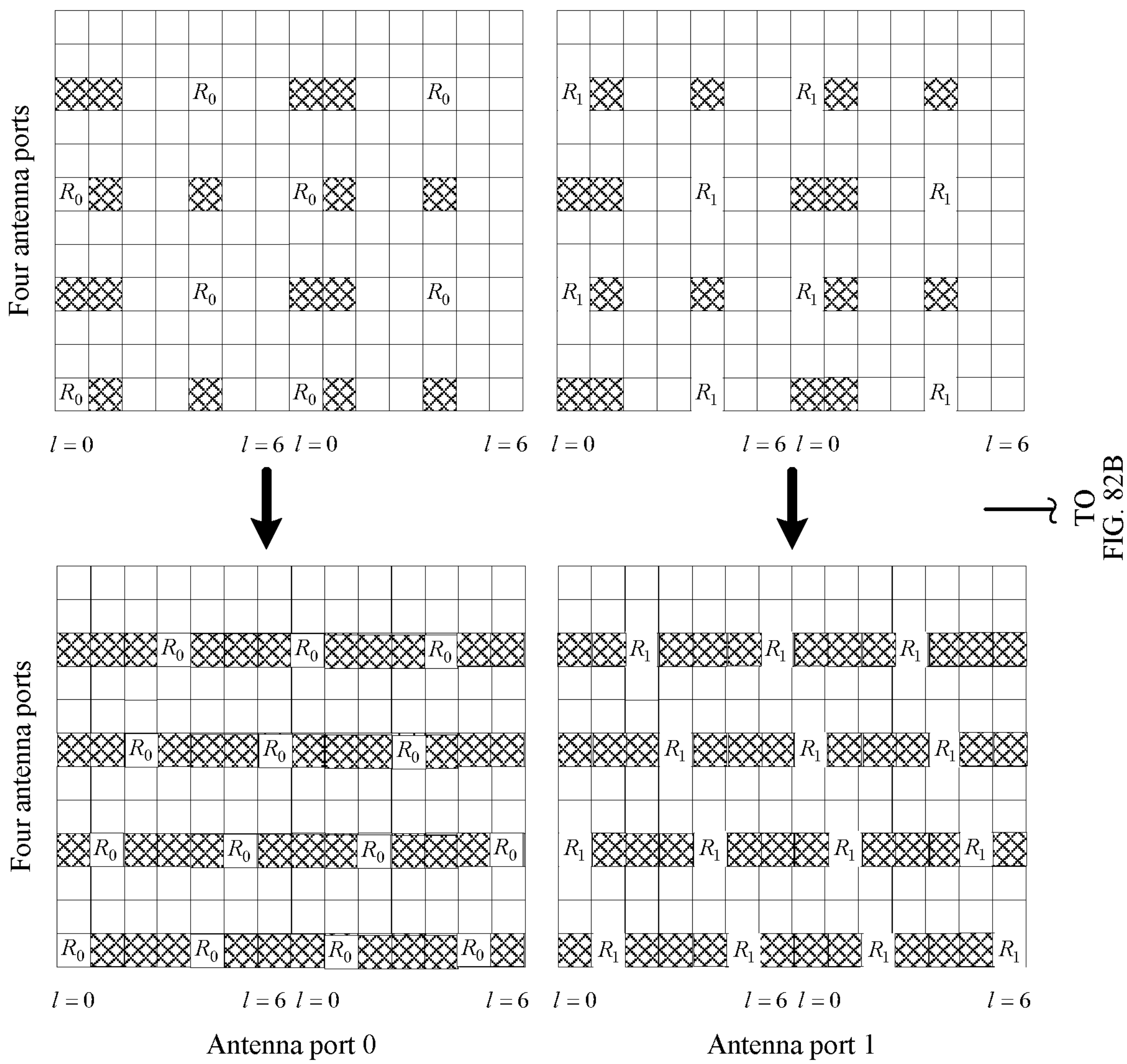
FIG. 82A and FIG. 82B are a schematic diagram of a change of a CRS pattern in a case of an NCP when a terminal has four antenna ports in a second option in Solution 3.
Figure 82B:
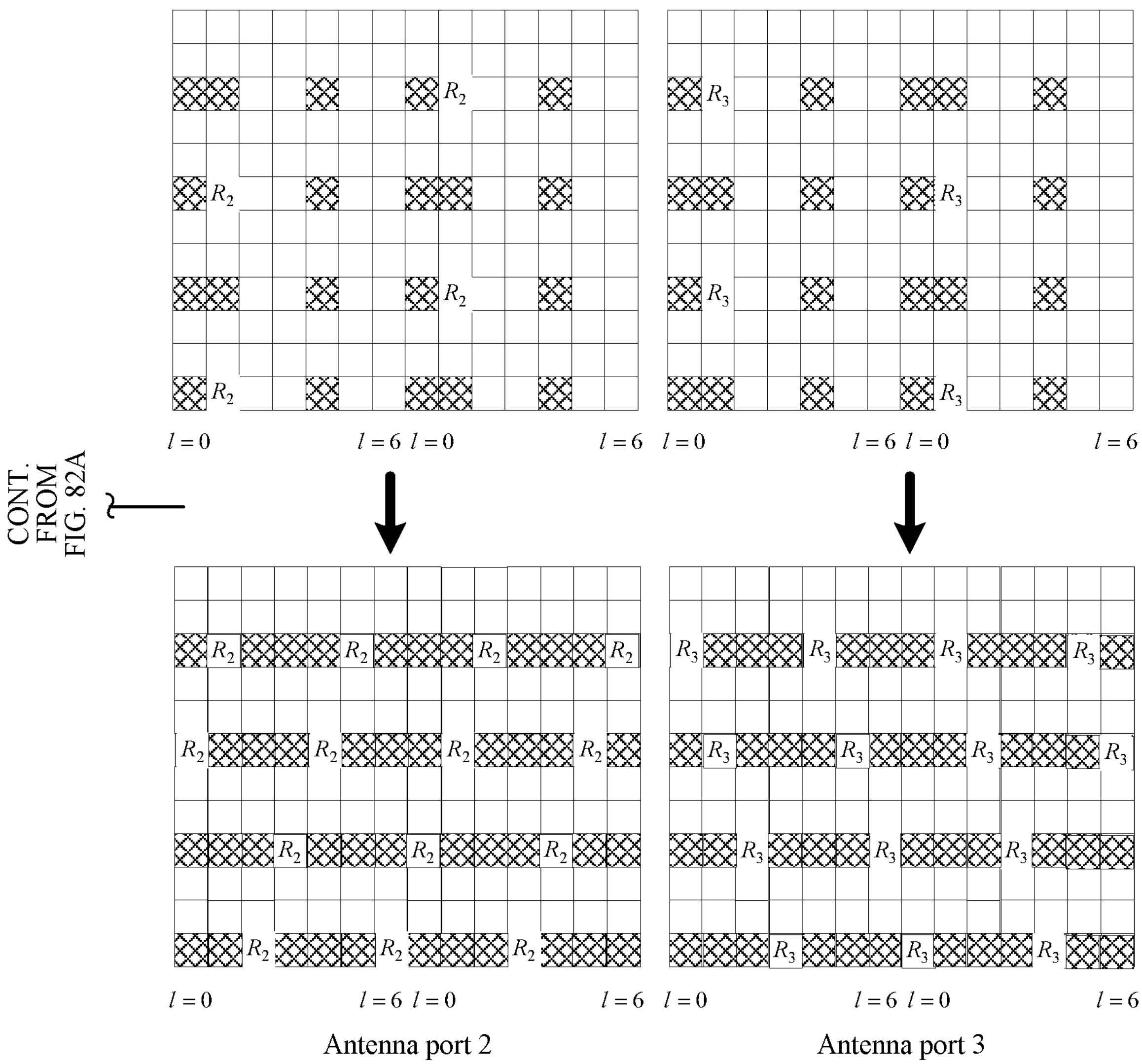
Figure 83:
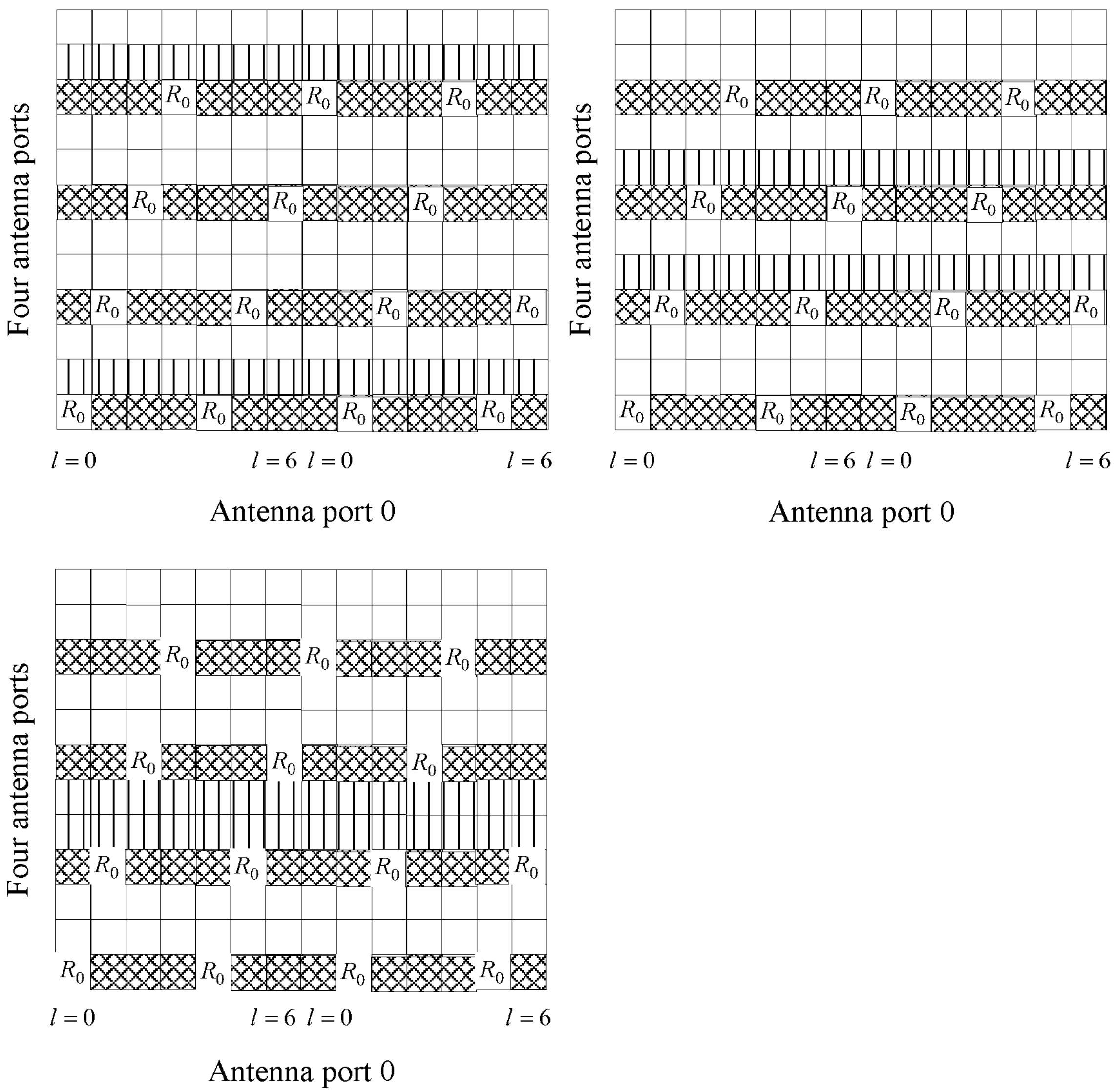
FIG. 83 is a schematic diagram of CRS and uPDCCH patterns in a case of an NCP when a terminal has four antenna ports in a second option in Solution 3.

When three OFDM symbols are used as a transmission unit, Option 2 is used, and there are four antenna ports, for a CRS pattern and a uPDCCH pattern, separately refer to FIG. 82A, FIG. 82B, and FIG. 83.

According to a method for transmitting downlink data that is provided in this embodiment of the present disclosure, a base station sends Q OFDM symbols to UE according to a predetermined pattern, and receives a response message sent by the UE to the base station after the UE receives the Q OFDM symbols. Because Q is a positive integer that is greater than or equal to 1 and less than 12 or 14, an end-to-end transmission latency is reduced by transmitting Q symbols that are less than symbols included in a subframe, so that a ULL requirement can be met. Therefore, in comparison with an existing manner of mapping the downlink control signal to a downlink subframe for transmission, in this embodiment of the present disclosure, Q is a positive integer that is greater than or equal to 1 and less than 12 or 14. Because a quantity of transmitted symbols is less than a quantity of symbols in a subframe, an end-to-end transmission latency from a transmit end to a receive end and then from the receive end to the transmit end can be reduced. Further, when Q is a positive integer that is greater than or equal to 1 and less than or equal to 3, a downlink control signal may be transmitted using one to three OFDM symbols, so as to meet a requirement that an end-to-end latency is less than 1 millisecond.

Embodiment 4

Figure 84:
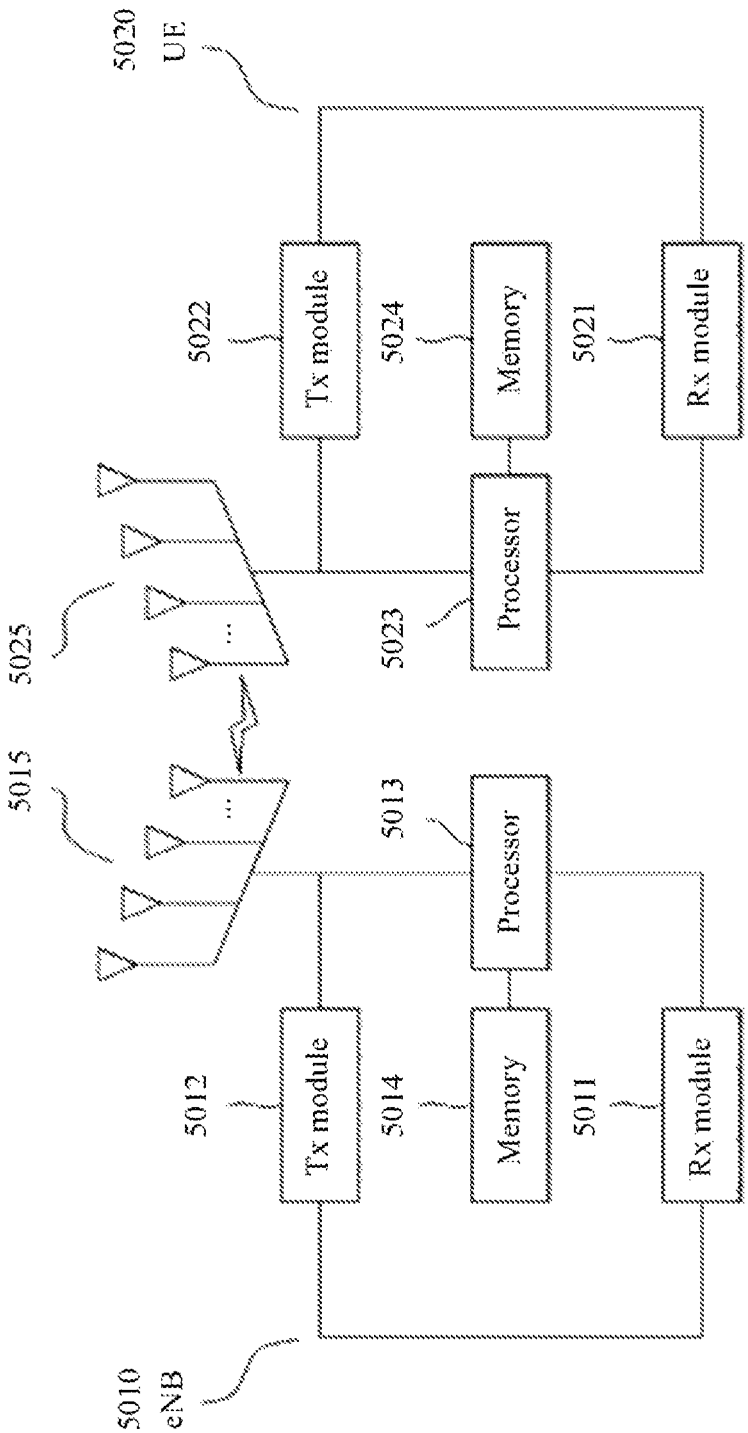
FIG. 84 is a diagram of configuration in an example embodiment of a wireless communications system including a base station and UE according to the present disclosure.

FIG. 84 shows a diagram of configuration of a wireless communications system including UE and a base station according to an example embodiment of the present disclosure.

The base station (eNB) 5010 may include a receiving (Rx) module 5011, a transmission (Tx) module 5012, a processor 5013, a memory 5014, and an antenna 5015. The Rx module 5011 may receive various signals, data, information, and the like from the UE. The Tx module 5012 may transmit various signals, data, information, and the like to the UE. The processor 5013 may be configured to perform overall control on the base station 5010 including the Rx module 5011, the Tx module 5012, the memory 5014, and the antenna 5015. The antenna 5015 may include various types of antennas.

The processor 5013 may map, in a data area of a downlink subframe with normal CP configuration according to a predetermined pattern, a CSI-RS used for four or fewer antenna ports, and control the downlink subframe to which the CSI-RS used for four or fewer antenna ports is mapped.

The processor 5013 is configured to process information received by the UE and information to be transmitted to an external device. The processor 5014 may store the processed information for predetermined duration, and may be replaced with a component such as a buffer (not shown).

The UE 5020 may include an Rx module 5021, a Tx module 5022, a processor 5023, and a memory 5024. The Rx module 5021 may receive various signals, data, information, and the like from the base station. The Tx module 5022 may transmit various signals, data, information, and the like to the base station. The processor 5023 may be configured to perform overall control on the base station 5020 including the Rx module 5021, the Tx module 5022, the memory 5024, and an antenna 5025. The antenna 5025 may include a plurality of antennas.

The processor 5013 is configured to control the receiver and the transmitter.

The Tx module 5022 is configured to send Q OFDM symbols to the UE according to a predetermined pattern.

The Rx module 5021 is configured to receive a response message sent by the UE. The response message is a message sent by the terminal device to the base station after the terminal device receives the Q OFDM symbols.

The predetermined pattern is a pattern including the Q OFDM symbols in a PRB. Q is a positive integer that is greater than or equal to 1 and less than 12 or 14. At least one of the Q OFDM symbols in the PRB includes a downlink control signal and downlink data.

The predetermined pattern to which a CRS is mapped may be determined in advance, and may be shared by the base station 5010 and the UE 5020. The predetermined pattern may be defined, so that a CRS mapped for four or fewer antenna ports is mapped to one or more OFDM symbols in a downlink subframe.

For a function performed by the base station 5010 and detailed description, refer to the related description in Embodiment 2 and Embodiment 3, and details are not described herein again.

The base station for transmitting downlink data that is provided in this embodiment of the present disclosure sends the Q OFDM symbols to the UE according to the predetermined pattern, and receives the response message sent by the UE to the base station after the UE receives the Q OFDM symbols. Because Q is a positive integer that is greater than or equal to 1 and less than 12 or 14, an end-to-end transmission latency is reduced by transmitting Q symbols that are less than symbols included in a subframe, so that a ULL requirement can be met. Therefore, in comparison with an existing manner of mapping the downlink control signal to a downlink subframe for transmission, in this embodiment of the present disclosure, Q is a positive integer that is greater than or equal to 1 and less than 12 or 14. Because a quantity of transmitted symbols is less than a quantity of symbols in a subframe, an end-to-end transmission latency from a transmit end to a receive end and then from the receive end to the transmit end can be reduced. Further, when Q is a positive integer that is greater than or equal to 1 and less than or equal to 3, a downlink control signal may be transmitted using one to three OFDM symbols, so as to meet a requirement that an end-to-end latency is less than 1 ms.

The CRS in the foregoing embodiments may be replaced with a reference signal RS. In other embodiments, the reference signal RS may include a CRS, a multicast-broadcast single-frequency network reference signal MBSFN reference signal, a UE-specific reference signal UE-specific reference signal, a demodulation reference signal (DM-RS), a positioning reference signal (PRS), or a channel state information reference signal (CSI-RS).

The embodiments of the present disclosure can be implemented using hardware, firmware, software, or various apparatuses combined using hardware, firmware, and software.

If the present disclosure is implemented using hardware, the present disclosure can be implemented using an application-specific integrated circuit (ASIC), a digital signal processor (DSP), a digital signal processing device (DSPDS), a programmable logic device (PLD), a field programmable gate array (FPGA), a processor, a controller, a microcontroller, a microprocessor, or the like.

If an operation or a function of the present disclosure is implemented using firmware or software, the present disclosure may be implemented in various formats such as a module, a processor, and a function. Software code may be stored in a memory unit, so that the memory unit can be driven by a processor. The memory unit is located inside or outside the processor, so that the memory unit communicates with the processor using various known parts.

Detailed descriptions of the example embodiments of the present disclosure are disclosed, so that persons skilled in the art can implement or practice the present disclosure. Although the present disclosure is described with reference to the example embodiments, persons skilled in the art should understand that the present disclosure may be modified and changed without departing from the spirit or scope of the present disclosure described in the appended claims. For example, persons skilled in the art may combine the structures described in the embodiments for use. Therefore, the present disclosure should not be limited to a specific embodiment described herein but needs to be in the widest scope that complies with the principles and novelty disclosed herein.

Persons skilled in the art should understand that the present disclosure may be implemented in a specific manner other than the manner described herein without departing from the spirit and essential feature of the present disclosure. Therefore, the example embodiments are explained in all aspects serving as examples instead of limitations. The scope of the present disclosure should be determined by the appended claims and law equivalent content of the claims instead of the foregoing descriptions, and all change intentions within a meaning and equivalent scope of the accompanying claims are included. Further, obviously, some claims that cite specific claims and other claims that cite claims other than the specific claims may be combined to form an embodiment; or a new claim is added using modification after this application is submitted.

The foregoing embodiments of the present disclosure may be applied to various mobile communications systems.

What is claimed is:

1. A method for transmitting downlink data in a $5^{th}$ Generation (5G) low-latency system, comprising:

sending, by a base station, Q orthogonal frequency division multiplexing (OFDM) symbols to user equipment (UE) in a subframe according to a predetermined pattern for reducing end-to-end latency, wherein a quantity of the Q OFDM symbols that are sent is less than a total quantity of OFDM symbols available in the subframe; and receiving, by the base station, a response message from the UE after the UE receives the Q OFDM symbols, wherein the predetermined pattern is a pattern comprising the Q OFDM symbols in a physical resource block (PRB), wherein Q is a positive integer that is greater than or equal to 1 and less than or equal to 3, wherein the Q OFDM symbols comprise 12 subcarriers, wherein each PRB comprises 12 by Q resource elements (REs) such that each PRB comprises 12 to 36 REs, wherein at least one of the Q OFDM symbols in the PRB comprises a downlink control signal and downlink data, wherein the predetermined pattern comprises that a subcarrier carrying the downlink control signal and a subcarrier carrying a reference signal are the same or are adjacent in a frequency domain, and wherein the end-to-end latency between the base station and the UE is less than one millisecond.

2. The method of claim 1, wherein in each OFDM symbol, the downlink control signal occupies two of the REs in every M PRBs, and wherein M is an integer greater than or equal to 1.

3. The method of claim 2, wherein in each PRB, there are at least two OFDM symbols in N OFDM symbols comprising the downlink control signal in a downlink subframe, wherein a subcarrier carrying the downlink control signal in a particular OFDM symbol in the at least two OFDM symbols is different from at least one subcarrier carrying the downlink control signal in another OFDM symbol in the at least two OFDM symbols, and wherein N is a positive integer greater than or equal to 2.

4. The method of claim 1, wherein the reference signal comprises a cell-specific reference signal (CRS).

5. A base station for transmitting a downlink control signal in a $5^{th}$ Generation (5G) low-latency system, comprising:

a transmitter configured to send Q orthogonal frequency division multiplexing (OFDM) symbols to user equipment (UE) in a subframe according to a predetermined pattern for reducing end-to-end latency, wherein a quantity of the Q OFDM symbols that are sent is less than a total quantity of OFDM symbols available in the subframe; and a receiver coupled to the transmitter and configured to receive a response message from the UE after the UE receives the Q OFDM symbols, wherein the predetermined pattern is a pattern comprising the Q OFDM symbols in a physical resource block (PRB), wherein Q is a positive integer that is greater than or equal to 1 and less than or equal to 3, wherein the Q OFDM symbols comprise 12 subcarriers, wherein each PRB comprises 12 by Q resource elements (REs) such that each PRB comprises 12 to 36 resource elements REs, wherein at least one of the Q OFDM symbols in the PRB comprises a downlink control signal and downlink data, wherein the predetermined pattern comprises that a subcarrier carrying the downlink control signal and a subcarrier carrying a reference signal are the same or are adjacent in a frequency domain, and wherein the end-to-end latency between the base station and the UE is less than one millisecond.

6. The base station of claim 5, wherein in each OFDM symbol, the downlink control signal occupies two of the REs in every M PRBs, and wherein M is an integer greater than or equal to 1.

7. The base station of claim 5, wherein in each PRB, there are at least two OFDM symbols in N OFDM symbols comprising the downlink control signal in a downlink subframe, wherein a subcarrier carrying the downlink control signal in a particular OFDM symbol in the at least two OFDM symbols is different from another subcarrier carrying at least one other downlink control signal in another OFDM symbol in the at least two OFDM symbols, and wherein N is a positive integer greater than or equal to 2.

8. The base station of claim 5, wherein the reference signal comprises a cell-specific reference signal (CRS).

9. The method of claim 1, wherein the reference signal comprises a multicast-broadcast single-frequency network (MBSFN) reference signal.

10. The method of claim 1, wherein the reference signal comprises a UE-specific reference signal.

11. The method of claim 1, wherein the reference signal comprises a demodulation reference signal (DM-RS).

12. The method of claim 1, wherein the reference signal comprises a positioning reference signal (PRS).

13. The method of claim 1, wherein the reference signal comprises a channel state information reference signal (CSI-RS).

14. The base station of claim 5, wherein the reference signal comprises a multicast-broadcast single-frequency network (MBSFN) reference signal.

15. The base station of claim 5, wherein the reference signal comprises a UE-specific reference signal.

16. The base station of claim 5, wherein the reference signal comprises a demodulation reference signal (DM-RS).

17. The base station of claim 5, wherein the reference signal comprises a positioning reference signal (PRS).

18. The base station of claim 5, wherein the reference signal comprises a channel state information reference signal (CSI-RS).

19. A computer program product comprising computer-executable instructions for storage on a non-transitory computer-readable medium that, when executed by a processor, cause a base station in a $5^{th}$ Generation (5G) low-latency system to:

send Q orthogonal frequency division multiplexing (OFDM) symbols to user equipment (UE) in a subframe according to a predetermined pattern for reducing end-to-end latency, wherein a quantity of the Q OFDM symbols that are sent is less than a total quantity of OFDM symbols available in the subframe; and receive a response message from the UE after the UE receives the Q OFDM symbols, wherein the predetermined pattern is a pattern comprising the Q OFDM symbols in a physical resource block (PRB), wherein Q is a positive integer that is greater than or equal to 1 and less than or equal to 3, wherein the Q OFDM symbols comprise 12 subcarriers, wherein each PRB comprises 12 by Q resource elements (REs) such that each PRB comprises 12 to 36 REs, wherein at least one of the Q OFDM symbols in the PRB comprises a downlink control signal and downlink data, wherein the predetermined pattern comprises that a subcarrier carrying the downlink control signal and a subcarrier carrying a reference signal are the same or are adjacent in a frequency domain, and wherein the end-to-end latency between the base station and the UE is less than one millisecond.

20. The computer program product of claim 19, wherein the reference signal comprises a multicast-broadcast single-frequency network (MBSFN) reference signal, a UE-specific reference signal, a demodulation reference signal (DM-RS), a positioning reference signal (PRS), or a channel state information reference signal (CSI-RS).

* * * * *